United States Patent
Yamamoto et al.

(10) Patent No.: US 11,454,746 B2
(45) Date of Patent: Sep. 27, 2022

(54) LAMINATED LENS STRUCTURE AND METHOD OF MANUFACTURING THE SAME, AND ELECTRONIC APPARATUS

(71) Applicant: SONY SEMICONDUCTOR SOLUTIONS CORPORATION, Kanagawa (JP)

(72) Inventors: Atsushi Yamamoto, Kanagawa (JP); Kaori Takimoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 438 days.

(21) Appl. No.: 16/478,021

(22) PCT Filed: Jan. 16, 2018

(86) PCT No.: PCT/JP2018/000934
§ 371 (c)(1),
(2) Date: Jul. 15, 2019

(87) PCT Pub. No.: WO2018/139253
PCT Pub. Date: Aug. 2, 2018

(65) Prior Publication Data
US 2019/0369299 A1    Dec. 5, 2019

(30) Foreign Application Priority Data

Jan. 26, 2017  (JP) .............................. JP2017-011991
Mar. 31, 2017  (JP) .............................. JP2017-069805

(51) Int. Cl.
*G02B 3/00*    (2006.01)
*B29D 11/00*    (2006.01)
*B29K 701/12*    (2006.01)

(52) U.S. Cl.
CPC ...... *G02B 3/0068* (2013.01); *B29D 11/00403* (2013.01); *G02B 3/0031* (2013.01); *B29K 2701/12* (2013.01)

(58) Field of Classification Search
CPC .. G02B 3/0068; G02B 3/0031; G02B 3/0012; B29D 11/00403; B29D 11/00307; B29D 11/00375; B29K 2701/12
See application file for complete search history.

(56) References Cited

U.S. PATENT DOCUMENTS

| 2008/0121784 A1 | 5/2008 | Chang |
| 2010/0079635 A1 | 4/2010 | Yano et al. |

(Continued)

FOREIGN PATENT DOCUMENTS

| CN | 101491961 | 7/2009 |
| CN | 101685188 | 3/2010 |

(Continued)

OTHER PUBLICATIONS

International Search Report and Written Opinion prepared by the European Patent Office dated Jul. 3, 2018, for International Application No. PCT/JP2018/0000934.

(Continued)

*Primary Examiner* — Robert E. Tallman
(74) *Attorney, Agent, or Firm* — Sheridan Ross P.C.

(57) ABSTRACT

To make it possible to restrain generation of chipping or cracking in a substrate of a laminated lens structure. A laminated lens structure includes substrates with lens which each have a lens disposed inside a through-hole formed in the substrate and which are laminated on one another by direct bonding, in which the substrates are each provided in the vicinity of the outer circumference thereof with through grooves penetrating the substrate. The present technology is applicable, for example, to a compound eye camera module.

21 Claims, 89 Drawing Sheets

(56) References Cited

U.S. PATENT DOCUMENTS

| | | | |
|---|---|---|---|
| 2010/0283113 A1* | 11/2010 | Kang | ............... H01L 27/14683 |
| | | | 257/432 |
| 2010/0321802 A1 | 12/2010 | Kim et al. | |
| 2011/0115058 A1* | 5/2011 | Mieczkowski | ....... H01L 23/562 |
| | | | 257/620 |
| 2011/0211105 A1 | 9/2011 | Yamada et al. | |
| 2011/0249350 A1 | 10/2011 | Hsueh | |
| 2011/0310281 A1 | 12/2011 | Chang et al. | |
| 2012/0322240 A1 | 12/2012 | Holden | |
| 2013/0003199 A1 | 1/2013 | Jeong et al. | |
| 2013/0126083 A1 | 5/2013 | Yamamoto | |
| 2013/0189829 A1 | 7/2013 | Mieczkowski et al. | |
| 2014/0063501 A1 | 3/2014 | Hirokubo | |

FOREIGN PATENT DOCUMENTS

| | | |
|---|---|---|
| CN | 101726815 A | 6/2010 |
| CN | 102529286 A | 7/2012 |
| CN | 102668072 | 9/2012 |
| JP | 2009-279790 | 12/2009 |
| JP | 2011-138089 | 7/2011 |
| JP | 2013-003542 | 1/2013 |
| JP | 2013511155 A | 3/2013 |
| JP | 2013-525828 | 6/2013 |
| JP | 2015-152922 | 8/2015 |
| KR | 100718421 B1 | 5/2007 |
| KR | 20090077305 A | 7/2009 |
| KR | 101503027 B1 | 3/2015 |
| WO | WO 2008/096822 | 8/2008 |
| WO | WO 2011/120538 | 10/2011 |
| WO | WO 2017/022193 | 2/2017 |

OTHER PUBLICATIONS

Official Action (with English translation) for China Patent Application No. 201880005184.7, dated Dec. 24, 2020, 34 pages.

* cited by examiner

F I G . 8 2
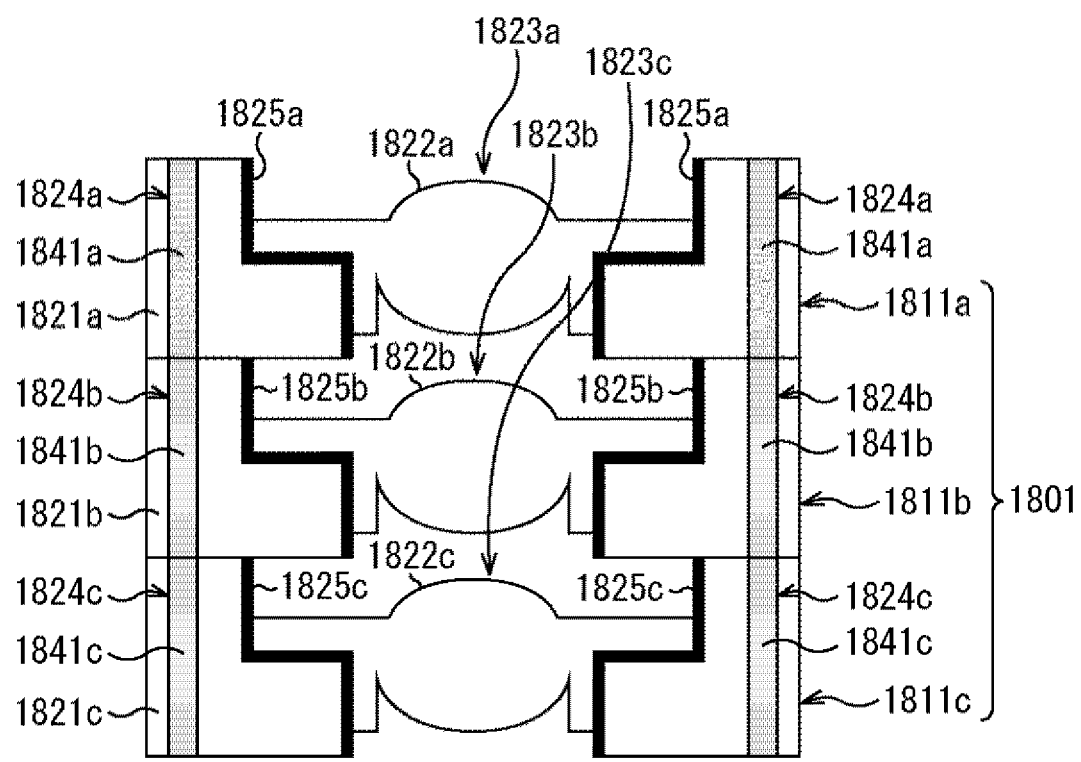

US 11,454,746 B2

LAMINATED LENS STRUCTURE AND METHOD OF MANUFACTURING THE SAME, AND ELECTRONIC APPARATUS

CROSS REFERENCE TO RELATED APPLICATIONS

This application is a national stage application under 35 U.S.C. 371 and claims the benefit of PCT Application No. PCT/JP2018/000934 having an international filing date of 16 Jan. 2018, which designated the United States, which PCT application claimed the benefit of Japanese Patent Application No. 2017-011991 filed 26 Jan. 2017 and 2017-069805 filed 31 Mar. 2017, the entire disclosures of each of which are incorporated herein by reference.

TECHNICAL FIELD

The present technology relates to a laminated lens structure and a method of manufacturing the same, and an electronic apparatus. Particularly, the present technology relates to a laminated lens structure and a method of manufacturing the same, and an electronic apparatus in which generation of chipping or cracking in a substrate of the laminated lens structure can be restrained.

BACKGROUND ART

A wafer level lens process in which a plurality of lenses are arranged in plane directions of a wafer substrate involves severe demands for shape accuracy and positional accuracy in forming the lenses. Particularly, a process for manufacturing a laminated lens structure by laminating wafer substrates on each other is very high in degree of difficulty, and lamination of three or more layers of substrates has not yet been realized on a mass production basis.

With regard to the wafer level lens process, a variety of technologies have hitherto been devised and proposed. For example, PTL 1 proposes a method in which in forming lenses by filling through-holes formed in substrates with a lens material, the lens material itself is used directly as an adhesive to thereby laminate the wafer substrates.

CITATION LIST

Patent Literature

PTL 1: JP 2009-279790A

SUMMARY OF INVENTION

Technical Problem

In individualizing laminated lens structures in which a plurality of substrates with lens are laminated, it is necessary to prevent chipping and to avoid generation of cracking in the substrate in, for example, a dropping test of a module in which the laminated lens structure is incorporated.

The present technology has been made in consideration of the above-mentioned circumstances, and it is an object of the present technology to make it possible to restrain generation or chipping or cracking in a substrate of a laminated lens structure.

Solution to Problem

A stacked lens substrate according to an aspect of the present technology includes a first lens substrate including a first lens in a first through-hole, a second lens substrate including a second lens in a second through-hole, the second lens substrate being stacked on the first lens substrate, and groove portions penetrating the first lens substrate and the second lens substrate in a cross-section view, wherein the first through-hole is disposed between at least two groove portions in a plan view.

A method of manufacturing a stacked lens structure according to an aspect of the present technology includes disposing a first lens in a first through-hole of a first lens substrate, disposing a second lens in a second through-hole of a second lens substrate, stacking the first lens substrate on the second lens substrate; forming groove portions penetrating the first lens substrate and the second lens substrate in a cross-section view, wherein the first through-hole is disposed between at least two groove portions in a plan view, and dicing the stacked substrates along dicing lines.

A method of manufacturing a stacked lens structure according to an aspect of the present technology includes bonding a plurality of lens substrates to one another by direct bonding, each lens substrate of the plurality of lens substrates including a lens disposed inside a through-hole formed in the respective lens substrate, forming grooves portions along dicing lines, and dicing the plurality of lens substrates along the dicing lines.

An electronic apparatus according to an aspect of the present technology includes a stacked lens substrate including a first lens substrate including a first lens in a first through-hole, a second lens substrate including a second lens in a second through-hole, the second lens substrate being stacked on the first lens substrate, and groove portions penetrating the first lens substrate and the second lens substrate in a cross-section view, wherein the first through-hole is disposed between at least two groove portions in a plan view, and an image sensor corresponding to the first through-hole.

The laminated lens structure and the electronic apparatus may be independent devices or may each be a module to be incorporated in another device.

Advantageous Effects of Invention

According to the first to fourth aspects of the present technology, generation of chipping or cracking in the substrate in the laminated lens structure can be restrained.

Note that the effect described here is not necessarily restrictive, and the effect of the present disclosure may be any one of the effects described herein.

BRIEF DESCRIPTION OF DRAWINGS

FIG. 82 is a schematic view of a section illustrating a first modification of the laminated lens structure of FIG. 77.

DESCRIPTION OF EMBODIMENTS

Modes for carrying out the present technology (hereinafter referred to as embodiments) will be described below. Note that the descriptions will be made in the following order.
1. First Embodiment of Camera Module
2. Second Embodiment of Camera Module
3. Third Embodiment of Camera Module
4. Fourth Embodiment of Camera Module
5. Fifth Embodiment of Camera Module
6. Detailed Configuration of Camera Module of Fourth Embodiment
7. Sixth Embodiment of Camera Module
8. Seventh Embodiment of Camera Module
9. Detailed Configuration of Substrate with Lens
10. Method of Producing Substrate with Lens
11. Direct Bonding between Substrates with Lens
12. Eighth and Ninth Embodiments of Camera Module
13. Tenth Embodiment of Camera Module
14. Eleventh Embodiment of Camera Module
15. Effect of Present Structure in Comparison with Other Structures
16. Various Modifications
17. Example of Application to Electronic Apparatus
18. Example of Application to Body Internal Information Acquisition System
19. Example of Application to Endoscopic Surgery System
20. Example of Application to Mobile Body 1. First Embodiment of Camera Module FIG. 1 illustrates figures depicting a first embodiment of a camera module using a laminated lens structure to which the present technology is applied.

Figure 1:
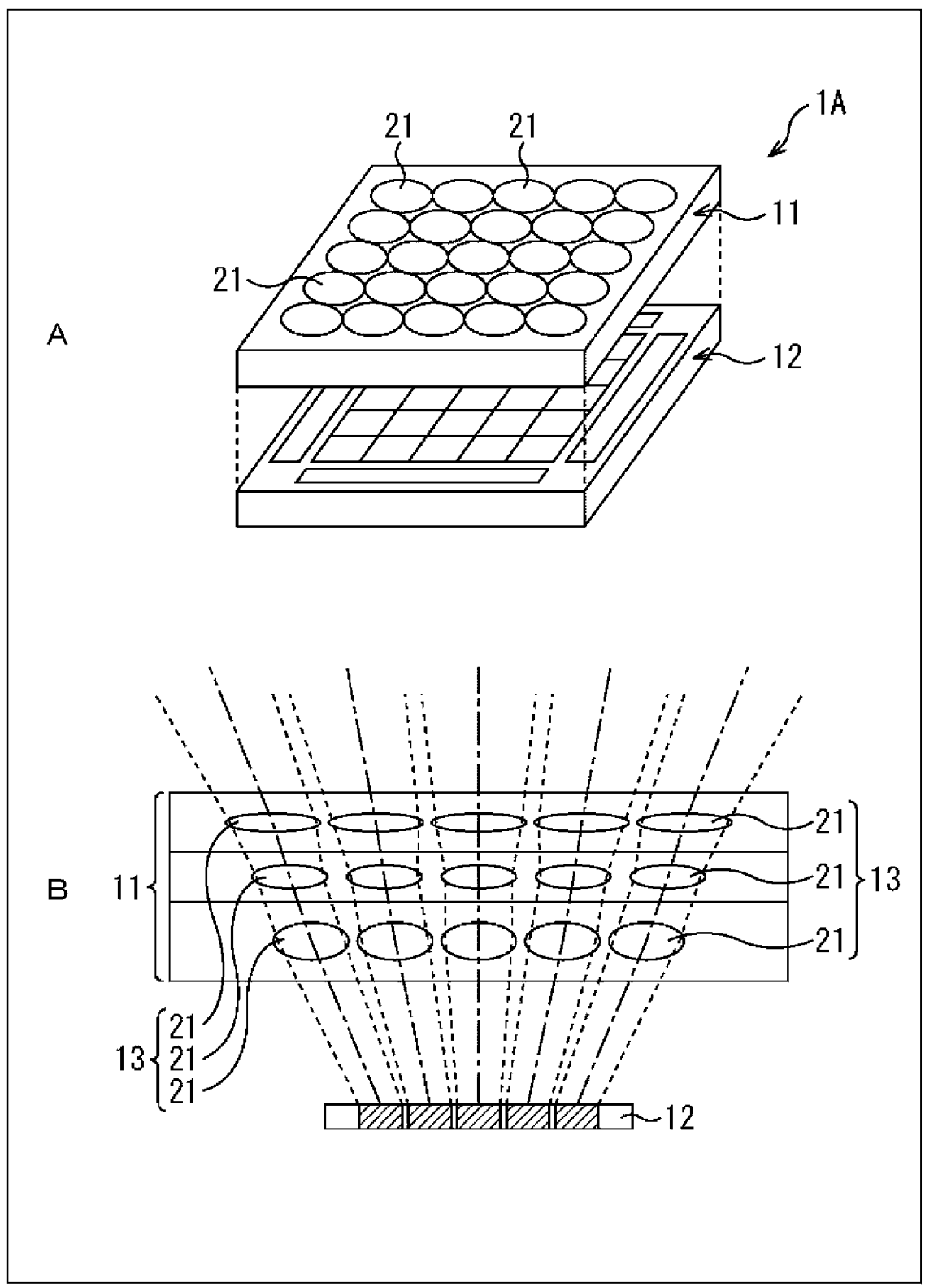
FIG. 1 illustrates figures depicting a first embodiment of a camera module using a laminated lens structure to which the present technology is applied.

A of FIG. 1 is a schematic view illustrating a configuration of a camera module 1A as a first embodiment of a camera module 1. B of FIG. 1 is a schematic sectional view of the camera module 1A.

The camera module 1A includes a laminated lens structure 11 and a light-receiving element 12. The laminated lens structure 11 has a total of 25 optical units 13, five each in a column direction and five each in a row direction. The optical element 13 is configured to include a plurality of lenses 21 directed in a single optical axis direction. The camera module 1A is a compound eye camera module provided with a plurality of the optical elements 13.

The optical axes of the plurality of optical units 13 possessed by the camera module 1A are disposed to diverge toward the outside of the module, as illustrated in B of FIG. 1, whereby imaging of a wide-angle image can be achieved.

Note that while the laminated lens structure 11 is illustrated to have a structure in which only three layers of lenses 21 are laminated, in B of FIG. 1, for simplification, it is natural that more lenses 21 may be laminated.

The camera module 1A of FIG. 1 is capable of producing a single wide-angle image by joining together a plurality of images imaged by the plurality of optical units 13. Since the plurality of images are joined together, high accuracy is demanded for the formation and layout of each of the optical units 13 for imaging the images. In addition, particularly since the incidence angle of light on the lens 21 is smaller at the optical unit 13 on the wide-angle side, high accuracy is demanded also for the positional relationship and layout of the lenses 21 in the optical unit 13.

Figure 2:
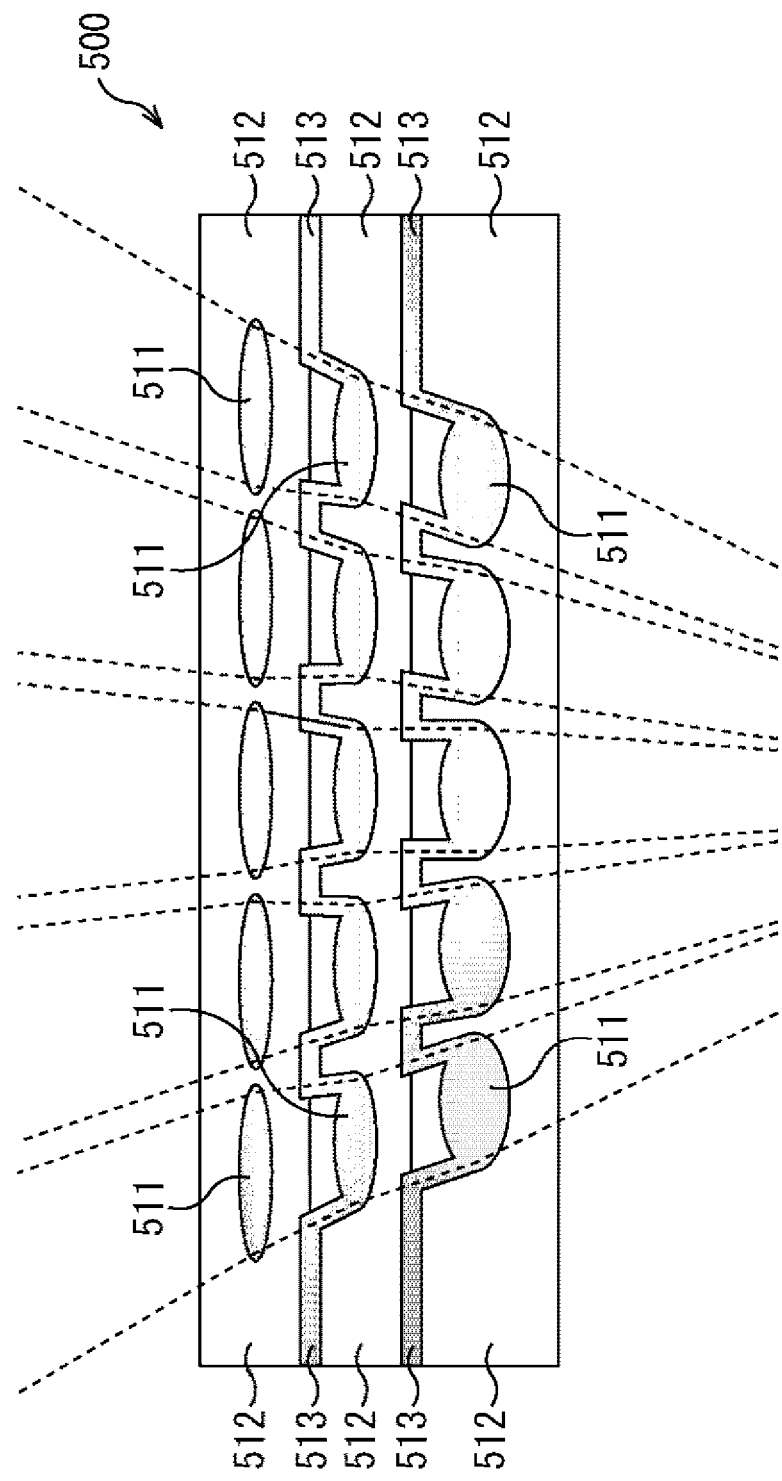
FIG. 2 is a sectional structural view of a laminated lens structure disclosed in PTL 1.

FIG. 2 is a sectional structural view of a laminated lens structure using a technique of fixing by a resin, disclosed in PTL 1.

In a laminated lens structure 500 illustrated in FIG. 2, a resin 513 is used as means for fixing together substrates 512 provided with lenses 511. The resin 513 is an energy-curing resin such as a UV-curing resin.

Before laminating the substrates 512 on one another, a layer of the resin 513 is formed on the whole surface of each of the substrates 512. Thereafter, the substrates 512 are laminated on one another, and, further, the resin 513 is cured. As a result, the laminated substrates 512 are firmly attached to one another.

However, when the resin 513 is cured, the resin 513 illustrates shrinkage on curing. In the case of the structure illustrated in FIG. 2, the resin 513 is cured after the layers of the resin 513 are formed on the whole surfaces of the substrates 512, and, therefore, displacement amounts of the resin 513 are large.

In addition, even after the laminated lens structure 500 formed by laminating the substrates 512 on one another is individualized and an imaging element is combined to form a camera module, the laminated lens structure 500 provided in the camera module has the resin 513 present in the whole area between the substrates 512 provided with the lenses 511, as illustrated in FIG. 2. Therefore, when the camera module is mounted in a housing of a camera and put to practical use, there is a fear that the resin between the substrates of the laminated lens structure 500 may undergo thermal expansion due to a temperature rise arising from heat generation in the apparatus.

Figure 3:
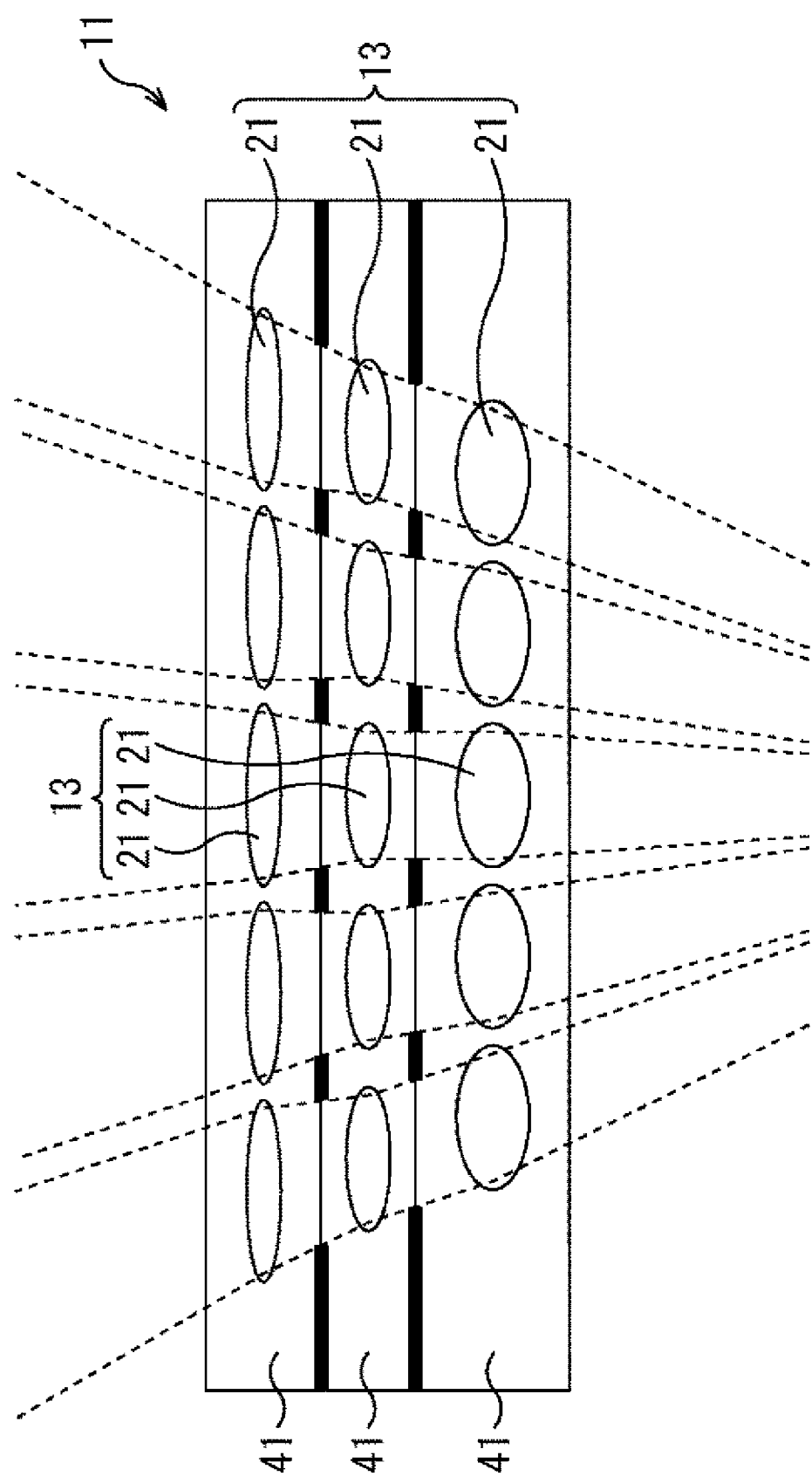
FIG. 3 is a sectional structural view of a laminated lens structure of the camera module of FIG. 1.

FIG. 3 is a sectional structural view illustrating only the laminated lens structure 11 of the camera module 1A of FIG. 1.

The laminated lens structure 11 of the camera module 1A is also formed by laminating a plurality of substrates with lens 41 provided with the lenses 21.

In the laminated lens structure 11 of the camera module 1A, as means for fixing together the substrates with lens 41 provided with the lenses 21, there is used fixing means different from those used in the laminated lens structure 500 of FIG. 2 or illustrated in the prior art documents.

Figure 4:
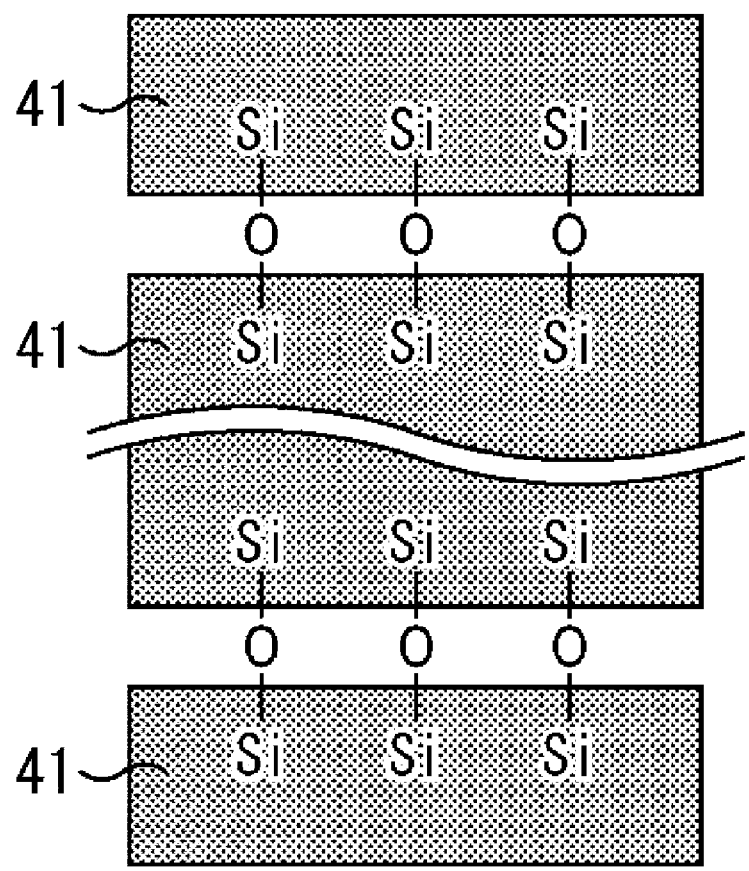
FIG. 4 illustrates direct bonding of substrates with lens.

Specifically, the two substrates with lens 41 to be laminated are directly bonded by covalent bond between a surface layer composed of an oxide or a nitride formed on a surface of the substrate on one side and a surface layer composed of an oxide or a nitride formed on a surface of the substrate on the other side. In a specific example, as illustrated in FIG. 4, a silicon oxide layer or a silicon nitride layer as a surface layer is formed on each of the two substrates with lens 41 to be laminated, hydroxyl groups are bonded to the surface layers, then the two substrates with lens 41 are laminated on each other, and temperature is raised to effect dehydration condensation. As a result, silicon-oxygen covalent bonds are formed between the surface layers of the two substrates with lens 41. In this way, the two substrates with lens 41 are directly bonded to each other. Note that the condensation may also cause direct covalent bonding between the elements contained in the two surface layers.

Herein, fixation of two substrates with lens 41 through an inorganic material layer disposed between the two substrates with lens 41, or fixation of two substrates with lens 41 by chemical bonding between inorganic material layers disposed respectively on surfaces of the two substrates with lens 41, or fixation of two substrates with lens 41 by formation of bonds through dehydration condensation between inorganic material layers disposed respectively on surfaces of the two substrates with lens 41, or fixation of two substrates with lens 41 by formation of covalent bonds through oxygen or covalent bonds between elements contained in inorganic material layers between the inorganic material layers disposed respectively on surfaces of the two substrates with lens 41, or fixation of two substrates with lens 41 by formation of silicon-oxygen covalent bonds or silicon-silicon covalent bonds between silicon oxide layers or silicon nitride layers disposed on surfaces of the two substrates with lens 41, as above-mentioned, is referred to as direct bonding.

In order to perform the lamination and the dehydration condensation by temperature rise, in the present embodiment, while using substrates which are ordinarily used in the field of manufacture of semiconductor devices and flat display devices, lenses are formed in a substrate state, the lamination and the dehydration condensation by temperature rise are conducted in a substrate state, and the bonding by covalent bonds is performed in a substrate state. The structure in which the inorganic material layers formed on surfaces of two substrates with lens 41 are bonded to each other by covalent bonds offers an action or effect of restraining deformation due to shrinkage on curing of the resin 513 present over the whole surface areas of the substrates or deformation due to thermal expansion of the resin 513 during practical use, which is possibly generated in the case of using the technology disclosed in PTL 1 and described referring to FIG. 2 above.

Figure 5:
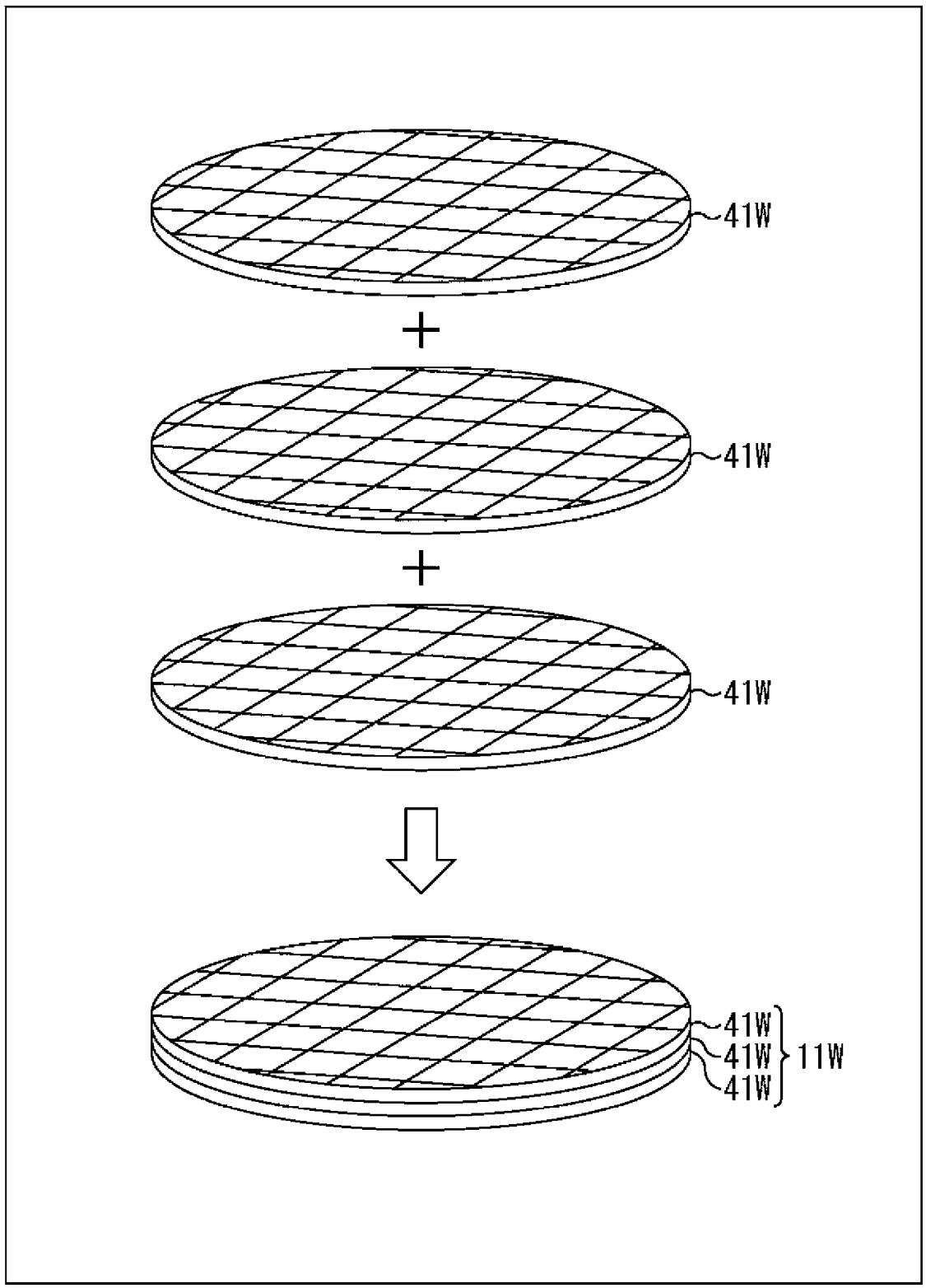
FIG. 5 illustrates a step of forming the camera module of FIG. 1.
Figure 6:
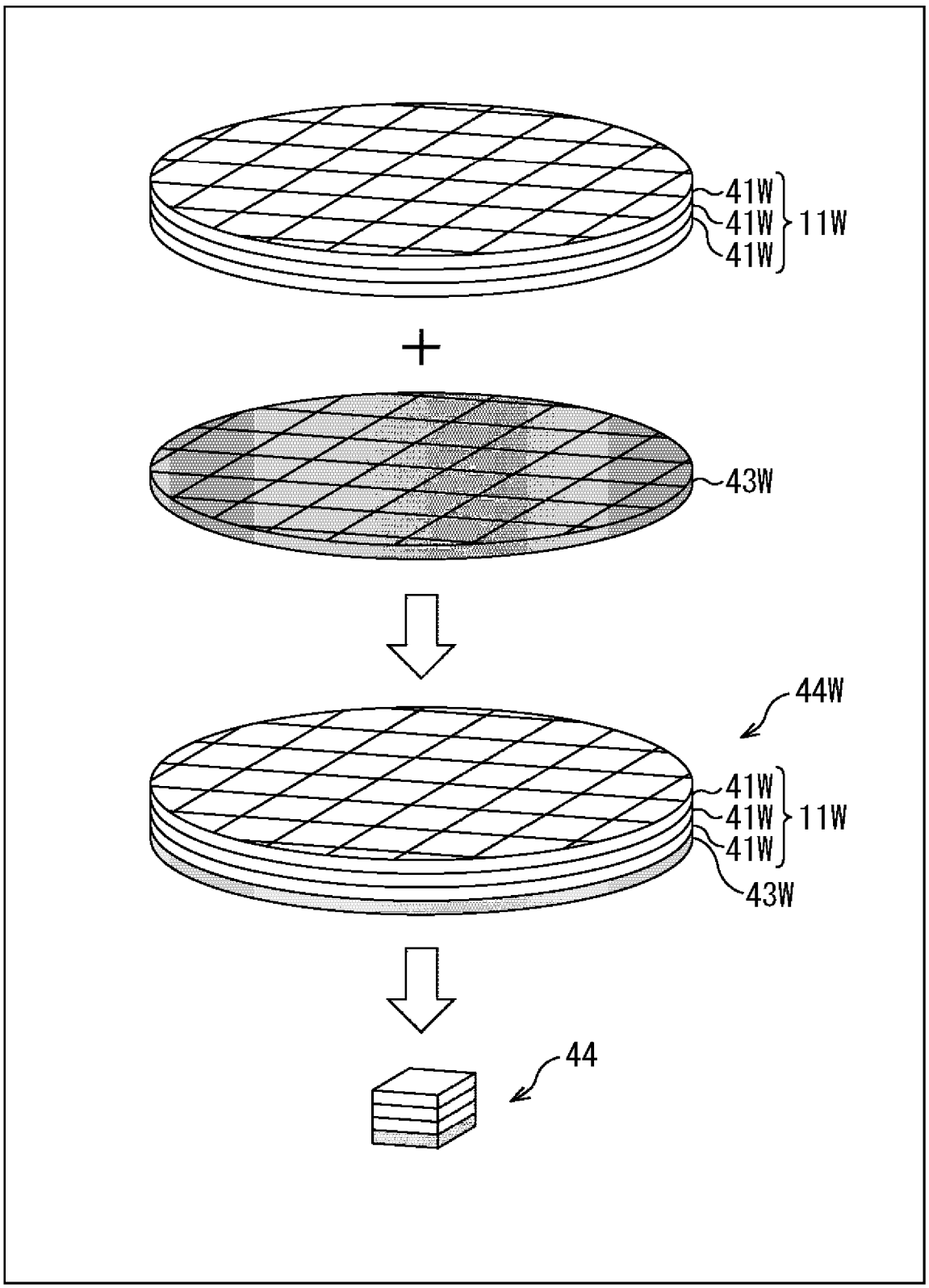
FIG. 6 illustrates a step of forming the camera module of FIG. 1.

FIGS. 5 and 6 illustrate figures illustrating steps of forming the camera module 1A of FIG. 1 in which the laminated lens structure 11 and the light-receiving element 12 are combined.

First, as illustrated in FIG. 5, a plurality of substrates with lens 41W provided with a plurality of lenses 21 (not illustrated) in plane directions are prepared, and they are laminated on each other. As a result, a laminated lens structure 11W in a substrate state is obtained in which the plurality of substrates with lens 41W in a substrate state are laminated on each other.

Next, as illustrated in FIG. 6, a sensor substrate 43W in a substrate state formed with a plurality of light-receiving elements 12 in plane directions is produced separately from the laminated lens structure 11W in the substrate state illustrated in FIG. 5, and is prepared.

Then, the sensor substrate 43W in the substrate state and the laminated lens structure 11W in the substrate state are laminated on each other, and external terminals are added thereto on the basis of each module of the laminated substrates, whereby a camera module 44W in a substrate state is obtained.

Finally, the camera module 44W in the substrate state is individualized on a module basis or chip basis. The individualized camera module 44 is sealed in a housing (not illustrated) prepared separately, whereby a final camera module 44 is obtained.

Note that in the present description and the drawings, a part with "W" added to its reference symbol such as, for example, the substrate with lens 41W, represents that the part is in a substrate state (wafer state), whereas a part without "W" added to its reference symbol such as, for example, the substrate with lens 41, represents that the part is in the state of being individualized on a module basis or chip basis. This applies also to other items such as sensor substrate 43W and camera module 44W.

Figure 7:
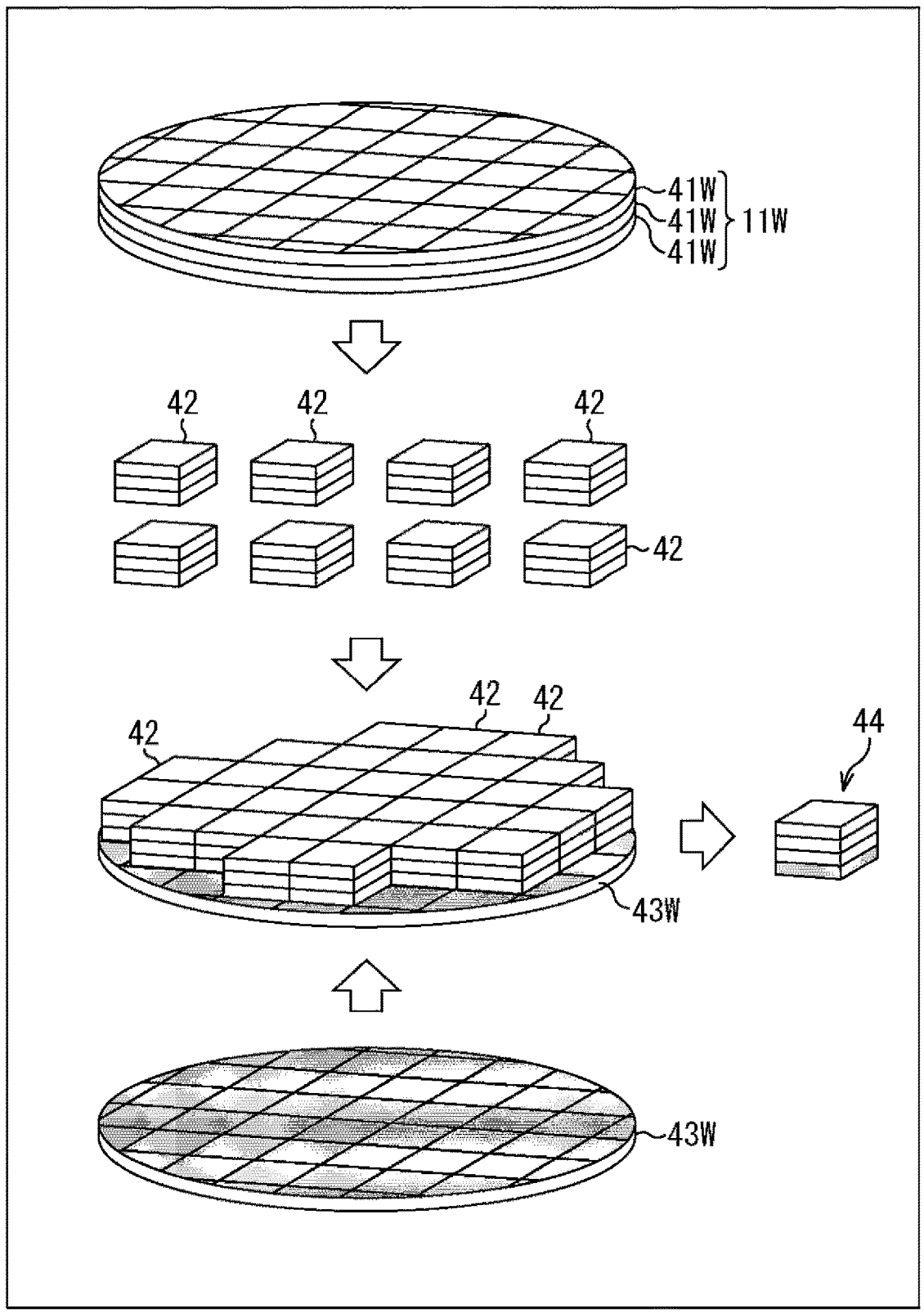
FIG. 7 illustrates a step of forming the camera module of FIG. 1.

FIG. 7 illustrates figures illustrating other steps of forming the camera module 1A of FIG. 1 in which the laminated lens structure 11 and the light-receiving element 12 are combined.

First, in the same manner as in the above-mentioned steps, a laminated lens structure 11W in a substrate state is produced in which a plurality of substrates with lens 41W in a substrate state are laminated.

Next, the laminated lens structure 11W in the substrate state is individualized.

In addition, a sensor substrate 43W in a substrate state is produced and prepared, separately from the laminated lens structure 11W in the substrate state.

Then, one individualized laminated lens structure 11 is mounted on each of the light-receiving elements 12 of the sensor substrate 43W in the substrate state.

Finally, the sensor substrate 43W in the substrate state, on which the individualized laminated lens structures 11 are mounted, is individualized on a module basis or chip basis.

The individualized sensor substrate 43 with the laminated lens structure 11 mounted thereon is sealed in a housing (not illustrated) prepared separately, and, further, external terminals are attached thereto, whereby a final camera module 44 is obtained.

Furthermore, as an example of still other steps of forming the camera module 1A of FIG. 1 in which the laminated lens structure 11 and the light-receiving element 12 are combined, a method may be adopted in which the sensor substrate 43W in a substrate state illustrated in FIG. 7 is individualized, then individualized laminated lens structures 11 are mounted respectively on the individual light-receiving elements 12 thus obtained, whereby individualized camera modules 44 are obtained.

Figure 8:
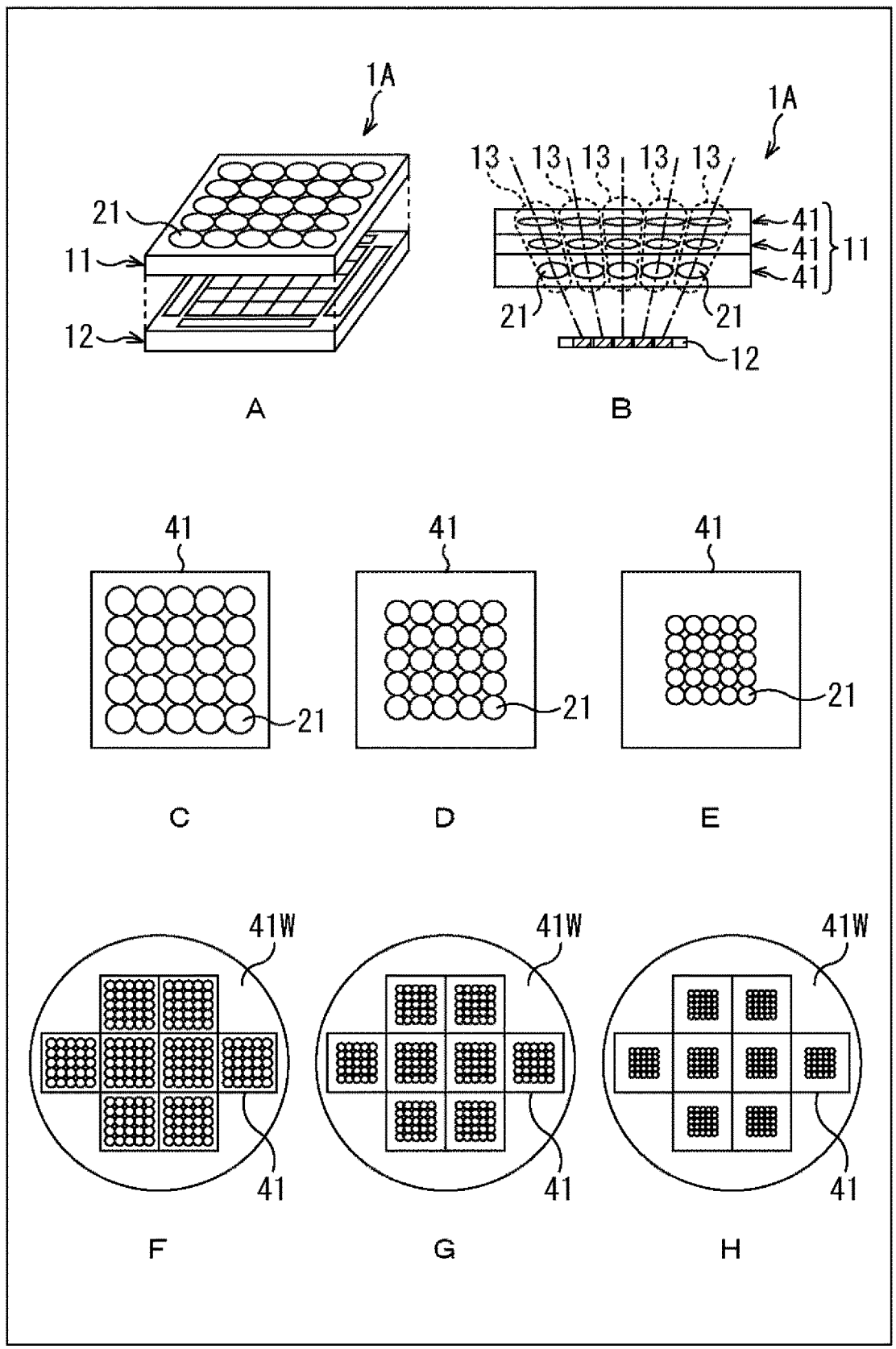
FIG. 8 illustrates figures for explaining the configuration of substrates with lens.

FIG. 8 illustrates figures for explaining the configuration of substrates with lens 41 in a camera module 1A.

A of FIG. 8 is a schematic view illustrating the configuration of a camera module 1A, like A of FIG. 1.

B of FIG. 8 is a schematic sectional view of the camera module 1A, like B of FIG. 1.

As illustrated in B of FIG. 8, the camera module 1A is a compound eye camera module provided with a plurality of optical units 13 each of which is formed by combining a plurality of lenses 21 and has a single optical axis. The laminated lens structure 11 includes a total of 25 optical units 13, five each in a column direction and five each in a row direction.

In the camera module 1A, the optical axes of the plurality of optical units 13 are disposed so as to diverge toward the outside of the module, whereby a wide-angle image can be imaged. While the laminated lens structure 11 is illustrated to have a structure in which only three substrates with lens 41 are laminated, in B of FIG. 8, for simplification, it is natural that more substrates with lens 41 may be laminated.

C to E of FIG. 8 are figures illustrating respective plan-view shapes of the three layers of substrates with lens 41 constituting the laminated lens structure 11.

C of FIG. 8 is a plan view of the substrate with lens 41 of the uppermost layer of the three layers, D of FIG. 8 is a plan view of the substrate with lens 41 of the middle layer, and E of FIG. 8 is a plan view of the substrate with lens 41 of the lowermost layer. Since the camera module 1 is a compound eye wide-angle camera module, the diameter of the lens 21 is greater and the pitch of the lenses is greater in the upper layer among the layers.

F to H of FIG. 8 are plan views of the substrates with lens 41W in a substrate state, for obtaining the substrates with lens 41 illustrated in C to E of FIG. 8.

The substrate with lens 41W illustrated in F of FIG. 8 illustrates a substrate state corresponding to the substrate with lens 41 of C of FIG. 8, the substrate with lens 41W illustrated in G of FIG. 8 illustrates a substrate state corresponding to the substrate with lens 41 of D of FIG. 8, and the substrate with lens 41W illustrated in H of FIG. 8 illustrates a substrate state corresponding to the substrate with lens 41 of E of FIG. 8.

The substrates with lens 41W in the substrate state illustrated in F to H of FIG. 8 have a configuration in which eight camera modules 1A illustrated in A of FIG. 8 are obtained per substrate.

It is seen that among the substrates with lens 41W of F to H of FIG. 8, the pitch between the lenses in the substrate with lens 41 on a module basis is different between the substrate with lens 41W of an upper layer and the substrate with lens 41W of a lower layer, and, that, on the other hand, the pitch in laying out the substrates with lens 41 on the module basis in each substrate with lens 41W is constant from the substrate with lens 41W of an upper layer to the substrate with lens 41W of a lower layer.

2. Second Embodiment of Camera Module

Figure 9:
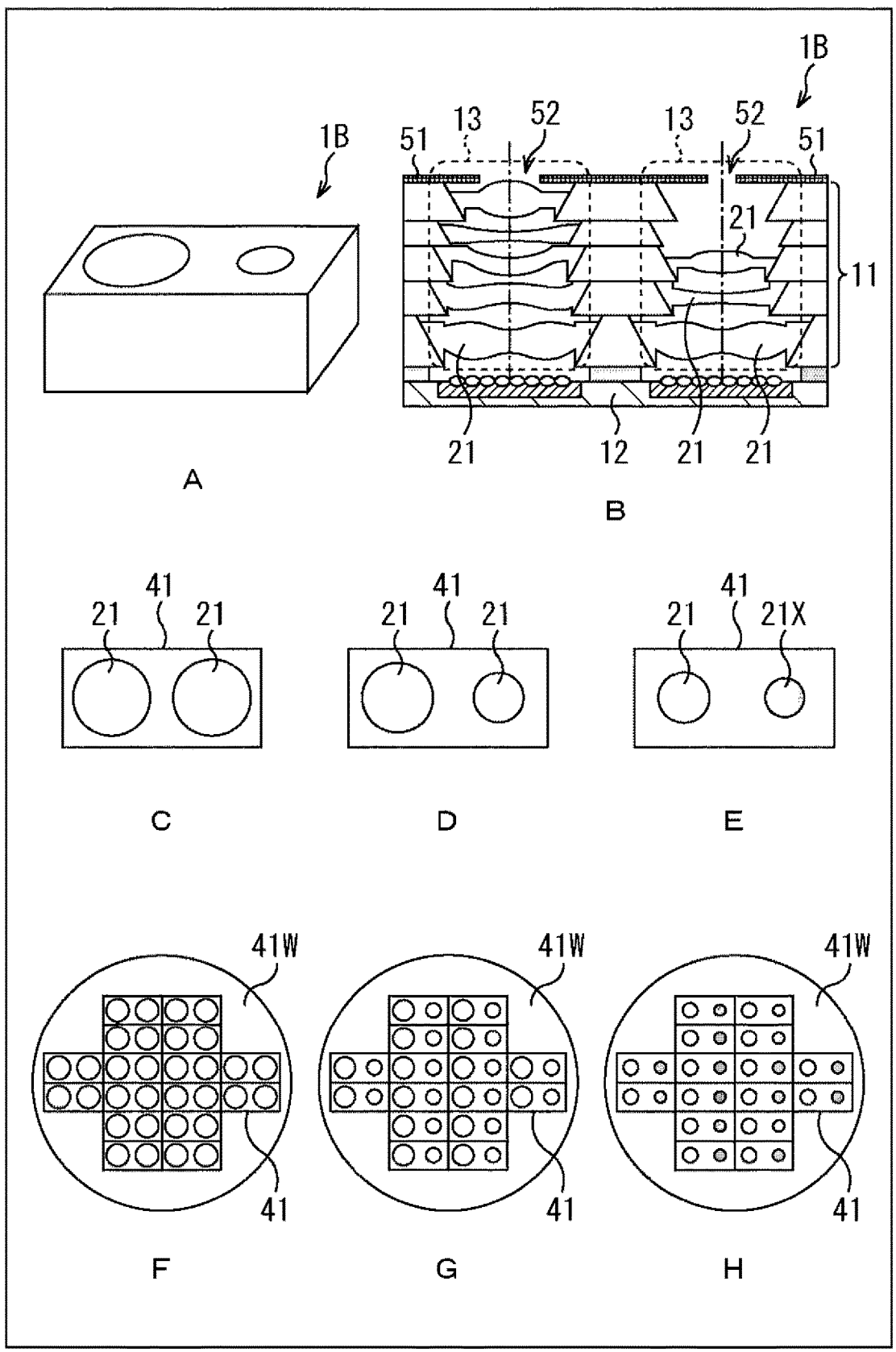
FIG. 9 illustrates figures illustrating a second embodiment of a camera module using a laminated lens structure to which the present technology is applied.

FIG. 9 illustrates figures illustrating a second embodiment of a camera module using a laminated lens structure to which the present technology is applied.

A of FIG. 9 is a schematic view illustrating an external appearance of a camera module 1B as a second embodiment of the camera module 1. B of FIG. 9 is a schematic sectional view of the camera module 1B.

The camera module 1B includes two optical units 13. The two optical units 13 each have a diaphragm plate 51 at an uppermost layer of a laminated lens structure 11. The diaphragm plate 51 is provided with an aperture 52.

While the camera module 1B includes the two optical units 13, the two optical units 13 differ in an optical parameter or parameters. In other words, the camera module 1B includes two kinds of optical units 13 differing in optical performance. The two kinds of optical units 13 may be, for example, an optical unit 13 with a shorter focal distance for imaging a near view, and an optical unit 13 with a longer focal distance for imaging a distant view.

In the camera module 1B, since the two optical units 13 differ in an optical parameter or parameters, the two optical units 13 differ, for example, in the number of lenses 21, as illustrated in B of FIG. 9. In addition, in regard of the lenses 21 in the same layer of the laminated lens structure 11 possessed by the two optical units 13, a configuration is possible in which the lenses 21 differ in any of diameter, thickness, surface shape, volume and distance from the adjacent lens. Therefore, with respect to the plan-view shape of the lenses 21 in the camera module 1B, for example, the two optical units 13 may have lenses 21 of the same diameter, as illustrated in C of FIG. 9, or the two optical units 13 may have lenses 21 of different shapes, as illustrated in D of FIG. 9, or one of the two optical units 13 does not have a lens 21 but has a cavity 21X, as illustrated in E of FIG. 9.

F to H of FIG. 9 are plan views of substrates with lens 41W in a substrate state, for obtaining the substrates with lens 41 of C to E of FIG. 9.

The substrate with lens 41W illustrated in F of FIG. 9 illustrates a substrate state corresponding to the substrate with lens 41 of C of FIG. 9, the substrate with lens 41W illustrated in G of FIG. 9 illustrates a substrate state corresponding to the substrate with lens 41 of D of FIG. 9, and the substrate with lens 41W illustrated in H of FIG. 9 illustrates a substrate state corresponding to the substrate with lens 41 of E of FIG. 9.

The substrates with lens 41W in the substrate state illustrated in F to H of FIG. 9 are each configured so that 16 camera modules 1B illustrated in A of FIG. 9 are obtained per substrate.

As illustrated in F to H of FIG. 9, for forming the camera module 1B, it is possible to form lenses of the same shape over the whole surface area of the substrates with lens 41W in the substrate state, or to form lenses of different shapes, or to selectively form and not form a lens.

3. Third Embodiment of Camera Module

Figure 10:
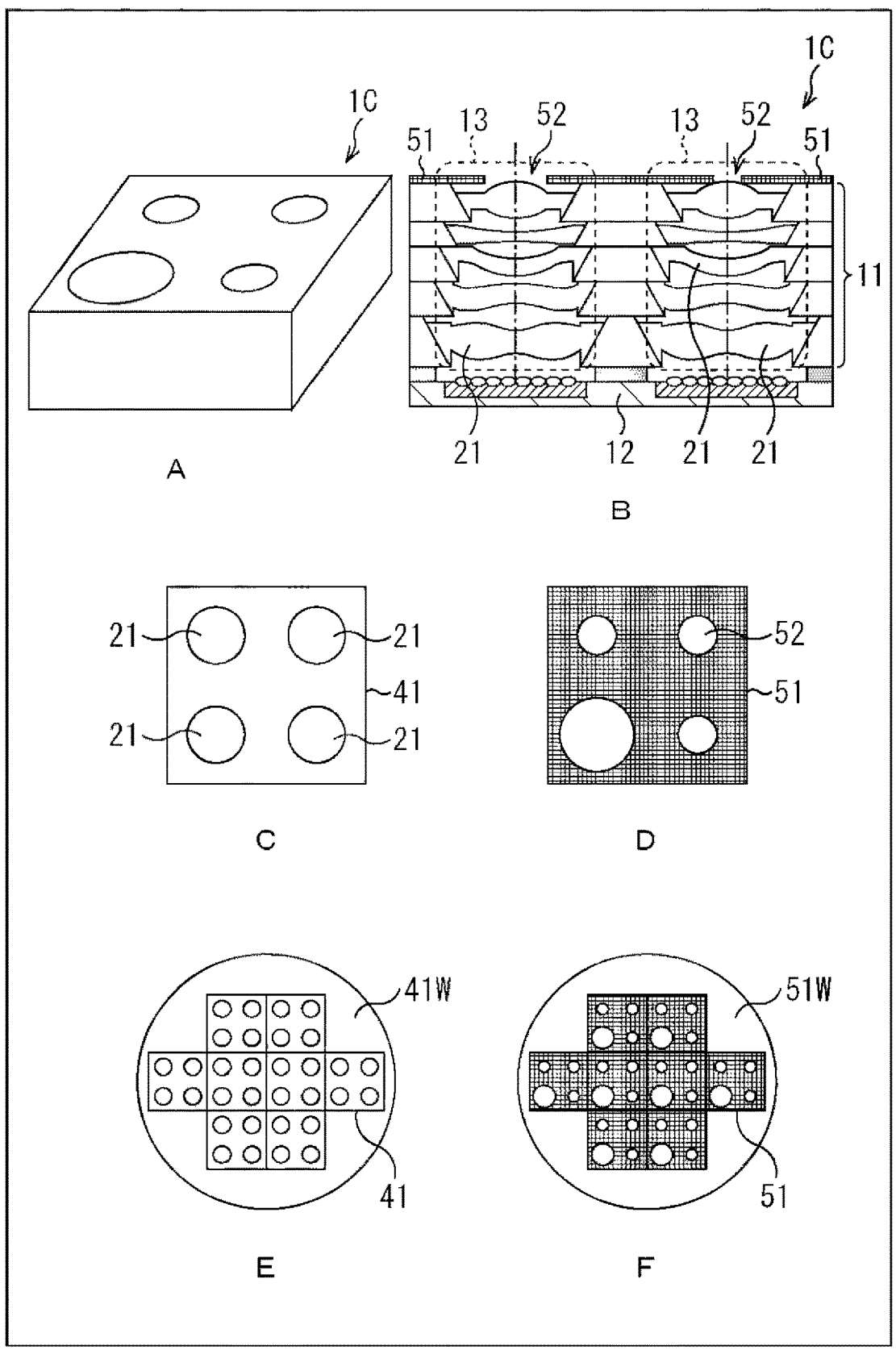
FIG. 10 illustrates figures illustrating a third embodiment of a camera module using a laminated lens structure to which the present technology is applied.

FIG. 10 illustrates figures illustrating a third embodiment of a camera module using a laminated lens structure to which the present technology is applied.

A of FIG. 10 is a schematic view illustrating an external appearance of a camera module 1C as a third embodiment of the camera module 1. B of FIG. 10 is a schematic sectional view of the camera module 1C.

The camera module 1C includes a total of four optical units 13, two each in a column direction and two each in a row direction, on a light incidence surface. The four optical units 13 are the same in the shape of lenses 21.

While the four optical units 13 each include a diaphragm plate 51 at an uppermost layer of a laminated lens structure 11, the size of an aperture 52 in the diaphragm plate 51 is different for the different ones of the four optical units 13. As a result, as the camera module 1C, for example, a camera module 1C as follows can be realized. Specifically, for example, in a monitor camera for crime prevention, a camera module 1C may use a light-receiving element 12 provided with light-receiving pixels for receiving three kinds (RGB) of lights through color filters for RGB, for color image monitoring in the daytime, and with light-receiving pixels not provided with RGB color filters, for black-and-white image monitoring in the night. In such a camera module 1C, a configuration is possible in which the size of an aperture of a diaphragm is set large only for the pixels for imaging a black-and-white image in the night, when the illuminance is low. Therefore, in regard of plan-view shape of lenses 21 in a single camera module 1C, for example, the lenses 21 possessed by the four optical units 13 are the same in diameter as illustrated in C of FIG. 10, whereas the size of the aperture 52 of the diaphragm plate 51 is different for different ones of the optical units 13 as illustrated in D of FIG. 10.

E of FIG. 10 is a plan view of a substrate with lens 41W in a substrate state, for obtaining the substrate with lens 41 illustrated in C of FIG. 10. F of FIG. 10 is a plan view illustrating a diaphragm plate 51W in a substrate state, for obtaining the diaphragm plate 51 illustrated in D of FIG. 10.

The substrate with lens 41W in the substrate state of E of FIG. 10 and the diaphragm plate 51W in the substrate state of F of FIG. 10 are each configured so that eight camera modules 1C illustrated in A of FIG. 10 are obtained per substrate.

As illustrated in F of FIG. 10, in the diaphragm plate 51W in a substrate state, different sizes for the aperture 52 can be set on the basis of each of the optical units 13 possessed by the camera module 1C, for forming the camera module 1C.

4. Fourth Embodiment of Camera Module

Figure 11:
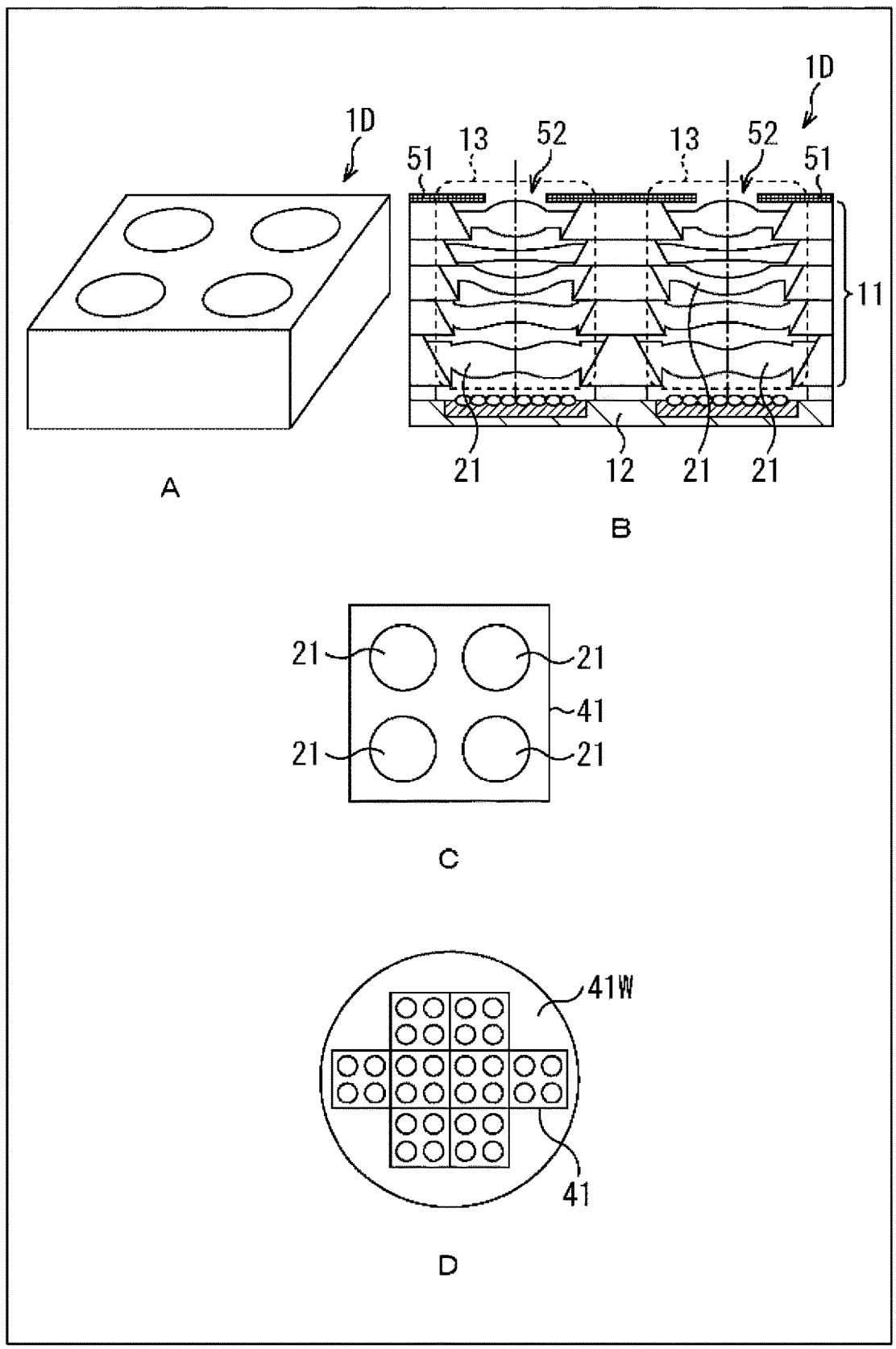
FIG. 11 illustrates figures illustrating a fourth embodiment of a camera module using a laminated lens structure to which the present technology is applied.

FIG. 11 illustrates figures illustrating a fourth embodiment of a camera module using a laminated lens structure to which the present technology is applied.

A of FIG. 11 is a schematic view illustrating an external appearance of a camera module 1D as a fourth embodiment of the camera module 1. B of FIG. 11 is a schematic sectional view of the camera module 1D.

Like the camera module 1C, the light camera module 1D includes a total of four optical units 13, two each in a column direction and two each in a row direction, on a light incidence surface. The four optical units 13 are the same in the shape of lenses 21 and in the size of an aperture 52 of a diaphragm plate 51.

In the camera module 1D, optical axes possessed by the optical units 13, disposed in twos in a column direction and in twos in a row direction on the light incidence surface, extend in the same direction. Alternate long and short dash lines illustrated in B of FIG. 11 represent the respective optical axes of the optical units 13. The camera module 1D having such a structure is suited to imaging an image with a higher resolution than that imaged by a single optical unit 13 by utilizing a super-resolution technique.

In the camera module 1D, in regard of each of a column direction and a row direction, it is possible to obtain a plurality of images of which the optical axes are oriented in the same direction but which are not necessarily identical, by imaging images by a plurality of light-receiving elements 12 of which the optical axes are oriented in the same direction but which are disposed at different positions, or by imaging images by light-receiving pixels in different regions in a single light-receiving element 12. By combining place-basis image data possessed by the plurality of non-identical images, an image with a high resolution can be obtained. Therefore, plan-view shape of the lens 21 in the single camera module 1D is desirably the same for the four optical units 13 as illustrated in C of FIG. 11.

D of FIG. 11 is a plan view of a substrate with lens 41W in a substrate state, for obtaining the substrate with lens 41 illustrated in C of FIG. 11. The substrate with lens 41W in the substrate state is configured so that eight camera modules 1D illustrated in A of FIG. 11 are obtained per substrate.

As illustrated in D of FIG. 11, in the substrate with lens 41W in the substrate state, for forming the camera modules 1D each of which includes the plurality of lenses 21, a plurality of lens groups each for a single module are disposed at fixed pitches on a substrate.

5. Fifth Embodiment of Camera Module

Figure 12:
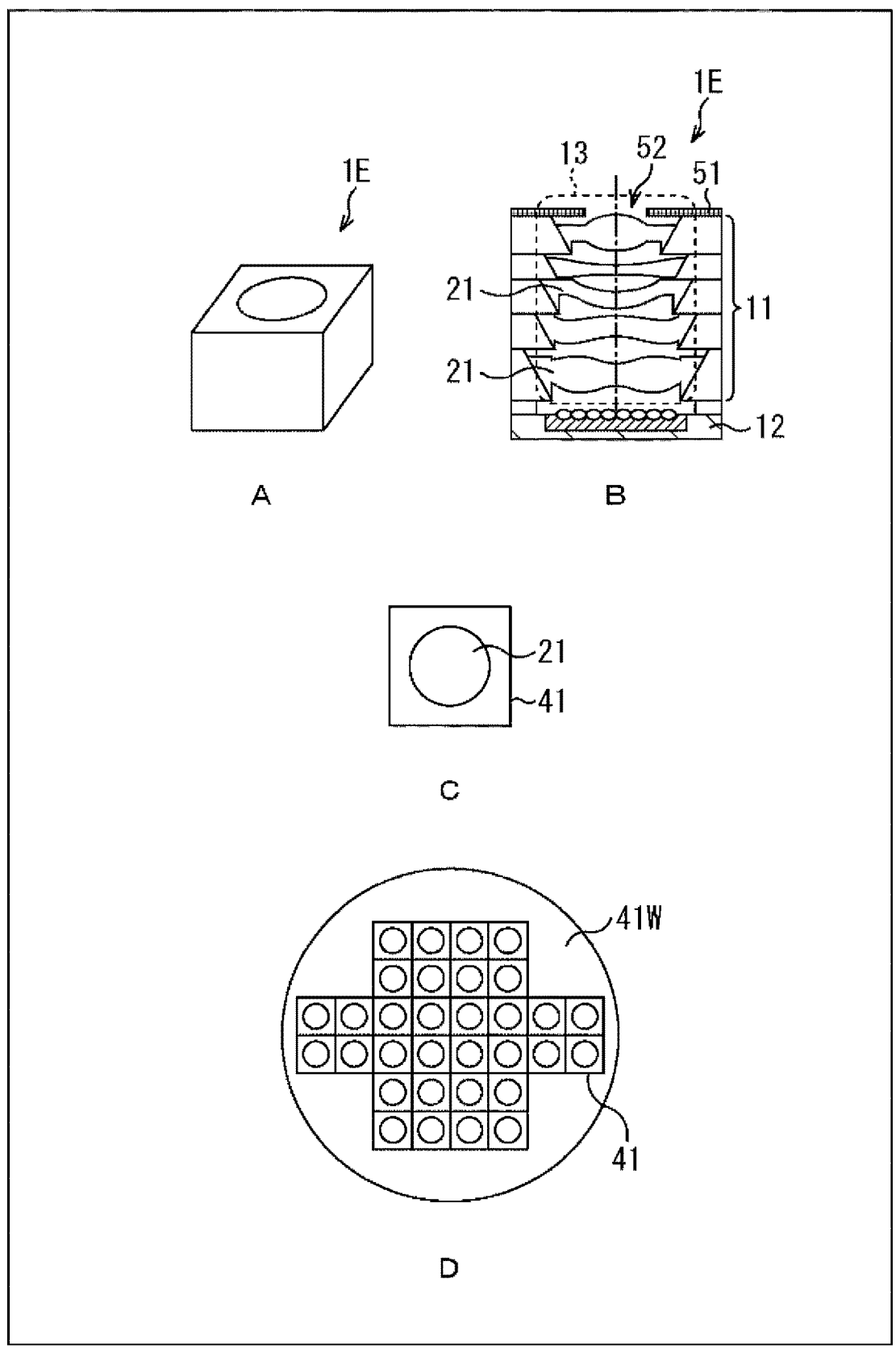
FIG. 12 illustrates figures illustrating a fifth embodiment of a camera module using a laminated lens structure to which the present technology is applied.

FIG. 12 illustrates figures illustrating a fifth embodiment of a camera module using a laminated lens structure to which the present technology is applied.

A of FIG. 12 is a schematic view illustrating an external appearance of a camera module 1E as a fifth embodiment of the camera module 1. B of FIG. 12 is a schematic sectional view of the camera module 1E.

The camera module 1E is a monocular camera module in which a single optical unit 13 having a single optical axis is provided in the camera module 1E.

C of FIG. 12 is a plan view of a substrate with lens 41, illustrating a plan-view shape of a lens 21 in the camera module 1E. The camera module 1E has the single optical unit 13.

D of FIG. 12 is a plan view of a substrate with lens 41W in a substrate state, for obtaining the substrate with lens 41 illustrated in C of FIG. 12. The substrate with lens 41W in the substrate state is configured so that 32 camera modules 1E illustrated in A of FIG. 12 are obtained per substrate.

As illustrated in D of FIG. 12, in the substrate with lens 41W in the substrate state, a plurality of lenses 21 each for the camera module 1E are disposed at fixed pitches on a substrate.

6. Detailed Configuration of Camera Module of Fourth Embodiment

Now, referring to FIG. 13, detailed configuration of the camera module 1D according to the fourth embodiment illustrated in FIG. 11 will be described below.

Figure 13:
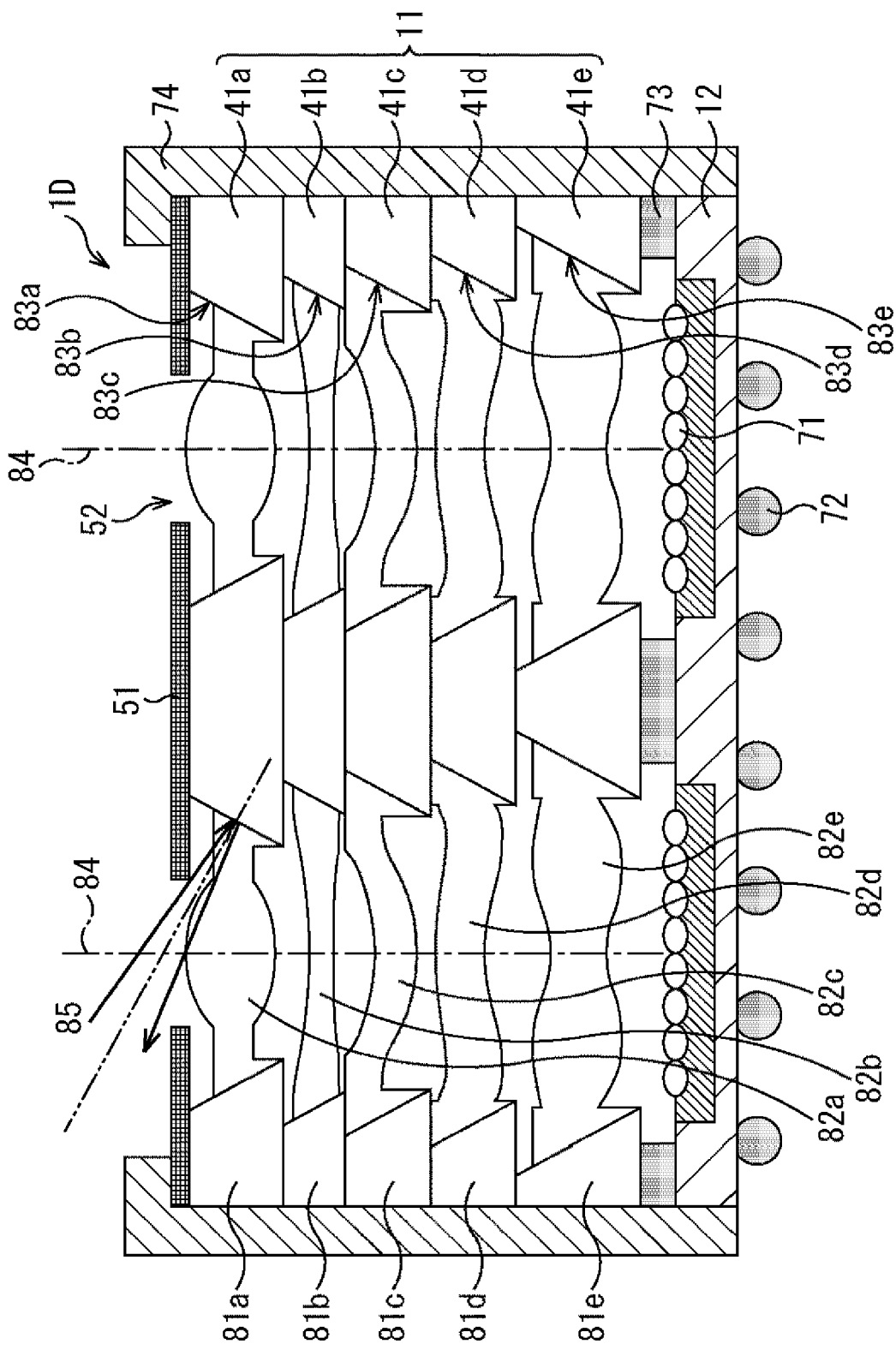
FIG. 13 is a figure for explaining a detailed configuration of the camera module according to the fourth embodiment.

FIG. 13 is a sectional view of the camera module 1D illustrated in B of FIG. 11.

The camera module 1D is configured to include a laminated lens structure 11 in which a plurality of substrates with lens 41a to 41e are laminated, and a light-receiving element 12. The laminated lens structure 11 includes a plurality of optical units 13. Alternate long and short dash lines 84 represent respective optical axes of the optical unit 13. The light-receiving element 12 is disposed on the lower side of the laminated lens structure 11. In the camera module 1D, light entering the camera module 1D from above is transmitted through the laminated lens structure 11, and is received by the light-receiving element 12 disposed on the lower side of the laminated lens structure 11.

The laminated lens structure 11 includes five laminated substrates with lens 41a to 41e. In the case where the five substrates with lens 41a and 41e are not particularly discriminated, each substrate with lens is referred to simply as the substrate with lens 41 in the description.

The profile of through-holes 83 in each substrate with lens 41 constituting the laminated lens structure 11 is a so-called downwardly narrowing shape in which the opening width decreases toward the lower side (the side on which the light-receiving element 12 is disposed).

A diaphragm plate 51 is disposed on the laminated lens structure 11. The diaphragm plate 51 has a layer formed from a light-absorbing or light-shielding material, for example. The diaphragm plate 51 is provided with apertures 52.

The light-receiving element 12 is configured by, for example, a front illumination type or back illumination type CMOS (Complementary Metal Oxide Semiconductor) image sensor. On-chip lenses 71 are formed at the upper-side surface, on the laminated lens structure 11 side, of the light-receiving element 12, and external terminals 72 for input/output of signals are formed on the lower-side surface of the light-receiving element 12.

The laminated lens structure 11, the light-receiving element 12, the diaphragm plate 51 and the like are accommodated in a lens barrel 74.

A structural member 73 is disposed on the upper side of the light-receiving element 12. The laminated lens structure 11 and the light-receiving element 12 are fixed through the structural member 73. The structural member 73 is composed of, for example, an epoxy resin.

While the laminated lens structure 11 includes five laminated substrates with lens 41a to 41e in this embodiment, the number of the substrates with lens 41 is not particularly limited so long as it is two or more.

The substrates with lens 41 constituting the laminated lens structure 11 each have a configuration in which lens resin portions 82 are added to a support substrate 81. The support substrate 81 has through-holes 83, and the lens resin portions 82 are formed inside the through-holes 83. The lens resin portion 82 represents a portion integrally formed from a material constituting the lens 21, the portion including the above-mentioned lens 21 together with a portion which extends to the support substrate 81 and supports the lens 21.

Note that in the case where the respective support substrates 81, lens resin portions 82 or through-holes 83 of the substrates with lens 41a to 41e are discriminated, they are referred to as support substrates 81a to 81e, lens resin portions 82a to 82e, or through-holes 83a to 83e, correspondingly to the substrates with lens 41a to 41e, in the description as illustrated in FIG. 13.

<Detailed Explanation of Lens Resin Portion>

Now, taking the substrate with lens 41a and the lens resin portion 82a as an example, the shape of the lens resin portion 82 will be described below.

Figure 14:
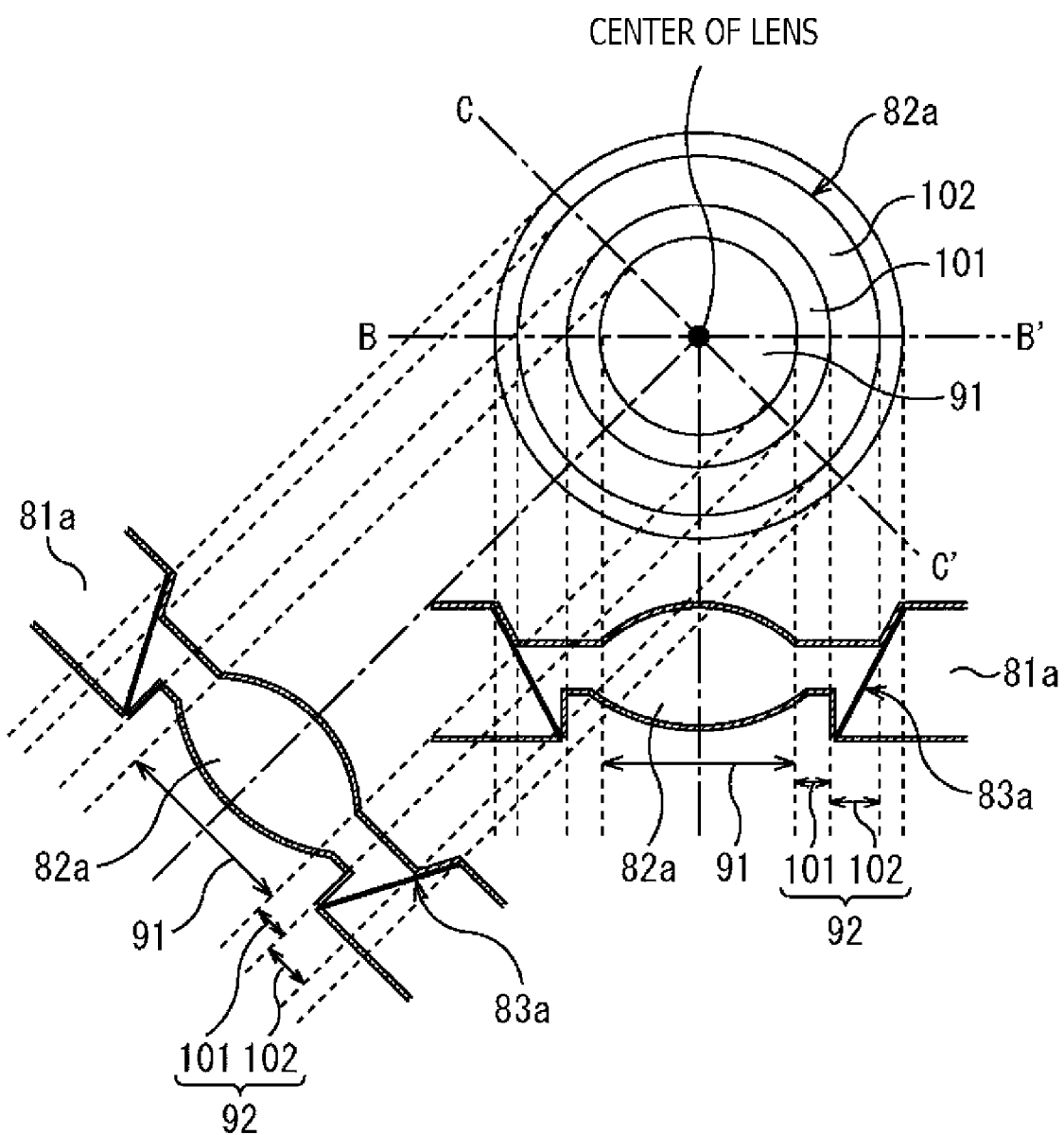
FIG. 14 illustrates a plan view and sectional views of a support substrate and a lens resin portion.

FIG. 14 illustrates a plan view and sectional views of the support substrate 81a and the lens resin portion 82a constituting the substrate with lens 41a.

The sectional views of the support substrate 81a and the lens resin portion 82a illustrated in FIG. 14 are sectional views taken along line B-B' and line C-C' illustrated in the plan view.

The lens resin portion 82a is a portion integrally formed from a material constituting the lens 21, and includes a lens portion 91 and a support portion 92. In the above description, the lens 21 corresponds to the lens portion 91a or the whole part of the lens resin portion 82a.

The lens portion 91 is a portion that has a performance as a lens, in other words, "a portion that refracts light to converge or diverge the light" or "a portion that has a curved surface such as a convex surface, a concave surface and a non-spherical surface or a portion that has a plurality of polygons disposed in succession to be used in a Fresnel lens or a lens utilizing a diffraction grating."

The support portion 92 is a portion that extends from the lens portion 91 to the support substrate 81a and supports the lens portion 91. The support portion 92 is composed of an arm portion 101 and a leg portion 102, and is located at an outer circumference of the lens portion 91.

The arm portion 101 is a portion that is disposed outside the lens portion 91 in contact with the lens portion 91 and that extends outward from the lens portion 91 in a fixed film thickness. The leg portion 102 is that portion of the support portion 92 which is other than the arm portion 101, and which includes a portion making contact with a side surface of the through-hole 83a. The leg portion 102 is preferably greater than the arm portion 101 in resin film thickness.

The plan-view shape of the through-holes 83a formed in the support substrate 81a is a circle, and its profile is naturally the same irrespectively of the direction of a diameter. The shape of the lens resin portions 82a, which is a shape determined by the shapes of an upper mold and a lower mold in lens molding, is also the same in profile shape irrespectively of the direction of a diameter.

Figure 15:
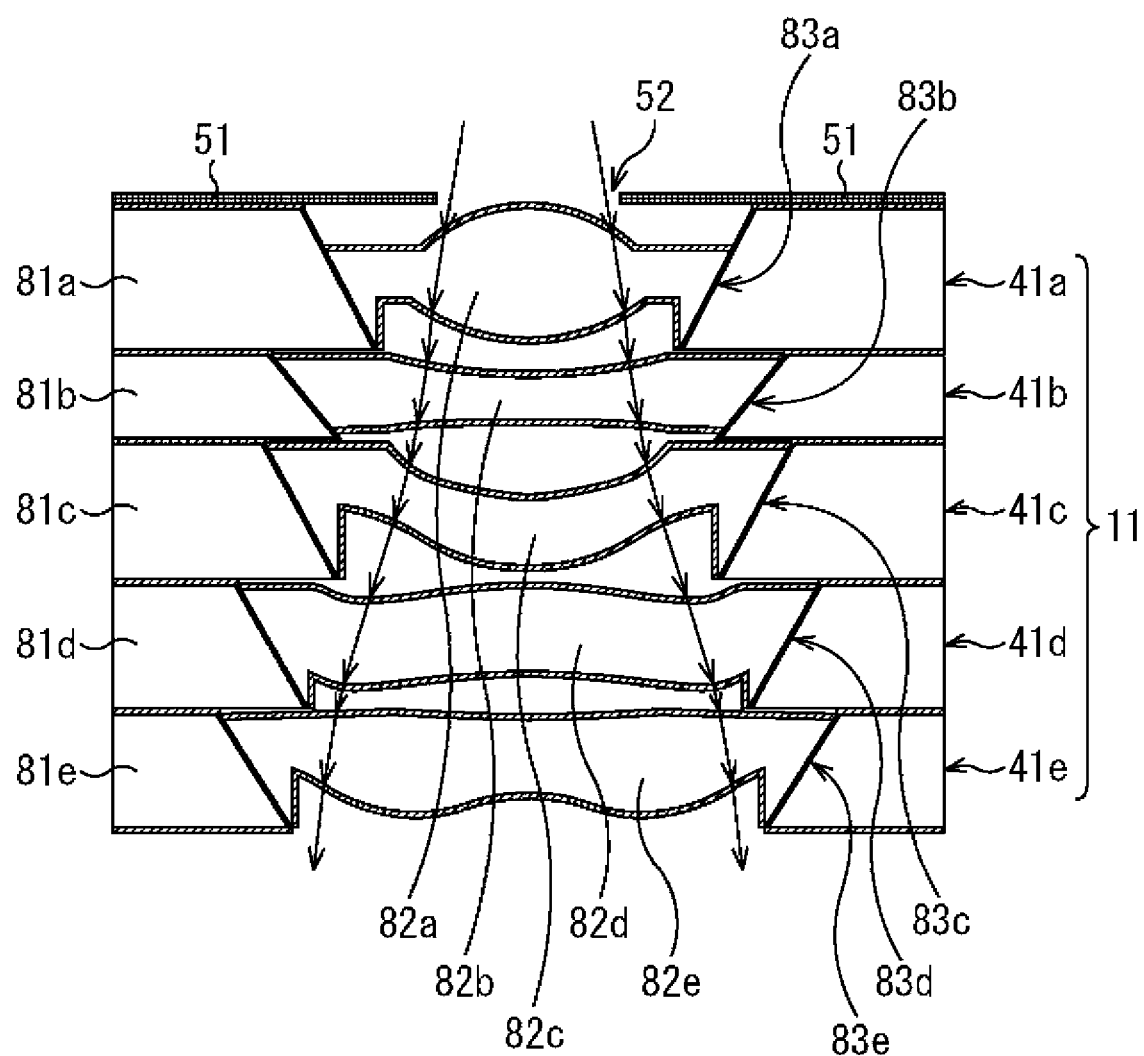
FIG. 15 is a sectional view illustrating a laminated lens structure and a diaphragm plate.

FIG. 15 is a sectional view illustrating a laminated lens structure 11 and a diaphragm plate 51 which constitute part of the camera module 1D of FIG. 13.

In the camera module 1D, light incident on the module is restrictedly permitted to enter by the diaphragm plate 51, is then broadened inside the laminated lens structure 11, and is incident on the light-receiving element 12 (not illustrated in FIG. 15) disposed on the lower side of the laminated lens structure 11. Briefly speaking in regard of the laminated lens structure 11 as a whole, the light incident on the module travels while substantially broadening, downwardly from the aperture 52 of the diaphragm plate 51. Therefore, as an example of the sizes of the lens resin portions 82 possessed by the laminated lens structure 11, the lens resin portion 82a possessed by the substrate with lens 41a immediately beneath the diaphragm plate 51, in the laminated lens structure 11 of FIG. 15, is the smallest, and the lens resin portion 82e possessed by the substrate with lens 41e disposed at the lowermost layer of the laminated lens structure 11 is the largest.

When the thickness of the lens resin portion 82 of the substrate with lens 41 is assumed to be constant, then it is more difficult to produce a larger-sized lens than to produce a smaller-sized lens. The reason for this is, for example, that a lens is liable to be deformed by a load exerted thereon at the time of producing the lens, or that it is difficult to maintain the strength of a lens due to a large size thereof. Therefore, it is preferable that a larger-sized lens is formed in a greater thickness than a smaller-sized lens. For this reason, in the laminated lens structure 11 of FIG. 15, the thicknesses of the lens resin portions 82 are so set that the lens resin portion 82e possessed by the substrate with lens 41e disposed at the lowermost layer is the largest.

For enhancing the degree of freedom in lens design, the laminated lens structure 11 of FIG. 15 has at least one of the following characteristic features.

(1) The thickness of the support substrate 81 differs among at least the plurality of substrates with lens 41 constituting the laminated lens structure 11. For example, the thickness of the support substrate 81 is greater in a substrate with lens 41 in a lower layer.

(2) The opening width of the through-hole 83 possessed by the substrate with lens 41 differs among at least the plurality of substrates with lens 41 constituting the laminated lens structure 11. For example, the opening width of the through-hole 83 is greater in a substrate with lens 41 of a lower layer.

(3) The diameter of the lens portion 91 possessed by the substrate with lens 41 differs among at least the plurality of substrates with lens 41 constituting the laminated lens structure 11. For example, the diameter of the lens portion 91 is greater for the lens portion 91 of a substrate with lens 41 of a lower layer.

(4) The thickness of the lens portion 91 possessed by the substrate with lens 41 differs among at least the plurality of substrates with lens 41 constituting the laminated lens structure 11. For example, the thickness of the lens portion 91 is greater for the lens portion 91 of a substrate with lens 41 at a lower layer.

(5) The distance between lenses possessed by the substrate with lens 41 differs among at least the plurality of substrates with lens 41 constituting the laminated lens structure 11.

(6) The volume of the lens resin portion 82 possessed by the substrate with lens 41 differs among at least the plurality of substrates with lens 41 constituting the laminated lens structure 11. For example, the volume of the lens resin portion 82 is greater for the lens resin portion 82 of a substrate with lens 41 of a lower layer.

(7) The material of the lens resin portion 82 possessed by the substrate with lens 41 differs among at least the plurality of substrates with lens 41 constituting the laminated lens structure 11.

In general, incident light that is incident on a camera module includes both vertical incident light and oblique incident light. Most of the oblique incident light impinges on the diaphragm plate 51, where it is absorbed or is reflected to the outside of the camera module 1D. The oblique incident light that is not restrictedly permitted to enter by the diaphragm plate 51 may impinge on a side wall of the through-hole 83, depending on the angle of incidence, and may be reflected there.

The direction in which the reflected light of the oblique incident light travels is determined by the incidence angle of the oblique incident light 85 and the angle of the side wall of the through-hole 83, which are illustrated in FIG. 13. In the case of a so-called forwardly broadening shape in which the opening width of the through-hole 83 increases from the incidence side toward the light-receiving element 12 side, if the oblique incident light 85 at a specific incidence angle that is not restrictedly permitted to enter by the diaphragm plate 51 impinges on the side wall of the through-hole 83, this oblique incident light may be reflected toward the light-receiving element 12, to be stray light or nose light.

However, in the laminated lens structure 11 illustrated in FIG. 13, the through-hole 83 is in a so-called downwardly narrowing shape in which the opening width decreased toward the lower side (the side on which the light-receiving element 12 is disposed), as illustrated in FIG. 15. In the case of this shape, the oblique incident light 85 colliding the side wall of the through-hole 83 is not reflected toward the lower side, or the so-called light-receiving element 12 side, but is reflected toward the upper side, or the so-called incidence side. As a result, an action or effect of restraining generation of stray light or noise light can be obtained.

It is more preferable that a light-absorbing material is disposed on the side wall of the through-hole 83 of the substrate with lens 41, in order to reduce the amount of light reflected upon impinging on the side wall.

As an example, the following method may be adopted for this purpose. Where light (e.g., visible light) of a wavelength to be received when the camera module 1D is used as a camera is first light and light (e.g., UV light) differing from the first light in wavelength is second light, carbon particles as an absorbing material for the first light (visible light) are dispersed in a resin curable with the second light (UV light), and the resulting dispersion is applied or sprayed onto the surface of the support substrate 81. Then, only the resin on the side wall portions of the through-holes 83 is cured by irradiation with the second light (UV light), and the resin in other regions is removed. In this way, a layer of the material having an absorbing property for the first light (visible light) is formed on the side walls of the through-holes 83.

The laminated lens structure 11 illustrated in FIG. 15 is an example of a structure in which the diaphragm plate 51 is disposed on top of the plurality of laminated substrates with lens 41. The diaphragm plate 51 may be disposed by insertion in an intermediate position in the plurality of laminated substrates with lens 41, instead of being disposed on top of the plurality of laminated substrates with lens 41.

As a further example, a layer of a light-absorbing material is formed on the surface of the substrate with lens 41 and the layer is made to function as a diaphragm, instead of providing the plate-shaped diaphragm plate 51 separately from the substrates with lens 41. For example, the following method may be adopted for this purpose. Carbon particles as an absorbing material for the first light (visible light) are dispersed in a resin curable with the second light (UV light). The resultant dispersion is applied or sprayed onto the surface of the substrate with lens 41. The resin in other regions than the regions where light is to be transmitted when a diaphragm functions is cured by irradiation with the second light (UV light), and is thereby left, whereas the resin not cured, namely, the resin in the regions where light is to be transmitted when the diaphragm functions is removed. In this way, a diaphragm is formed on the substrate with lens 41.

Note that the substrate with lens 41 on the surface of which the diaphragm is formed may be the substrate with lens 41 that is disposed in the uppermost layer of the laminated lens structure 11, or may be the substrate with lens 41 that constitutes an internal layer of the laminated lens structure 11.

The laminated lens structure 11 illustrated in FIG. 15 has a structure in which the substrates with lens 41 are laminated.

As another embodiment, the laminated lens structure 11 may have a structure in which both a plurality of substrates with lens 41 and at least one support substrate 81 not provided with lens resin portions 82 are provided. In this structure, the support substrate 81 not provide with lens resin portions 82 may be disposed as a lowermost layer or an uppermost layer of the laminated lens structure 11, or may be disposed as an inside layer of the laminated lens structure 11. This structure offers, for example, an action or effect such that it is possible to arbitrarily set the distance between the plurality of lenses possessed by the laminated lens structure 11 or the distance between the lens resin portion 82 of the lowermost layer of the laminated lens structure 11 and the light-receiving element 12 disposed on the lower side of the laminated lens structure 11.

Alternatively, this structure offers an action or effect such that the opening width of the support substrate 81 not provided with lens resin portions 82 can be appropriately set and it is possible, by disposing a light-absorbing material in regions exclusive of the aperture portions, to cause the light-absorbing material to function as a diaphragm plate.

7. Sixth Embodiment of Camera Module

Figure 16:
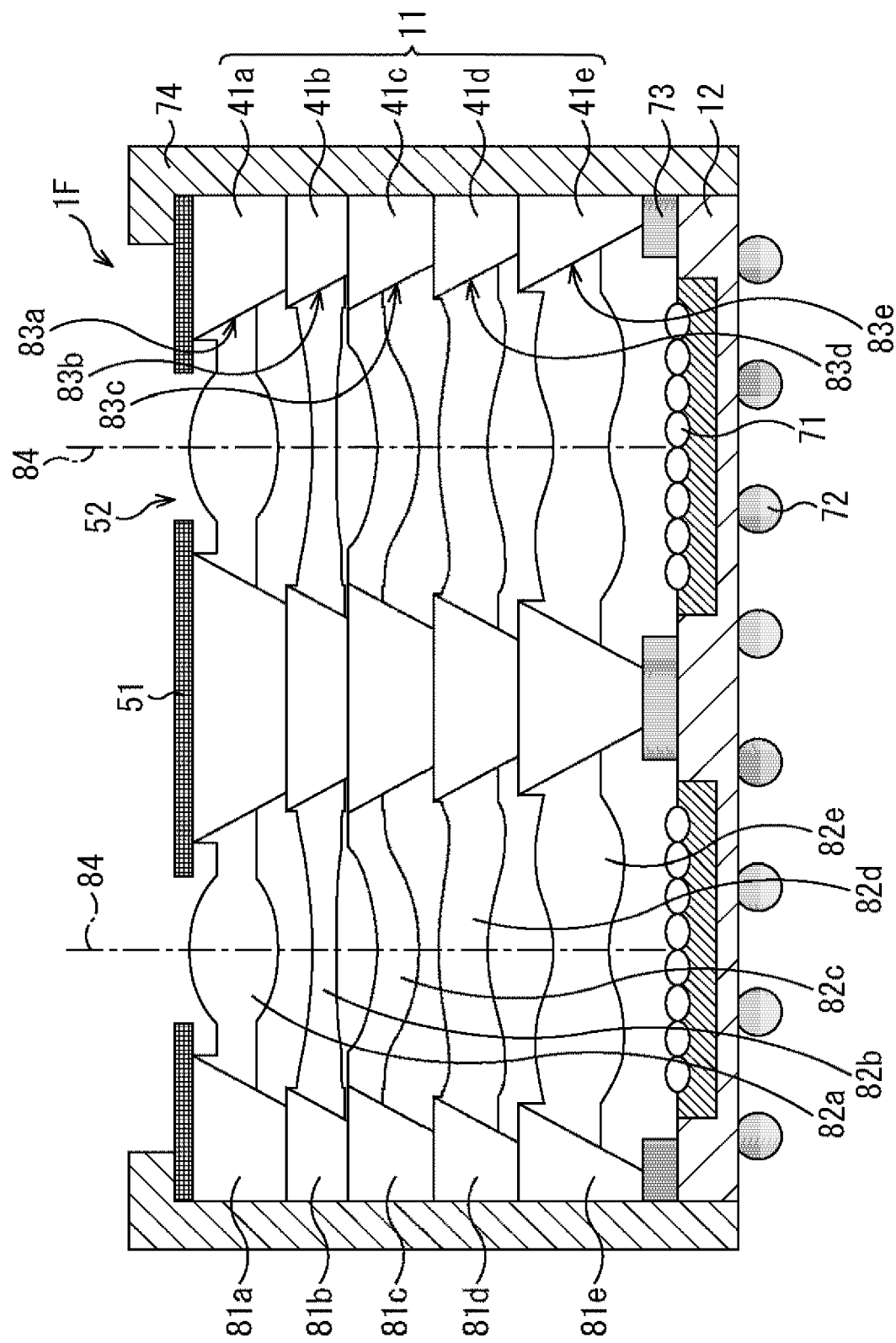
FIG. 16 is a figure illustrating a sixth embodiment of a camera module using a laminated lens structure to which the present technology is applied.

FIG. 16 is a figure illustrating a sixth embodiment of a camera module using a laminated lens structure to which the present technology is applied.

In FIG. 16, the portions corresponding to those in the fourth embodiment illustrated in FIG. 13 are denoted by the same reference symbols as used above, and description will be made by paying attention to the parts differing from the camera module 1D of FIG. 13.

Like in the camera module 1D illustrated in FIG. 13, also in a camera module 1F illustrated in FIG. 16, incident light is restrictedly permitted to enter by a diaphragm plate 51, is then broadened inside a laminated lens structure 11, and is incident on a light-receiving element 12 disposed under the laminated lens structure 11. In other words, briefly speaking in regard of the laminated lens structure 11 as a whole, the light travels downward while forwardly broadening from apertures 52 of the diaphragm plate 51.

The camera module 1F of FIG. 16 differs from the camera module 1D illustrated in FIG. 13 in that the profile of through-holes 83 in each substrate with lens 41 constituting the laminated lens structure 11 is a so-called forwardly broadening shape in which the opening width increases toward the lower side (the side on which the light-receiving element 12 is disposed).

The laminated lens structure 11 of the camera module 1F has a structure in which the incident light travels downward while forwardly broadening from the apertures 52 of the diaphragm plate 51. Therefore, in the forwardly broadening shape in which the opening width of the through-holes 83 increases toward the lower side, the support substrate 81 is less liable to become an obstacle in the optical path, as compared to the downwardly narrowing shape in which the opening width of the through-holes 83 decreases toward the lower side. As a result, an action of ensuring a higher degree of freedom in lens design is offered.

In addition, in the case of the downwardly narrowing shape in which the opening width of the through-hole 83 decreases toward the lower side, the sectional area in the substrate plane directions of the lens resin portion 82 inclusive of the support portion 92 is a specific size, at the lower surface of the lens resin portion 82, for transmission therethrough of the rays incident on the lens 21, and the sectional area increases from the lower surface toward the upper surface of the lens resin portion 82.

On the other hand, in the case of the forwardly broadening shape in which the opening width of the through-hole 83 increases toward the lower side, the sectional area at the lower surface of the lens resin portion 82 is substantially the same as that in the case of the downwardly narrowing shape, but the sectional area decreases from the lower surface toward the upper surface of the lens resin portion 82.

As a result, the structure in which the opening width of the through-hole 83 increases toward the lower side offers an action or effect that the size of the lens resin portion 82 inclusive of the support portion 92 can be suppressed to a small value. In addition, consequently, an action or effect is offered such that the difficulty in forming a lens in the case where the lens is large in size as above-mentioned can be reduced.

8. Seventh Embodiment of Camera Module

Figure 17:
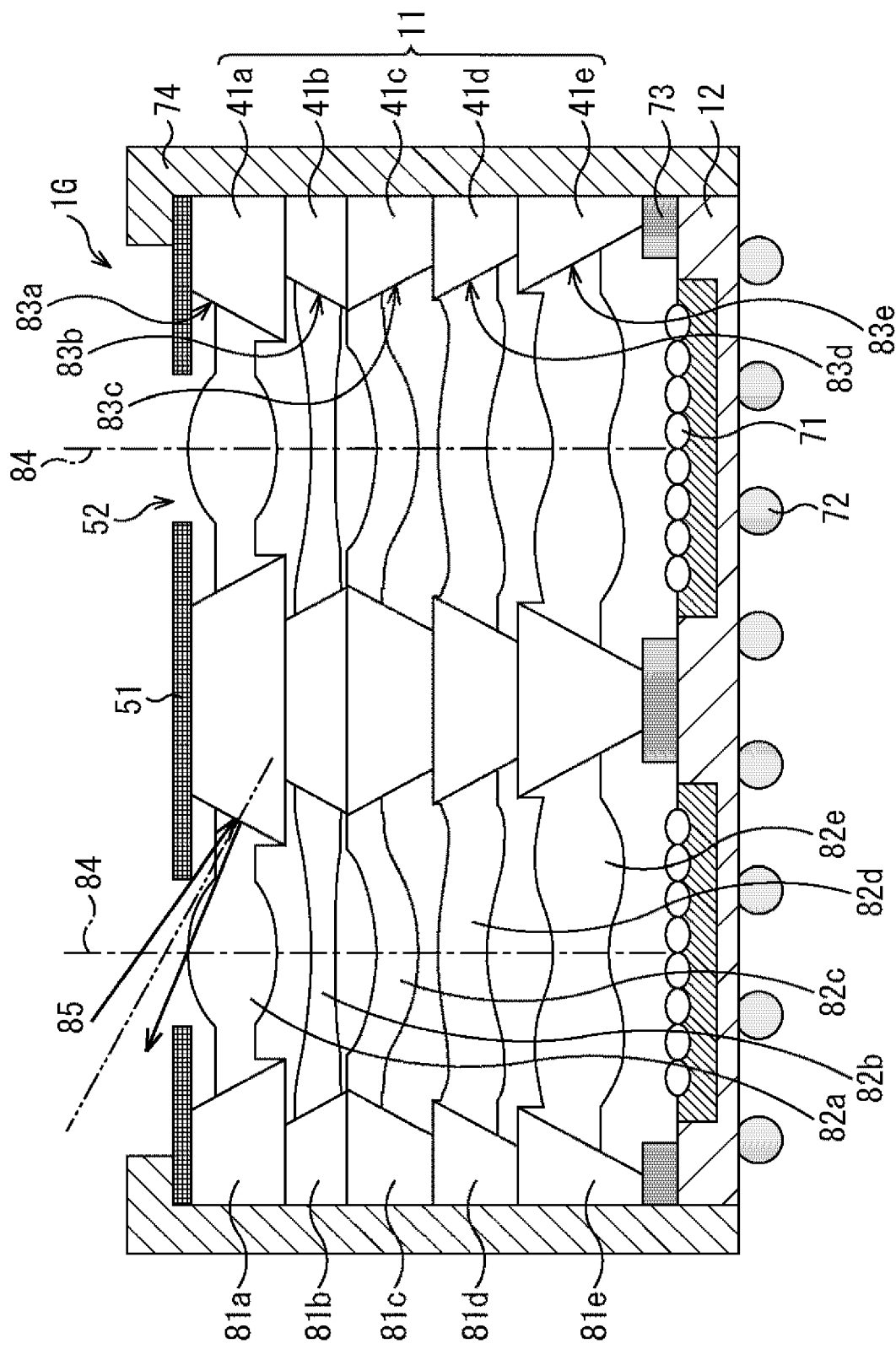
FIG. 17 is a figure illustrating a seventh embodiment of a camera module using a laminated lens structure to which the present technology is applied.

FIG. 17 is a figure illustrating a seventh embodiment of a camera module using a laminated lens structure to which the present technology is applied.

In FIG. 17, also, the portions corresponding to those in FIG. 13 are denoted by the same reference symbols as used above, and description will be made while paying attention to the parts differing from the camera module 1D illustrated in FIG. 13.

A camera module 1G of FIG. 17, also, differs from the camera module 1D of FIG. 13 in the shapes of lens resin portions 82 and through-holes 83 of each substrate with lens 41 constituting a laminated lens structure 11.

The laminated lens structure 11 of the camera module 1G includes both: substrates with lens 41 in which the shape of the through-hole 83 is a so-called downwardly narrowing shape in which the opening width decreases toward the lower side (the side on which a light-receiving element 12 is disposed); and substrates with lens 41 in which the shape of the through-hole 83 is a so-called forwardly broadening shape in which the opening width increases toward the lower side.

As has been mentioned above, the substrate with lens 41 in which the through-hole 83 has the so-called downwardly narrowing shape in which the opening width decreases toward the lower side offers an action or effect of restraining the generation of stray light or nose light which may be caused when the oblique incident light 85 impinging on the side wall of the through-hole 83 is reflected toward the upper side, or toward the so-called incidence side.

In view of this, in the laminated lens structure 11 of FIG. 17, substrates with lens 41 in which the through-hole 83 has the so-called downwardly narrowing shape in which the opening width decreases toward the lower side are used particularly as a plurality of substrates with lens 41 on the upper side (incidence side), of the plurality of substrates with lens 41 constituting the laminated lens structure 11.

As has been mentioned above, the substrate with lens 41 in which the through-hole 83 has the so-called forwardly broadening shape in which the opening width increases toward the lower side offers an action or effect such that the support substrate 81 possessed by the substrate with lens 41 is less liable to be an obstacle in the optical path, whereby the degree of freedom in lens design is increased, or that the size of the lens resin portion 82 inclusive of the support portion 92 possessed by the substrate with lens 41 is suppressed to a small value.

In the laminated lens structure 11 of FIG. 17, the light travels downward while broadening from the diaphragm, and, therefore, the lens resin portions 82 possessed by some substrates with lens 41 disposed on the lower side, of the plurality of substrates with lens 41 constituting the laminated lens structure 11, are large in size. When the through-holes 83 with the forwardly broadening shape are used in such large-sized lens resin portions 82, the action of suppressing the size of the lens resin portion 82 to a small value is displayed greatly.

In view of this, in the laminated lens structure 11 of FIG. 17, substrates with lens 41 in which the through-hole 83 has the so-called forwardly broadening shape in which the opening width increases toward the lower side are used particularly as a plurality of substrates with lens 41 on the lower side, of the plurality of substrates with lens 41 constituting the laminated lens structure 11.

9. Detailed Configuration of Substrate with Lens

Now, detailed configuration of the substrate with lens 41 will be described below.

Figure 18:
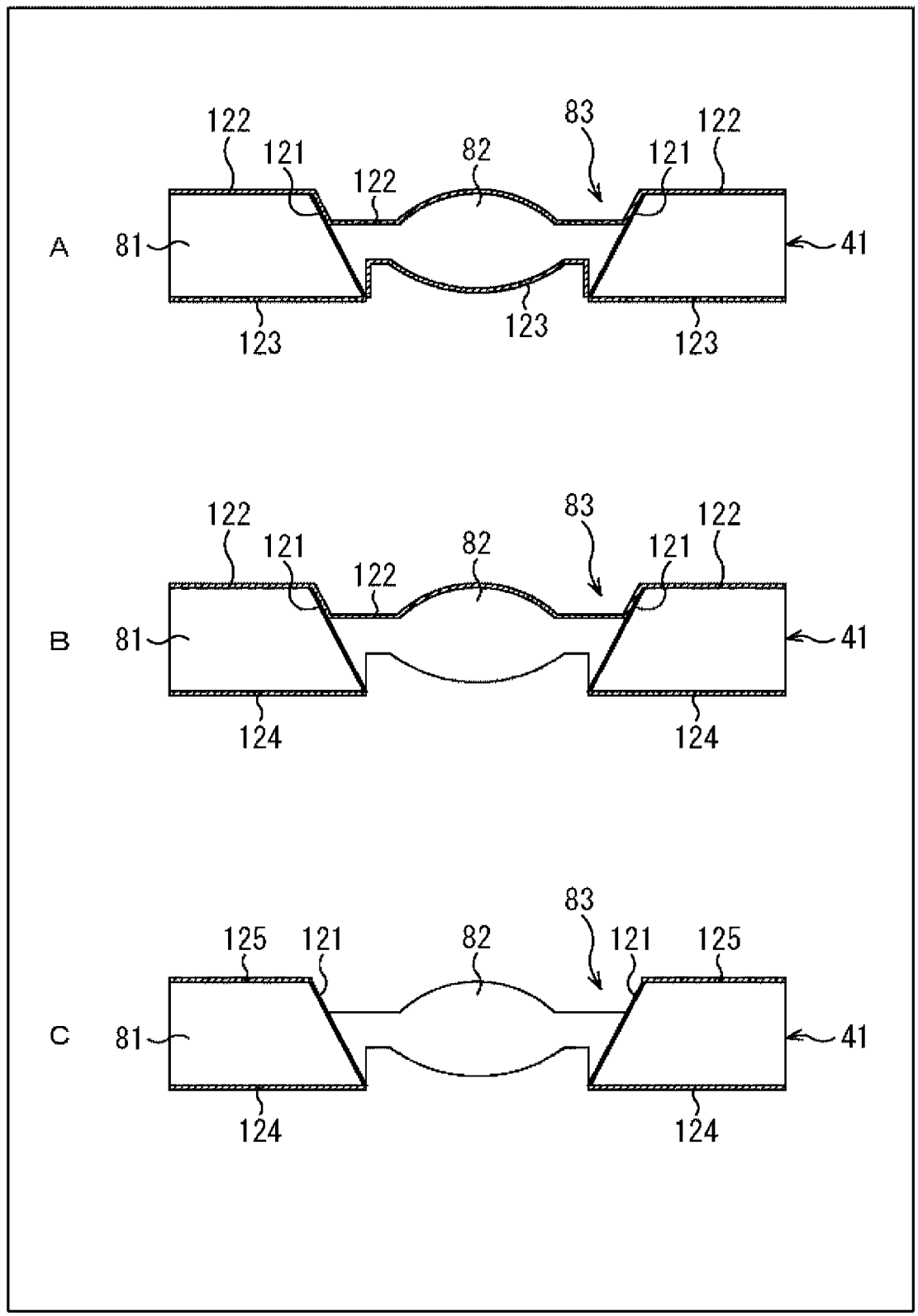
FIG. 18 illustrates sectional views illustrating a detailed configuration of a substrate with lens.

FIG. 18 illustrates figures illustrating a detailed configuration of a substrate with lens 41.

Note that while the substrate with lens 41a in the uppermost layer, of the five substrates with lens 41a to 41e, is illustrated in FIG. 18, the other substrates with lens 41 are also configured in the same or similar manner.

As a configuration of the substrate with lens 41, any configuration of A to C of FIG. 18 can be adopted.

In the substrate with lens 41 illustrated in A of FIG. 18, a through-hole 83 is provided in a support substrate 81, and a lens resin portion 82 is formed in the manner of plugging up the through-hole 83 as viewed from above. As has been described referring to FIG. 14, the lens resin portion 82 is composed of a lens portion 91 (not illustrated) in a central area and a support portion 92 (not illustrated) in a peripheral area.

A film 121 having a light-absorbing property or a light-shielding property is formed on a side wall of the through-hole 83 of the substrate with lens 41, for preventing ghost or flare which might arise from reflection of light. The film 121 is referred to as light-shielding film 121, for convenience.

An upper-side surface layer 122 containing an oxide or a nitride or other insulating material is formed on upper-side surfaces of the support substrate 81 and the lens resin portion 82, and a lower-side surface layer 123 containing an oxide or a nitride or other insulating material is formed on lower-side surfaces of the support substrate 81 and the lens resin portion 82.

As an example, the upper-side surface layer 122 is configured as an anti-reflection film by alternately laminating a plurality of low-refractive-index and high-refractive index films. The anti-reflection film may be configured, for example, by alternatively laminating a total of four low-refractive-index and high-refractive-index films. The low-refractive-index film is composed, for example, of an oxide film of SiOx (1≤x≤2), SiOC, SiOF or the like, and the high-refractive-index film is composed, for example, of a metal oxide film of TiO, TaO, $Nb_2O_5$ or the like.

Note that it is sufficient that the configuration of the upper-side surface layer 122 is designed such that a desired anti-reflection performance can be obtained by use of, for example, optical simulation, and the material, thickness, number and the like of the low-refractive-index and high-refractive-index films to be laminated are not particularly limited. In this embodiment, the outermost surface of the upper-side surface layer 122 is a low-refractive-index film, which has a thickness of, for example, 20 to 1,000 nm, a density of, for example, 2.2 to 2.5 g/cm³, and a flatness in terms of root mean square surface roughness Rs (RMS) of, for example, not more than approximately 1 nm. Besides, while details will be described later, this upper-side surface layer 122 serves also as a joining film when joined to another substrate with lens 41.

As an example, the upper-side surface layer 122 may be an anti-reflection film obtained by alternately laminating a plurality of low-refractive-index and high-refractive-index films, and, among others, may be an anti-reflection film of an inorganic material. As another example, the upper-side surface layer 122 may be a monolayer film containing an oxide or a nitride or other insulating material, and, among others, may be a film of an inorganic material.

As an example, the lower-side surface layer 123 may also be an anti-reflection film obtained by alternately laminating a plurality of low-refractive-index and high-refractive-index films, and, among others, may be an anti-reflection film of an inorganic material. As another example, the lower-side surface layer 123 may be a monolayer film containing an oxide or a nitride or other insulating material, and, among others, may be a film of an inorganic material.

With respect to the substrates with lens 41 of B and C of FIG. 18, only the parts differing from the substrate with lens 41 illustrated in A of FIG. 18 will be described.

In the substrate with lens 41 illustrated in B of FIG. 18, a film formed on lower-side surfaces of the support substrate 81 and the lens resin portion 82 is different from that in the substrate with lens 41 illustrated in A of FIG. 18.

In the substrate with lens 41 of B of FIG. 18, a lower-side surface layer 124 containing an oxide or a nitride or other insulating material is formed on a lower-side surface of the support substrate 81, but, on the other hand, a lower-side surface layer 124 is not formed on a lower-side surface of the lens resin portion 82. The lower-side surface layer 124 may be formed of the same material as, or a different material from, that of the upper-side surface layer 122.

Such a structure can be formed by, for example, a producing method in which before formation of the lens resin portion 82, the lower-side surface layer 124 is preliminarily formed on the lower-side surface of the support substrate 81, and thereafter the lens resin portion 82 is formed. Alternatively, the structure can be formed by a method in which after formation of the lens resin portion 82, a mask is formed on the lens resin portion 82, whereas the mark is not formed on the support substrate 81, and a film for constituting the lower-side surface layer 124 is built up on the lower-side surface of the support substrate 81 by, for example, PVD.

In the substrate with lens 41 of C of FIG. 18, an upper-side surface layer 125 containing an oxide or a nitride or other insulating material is formed on an upper-side surface of the support substrate 81, but, on the other hand, an upper-side surface layer 125 is not formed on an upper-side surface of the lens resin portion 82.

Similarly, in regard of a lower-side surface of the substrate with lens 41, a lower-side surface layer 124 containing an oxide or a nitride or other insulating material is formed on a lower-side surface of the support substrate 81, but, on the other hand, a lower-side surface layer 124 is not formed on a lower-side surface of the lens resin portion 82.

Such a structure can be formed by, for example, a producing method in which before formation of the lens resin portion 82, the upper-side surface layer 125 and the lower-side surface layer 124 are preliminarily formed on the support substrate 81, and thereafter the lens resin portion 82 is formed. Alternatively, the structure can be formed by a method in which after formation of the lens resin portion 82, a mask is formed on the lens resin portion 82, whereas the mask is not formed on the support substrate 81, and films for constituting the upper-side surface layer 125 and the lower-side surface layer 124 are built up on the surfaces of the support substrate 81 by, for example, PVD. The lower-side surface layer 124 and the upper-side surface layer 125 may be formed of the same material or of different materials.

The substrate with lens 41 can be configured in the above-mentioned way.

10. Method of Producing Substrate with Lens

Now, referring to FIGS. 19 to 29, a method of producing a substrate with lens 41 will be described below.

First, a support substrate 81W in a substrate state that is formed with a plurality of through-holes 83 is prepared. As the support substrate 81W, there can be used, for example, a silicon substrate which is used for ordinary semiconductor devices. The shape of the support substrate 81W is, for example, a circle as illustrated in A of FIG. 19, and its diameter is, for example, 200 mm or 300 mm or the like. The support substrate 81W may not be a silicon substrate but may, for example, be a glass substrate, a resin substrate, or a metallic substrate.

Figure 19:
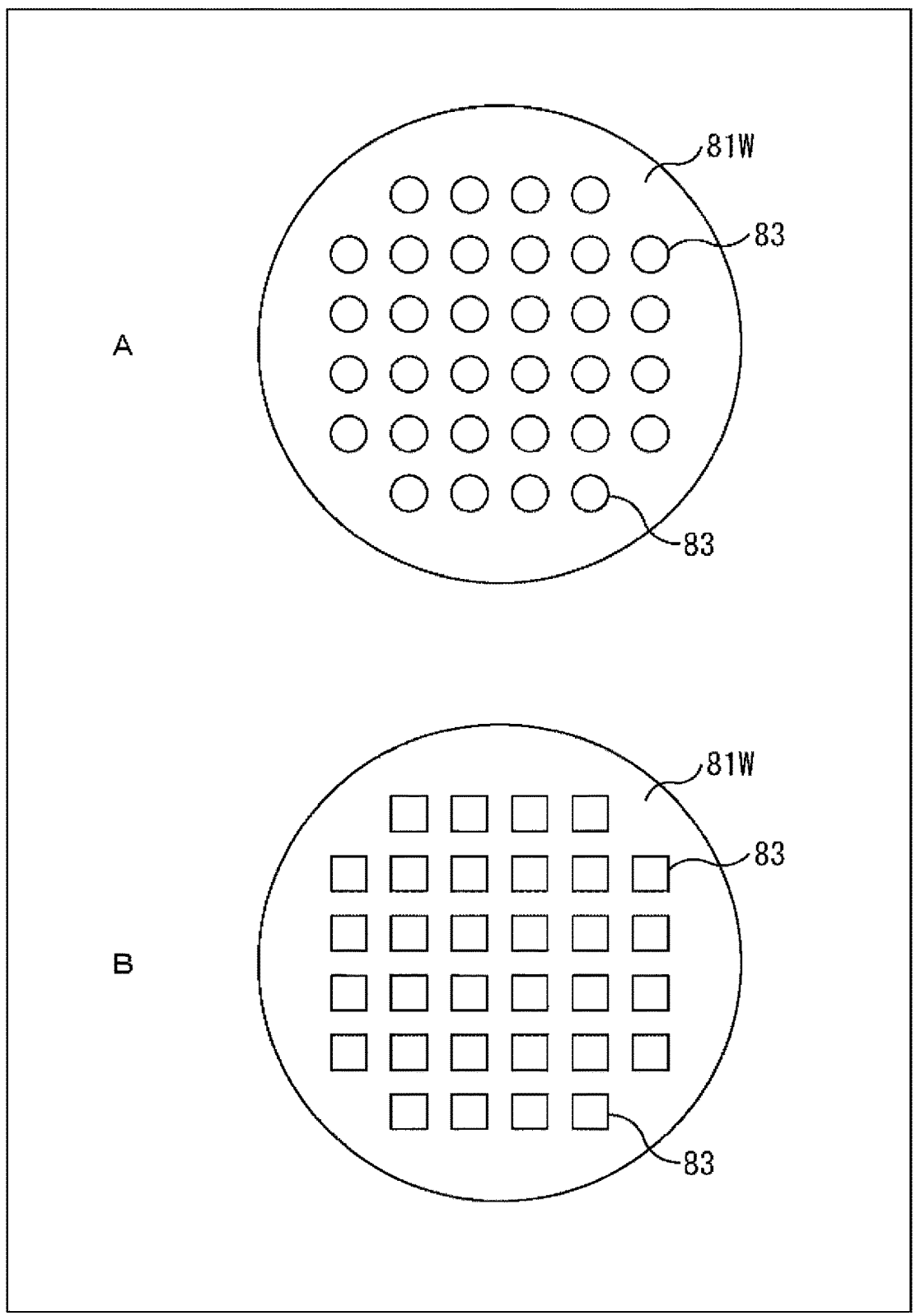
FIG. 19 illustrates figures for explaining a method of manufacturing a substrate with lens.

In addition, the plan-view shape of the through-holes 83 is a circle as illustrated in A of FIG. 19 in this embodiment, but the plan-view shape of the through-holes 83 may be a polygon such as, for example, a tetragon as illustrated in B of FIG. 19.

The opening width of the through-holes 83 may be, for example, in the range of approximately 100 μm to approximately 20 mm. In this case, for example, approximately 100 through-holes 83 to approximately 5,000,000 through-holes 83 can be disposed in the support substrate 81W.

Herein, the size of the through-holes 83 in plane directions of the substrate with lens 41 is referred to as opening width. Unless specified otherwise, the opening width means the length of one side in the case where the plan-view shape of the through-hole 83 is a tetragon, and means the diameter in the case where the plan-view shape of the through-holes 83 is a circle.

Figure 20:
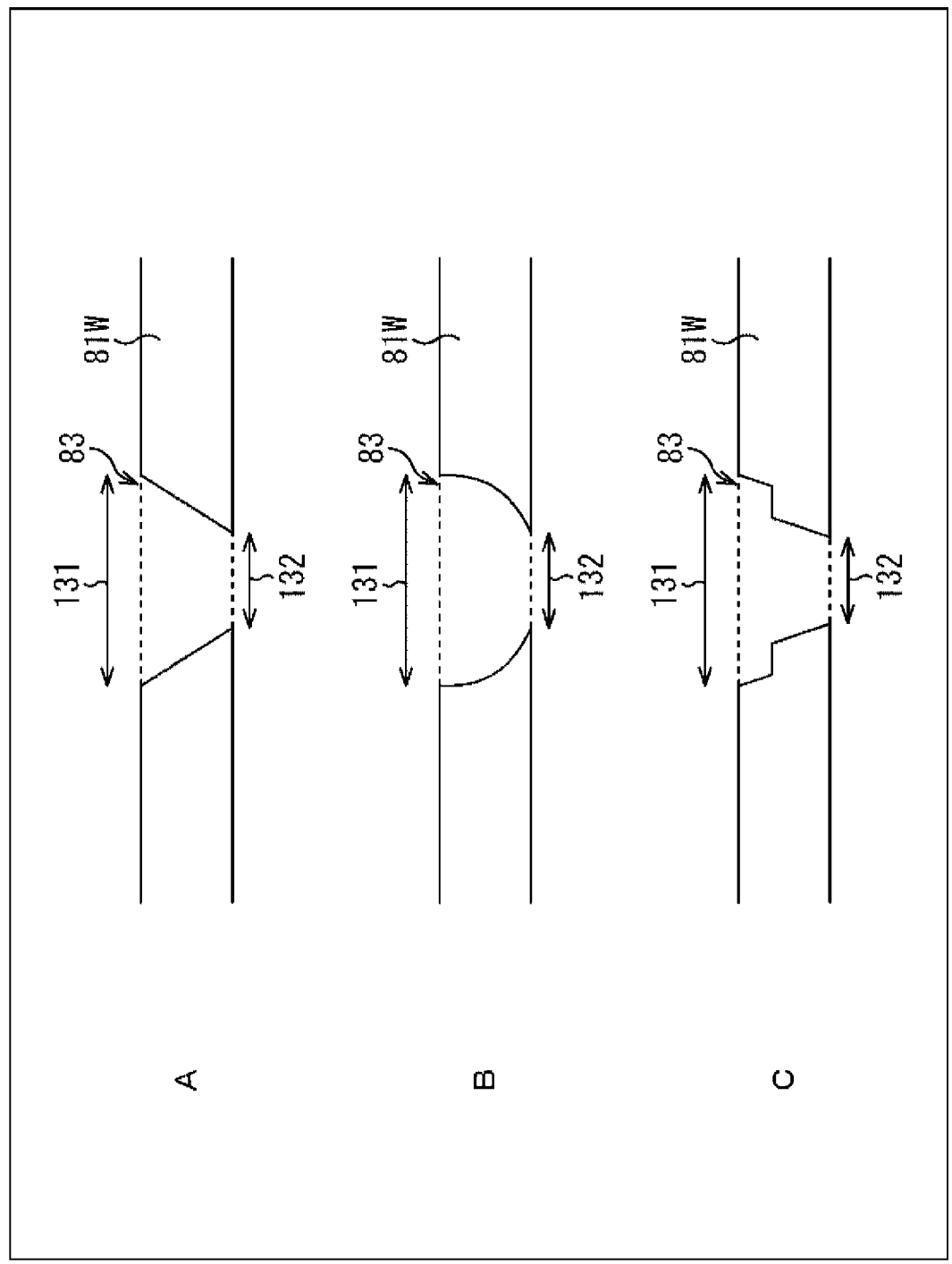
FIG. 20 illustrates figures for explaining a method of manufacturing a substrate with lens.

As illustrated in FIG. 20, the through-holes 83 are so shaped that as compared to a first opening width 131 at a first surface of the support substrate 81W, a second opening width 132 at a second surface opposite to the first surface is smaller.

As an example of the three-dimensional shape of the through-holes 83 in which the second opening width 132 is smaller than the first opening width 131, the through-holes 83 may be in the shape of a truncated cone or a truncated polygonal pyramid as illustrated in A of FIG. 20. The profile of the side wall or walls of the through-hole 83 may be a straight line as illustrated in A of FIG. 20, or may be a curved line as illustrated in B of FIG. 20. Alternatively, the profile may be stepped as illustrated in C of FIG. 20.

The through-hole 83 having a shape in which the second opening width 132 is smaller than the first opening width 131 ensures that, when a resin is supplied into the through-hole 83 and the resin is pressed by mold members from the first and second surfaces toward in the respective opposite directions to form the lens resin portion 82, the resin to be the lens resin portion 82 receives forces from the two opposed mold members and is thereby pressed against the side wall or walls of the through-hole 83. As a result, an action such as to enhance the adhesion strength between the resin to be the lens resin portion 82 and the support substrate can be offered.

Note that as a further embodiment of the through-hole 83, a shape in which the first opening width 131 and the second opening width 132 are equal, namely, a shape in which the profile of the side wall or walls of the through-hole 83 is a straight line, may also be adopted.

<Method of Forming Through-Holes by Use of Wet Etching>

The through-holes 83 in the support substrate 81W can be formed by etching the support substrate 81W by wet etching. Specifically, before etching the support substrate 81W, an etching mask is formed on a surface of the support substrate 81W for preventing non-opening regions of the support substrate 81W from being etched. As the material for the etching mask, there is used, for example, an insulating film such as a silicon oxide film or a silicon nitride film. The etching mask is formed by forming a layer of an etching mask material on the surface of the support substrate 81W, and opening in the layer a pattern to be plan-view shapes of the through-holes 83. After the etching mask is formed, the support substrate 81W is etched, whereby the through-holes 83 are formed in the support substrate 81W.

In the case where, for example, single crystal silicon with a substrate surface orientation of (100) is used as the support substrate 81W, crystal-anisotropic wet etching using a basic solution of KOH or the like can be adopted for forming the through-holes 83.

When the support substrate 81W which is single crystal silicon with a substrate surface orientation of (100) is subjected to the crystal-anisotropic wet etching using a basic solution of KOH or the like, etching proceeds in such a manner that a (111) plane appears at an opening side wall. As a result, irrespectively of whether the plan-view shape of the openings in the etching mask is a circle or a tetragon, through-holes 83 with a tetragonal plan-view shape are obtained in which the second opening width 132 of the through-hole 83 is smaller than the first opening width 131, and the three-dimensional shape of the through-hole 83 is a truncated pyramid or similar shape. The angle of side walls of the through-hole 83 in the shape of the truncated pyramid is approximately 55 degrees relative to the substrate plane.

The etching for forming the through-holes may also be carried out by another carrying-out example consisting in the wet etching which is disclosed in WO 2011/010739 and the like and in which a chemical liquid capable of etching silicon into an arbitrary shape without being restricted by crystal orientation is used. As the chemical liquid, there can be used, for example, a chemical liquid obtained by adding at least one surfactant selected from among polyoxyethylene alkyl phenyl ethers, polyoxyalkylene alkyl ethers and polyethylene glycol to an aqueous solution of TMAH (tetramethylammonium hydroxide), or a chemical liquid obtained by adding isopropyl alcohol to an aqueous KOH solution.

When the support substrate 81W composed of single crystal silicon with a substrate surface orientation of (100) is subjected to etching for formation of the through-holes 83 by using one of the above-mentioned chemical liquids, in the case where the plan-view shape of the openings in the etching mask is a circle, through-holes 83 with a circular plan-view shape are obtained in which the second opening width 132 is smaller than the first opening width 131, and the three-dimensional shape is a truncated cone or similar shape.

In the case where the plan-view shape of the openings in the etching mask is a tetragon, through-holes 83 with a tetragonal plan-view shape are obtained in which the second opening width 132 is smaller than the first opening width 131, and the three-dimensional shape is a truncated pyramid or similar shape. The angle of the side wall or walls of the through-hole 83 in the shape of the truncated cone or truncated pyramid is approximately 45 degrees relative to the substrate plane.

<Method of Forming Through-Holes by Use of Dry Etching>

In addition, the etching for forming the through-holes 83 can be conducted using dry etching, instead of the above-mentioned wet etching.

Figure 21:
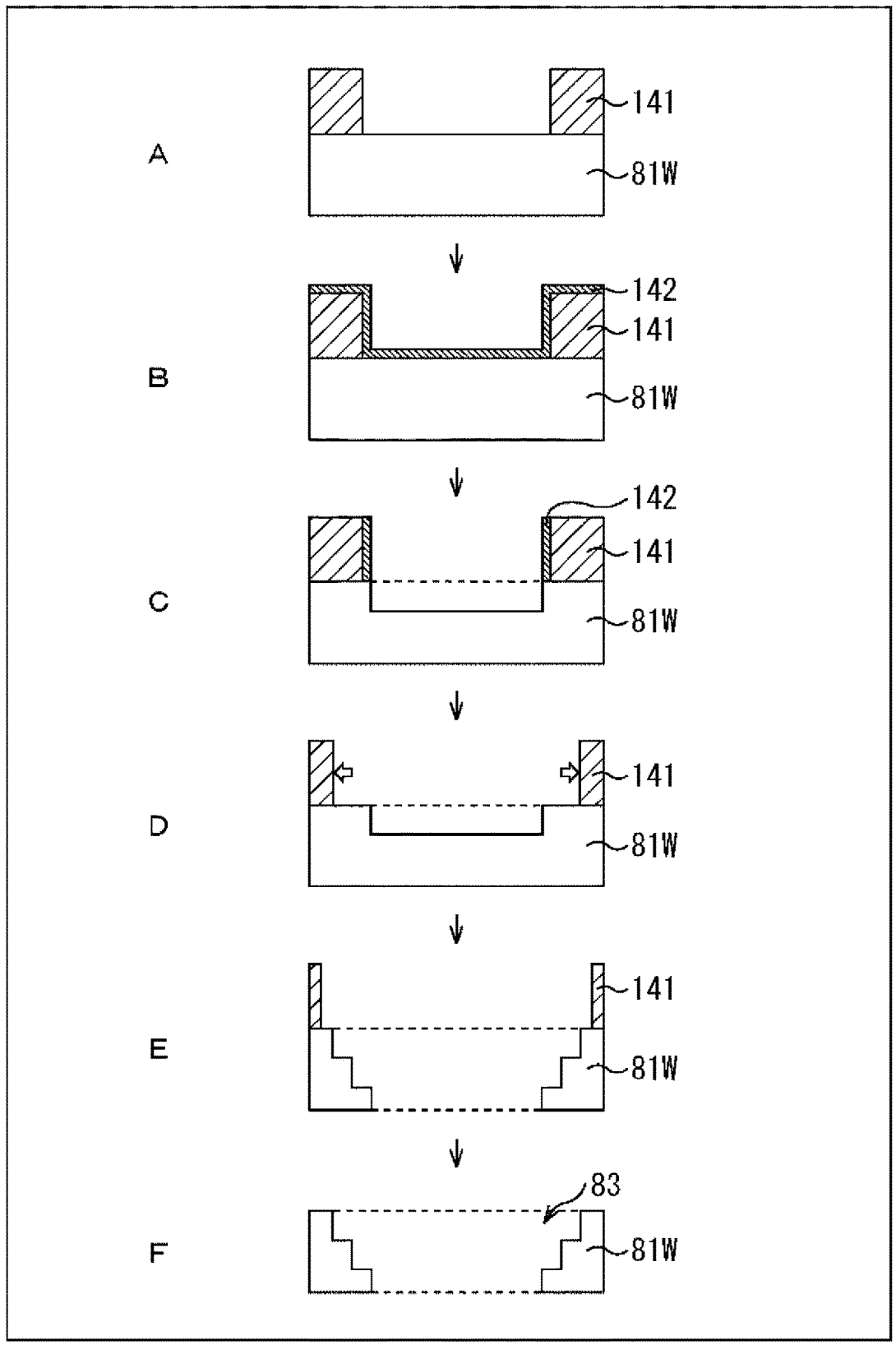
FIG. 21 illustrates figures for explaining a method of manufacturing a substrate with lens.

Referring to FIG. 21, a method of forming the through-holes 83 by use of dry etching will be described.

As illustrated in A of FIG. 21, an etching mask 141 is formed on one surface of the support substrate 81W. The etching mask 141 has a mask pattern in which areas for forming the through-holes 83 are opened.

Next, as illustrated in B of FIG. 21, a protective film 142 for protecting the side wall of the etching mask 141 is formed, after which the support substrate 81W is etched in a predetermined depth by dry etching, as illustrated in C of FIG. 21. By the dry etching step, the protective film 142 on the surface of the support substrate 81W and on the surface of the etching mask 141 are removed, but the protective film 142 on the side surfaces of the etching mask 141 remains, whereby the side walls of the etching mask 141 are protected. After the etching, as illustrated in D of FIG. 21, the protective film 142 on the side walls is removed, and the etching mask 141 is retracted in directions for enlarging the pattern size of the opening patterns.

Then, again, the protective film forming step, the dry etching step, and the etching mask retracting step of B to D of FIG. 21 are repeated multiple times. By this, as illustrated in E of FIG. 21, the support substrate 81W is etched into a stepped shape (projected and recessed shape) provided with periodic steps.

Finally, the etching mask 141 is removed, whereon the through-holes 83 provided with side walls in the stepped shape are formed in the support substrate 81W, as illustrated in F of FIG. 21. The width in the plane direction (the width of one step) of the stepped shape of the through-holes 83 is, for example, approximately 400 nm to 1 μm.

In the case of forming the through-holes 83 by use of dry etching as above-mentioned, the protective film forming step, the dry etching step and the etching mask retracting step are carried out repeatedly.

Since the side walls of the through-holes 83 are in a periodic stepped shape (projected and recessed shape), reflection of incident light can be restrained. In addition, if the side walls of the through-holes 83 are in a randomly sized projected and recessed shape, voids (gaps) may be generated in the close contact layer between the lens formed inside the through-hole 83 and the side wall of the through-hole 83, and adhesion with the lens may be lowered due to the voids. According to the above-mentioned method, however, since the side walls of the through-holes 83 are in the periodic projected and recessed shape, adhesion is enhanced, and variations in optical characteristics due to positional deviations of the lenses can be restrained.

Examples of the materials to be used in each of the steps are as follows. For example, the support substrate 81W may be formed of single crystal silicon, the etching mask 141 may be formed of a photoresist, and the protective film 142 may be formed of a fluorocarbon polymer formed by use of a gas plasma of C4F8, CHF3 or the like. The etching treatment may be conducted by plasma etching using a gas containing SF6/O2, C4F8/SF6 or the like, and the mask retracting step may be conducted by plasma etching using an O2 gas or an O2-containing gas such as CF4/O2.

Alternatively, the support substrate 81W may be formed of single crystal silicon, the etching mask 141 may be formed of SiO2, the etching may be conducted using a plasma containing Cl2, and the protective film 142 may be composed of an oxide film obtained by oxidizing a material to be etched by use of an O2 plasma. The etching treatment may be conducted by plasma etching using a gas containing Cl2, and the mask retracting step may be conducted by plasma etching using an F-containing gas such as CF4/O2.

As above-mentioned, a plurality of through-holes 83 can be simultaneously formed in the support substrate 81W by wet etching or dry etching. In this case, the support substrate 81W may be formed with through grooves 151 in regions where the through-holes 83 are not formed, as illustrated in A of FIG. 22.

Figure 22:
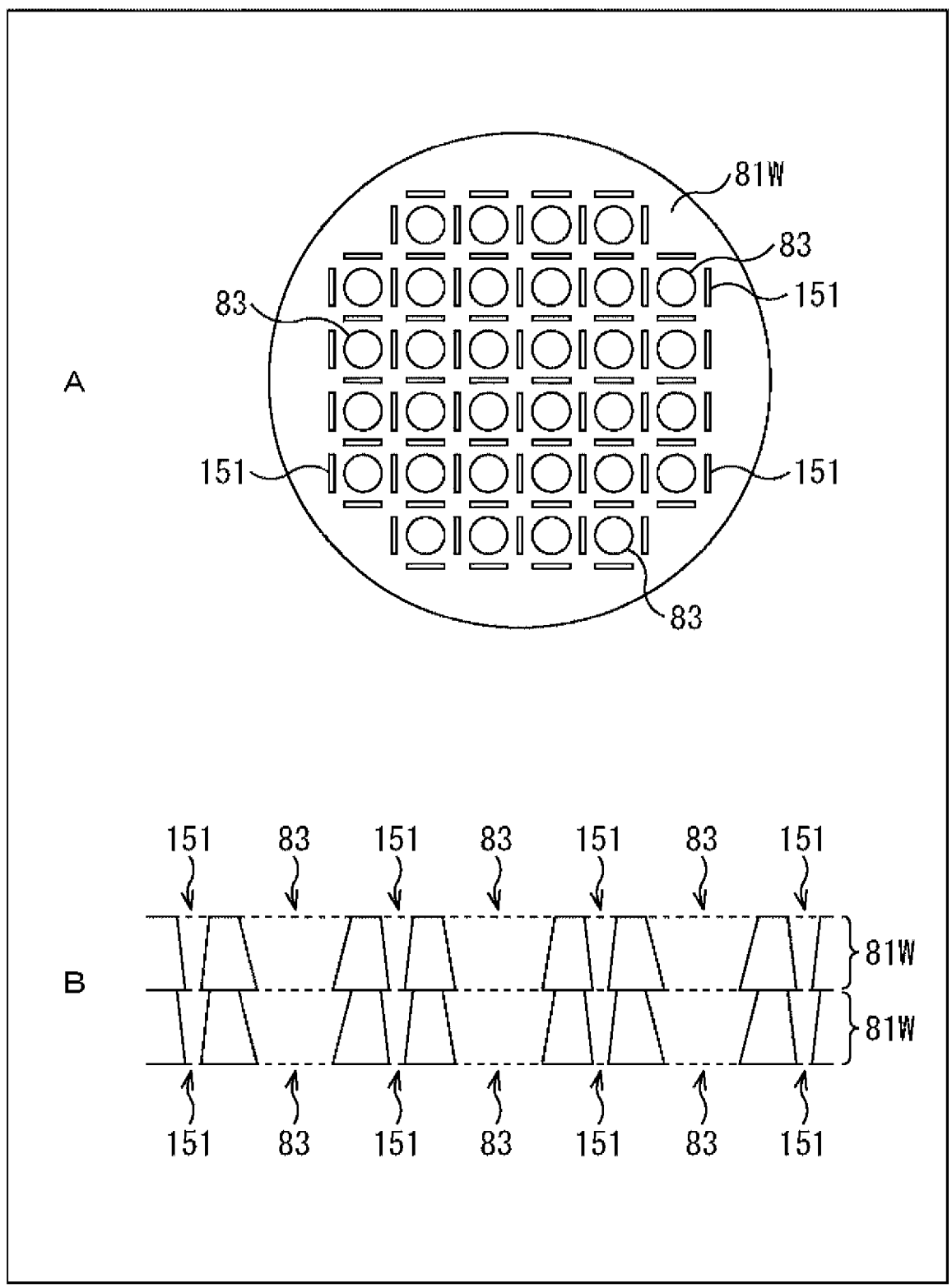
FIG. 22 illustrates figures for explaining a method of manufacturing substrates with lens.

A of FIG. 22 is a plan view of a support substrate 81W formed with the through grooves 151 in addition to the through-holes 83.

For example, as illustrated in A of FIG. 22, the through grooves 151 are disposed while avoiding the plurality of through-holes 83 disposed in a matrix pattern; specifically, the through grooves 151 are disposed only at parts between the through-holes 83 in the row direction and the column direction.

In addition, the through grooves 151 in the support substrate 81W may be disposed at the same positions, among the substrates with lens 41 constituting the laminated lens structure 11. In this case, in a state in which the plurality of support substrates 81W are laminated as the laminated lens structure 11, as illustrated in a sectional view in B of FIG. 22, the through grooves 151 in the plurality of support substrates 81W are in the state of penetrating the plurality of support substrates 81W.

The through grooves 151 in the support substrate 81W as part of the substrate with lens 41 can produce an action or effect of suppressing deformation of the substrate with lens 41 due to stress in the case where the stress for deforming the substrate with lens 41 is exerted from the outside of the substrate with lens 41, for example.

Alternatively, the through grooves 151 can also produce an action or effect of suppressing deformation of the substrate with lens 41 due to stress in the case where the stress for deforming the substrate with lens 41 is exerted from the inside of the substrate with lens 41, for example.

<Method of Producing Substrate with Lens>

Now, referring to FIG. 23, a method of producing a substrate with lens 41W in a substrate state will be described below.

Figure 23:
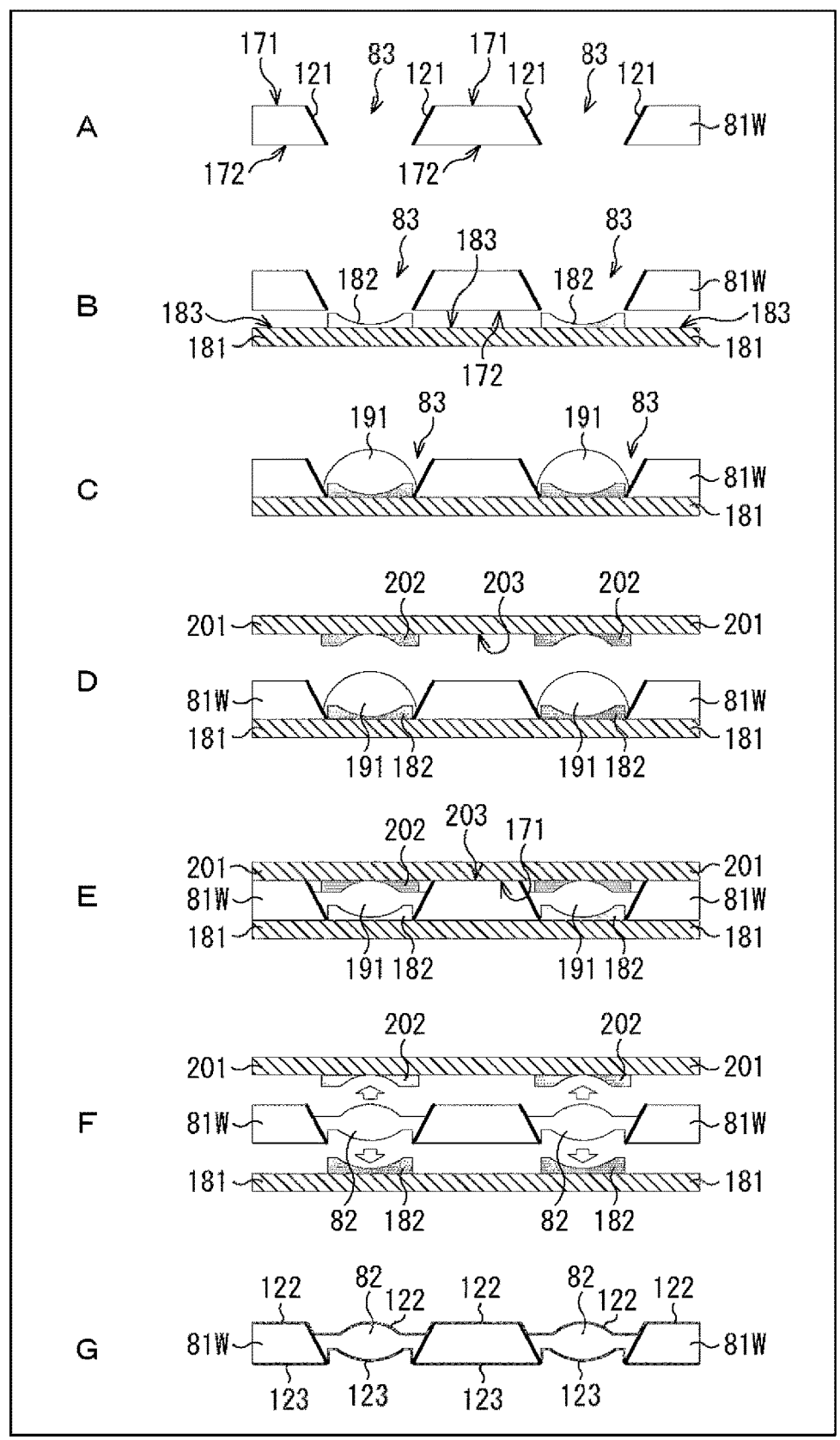
FIG. 23 illustrates figures for explaining a method of manufacturing a substrate with lens.

First, as illustrated in A of FIG. 23, a support substrate 81W formed with a plurality of through-holes 83 is prepared. A light-shielding film 121 is formed on side walls of the through-holes 83. In FIG. 23, as space is limited, only two through-holes 83 are illustrated. In practice, however, a multiplicity of through-holes 83 are formed in plane directions of the support substrate 81W, as illustrated in FIG. 19. In addition, an alignment mark (not illustrated) for alignment is formed in a region near the outer circumference of the support substrate 81W.

A front-side flat portion 171 on the upper side of the support substrate 81W and a back-side flat portion 172 on the lower side are flat surfaces formed to be flat to such an extent as to enable plasma bonding conducted in a later step. The thickness of the support substrate 81W also plays a role of spacer for determining lens-to-lens distance when final individualization as the substrate with lens 41 and lamination thereof with other substrates with lens 41 are conducted.

As the support substrate 81W, there is preferably used a low-thermal-expansion-coefficient substrate having a thermal expansion coefficient of not more than 10 ppm/° C.

Next, as illustrated in B of FIG. 23, the support substrate 81W is disposed on a lower mold 181 on which a plurality of concave-shaped optical transfer surfaces 182 are arranged at regular intervals. More specifically, the back-side flat portion 172 of the support substrate 81W and a flat surface 183 of the lower mold 181 are superposed on each other such that the concave-shaped optical transfer surfaces 182 are located inside the through-holes 83 of the support substrate 81W. The optical transfer surfaces 182 of the lower mold 181 are so formed as to make one-to-one correspondence with the through-holes 83 of the support substrate 81W, and the positions of the support substrate 81W and the lower mold 181 in plane directions are controlled so that the centers of the corresponding optical transfer surfaces 182 and through-holes 83 coincide in the optical axis direction. The lower mold 181 is formed of a hard mold material, for example, metal, silicon, quartz or glass.

Subsequently, as illustrated in C of FIG. 23, an energy-curing resin 191 is filled (dropped) into the inside of the lower mold 181 and the through-holes 83 of the support substrate 81W which are superposed on each other. The lens resin portions 82 are formed by use of the energy-curing resin 191. Therefore, it is preferable that the energy-curing resin 191 is preliminarily subjected to a degassing treatment so as not to contain bubbles. The degassing treatment is preferably a vacuum degassing treatment or a degassing treatment by centrifugal force. In addition, the vacuum degassing treatment is preferably conducted after the filling. With the degassing treatment thus conducted, the lens resin portions 82 can be formed without entrapping bubbles therein.

Next, as illustrated in D of FIG. 23, an upper mold 201 is disposed over the superposed lower mold 181 and support substrate 81W. A plurality of concave-shaped optical transfer surfaces 202 are disposed on the upper mold 201 at regular intervals. Like in disposing the lower mold 181, the upper mold 201 is disposed with highly accurate alignment such that the centers of the through-holes 83 and the centers of the optical transfer surfaces 202 coincide in the optical axis direction.

With respect to the height direction which is the vertical direction on the paper, the position of the upper mold 201 is fixed by a controller for controlling the spacing between the upper mold 201 and the lower mold 181 in such a manner that the spacing between the upper mold 201 and the lower mold 181 will be a predetermined distance. In this case, the space between the optical transfer surface 202 of the upper mold 201 and the optical transfer surface 182 of the lower mold 181 is equal to a thickness of the lens resin portion 82 (lens 21) which is calculated by optical design.

Alternately, as illustrated in E of FIG. 23, like in disposing the lower mold 181, a flat surface 203 of the upper mold 201 and the front-side flat portion 171 of the support substrate 81W may be superposed on each other. In this case, the distance between the upper mold 201 and the lower mold 181 is equal to the thickness of the support substrate 81W, and highly accurate alignment in the plane directions and the height direction can be performed.

When a control is conducted such that the spacing between the upper mold 201 and the lower mold 181 is set to the preset distance, in the step of C of FIG. 23 described above, the amount of the energy-curing resin 191 dropped to fill the inside of the through-hole 83 of the support substrate 81W is an amount so controlled that the resin will not overflow from the space surrounded by the through-hole 83 of the support substrate 81W and the upper mold 201 and the lower mold 181 disposed on the upper and lower sides thereof. As a result, wasting of the material of the energy-curing resin 191 is avoided, so that production cost can be reduced.

Subsequently, in the state illustrated in E of FIG. 23, a curing treatment of the energy-curing resin 191 is conducted. The energy-curing resin 191 is cured, for example, by giving heat or UV light thereto as energy, and leaving the resin to stand for a predetermined time. During the curing, the upper mold 201 may be pressed downward or aligned, whereby deformation due to shrinkage of the energy-curing resin 191 can be minimized.

A thermoplastic resin may be used in place of the energy-curing resin 191. In that case, in the state illustrated in E of FIG. 23, the upper mold 201 and the lower mold 181 are heated to raise temperature, whereby the energy-curing resin 191 is molded in a lens shape, and the resin is cured by cooling.

Next, as illustrated in F of FIG. 23, a controller for controlling the positions of the upper mold 201 and the lower mold 181 moves the upper mold 201 upward and the lower mold 181 downward, whereby the upper mold 201 and the lower mold 181 are released from the support substrate 81W. When the upper mold 201 and the lower mold 181 are released from the support substrate 81W, the lens resin portions 82 including the lenses 21 have been formed inside the through-holes 83 of the support substrate 81W.

Note that surfaces of the upper mold 201 and the lower mold 181 that are brought into contact with the support substrate 81W may be coated with a mold release agent based on fluorine or silicon or the like. Such a coating enables easy releasing of the support substrate 81W from the upper mold 201 and the lower mold 181. In addition, as a method for easily releasing from the surface of contact with the support substrate 81W, any of various coatings with fluorine-containing DLC (Diamond Like Carbon) or the like may be conducted.

Subsequently, as illustrated in G of FIG. 23, an upper-side surface layer 122 is formed on front surfaces of the support substrate 81W and the lens resin portions 82, and a lower-side surface layer 123 is formed on back surfaces of the support substrate 81W and the lens resin portions 82. Before or after the formation of the upper-side surface layer 122 and the lower-side surface layer 123, CMP (Chemical Mechanical Polishing) or the like may be conducted, as required, to flatten a front-side flat portion 171 and a back-side flat portion 172 of the support substrate 81W.

With the energy-curing resin 191 thus pressure molded (imprinted) into the through-holes 83 formed in the support substrate 81W by use of the upper mold 201 and the lower mold 181, it is possible to form the lens resin portions 82 and to produce the substrate with lens 41.

The shape of the optical transfer surfaces 182 and the optical transfer surfaces 202 is not limited to the above-mentioned concave shape, and are appropriately determined according to the shape of the lens resin portions 82. As has been illustrated in FIG. 15, the lens shape in the substrates with lens 41a to 41e may be any of various shapes derived by optical system design, and may, for example, be a biconvex shape, a biconcave shape, a planoconvex shape, a planoconcave shape, a convex meniscus shape, a concave meniscus shape, and, further, a high-order aspherical shape.

Besides, the shape of the optical transfer surfaces 182 and the optical transfer surfaces 202 may be such a shape that the lens shape after formation will be a moth-eye structure.

According to the aforementioned producing method, variations in the distances in plane directions between the lens resin portions 82 due to shrinkage on curing of the energy-curing resin 191 can be cut off by the interposition of the support substrate 81W, and, therefore, the accuracy between lens distances can be controlled with high accuracy. In addition, there is an effect such that the energy-curing resin 191 low in strength is reinforced by the support substrate 81W high in strength. As a result, it is possible to provide a lens array substrate in which a plurality of favorably handleable lenses are disposed, and to provide an effect of restraining the lens array substrate from warping.

<Example in which Through-Hole Shape is Polygon>

As illustrated in B of FIG. 19, the plan-view shape of the through-holes 83 may be a polygon such as, for example, a tetragon.

Figure 24:
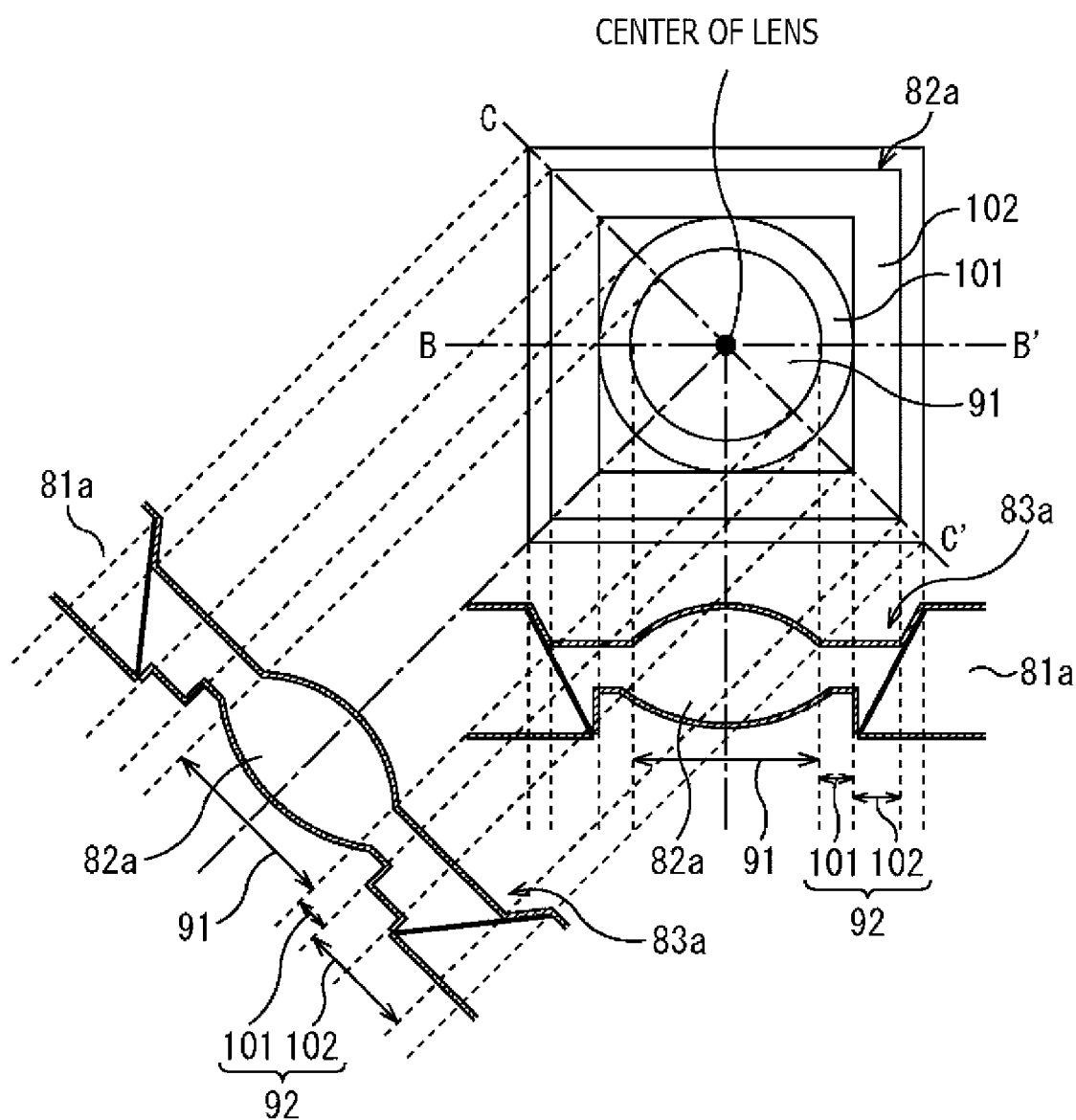
FIG. 24 illustrates figures for explaining a method of manufacturing a substrate with lens.

FIG. 24 illustrates a plan view and sectional views of a support substrate 81a and a lens resin portion 82a of a substrate with lens 41a, in the case where the plan-view shape of through-holes 83 is a tetragon.

The sectional views of the substrate with lens 41a in FIG. 24 are sectional views taken along line B-B' and line C-C' of the plan view.

As seen from comparison between the B-B' line sectional view and the C-C' line sectional view, in the case where the through-hole 83a is tetragonal, the distance from the center of the through-hole 83a to an upper outer edge of the through-hole 83a and the distance from the center of the through-hole 83a to a lower outer edge of the through-hole 83a are different in a side direction and in a diagonal direction of the through-hole 83a which is tetragonal, and the distance in the diagonal direction is longer. Therefore, in the case where the plan-view shape of the through-hole 83a is a tetragon, when the lens portion 91 is circular, the distance from the outer circumference of the lens portion 91 to the side wall of the through-hole 83a, or the length of a support portion 92, should have different lengths in the side direction and in the diagonal direction of the tetragon.

In view of this, the lens resin portion 82a illustrated in FIG. 24 has the following structure.

(1) The length of an arm portion 101 disposed at the outer circumference of the lens portion 91 is the same in the side direction and in the diagonal direction of the tetragon.

(2) The length of a leg portion 102 which is disposed on the outside of the arm portion 101 and extends to the side wall of the through-hole 83a is so set that the length of the leg portion 102 in the diagonal direction of the tetragon is longer than the length of the leg portion 102 in the side direction.

As illustrated in FIG. 24, the leg portion 102 is not in direct contact with the lens portion 91, but, on the other hand, the arm portion 101 is in direct contact with the lens portion 91.

In the lens resin portion 82a of FIG. 24, the length and thickness of the arm portion 101 in direct contact with the lens portion 91 are constant over the whole part of the outer circumference of the lens portion 91, whereby an action or effect of supporting the whole part of the lens portion 91 with a constant force and evenly can be offered.

Further, since the whole part of the lens portion 91 is supported with a constant force and evenly, in the case where for example stress is exerted over the whole part of the outer circumference of the through-hole 83a from the support substrate 81a surrounding the through-hole 83a, the stress is evenly transmitted to the whole part of the lens portion 91, whereby an action or effect of restraining the stress from being unevenly transmitted only to a specific portion of the lens portion 91 can be offered.

Figure 25:
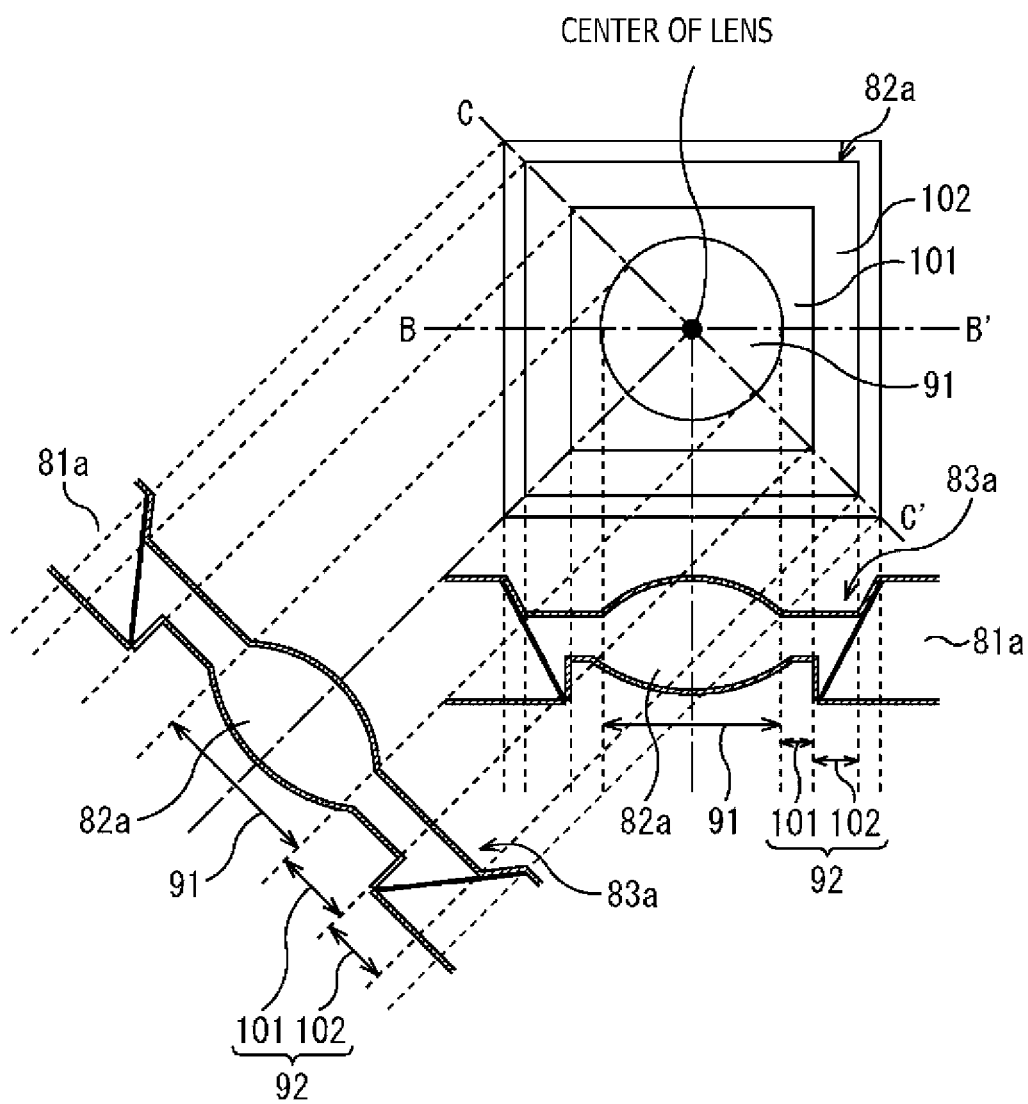
FIG. 25 illustrates figures for explaining a method of manufacturing a substrate with lens.

FIG. 25 illustrates a plan view and sectional views of a support substrate 81a and a lens resin portion 82a of a substrate with lens 41a, illustrating another example of the through-hole 83 of which the plan-view shape is a tetragon.

The sectional views of the substrate with lens 41a in FIG. 25 are sectional views taken along line B-B' and line C-C' of the plan view.

Also in FIG. 25, like in FIG. 22, the distance from the center of the through-hole 83a to an upper outer edge of the through-hole 83a and the distance from the center of the through-hole 83a to a lower outer edge of the through-hole 83a are different in a side direction and in a diagonal direction of the through-hole 83a which is tetragonal, and the distance in the diagonal direction is longer. Therefore, in the case where the plan-view shape of the through-hole 83a is a tetragon, when the lens portion 91 is circular, the distance from the outer circumference of the lens portion 91 to the side wall of the through-hole 83a, or the length of a support portion 92, should have different lengths in the side direction and in the diagonal direction of the tetragon.

In view of this, the lens resin portion 82a illustrated in FIG. 25 has the following structure.

(1) The length of a leg portion 102 disposed at the outer circumference of the lens portion 91 is constant along the four sides of the tetragon of the through-hole 83a.

(2) To realize the structure of the above paragraph (1), the length of an arm portion 101 is so set that the length of the arm portion in the diagonal direction of the tetragon is longer than the length of the arm portion in the side direction.

As illustrated in FIG. 25, the leg portion 102 is greater than the arm portion 101 in film thickness of resin. Therefore, the leg portion 102 is greater than the arm portion 101 also in volume per unit area in plane directions of the substrate with lens 41a.

In the working example of FIG. 25, the volume of the leg portion 102 is made as small as possible, and is made to be constant along the four sides of the tetragon of the through-hole 83a. As a result, for example in the case where deformation such as swelling of resin is generated, an action or effect of suppressing a volume change due to the deformation as securely as possible and of preventing as securely as possible such a volume change from appearing unevenly over the whole part of the outer circumference of the lens portion 91 can be offered.

Figure 26:
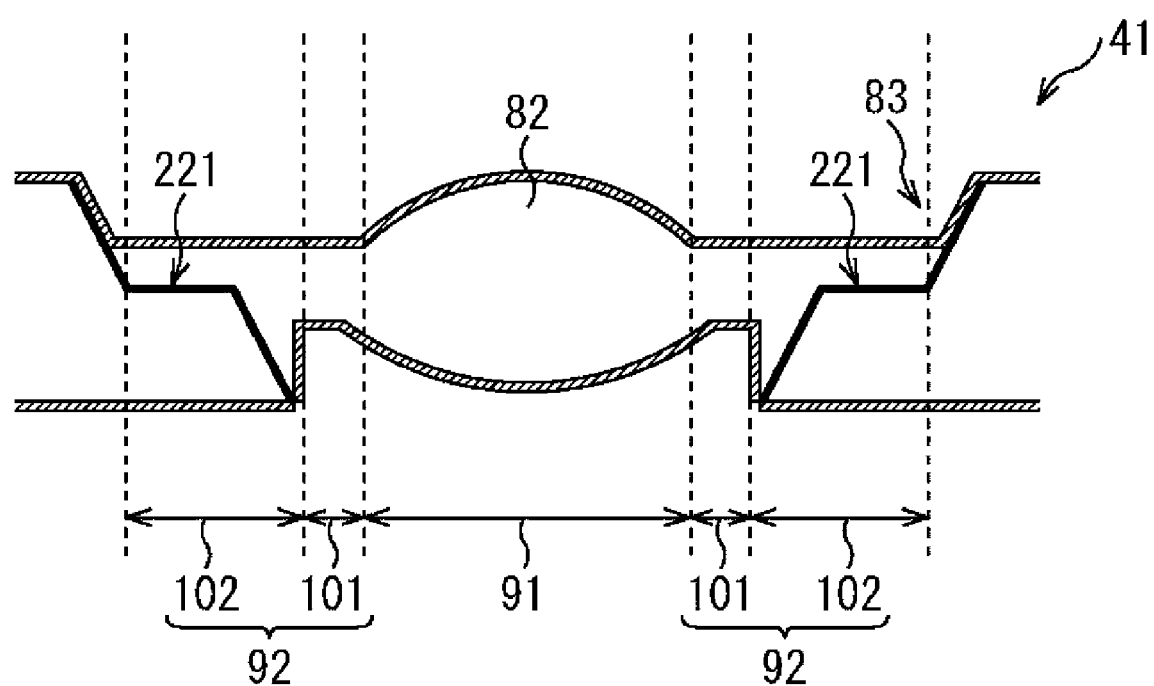
FIG. 26 is a figure for explaining a method of manufacturing a substrate with lens.

FIG. 26 is a sectional view illustrating a further embodiment of the lens resin portion 82 and the through-hole 83 of the substrate with lens 41.

The lens resin portion 82 and the through-hole 83 illustrated in FIG. 26 have the following structure.

(1) The side wall of the through-hole 83 has a stepped shape provided with a stepped portion 221.

(2) A leg portion 102 of a support portion 92 of the lens resin portion 82 not only is disposed on the upper side of the side wall of the through-hole 83 but also extends on the stepped portion 221 possessed by the through-hole 83 in plane directions of the substrate with lens 41.

Figure 27:
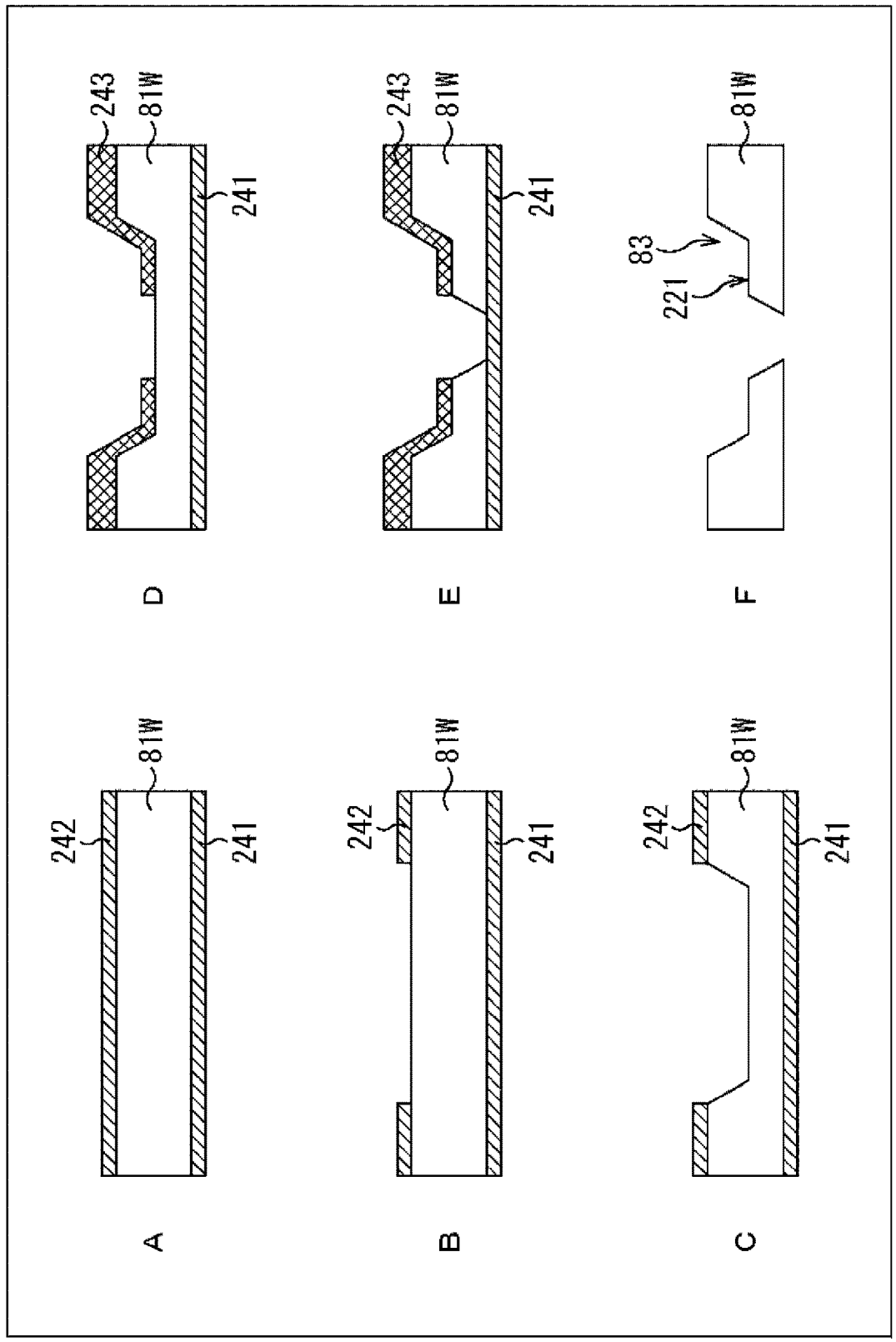
FIG. 27 illustrates figures for explaining a method of manufacturing a substrate with lens.

Referring to FIG. 27, a method of producing the through-hole 83 with the stepped shape illustrated in FIG. 26 will be described.

First, as illustrated in A of FIG. 27, an etching stop film 241 illustrating resistance to wet etching at the time of opening through-holes is formed on one surface of a support substrate 81W. The etching stop film 241 may be, for example, a silicon nitride film.

Next, a hard mask 242 illustrating resistance to wet etching at the time of opening the through-holes is formed on another surface of the support substrate 81W. The hard mask 242 may also be, for example, a silicon nitride film.

Subsequently, as illustrated in B of FIG. 27, a predetermined region of the hard mask 242 is opened for first-time etching. In the first-time etching, a portion to be an upper stage of a stepped portion 221 of a through-hole 83 is etched. Therefore, the opening in the hard mask 242 for the first-time etching is a region corresponding to the opening in the upper-side substrate surface of the substrate with lens 41 described in FIG. 26.

Next, as illustrated in C of FIG. 27, the support substrate 81W is etched in a predetermined depth according to the opening of the hard mask 242 by wet etching.

Subsequently, as illustrated in D of FIG. 27, a hard mask 243 is newly formed on a surface of the support substrate 81W after etching, and the hard mask 243 is opened correspondingly to the portion to be the lower side of the stepped portion 221 of the through-hole 83. For the second-time hard mask 243, a silicon nitride film may be adopted.

Next, as illustrated in E of FIG. 27, the support substrate 81W is etched until reaching the etching stop film 241, according to the opening of the hard mask 243, by wet etching.

Finally, as illustrated in F of FIG. 27, the hard mask 243 on the upper-side surface of the support substrate 81W and the etching stop film 241 on the lower-side surface are removed.

In this way, the etching of the support substrate 81W for forming the through-holes by wet etching is conducted dividedly in two steps, whereby the though-hole 83 with the stepped shape illustrated in FIG. 26 is obtained.

Figure 28:
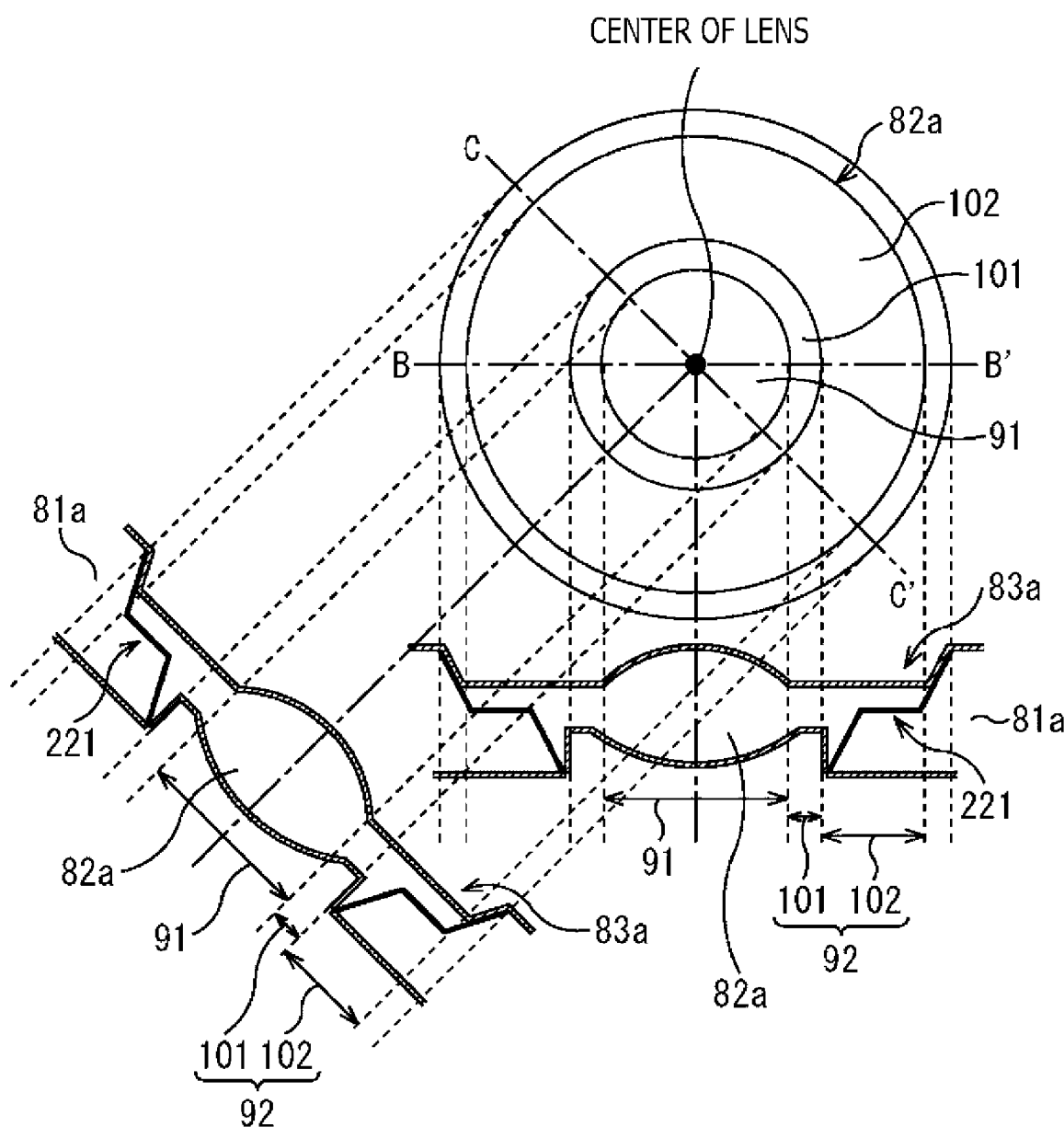
FIG. 28 illustrates figures for explaining a method of manufacturing a substrate with lens.

FIG. 28 illustrates a plan view and sectional views of a support substrate 81a and a lens resin portion 82a of a substrate with lens 41a in the case where a through-hole 83a has a stepped portion 221 and where the plan-view shape of the through-hole 83a is a circle.

The sectional views of the substrate with lens 41a in FIG. 28 are sectional views taken along line B-B' and line C-C' of the plan view.

In the case where the plan-view shape of the through-hole 83a is a circle, the profile of the through-hole 83a naturally is the same irrespectively of the direction of a diameter. In addition, the profiles of an outer edge of a lens resin portion 82a, an arm portion 101, and a leg portion 102 are also the same in profile irrespectively of the direction of a diameter.

The through-hole 83a having the stepped shape of FIG. 28 offers an action or effect such that the area of contact between the leg portion 102 of the support portion 92 of the lens resin portion 82 and the side wall of the through-hole 83a can be made larger, as compared to the through-hole 83a of FIG. 14 which is not provided with a stepped portion 221 in the through-hole 83a. In addition, as a result, an action or effect of increasing the adhesion strength between the lens resin portion 82 and the side wall of the through-hole 83a, in other words, the adhesion strength between the lens resin portion 82a and the support substrate 81W, is offered.

Figure 29:
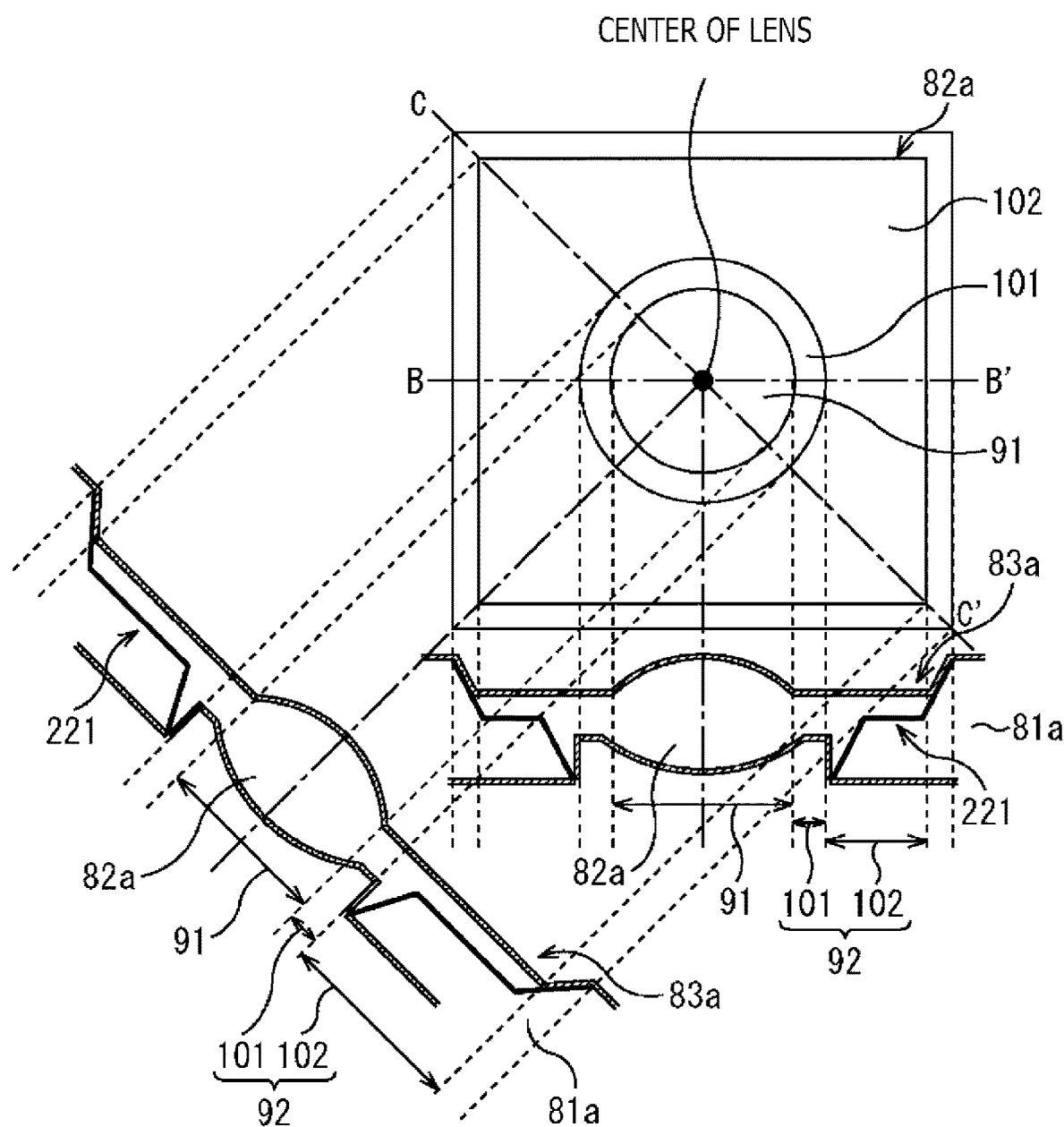
FIG. 29 illustrates figures for explaining a method of manufacturing a substrate with lens.

FIG. 29 illustrates a plan view and sectional views of a support substrate 81a and a lens resin portion 82a of a substrate with lens 41a in the case where a through-hole 83a has a stepped portion 221 and where the plan-view shape of the through-hole 83a is a tetragon.

The sectional views of the substrate with lens 41a in FIG. 29 are sectional views taken along line B-B' and line C-C' of the plan view.

The lens resin portion 82 and the through-hole 83 illustrated in FIG. 29 have the following structure.

(1) The length of an arm portion 101 disposed at the outer circumference of a lens portion 91 is the same in a side direction and in a diagonal direction of the tetragon.

(2) The length of a leg portion 102 which is disposed on the outside of the arm portion 101 and extends to the side wall of the through-hole 83a is so set that the length of the leg portion 102 in the diagonal direction of the tetragon is longer than the length of the leg portion 102 in the side direction.

As illustrated in FIG. 29, the leg portion 102 is not in direct contact with the lens portion 91, but, on the other hand, the arm portion 101 is in direct contact with the lens portion 91.

In the lens resin portion 82a of FIG. 29, like in the lens resin portion 82a described in FIG. 24, the length and thickness of the arm portion 101 in direct contact with the lens portion 91 are constant over the whole part of the outer circumference of the lens portion 91, whereby an action or effect of supporting the whole part of the lens portion 91 with a constant force and evenly can be offered.

Further, since the whole part of the lens portion 91 can be supported with a constant force and evenly, in the case where for example stress is exerted over the whole part of the outer circumference of the through-hole 83a from the support substrate 81a surrounding the through-hole 83a, the stress is evenly transmitted to the whole part of the lens portion 91, whereby an action or effect of restraining the stress from being unevenly transmitted only to a specific portion of the lens portion 91 can be offered.

Furthermore, the structure of the through-hole 83a of FIG. 29 offers an action or effect such that the area of contact between the leg portion 102 of the support portion 92 of the lens resin portion 82a and the side wall of the through-hole 83a can be enlarged, as compared to the through-hole 83a of FIG. 24 and the like which is not provided with a stepped portion 221 in the through-hole 83a. As a result, an action or effect of increasing the adhesion strength between the lens resin portion 82a and the side wall portion of the through-hole 83a, in other words, the adhesion strength between the lens resin portion 82a and the support substrate 81a, is offered.

11. Direct Bonding Between Substrates with Lens

Now, direct bonding between substrates with lens 41W in a substrate state in which a plurality of substrates with lens 41 are formed will be described below.

Figure 30:
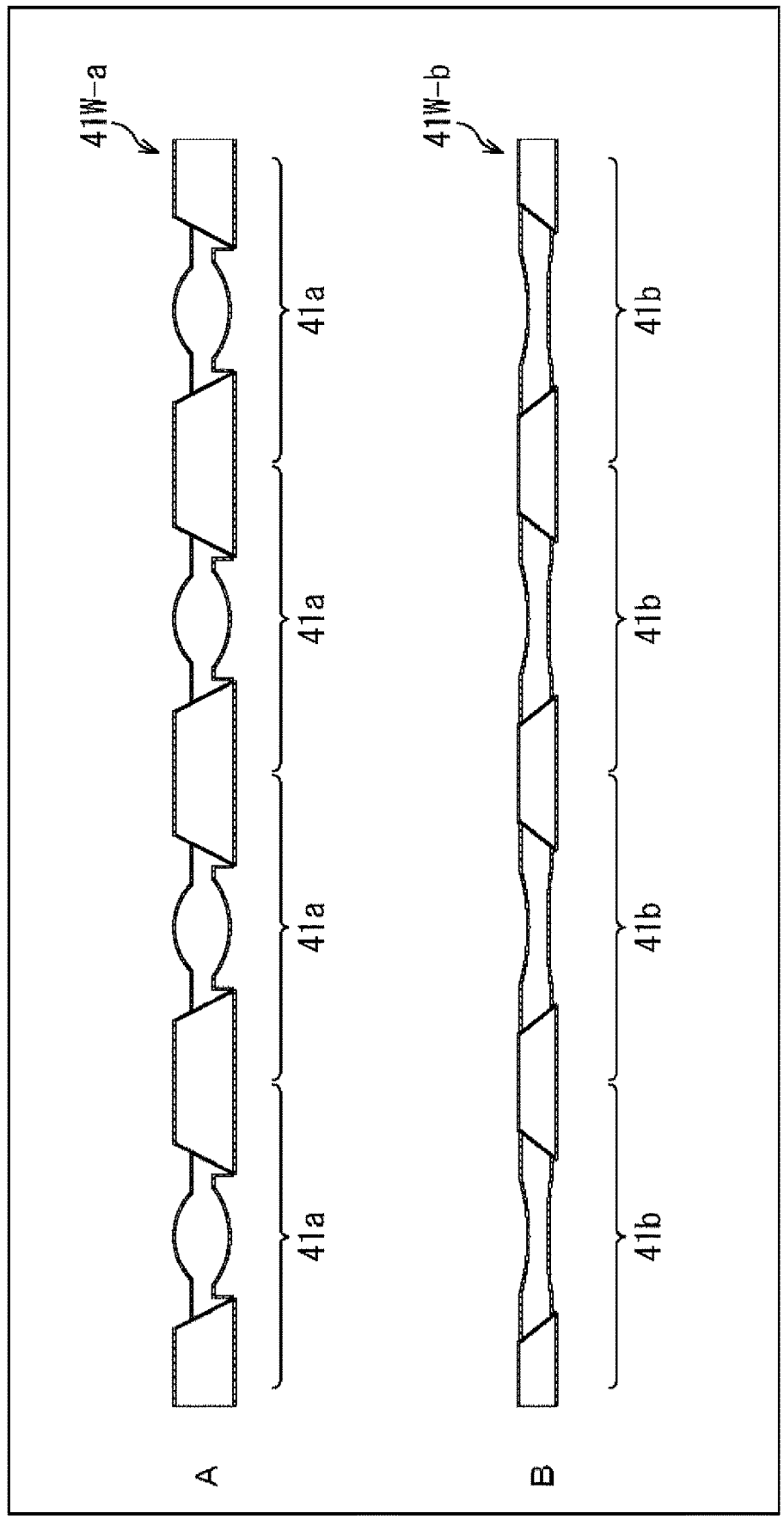
FIG. 30 illustrates figures for explaining bonding between substrates with lens in a substrate state.

In the following description, as illustrated in FIG. 30, the substrate with lens 41W in a substrate state in which a plurality of substrates with lens 41a are formed will be referred to as the substrate with lens 41W-a, and the substrate with lens 41W in a substrate state in which a plurality of substrates with lens 41b are formed will be referred to as the substrate with lens 41W-b. The same applies also to other substrates with lens 41c to 41e.

Figure 31:
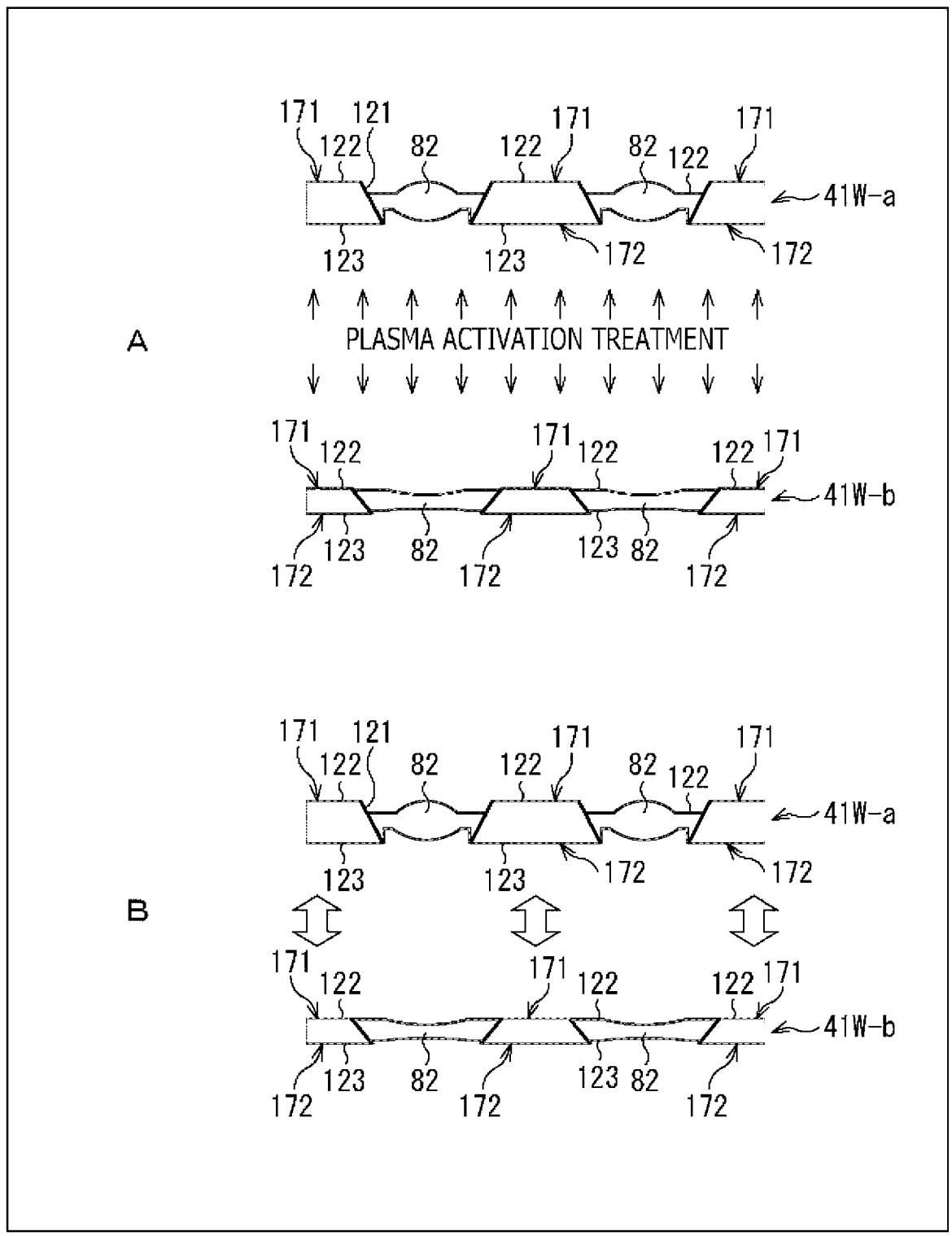
FIG. 31 illustrates figures for explain bonding between substrates with lens in a substrate state.

Referring to FIG. 31, direct bonding between the substrate with lens 41W-a in the substrate state and the substrate with lens 41W-b in the substrate state will be described.

Note that in FIG. 31, the parts of the substrate with lens 41W-b which correspond to the parts of the substrate with lens 41W-a are denoted by the same reference symbols as used for the substrate with lens 41W-a, in making descriptions thereof.

An upper-side surface layer 122 or 125 is formed on upper-side surfaces of the substrate with lens 41W-a and the substrate with lens 41W-b. A lower-side surface layer 123 or 124 is formed on lower-side surfaces of the substrate with lens 41W-a and the substrate with lens 41W-b. As illustrated in A of FIG. 31, the lower-side surface inclusive of a back-side flat portion 172 of the substrate with lens 41W-a and the upper-side surface inclusive of a front-side flat portion 171 of the substrate with lens 41W-b, which are to-be-bonded surfaces of the substrates with lens 41W-a and 41W-b, are entirely subjected to a plasma activation treatment. A gas to be used for the plasma activation treatment may be any gas in which a plasma treatment can be performed, such as O2, N2, He, Ar, and H2. It is to be noted, however, that it is preferable to use a gas of the same element as an constituent element of the upper-side surface layer 122 and the lower-side surface layer 123, as the gas for the plasma activation treatment, since alteration (denaturing) of the upper-side surface layer 122 and the lower-side surface layer 123 themselves can be thereby restrained.

Then, as illustrated in B of FIG. 31, the back-side flat portion 172 of the substrate with lens 41W-a and the front-side flat portion 171 of the substrate with lens 41W-b, which are in the activated surface state, are laminated.

By the lamination treatment of the substrates with lens, hydrogen bonds are produced between hydrogen of OH groups at the surface of the lower-side surface layer 123 or 124 of the substrate with lens 41W-a and hydrogen of OH groups at the surface of the upper-side surface layer 122 or 125 of the substrate with lens 41W-b. As a result, the substrate with lens 41W-a and the substrate with lens 41W-b are fixed together. The lamination treatment of the substrates with lens can be carried out under atmospheric pressure conditions.

The substrate with lens 41W-a and the substrate with lens 41W-b having thus undergone the lamination treatment are subjected to an annealing treatment. By this, dehydration condensation is brought approximately from the state in which the OH groups are hydrogen bonded, whereby covalent bonds through oxygen are formed between the lower-side surface layer 123 or 124 of the substrate with lens 41W-a and the upper-side surface layer 122 or 125 of the substrate with lens 41W-b. Alternatively, an element contained in the lower-side surface layer 123 or 124 of the substrate with lens 41W-a and an element contained in the upper-side surface layer 122 or 125 of the substrate with lens 41W-b are bonded by covalent bonds. By these bonds or bonding, the two substrates with lens are firmly fixed. The phenomenon in which the covalent bonds are thus formed between the lower-side surface layer 123 or 124 of the substrate with lens 41W-a disposed on the upper side and the upper-side surface layer 122 or 125 of the substrate with lens 41W-b disposed on the lower side and the two substrates with lens 41W are thereby fixed, is referred to as direct bonding herein. The method in which a plurality of substrates with lens are firmly attached by a resin over the whole substrate surface area as disclosed in PTL 1 involves a fear of shrinkage on curing of a resin or thermal expansion of the resin and the resulting deformation of lenses. On the other hand, the direct bonding according to the present technology does not use a resin in fixing a plurality of substrates with lens 41W, and, therefore, offers an action or effect such that the plurality of substrates with lens 41W can be fixed without any shrinkage on curing or thermal expansion due to the use of a resin.

The annealing treatment can also be carried out under atmospheric pressure conditions. The annealing treatment may be conducted at 100° C. or above, or at 150° C. or above, or at 200° C. or above, for performing dehydration condensation. On the other hand, from the viewpoint of protecting the energy-curing resin 191 for forming the lens resin portions 82 from heat or from the viewpoint of restraining degassing from the energy-curing resin 191, the annealing treatment may be performed at 400° C. or below, or at 350° C. or below, or at 300° C. or below.

In the case where the lamination treatment between the substrates with lens 41W or the direct bonding treatment between the substrates with lens 41W is conducted under other conditions than atmospheric pressure, when the substrate with lens 41W-a and the substrate with lens 41W-b bonded to each other are returned into an atmospheric pressure environment, a pressure difference would be generated between the space between the lens resin portion 82 and the lens resin portion 82 bonded to each other and the exterior of the lens resin portion 82. Due to the pressure difference, there is a fear that a pressure may be exerted on the lens resin portion 82 to deform the lens resin portion 82.

Where both the lamination treatment between the substrates with lens 41W and the direct bonding treatment between the substrates with lens are conducted under the atmospheric pressure conditions, there is offered an action or effect such that the deformation of the lens resin portion 82 which is feared in the case where the bonding is conducted under other conditions than the atmospheric pressure can be avoided.

Where the substrates having undergone a plasma activation treatment are directly bonded together, or, in other words, are plasma-bonded together, the flowability and/or thermal expansion observed for example in the case of using a resin as an adhesive can be restrained, and, therefore, the positional accuracy in bonding the substrate with lens 41W-a and the substrate with lens 41W-b can be enhanced.

As has been described above, the upper-side surface layer 122 or the lower-side surface layer 123 is formed on the back-side flat portion 172 of the substrate with lens 41W-a and the front-side flat portion 171 of the substrate with lens 41W-b. The upper-side surface layer 122 and the lower-side surface layer 123 are in a state where dangling bonds are liable to be formed, due to the plasma activation treatment conducted previously. In other words, the lower-side surface layer 123 formed on the back-side flat portion 172 of the substrate with lens 41W-a and the upper-side surface layer 122 formed on the front-side flat portion 171 of the substrate with lens 41W-b also have a role of increasing the adhesion strength.

In addition, in the case where the upper-side surface layer 122 or the lower-side surface layer 123 is composed of an oxide film, there is no influence of alteration of film nature by the plasma (O2), and, therefore, there is an effect of restraining the lens resin portions 82 from being corroded by the plasma.

Thus, the substrate with lens 41W-a in a substrate state in which a plurality of substrates with lens 41a are formed and the substrate with lens 41W-b in a substrate state in which a plurality of substrates with lens 41b are formed are directly bonded after being subjected to the surface activation treatment with a plasma, or, in other words, they are bonded by use of plasma bonding.

Figure 32:
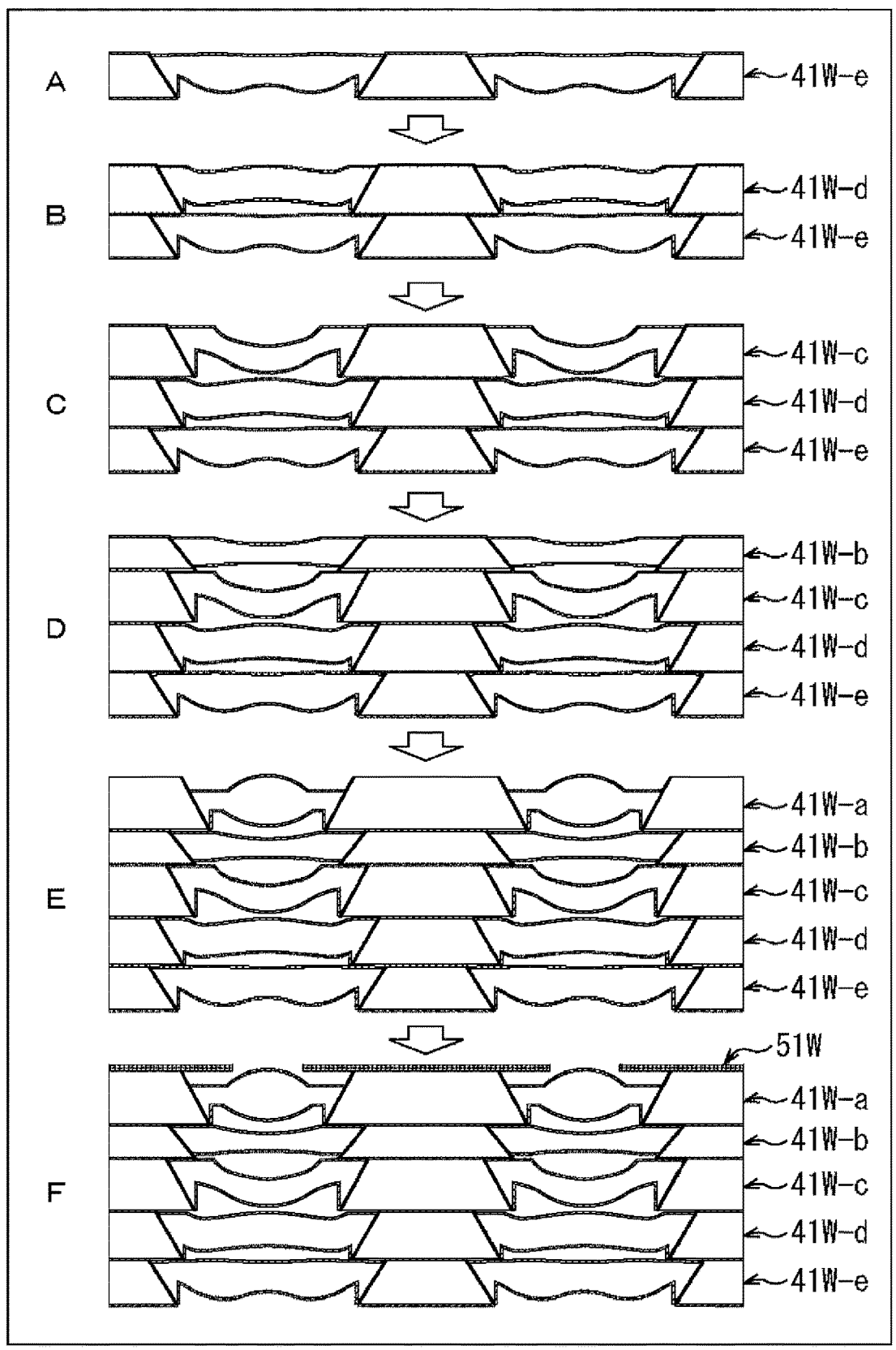
FIG. 32 illustrates figures for explaining a first lamination method for laminating five substrates with lens in a substrate state.

FIG. 32 illustrates a first lamination method for laminating five substrates with lens 41a to 41e, corresponding to the laminated lens structure 11 of FIG. 13, in a substrate state by use of the method of bonding the substrates with lens 41W in a substrate state which has been described referring to FIG. 31.

First, as illustrated in A of FIG. 32, a substrate with lens 41W-e in a substrate state which is located at a lowermost layer in the laminated lens structure 11 is prepared.

Next, as illustrated in B of FIG. 32, a substrate with lens 41W-d in a substrate state which is located at a second lowest layer in the laminated lens structure 11 is bonded onto the substrate with lens 41W-e in the substrate state.

Subsequently, as illustrated in C of FIG. 32, a substrate with lens 41W-c in a substrate state which is located at a third lowest layer in the laminated lens structure 11 is bonded onto the substrate with lens 41W-d in the substrate state.

Next, as illustrated in D of FIG. 32, a substrate with lens 41W-b in a substrate state which is located at a fourth lowest layer in the laminated lens structure 11 is bonded onto the substrate with lens 41W-c in the substrate state.

Subsequently, as illustrated in E of FIG. 32, a substrate with lens 41W-a in a substrate state which is located at a fifth lowest layer in the laminated lens structure 11 is bonded onto the substrate with lens 41W-b in the substrate state.

Finally, as illustrated in F of FIG. 32, a diaphragm plate 51W located on top of the substrate with lens 41a in the laminated lens structure 11 is bonded onto the substrate with lens 41W-a in the substrate state.

In this way, the five substrates with lens 41W-a to 41W-e in the substrate state are sequentially laminated one after another from the substrate with lens 41W at the lower layer in the laminated lens structure 11 to the substrate with lens 41W at the upper layer, whereby a laminated lens structure 11W in the substrate state is obtained.

Figure 33:
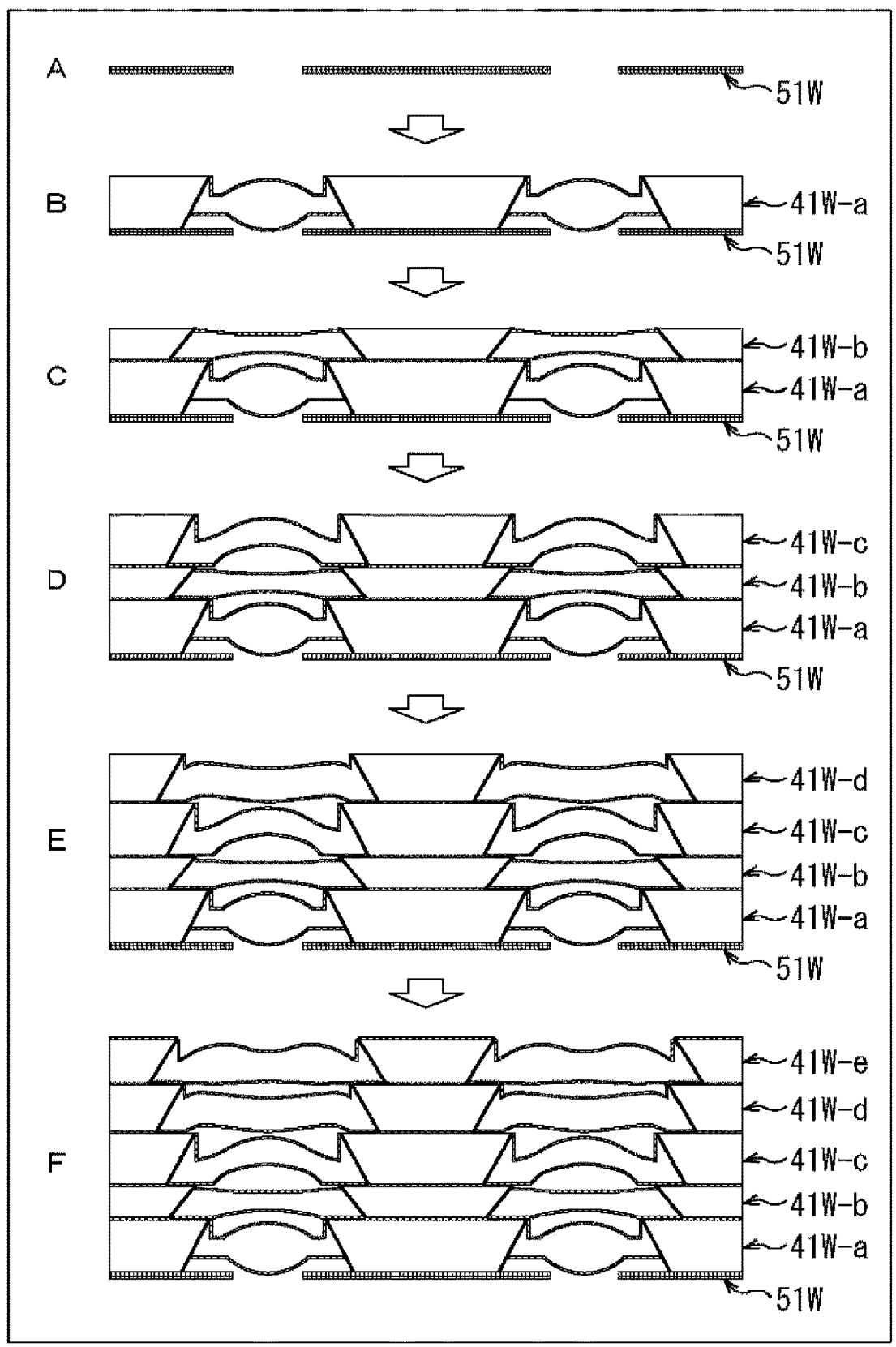
FIG. 33 illustrates figures for explaining a second lamination method for laminating five substrates with lens in a substrate state.

FIG. 33 illustrates a second lamination method for laminating five substrates with lens 41a to 41e, corresponding to the laminated lens structure 11 of FIG. 13, in a substrate state by use of the method of bonding the substrates with lens 41W in a substrate state which has been described referring to FIG. 31.

First, as illustrated in A of FIG. 33, a diaphragm plate 51W located on top of a substrate with lens 41a in the laminated lens structure 11 is prepared.

Next, as illustrated in B of FIG. 33, a substrate with lens 41W-a in a substrate state which is located at the uppermost layer in the laminated lens structure 11 is bonded onto the diaphragm plate 51W, after being reversed upside down.

Subsequently, as illustrated in C of FIG. 33, a substrate with lens 41W-b in a substrate state which is located at a second highest layer in the laminated lens structure 11 is bonded onto the substrate with lens 41W-a in the substrate state, after being reversed upside down.

Next, as illustrated in D of FIG. 33, a substrate with lens 41W-c in a substrate state which is located at a third highest layer in the laminated lens structure 11 is bonded onto the substrate with lens 41W-b in the substrate state, after being reversed upside down.

Subsequently, as illustrated in E of FIG. 33, a substrate with lens 41W-d in a substrate state which is located at a fourth highest layer in the laminated lens structure 11 is bonded onto the substrate with lens 41W-c in the substrate state, after being reversed upside down.

Finally, as illustrated in F of FIG. 33, a substrate with lens 41W-e in a substrate state which is located at a fifth highest layer in the laminated lens structure 11 is bonded onto the substrate with lens 41W-d in the substrate state, after being reversed upside down.

In this way, the five substrates with lens 41W-a to 41W-e in the substrate state are sequentially laminated one after another from the substrate with lens 41W at the upper layer in the laminated lens structure 11 to the substrate with lens 41W at the lower layer, whereby a laminated lens structure 11W in the substrate state is obtained.

The five substrates with lens 41W-a to 41W-e in the substrate state which are laminated by the lamination method described referring to FIG. 32 or FIG. 33 is individualized on a module basis or chip basis by use of a blade or laser or the like, to be laminated lens structures 11 in which the five substrates with lens 41a to 41e are laminated.

12. Eighth and Ninth Embodiments of Camera Module

Figure 34:
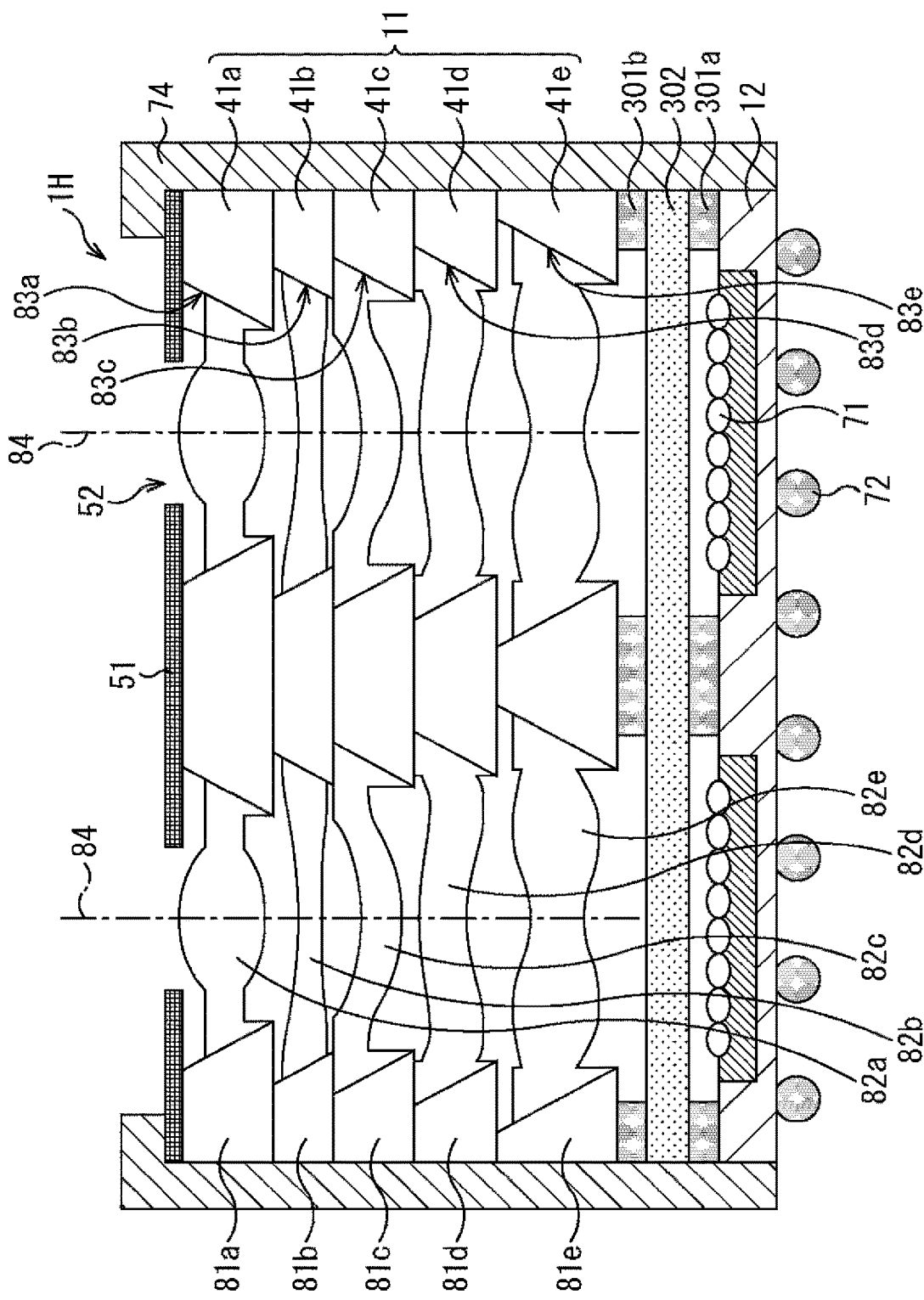
FIG. 34 is a figure illustrating an eight embodiment of a camera module using a laminated lens structure to which the present technology is applied.

FIG. 34 is a figure illustrating an eighth embodiment of a camera module using a laminated lens structure to which the present technology is applied.

Figure 35:
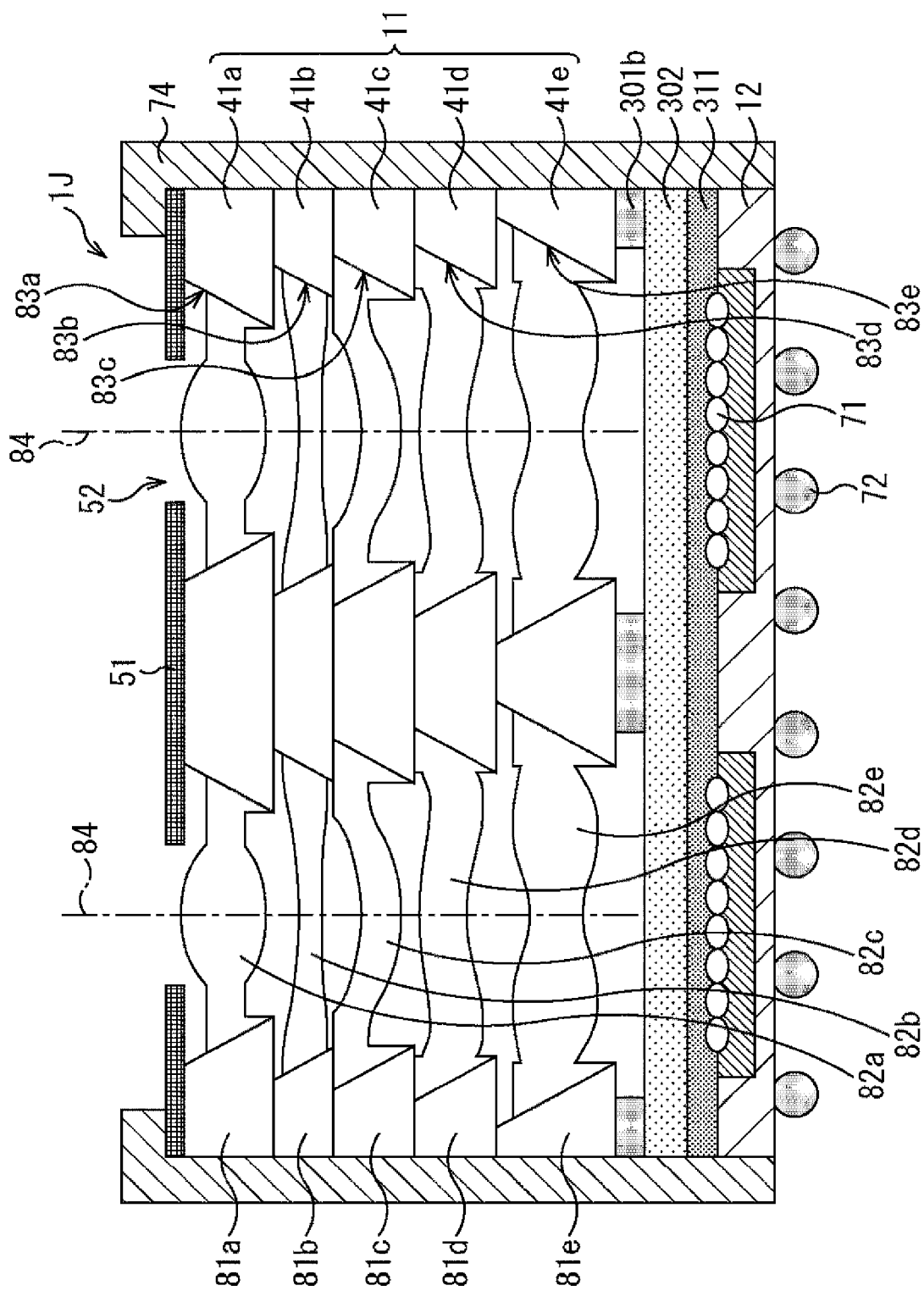
FIG. 35 is a figure illustrating a ninth embodiment of a camera module using a laminated lens structure to which the present technology is applied.

FIG. 35 is a figure illustrating a ninth embodiment of a camera module using a laminated lens structure to which the present technology is applied.

In descriptions of FIGS. 34 and 35, only the parts differing from the camera module E illustrated in FIG. 13 will be described.

In a camera module 1H of FIG. 34 and a camera module 1J of FIG. 35, the part of the structural member 73 in the camera module E illustrated in FIG. 13 is replaced with a different structure.

In the camera module 1H of FIG. 34, the part of the structural member 73 in the camera module 1J is replaced with structural members 301a and 301b and a light-transmitting substrate 302.

Specifically, the structural member 301a is disposed at part on the upper side of a light-receiving element 12. Through the structural member 301a, are fixed the light-receiving element 12 and the light-transmitting substrate 302. The structural member 301a is, for example, an epoxy resin.

The structural member 301b is disposed on the upper side of the light-transmitting substrate 302. Through the structural member 301b, are fixed the light-transmitting substrate 302 and the laminated lens structure 11. The structural member 301b is, for example, an epoxy resin.

On the other hand, in the camera module 1J of FIG. 35, the part of the structural member 301a in the camera module 1H of FIG. 34 is replaced with a resin layer 311 which has a light-transmitting property.

The resin layer 311 is disposed over the whole upper-side surface of the light-receiving element 12. Through the resin layer 311, are fixed the light-receiving element 12 and the light-transmitting substrate 302. The resin layer 311 disposed over the whole upper-side surface of the light-receiving element 12 offers an action or effect of preventing a stress, which may be exerted on the light-transmitting substrate 302 from above the light-transmitting substrate 302, from being concentratedly applied to a partial region of the light-receiving element 12, and thereby causing the stress to be received while being dispersed over the whole surface of the light-receiving element 12.

A structural member 301b is disposed on the upper side of the light-transmitting substrate 302. Through the structural member 301b, are fixed the light-transmitting substrate 302 and the laminated lens structure 11.

The camera module 1H of FIG. 34 and the camera module 1J of FIG. 35 have the light-transmitting substrate 302 on the upper side of the light-receiving element 12. The light-transmitting substrate 302 has an action or effect of, for example, restraining the light-receiving element 12 from being damaged during the manufacture of the camera module 1H or 1J.

13. Tenth Embodiment of Camera Module

Figure 36:
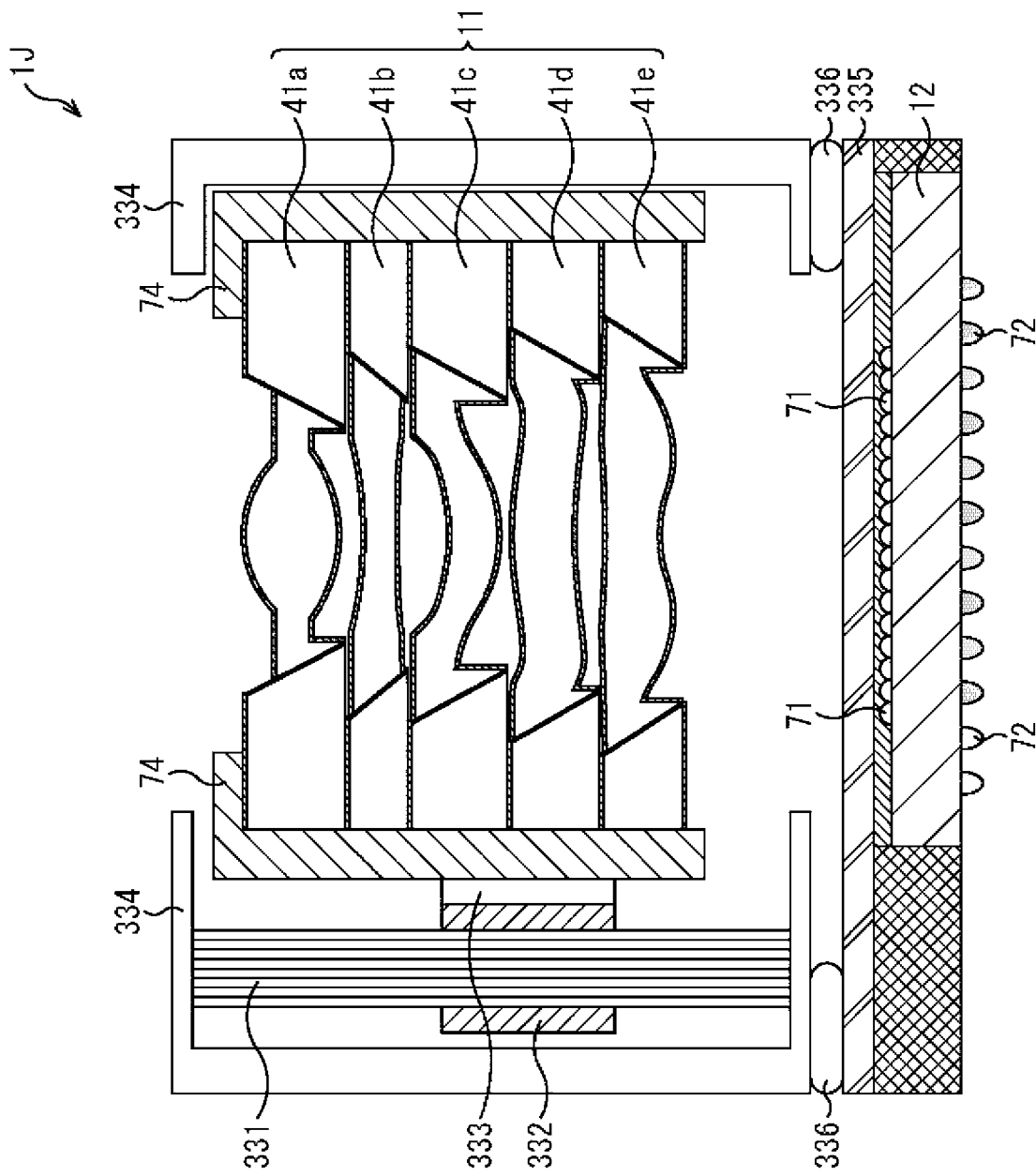
FIG. 36 is a figure illustrating a tenth embodiment of a camera module using a laminated lens structure to which the present technology is applied.

FIG. 36 is a figure illustrating a tenth embodiment of a camera module using a laminated lens structure to which the present technology is applied.

In the camera module 1J illustrated in FIG. 36, a laminated lens structure 11 is accommodated in a lens barrel 74. The lens barrel 74 is fixed by a moving member 332 moved along a shaft 331, and a fixing member 333. The lens barrel 74 is moved in an axial direction of the shaft 331 by a driving motor which is not illustrated, whereby the distance from the laminated lens structure 11 to an imaging surface a light-receiving element 12 is controlled.

The lens barrel 74, the shaft 331, the moving member 332, and the fixing member 333 are accommodated in a housing 334. A protective substrate 335 is disposed on top of the light-receiving element 12, and the protective substrate 335 and the housing 334 are connected by an adhesive 336.

The mechanism for moving the laminated lens structure 11 offers an action or effect of enabling an auto focusing operation to be performed when a camera using the camera module 1J picks up an image.

14. Eleventh Embodiment of Camera Module

Figure 37:
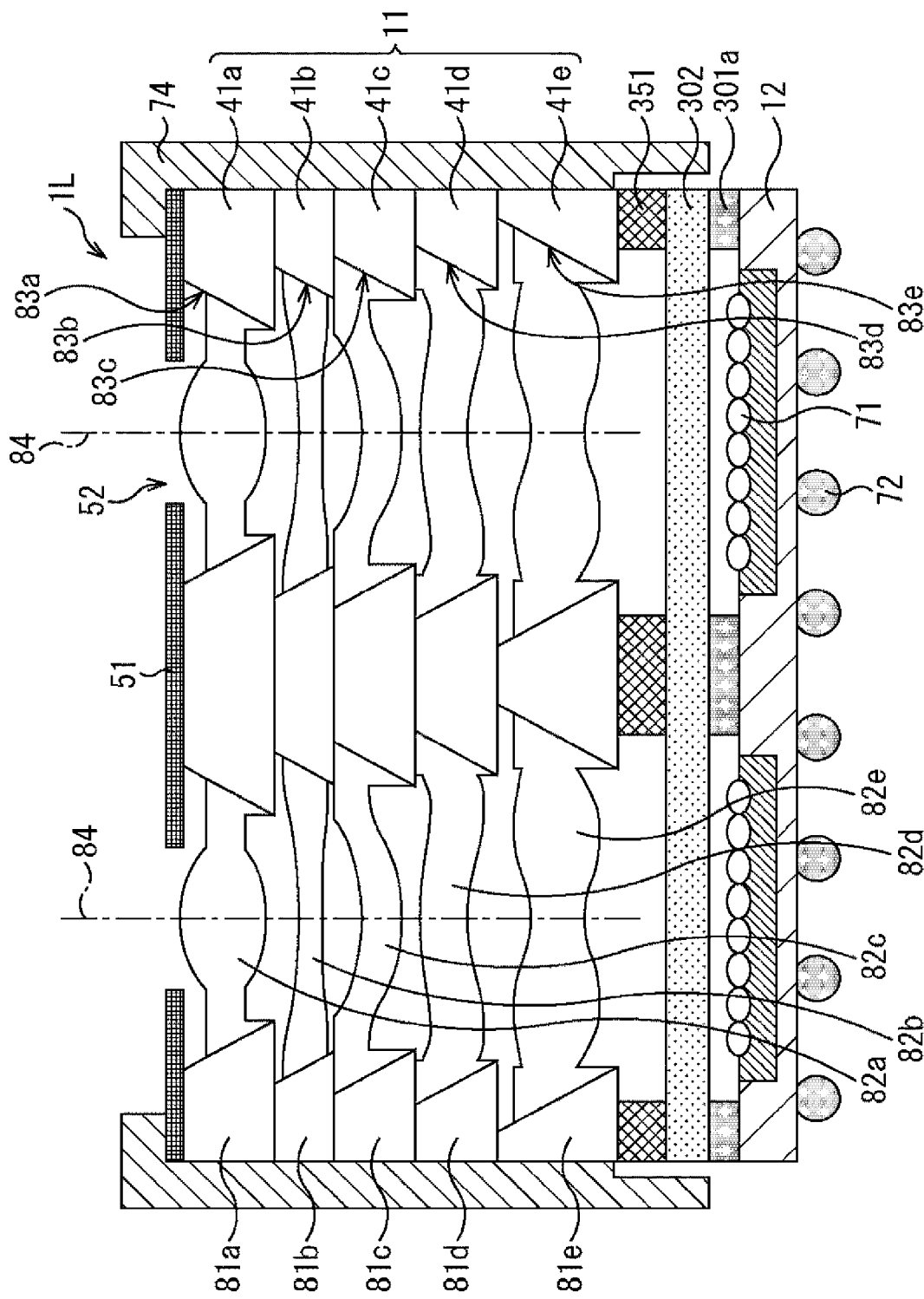
FIG. 37 is a figure illustrating an eleventh embodiment of a camera module using a laminated lens structure to which the present technology is applied.

FIG. 37 is a figure illustrating an eleventh embodiment of a camera module using a laminated lens structure to which the present technology is applied.

A camera module 1L of FIG. 37 is a camera module in which a focus adjustment mechanism by a piezoelectric element is added.

Specifically, in the camera module 1L, like in the camera module 1H of FIG. 34, a structural member 301a is disposed at part on the upper side of a light-receiving element 12. Through the structural member 301a, are fixed the light-receiving element 12 and a light-transmitting substrate 302. The structural member 301a is, for example, an epoxy resin.

A piezoelectric element 351 is disposed on the upper side of the light-transmitting substrate 302. Through the piezoelectric element 351, are fixed the light-transmitting substrate 302 and a laminated lens structure 11.

In the camera module 1L, the laminated lens structure 11 can be moved in the vertical direction by applying, and interrupting application of, a voltage to the piezoelectric element 351 disposed on the lower side of the laminated lens structure 11. The means for moving the laminated lens structure 11 is not limited to the piezoelectric element 351, and there can be used other device that is varied in shape by application of, and interruption of application of, a voltage thereto. For example, an MEMS device can be used.

The mechanism for moving the laminated lens structure 11 offers an action or effect of enabling an auto focusing operation to be performed when a camera using the camera module 1L picks up an image.

15. Effect of Present Structure in Comparison with Other Structures

The laminated lens structure 11 is a structure in which the substrates with lens 41 are firmly attached to one another by direct bonding (hereinafter referred to the present structure). The action and effect of the present structure will be described by way of comparison with other structures of substrates with lens which are formed with lenses.

Comparative Structure Example 1

Figure 38:
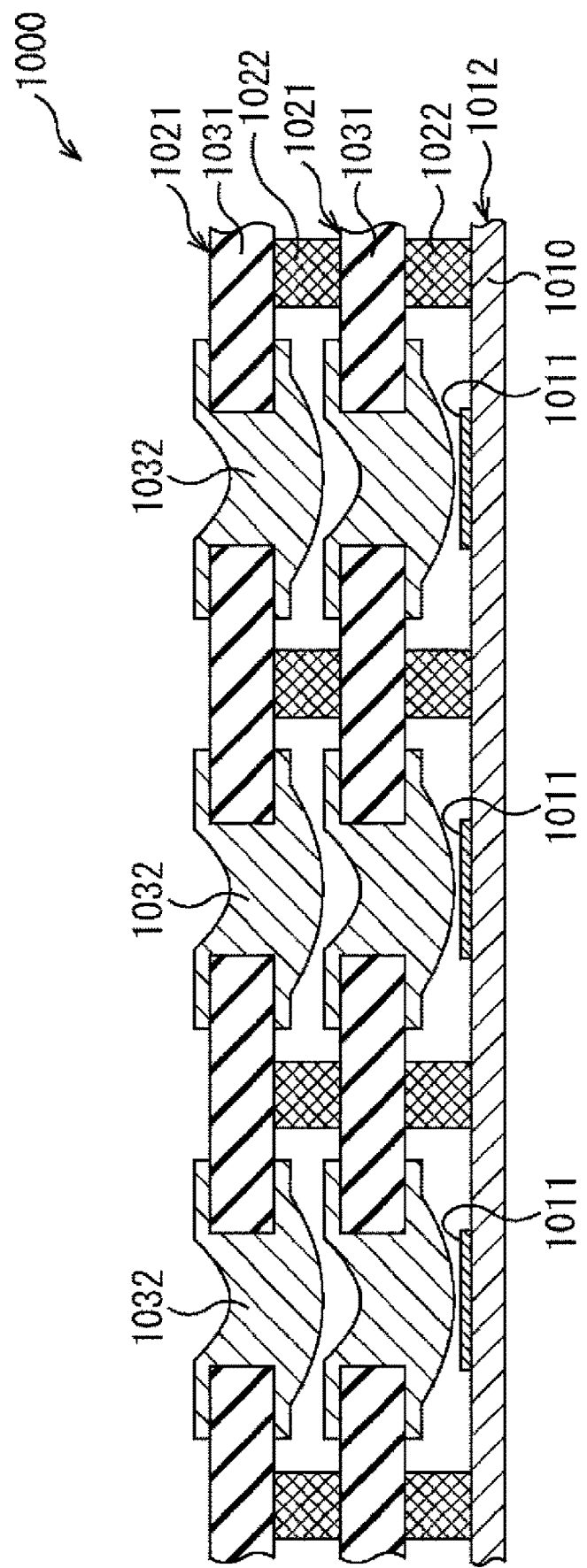
FIG. 38 is a sectional view of a wafer level laminated structure as Comparative Structure Example 1.

FIG. 38 is a sectional view of a wafer level laminated structure which is a first substrate structure (hereinafter referred to as Comparative Structure Example 1) for comparison with the present structure, and which is disclosed as FIG. 14(b) in JP 2011-138089A (hereinafter referred to as Comparative Literature 1).

A wafer level laminated structure 1000 illustrated in FIG. 38 has a structure in which two lens array substrates 1021 are laminated on a sensor array substrate 1012, in which a plurality of image sensors 1011 are arrayed on a wafer substrate 1010, with columnar spacers 1022 therebetween. Each of the lens array substrates 1021 is composed of a substrate with lens 1031, and lenses 1032 formed in the areas of a plurality of through-holes formed in the substrate with lens 1031.

Comparative Structure Example 2

Figure 39:
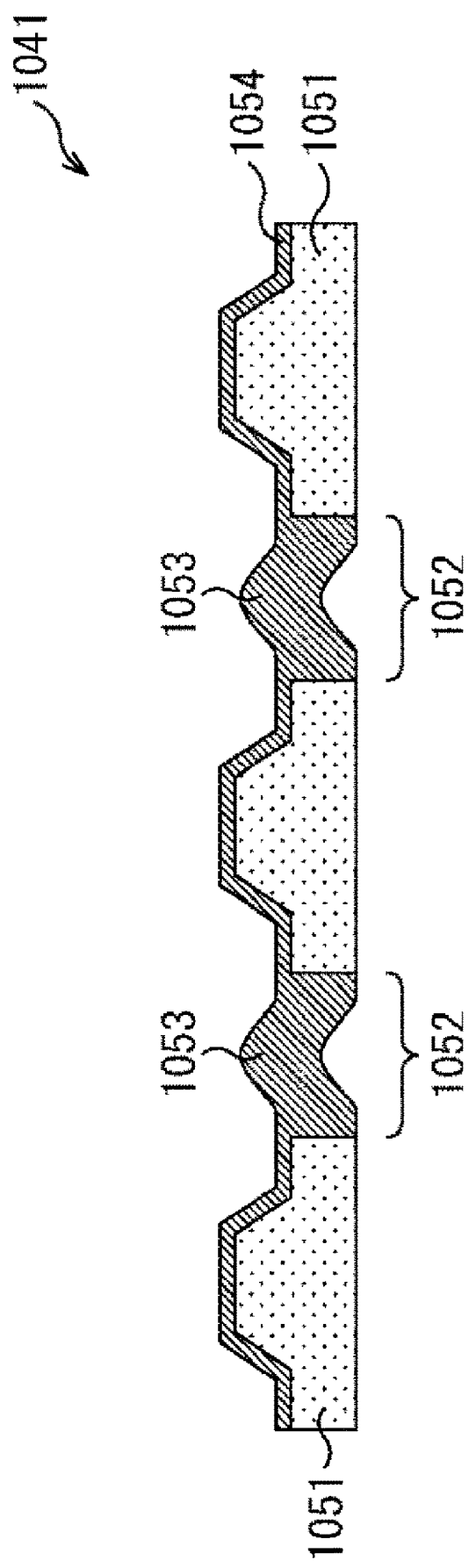
FIG. 39 is a sectional view of a lens array substrate as Comparative Structure Example 2.

FIG. 39 is a sectional view of a lens array substrate which is a second substrate structure (hereinafter referred to as Comparative Structure Example 2) for comparison with the present structure, and which is disclosed as FIG. 5(a) in JP 2009-279790A (hereinafter referred to as Comparative Literature 2).

In a lens array substrate 1041 illustrated in FIG. 39, lenses 1053 are provided respectively in a plurality of through-holes 1052 formed in a plate-shaped substrate 1051. Each of the lenses 1053 is formed of a resin (energy-curing resin) 1054, and the resin 1054 is formed also on an upper surface of the substrate 1051.

Figure 40:
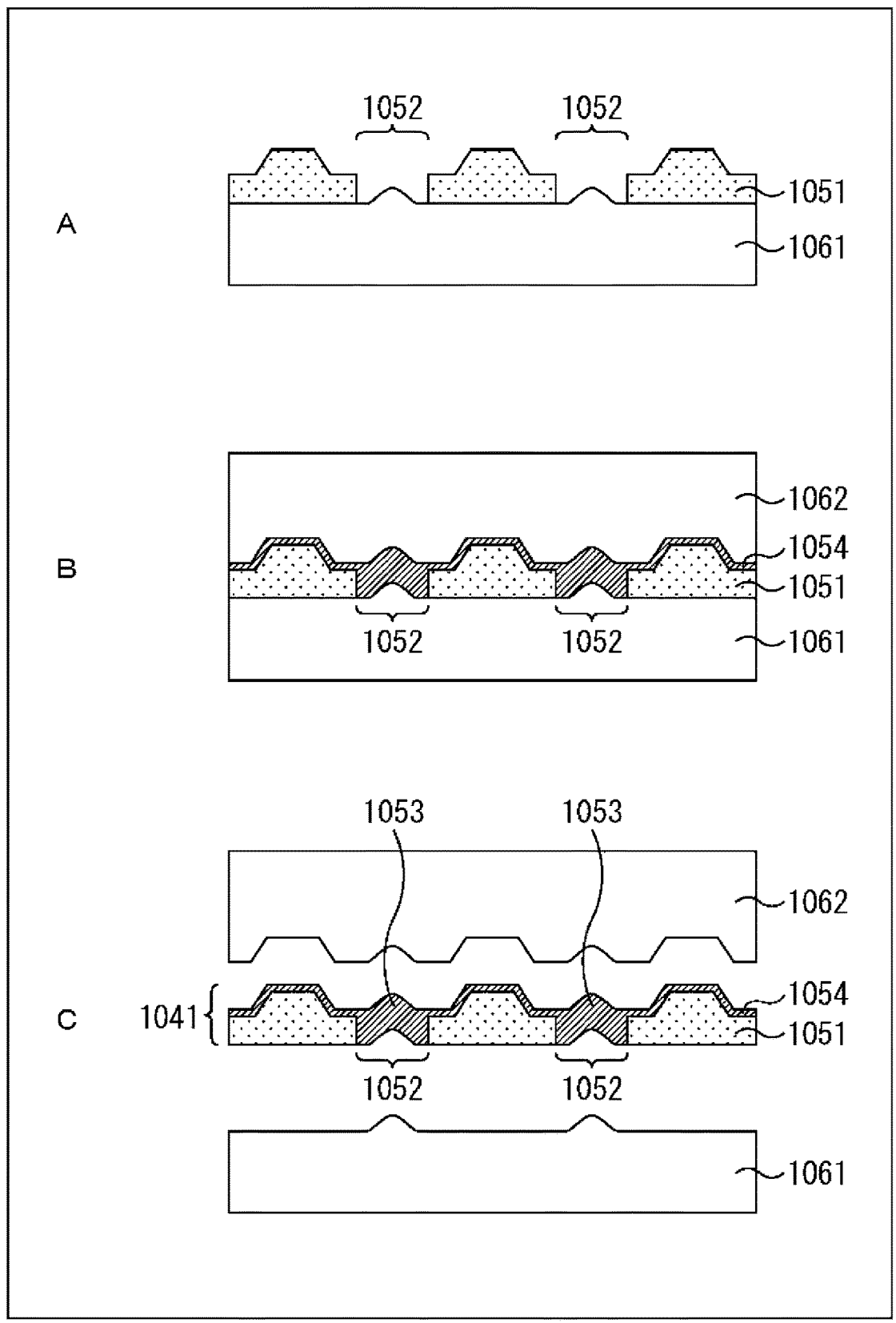
FIG. 40 illustrates figures for explaining a method of manufacturing the lens array substrate of FIG. 39.

Referring to FIG. 40, a method of producing the lens array substrate 1041 of FIG. 39 will be described briefly.

A of FIG. 40 depicts a state in which the substrate 1051 formed with the plurality of through-holes 1052 is placed on a lower mold 1061. The lower mold 1061 is a mold for pressing the resin 1054 upward from below, in the subsequent step.

B of FIG. 40 illustrates a state in which, after application of the resin 1054 to the inside of the plurality of through-holes 1052 and to the upper surface of the substrate 1051, an upper mold 1062 is disposed on the substrate 1051 and pressure molding is being conducted by use of the upper mold 1062 and the lower mold 1061. The upper mold 1062 is a mold for pressing the resin 1054 downward from above. In the state illustrated in B of FIG. 40, curing of the resin 1054 is conducted.

C of FIG. 40 illustrates a state in which, after the curing of the resin 1054, the upper mold 1062 and the lower mold 1061 are released and the lens array substrate 1041 is completed.

The lens array substrate 1041 is characterized in that (1) the resin 1054 formed in the positions of the through-holes 1052 of the substrate 1051 constitutes the lenses 1053, and a plurality of the lenses 1053 are formed in the substrate 1051, and that (2) a thin layer of the resin 1054 is formed over the whole part of the upper-side surface of the substrate 1051 located between the plurality of lenses 1053.

In the case of forming a structure in which a plurality of the lens array substrates 1041 are laminated, the thin layer of the resin 1054 formed over the whole part of the upper-side surface of the substrate 1051 offers an action or effect as an adhesive for adhesion between the substrates.

In the case of forming the structure in which the plurality of the lens array substrates 1041 are laminated, it is possible to enlarge the area of adhesion between the substrates and to adhere the substrates with a stronger force, as compared to the wafer level laminated structure 1000 of FIG. 38 illustrated as Comparative Structure Example 1.

Action Offered by Resin in Comparative Structure Example 2

In Comparative Literature 2 in which the lens array substrate 1041 of FIG. 39 as Comparative Structure Example 2 is disclosed, the following is disclosed as an effect of the resin 1054 to be the lenses 1053.

In Comparative Structure Example 2, an energy-curing resin is used as the resin 1054. As an example of the energy-curing resin, a photo-curing resin is used. In the case where a photo-curing resin is used as the energy-curing resin, when the resin 1054 is irradiated with UV light, the resin 1054 is cured. The curing causes shrinkage on curing in the resin 1054.

According to the structure of the lens array substrate 1041 of FIG. 39, however, even if shrinkage on curing of the resin 1054 occurs, the interposition of the substrate 1051 between the plurality of lenses 1053 can break off the variations in the distances between the lenses 1053 due to the shrinkage on curing of the resin 1054; it is described that, for this reason, the lens array substrate 1041 in which the plurality of lenses 1053 are disposed can be restrained from warping.

Comparative Structure Example 3

Figure 41:
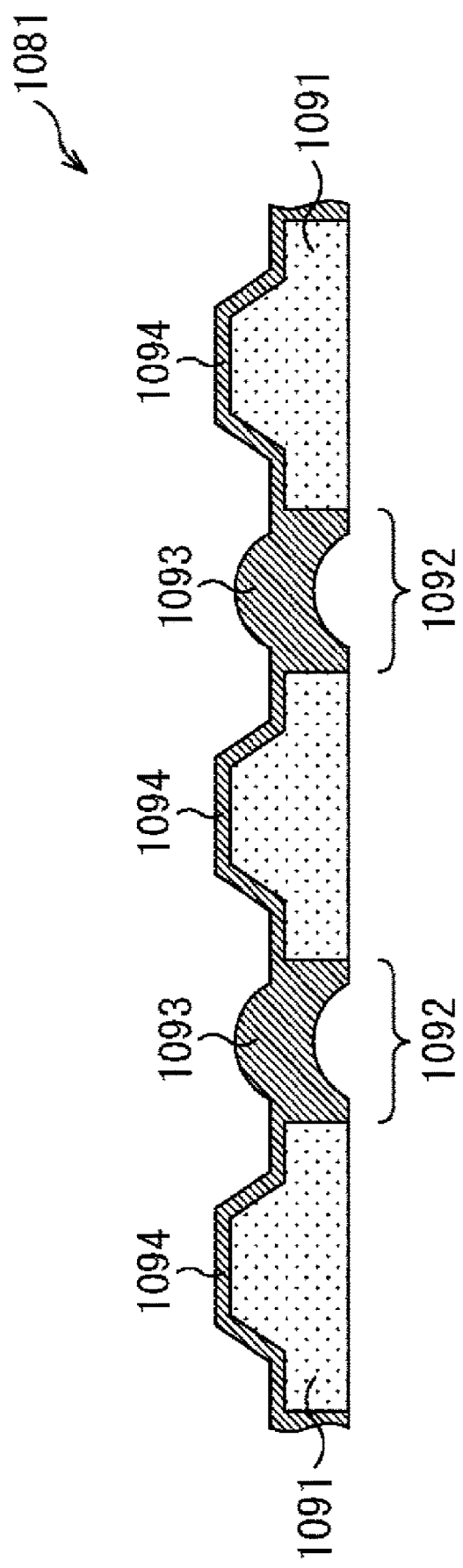
FIG. 41 is a sectional view of a lens array substrate as Comparative Structure Example 3.

FIG. 41 is a sectional view of a lens array substrate which is a third substrate structure (hereinafter referred to as Comparative Structure Example 3) for comparison with the present structure, and which is disclosed as FIG. 1 in JP 2010-256563A (hereinafter referred to as Comparative Literature 3).

In a lens array substrate 1081 illustrated in FIG. 41, lenses 1093 are provided respectively in a plurality of through-holes 1092 provided in a plate-shaped substrate 1091. Each of the lenses 1093 is formed of a resin (energy-curing resin) 1094, and the resin 1094 is formed also on an upper surface of the substrate 1091 where through-holes 1092 are not provided.

Figure 42:
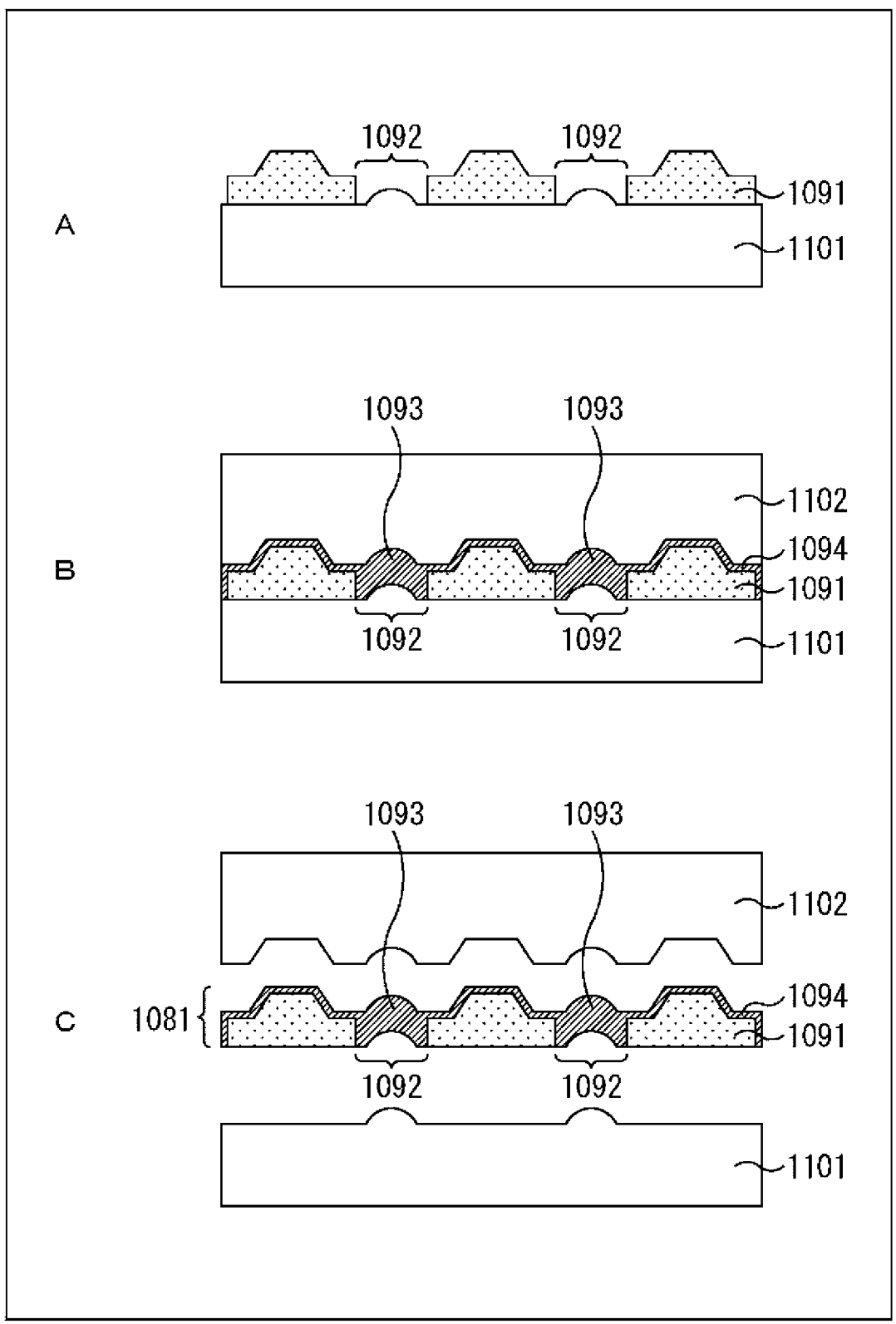
FIG. 42 illustrates figures for explaining a method of manufacturing the lens array substrate of FIG. 41.

Referring to FIG. 42, a method of producing the lens array substrate 1081 of FIG. 41 will be described briefly.

A of FIG. 42 depicts a state in which the substrate 1091 formed with the plurality of through-holes 1092 is placed on a lower mold 1101. The lower mold 1101 is a mold for pressing the resin 1094 upward from below in the subsequent step.

B of FIG. 42 illustrates a state in which, after application of the resin 1094 to the inside of the plurality of through-holes 1092 and to the upper surface of the substrate 1091, an upper mold 1102 is disposed on the substrate 1091, and pressure molding is conducted by use of the upper mold 1102 and the lower mold 1101. The upper mold 1102 is a mold for pressing the resin 1094 downward from above. In the state illustrated in B of FIG. 42, curing of the resin 1094 is conducted.

C of FIG. 42 illustrates a state in which, after the curing of the resin 1094, the upper mold 1102 and the lower mold 1101 are released and the lens array substrate 1081 is completed.

The lens array substrate 1081 is characterized in that (1) the resin 1094 formed in the positions of the through-holes 1092 of the substrate 1091 constitutes the lenses 1093, and a plurality of the lenses 1093 are formed in the substrate 1091, and that (2) a thin layer of the resin 1094 is formed on the whole part of an upper-side surface of the substrate 1091 between the plurality of lenses 1093.

Action Offered by Resin in Comparative Structure Example 3

In Comparative Literature 3 in which the lens array substrate 1081 of FIG. 41 as Comparative Structure Example 3 is disclosed, the following is disclosed as an action of the resin 1094 to be the lenses 1093.

In Comparative Structure Example 3, an energy-curing resin is used as the resin 1094. As an example of the energy-curing resin, a photo-curing resin is used. In the case where a photo-curing resin is used as the energy-curing resin, when the resin 1094 is irradiated with UV light, the resin 1094 is cured. The curing causes shrinkage on curing in the resin 1094.

According to the structure of the lens array substrate 1081 of FIG. 41, however, even if shrinkage on curing of the resin 1094 occurs, the interposition of the substrate 1091 between the plurality of lenses 1093 can break off the variations in the distances between the lenses 1093 due to the shrinkage on curing of the resin 1094; it is described that, for this reason, the lens array substrate 1081 in which the plurality of lenses 1093 are disposed can be restrained from warping.

In this way, in Comparative Literature 2 and 3 it is disclosed that shrinkage on curing occurs when the photo-curing resin is cured. Note that it is disclosed not only in Comparative Literature 2 and 3 but also in, for example, JP 2013-1091A and the like, that shrinkage on curing occurs when a photo-curing resin is cured.

In addition, the problem that shrinkage on curing of a resin occurs when the resin is molded into the shape of lenses and the molded resin is cured is not limited to the case of a photo-curing resin. For example, in the case of a thermosetting resin as a kind of an energy-curing resin, also, the problem that shrinkage on curing occurs at the time of curing is encountered, like in the case of the photo-curing resin. This is disclosed also in, for example, Comparative Literature 1 and 3 and JP 2010-204631A and the like.

Comparative Structure Example 4

Figure 43:
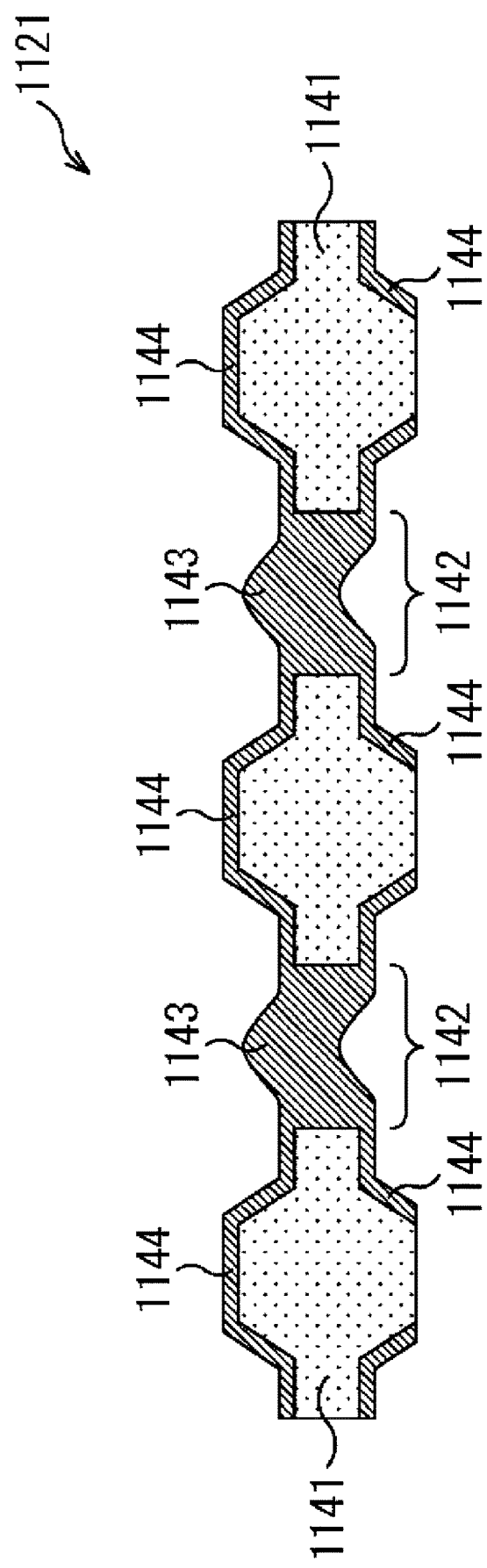
FIG. 43 is a sectional view of a lens array substrate as Comparative Structure Example 4.

FIG. 43 is a sectional view of a lens array substrate which is a fourth substrate structure (hereinafter referred to as Comparative Structure Example 4) for comparison with the present structure, and which is disclosed as FIG. 6 in Comparative Literature 2 mentioned above.

A lens array substrate 1121 of FIG. 43 differs from the lens array substrate 1041 illustrated in FIG. 39 in that a substrate 1141 is shaped to project not only to the upper side but also to the lower side, in other areas than through-holes 1042, and that a resin 1144 is formed also on part of a lower-side surface of the substrate 1141. In other points of configuration, the lens array substrate 1121 is the same as the lens array substrate 1041 illustrated in FIG. 39.

Figure 44:
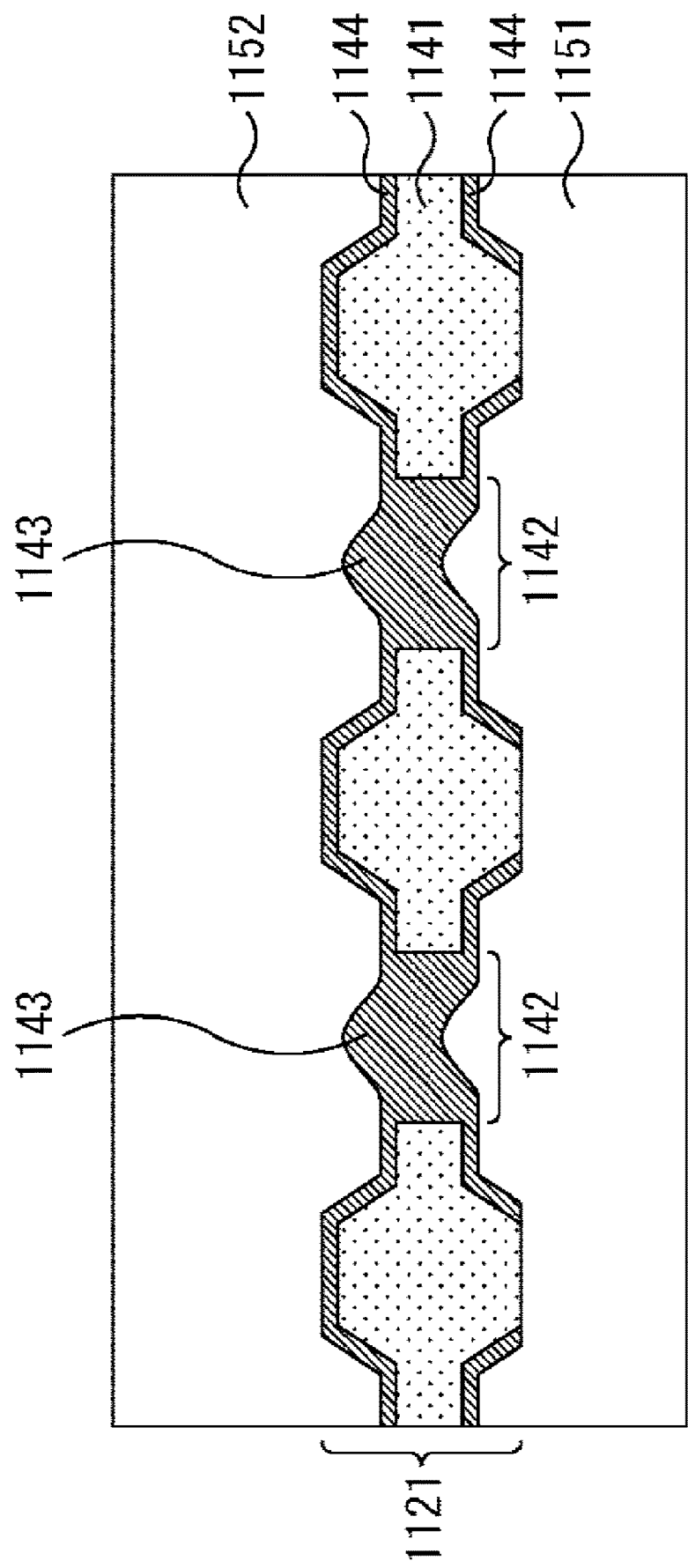
FIG. 44 is a figure for explaining a method of producing the lens array substrate of FIG. 43.

FIG. 44 is a figure for explaining a method of producing the lens array substrate 1121 of FIG. 43, and is a figure corresponding to B of FIG. 40.

FIG. 44 depicts a state in which after application of the resin 1144 to the inside of the plurality of through-holes 1142 and to an upper surface of the substrate 1141, pressure molding is being conducted by use of an upper mold 1152 and a lower mold 1151. The resin 1144 is poured into spaces between a lower surface of the substrate 1141 and the lower mold 1151. In the state illustrated in FIG. 44, curing of the resin 1144 is conducted.

The lens array substrate 1121 is characterized in that (1) the resin 1144 formed in the positions of the through-holes 1142 of the substrate 1141 constitutes lenses 1143, and a plurality of the lenses 1143 are formed in the substrate 1141, and that (2) not only a thin layer of the resin 1144 is formed over the whole part of an upper-side surface of the substrate 1141 located between the plurality of lenses 1143 but also a thin layer of the resin 1144 is formed on part of a lower-side surface of the substrate 1141.

Action Offered by Resin in Comparative Structure Example 4

In Comparative Literature 2 in which the lens array substrate 1121 of FIG. 43 as Comparative Structure Example 4 is disclosed, the following is disclosed as an action of the resin 1144 to be the lenses 1143.

In the lens array substrate 1121 of FIG. 43 as Comparative Structure Example 4, also, a photo-curing resin as an example of an energy-curing resin is used as the resin 1144. When the resin 1144 is irradiated with UV light, the resin 1144 is cured. The curing causes shrinkage on curing in the resin 1144, like in Comparative Structure Examples 2 and 3.

In the lens array substrate 1121 of Comparative Structure Example 4, however, the thin layer of the resin 1144 is formed not only over the whole part of the upper-side surface of the substrate 1141 located between the plurality of lenses 1143 but also in predetermined regions on the lower-side surface of the substrate 1141.

The structure in which the resin 1144 is formed on both the upper-side surface and the lower-side surface of the substrate 1141 makes it possible to cancel the warping direction in regard of the lens array substrate 1121 as a whole.

On the other hand, in the lens array substrate 1041 illustrated in FIG. 39 as Comparative Structure Example 2, although the thin layer of the resin 1054 is formed over the whole part of the upper-side surface of the substrate 1051 located between the plurality of lenses 1053, a thin layer of the resin 1054 is not formed at all on the lower-side surface of the substrate 1051.

For this reason, in the lens array substrate 1121 of FIG. 43, it is possible to provide a lens array substrate reduced in warping amount, as compared to the lens array substrate 1041 of FIG. 39.

Comparative Structure Example 5

Figure 45:
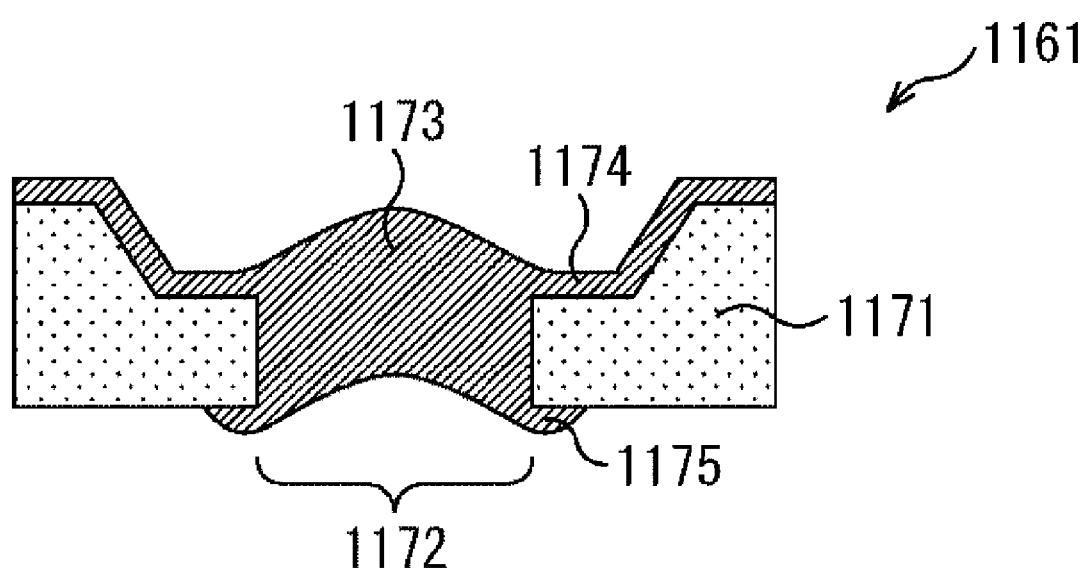
FIG. 45 is a sectional view of a lens array substrate as Comparative Structure Example 5.

FIG. 45 is a sectional view of a lens array substrate which is a fifth substrate structure (hereinafter referred to as Comparative Structure Example 5) for comparison with the present structure, and which is disclosed as FIG. 9 in Comparative Literature 2 mentioned above.

A lens array substrate 1161 of FIG. 45 differs from the lens array substrate 1041 illustrated in FIG. 39 in that a protruding portion 1175 of a resin is provided on a substrate back side in the vicinity of a through-hole 1172 formed in a substrate 1171. In other points of configuration, the lens array substrate 1161 is the same as the lens array substrate 1041 illustrated in FIG. 39.

Note that the lens array substrate 1161 of FIG. 45 is illustrated in a state of having been individualized.

The lens array substrate 1161 is characterized in that (1) the resin 1174 formed in the position of the through-hole 1172 of the substrate 1171 constitutes a lens 1173, and a plurality of the lenses 1173 are formed in the substrate 1171, and that (2) not only a thin layer of the resin 1174 is formed over the whole part of the upper-side surface of the substrate 1171 located between the plurality of lenses 1173 but also a thin layer of the resin 1174 is formed on part of the lower-side surface of the substrate 1171.

Action Offered by Resin in Comparative Structure Example 5

In Comparative Literature 2 in which the lens array substrate 1161 of FIG. 45 as Comparative Structure Example 5 is disclosed, the following is disclosed as an action of the resin 1174 to be the lenses 1173.

In the lens array substrate 1161 of FIG. 45 as Comparative Structure Example 5, a photo-curing resin as an example of an energy-curing resin is sued as the resin 1174. When the resin 1174 is irradiated with UV light, the resin 1174 is cured. The curing causes shrinkage on curing in the resin 1174, like in Comparative Structure Examples 2 and 3.

In the lens array substrate 1171 of Comparative Structure Example 5, however, a thin layer of the resin 1174 is formed not only over the whole part of the upper-side surface of the substrate 1171 located between the plurality of lenses 1173 but also in predetermined regions on the lower-side surface of the substrate 1171 (the protruding portions 1175 of the resin). This makes it possible to cancel the warping direction in regard of the lens array substrate 1171 as a whole and to provide a lens array substrate more reduced in warping amount.

Comparison of Actions Offered by Resin in Comparative Structure Examples 2 to 5

The actions offered by the resin in Comparative Structure Examples 2 to 5 are summarized as follows.

(1) In the case of a structure in which a layer of the resin is disposed over the whole part of the upper surface of the lens array substrate, as in Comparative Structure Example 2 and 3, warping would be generated in the substrate in which the plurality of lenses.

Figure 46:
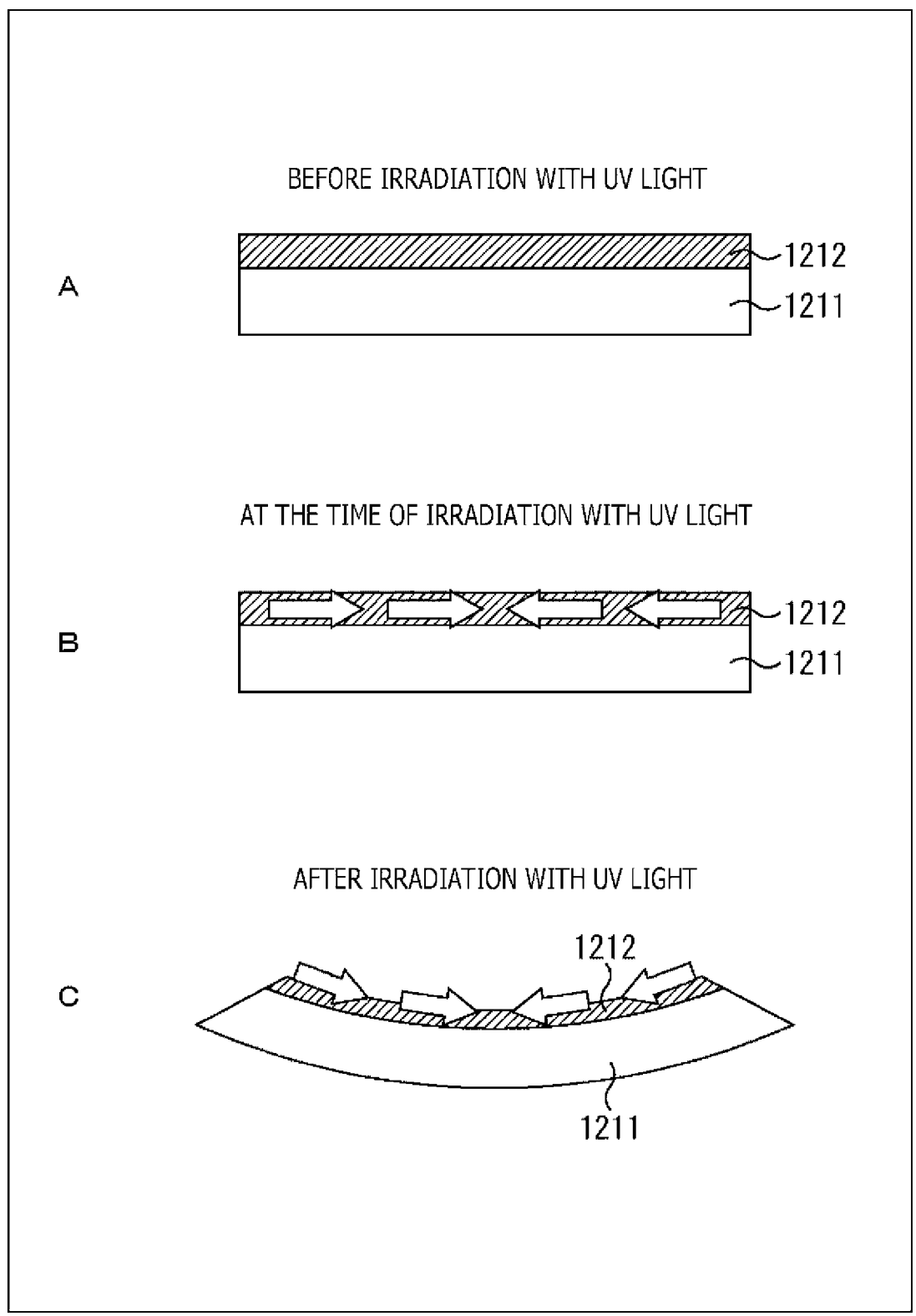
FIG. 46 illustrates figures for explaining an action offered by a resin which becomes a lens.

FIG. 46 illustrates figures which schematically represent the structure in which a layer of the resin is disposed over the whole part of the upper surface of the lens array substrate as in Comparative Structure Examples 2 and 3, for explaining the action offered by the resin to be lenses.

As illustrated in A and B of FIG. 46, in a layer of a photo-curing resin 1212 disposed on the upper surface of a lens array substrate 1211 (lenses and through-holes are omitted in the drawing), shrinkage on curing is generated by irradiation with UV light for curing. As a result, in the layer of the photo-curing resin 1212, forces in shrinking directions are generated arising from the photo-curing resin 1212.

On the other hand, the lens array substrate 1211 itself undergoes neither shrinkage nor expansion even when irradiated with UV light. In other words, in the lens array substrate 1211 itself, no force is generated arising from the substrate. As a result, the lens array substrate 1211 would be warped into a downwardly convex shape, as illustrated in C of FIG. 46.

(2) However, in the case of the structure in which a layer of the resin is disposed on both the upper surface and the lower surface of the lens array substrate, as in Comparative Structure Examples 4 and 5, the warping direction of the lens array substrate is canceled, and, therefore, the warping amount of the lens array substrate can be reduced, as compared to Comparative Structure Examples 2 and 3.

Figure 47:
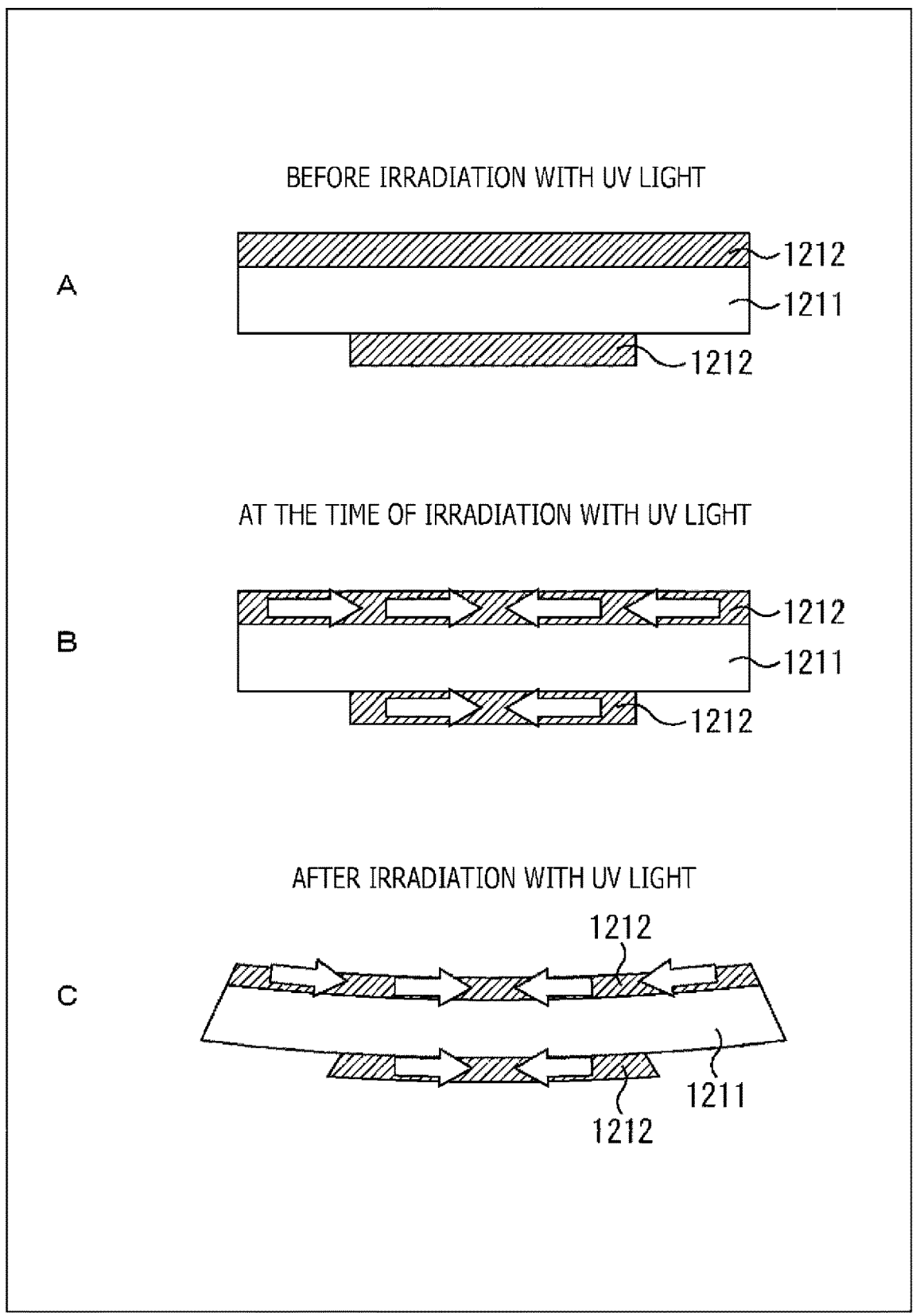
FIG. 47 illustrates figures for explaining an action offered by a resin which becomes a lens.

FIG. 47 illustrates figures which schematically represent the structure in which a layer of the resin is formed on both the upper surface and the lower surface of the lens array substrate as in Comparative Structure Examples 4 and 5, for explaining the action of the resin to be lenses.

As illustrated in A and B of FIG. 47, in a layer of a photo-curing resin 1212 disposed on the upper surface of a lens array substrate 1211, shrinkage on curing is generated by irradiation with UV light for curing. As a result, in the layer of the photo-curing resin 1212 disposed on the upper surface of the lens array substrate 1211, forces in shrinking directions are generated arising from the photo-curing resin 1212. Therefore, on the upper surface side of the lens array substrate 1211, forces for warping the lens array substrate 1211 into a downwardly convex shape are working.

On the other hand, the lens array substrate 1211 itself undergoes neither shrinkage nor expansion even when irradiated with UV light. In other words, in the lens array substrate 1211, no force is generated arising from the substrate.

On the other hand, in a layer of the photo-curing resin 1212 disposed on the lower surface of the lens array substrate 1211, shrinkage on curing is generated by the irradiation with UV light for curing. As a result, in the layer of the photo-curing resin 1212 disposed on the lower surface of the lens array substrate 1211, forces in shrinking directions are generated arising from the photo-curing resin 1212. Therefore, on the lower surface side of the lens array substrate 1211, forces for warping the lens array substrate 1211 into an upwardly convex shape are working.

The forces for warping the lens array substrate 1211 into a downwardly convex shape on the upper surface side of the lens array substrate 1211 and the forces for warping the lens array substrate 1211 into an upwardly convex shape on the lower surface side of the lens array substrate 1211 act to cancel each other.

As a result, as illustrated in C of FIG. 47, the warping amounts of the lens array substrate 1211 in Comparative Structure Examples 4 and 5 are reduced, as compared to the warping amounts in Comparative Structure Examples 2 and 3 illustrated in C of FIG. 46.

In this way, the forces for warping the lens array substrate and the warping amount of the lens array substrate are influenced by the correlation between:

(1) the directions and magnitudes of the forces acting on the lens array substrate at the upper surface of the lens array substrate; and (2) the directions and magnitudes of the forces acting on the lens array substrate at the lower surface of the lens array substrate.

Comparative Structure Example 6

Figure 48:
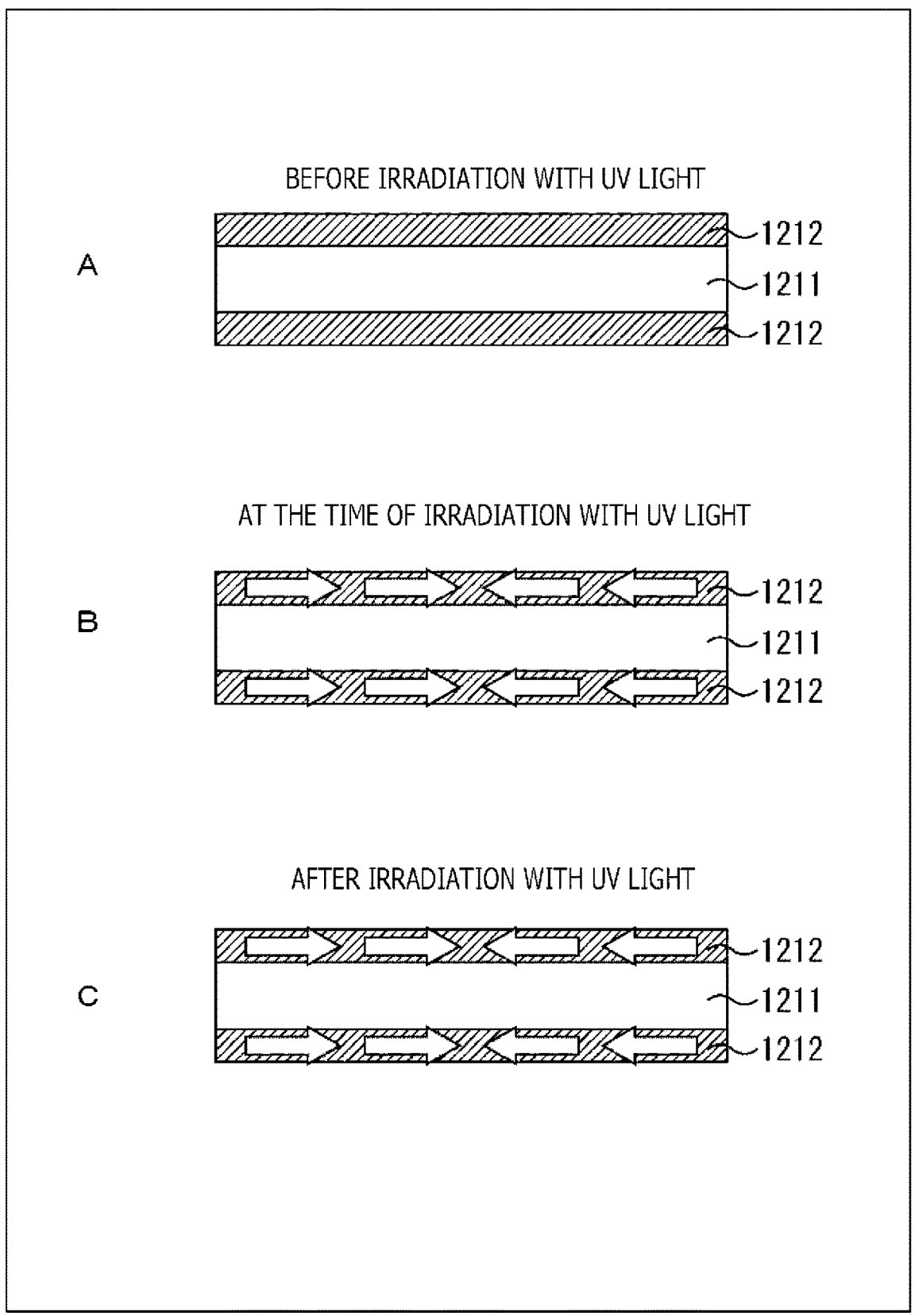
FIG. 48 illustrates figures schematically representing a lens array substrate as Comparative Structure Example 6.

In view of this, for example, a lens array structure may be considered in which as illustrated in A of FIG. 48, the layer and area of a photo-curing resin 1212 disposed on the upper surface of a lens array substrate 1211 and the layer and area of the photo-curing resin 1212 disposed on the lower surface of the lens array substrate 1211 are set to be the same. This lens array substrate structure is called a sixth substrate structure (hereinafter referred to as Comparative Structure Example 6) for comparison with the present structure.

In Comparative Structure Example 6, in the layer of the photo-curing resin 1212 disposed on the upper surface of the lens array substrate 1211, forces in shrinking directions are generated arising from the photo-curing resin 1212. In the lens array substrate 1211 itself, no force is generated arising from the substrate. Therefore, on the upper surface side of the lens array substrate 1211, forces for warping the lens array substrate 1211 into a downwardly convex shape are working.

On the other hand, in the layer of the photo-curing resin 1212 disposed on the lower surface of the lens array substrate 1211, forces in shrinking directions are generate arising from the photo-curing resin 1212. In the lens array substrate 1211 itself, no force is generated arising from the substrate. Therefore, on the lower surface side of the lens array substrate 1211, forces for warping the lens array substrate 1211 into an upwardly convex shape are working.

The above-mentioned two kinds of forces for warping the lens array substrate 1211 act in directions for canceling each other, more conspicuously than in the structure illustrated in A of FIG. 47. As a result, the forces for warping the lens array substrate 1211 and the warping amount of the lens array substrate 1211 are further reduced, as compared to Comparative Structure Examples 4 and 5.

Comparative Structure Example 7

Meanwhile, in practice, the shapes of the substrates with lens that constitute a laminated lens structure to be incorporated in a camera module are not all the same. Specifically, the plurality of substrates with lens that constitute a laminated lens structure may differ in the thickness of the substrate with lens or in the size of through-holes, or may differ in the thickness, shape or volume of lenses formed in the through-holes or the like. Furthermore, the substrates with lens may differ also in, for example, the film thickness of the photo-curing resin formed on the upper surface and lower surface of the substrate with lens.

Figure 49:
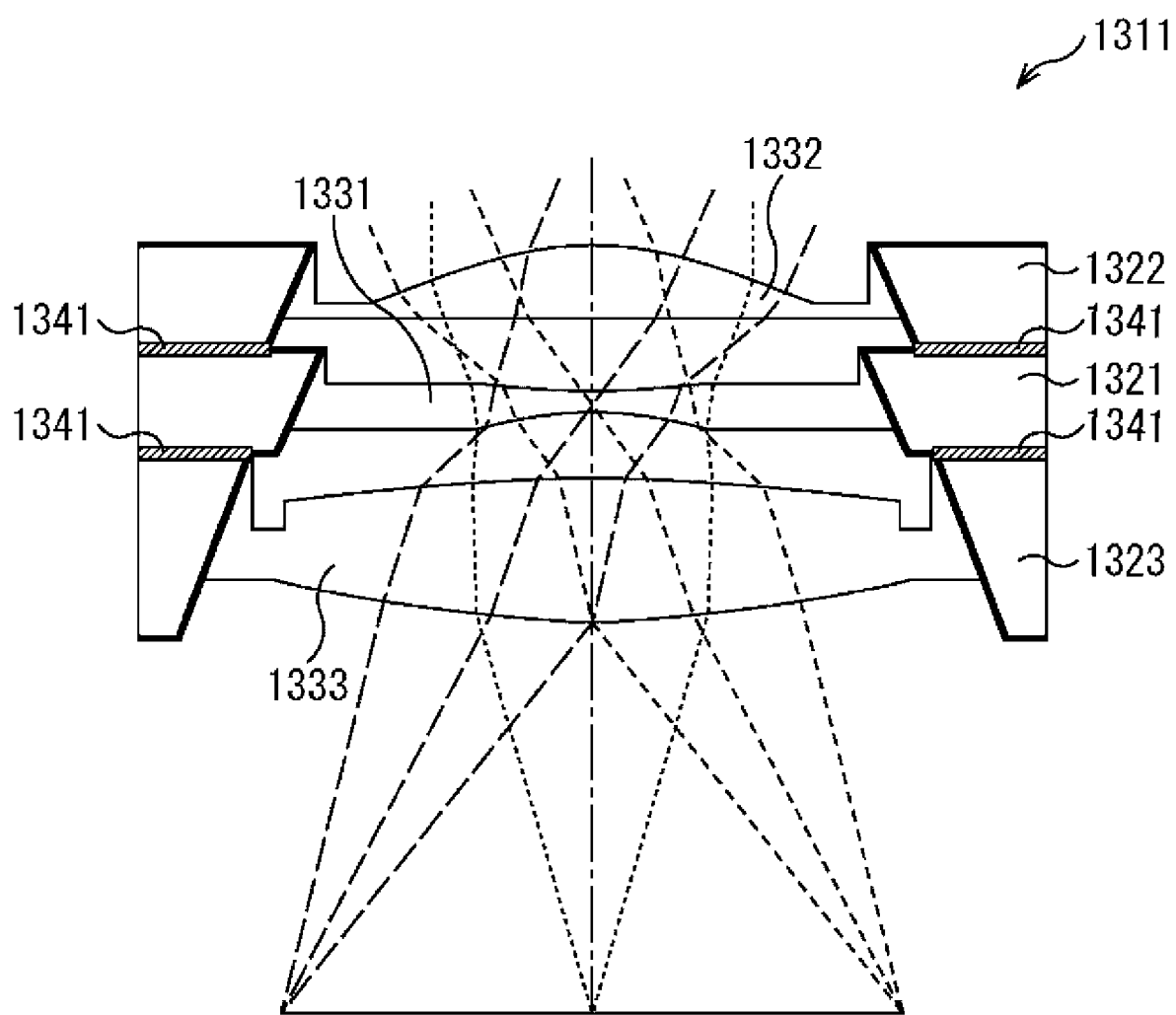
FIG. 49 is a sectional view of a laminated lens structure as Comparative Structure Example 7.

FIG. 49 is a sectional view of a laminated lens structure configured by laminating three substrates with lens, as a seventh substrate structure (hereinafter referred to as Comparative Structure Example 7). In this laminated lens structure, the layer and area of the photo-curing resin disposed on the upper side of each substrate with lens are the same as those on the lower side, like in Comparative Structure Example 6 illustrated in FIG. 48.

The laminated lens structure 1311 illustrated in FIG. 49 is composed of three substrates with lens 1321 to 1323.

Regarding the three substrates with lens 1321 to 1323, the substrate with lens 1321 in the middle will hereinafter be referred to as the first substrate with lens 1321, the substrate with lens 1322 in the uppermost layer will be referred to as the second substrate with lens 1322, and the substrate with lens 1323 in the lowermost layer will be referred to as the third substrate with lens 1323.

The second substrate with lens 1322 disposed in the uppermost layer and the third substrate with lens 1323 disposed in the lowermost layer differ in substrate thickness and in lens thickness.

More specifically, the third substrate with lens 1323 is formed to be greater in lens thickness than the second substrate with lens 1322, and, attendant on this, the third substrate with lens 1323 is formed to be greater than the second substrate with lens 1322 in substrate thickness, too.

At a contact surface between the first substrate with lens 1321 and the second substrate with lens 1322 and at a contact surface between the first substrate with lens 1321 and the third substrate with lens 1323, a resin 1341 is formed over the whole area of the contact surface.

The profiles of through-holes in the three substrates with lens 1321 to 1323 are so-called forwardly broadening shapes in which each through-hole is broader at the substrate lower surface than at the substrate upper surface.

Figure 50:
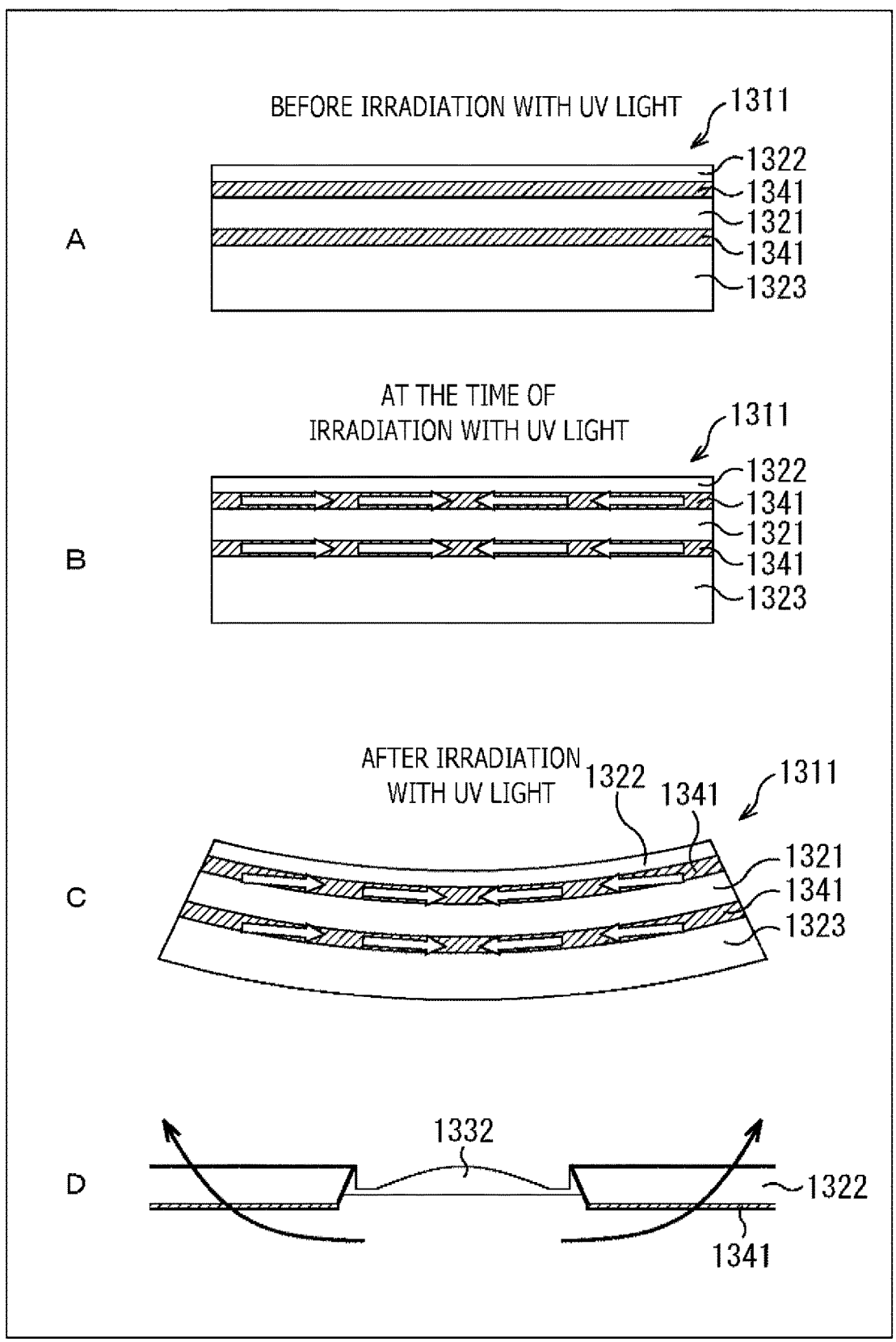
FIG. 50 illustrates figures for explaining an action offered by the laminated lens structure of FIG. 49.

Referring to FIG. 50, an action offered by the three substrates with lens 1321 to 1323 differing in shape will be described.

A to C of FIG. 50 are figures schematically representing the laminated lens structure 1311 illustrated in FIG. 49.

In the case where the second substrate with lens 1322 and the third substrate with lens 1323 which differ in substrate thickness are disposed on the upper surface and the lower surface of the first substrate with lens 1321 as in this laminated lens structure 1311, the forces for warping the laminated lens structure 1311 and the warping amount of the laminated lens structure 1311 vary depending on at what positions in the thickness direction of the laminated lens structure 1311 the layers of the resin 1341 (present over the whole areas of the contact surfaces in the three substrates with lens 1321 to 1323) are present.

If the layers of the resin 1341 present over the whole areas of the contact surfaces in the three substrates with lens 1321 to 1323 are not disposed symmetrically with respect to a center line of the laminated lens structure 1311, namely, a straight line extending in a substrate plane direction while passing through the center in the thickness direction of the laminated lens structure 1311, then the actions of the forces generated by shrinkage on curing of the resin 1341 disposed on the upper surface and the lower surface of the first substrate with lens 1321 could not be perfectly canceled out as illustrated in C of FIG. 48. As a result, the laminated lens structure 1311 would be warped in either direction.

For example, in the case where the two layers of resin 1341 on the upper surface and the lower surface of the first substrate with lens 1321 are disposed to be deviated upward from the center line in regard of the thickness direction of the laminated lens structure 1311, shrinkage on curing of the two layers of resin 1341 would warp the laminated lens structure 1311 into a downwardly convex shape, as illustrated in C of FIG. 50.

Further, in the case where the profile of the through-holes in the thinner one of the second substrate with lens 1322 and the third substrate with lens 1323 is a shape of becoming greater in the direction toward the first substrate with lens 1321, the fear of deficit or breakage of the lens or lenses is increased.

In an example illustrated in FIG. 49, the profile of through-holes in the second substrate with lens 1322, which is the thinner one of the second substrate with lens 1322 and the third substrate with lens 1323, is a forwardly broadening shape of becoming greater in the direction toward the first substrate with lens 1321. In such a shape, when the two layers of resin 1341 on the upper surface and the lower surface of the first substrate with lens 1321 undergoes shrinkage on curing, forces for warping the laminated lens structure 1311 into a downwardly convex shape act on the laminated lens structure 1311 as illustrated in C of FIG. 50. These forces act on the second substrate with lens 1322 as forces in the directions for separating the lens and the substrate from each other, as illustrated in D of FIG. 50. Due to this action, the fear of deficit or breakage of the lens 1332 of the second substrate with lens 1322 is increased.

Now, a case where a resin undergoes thermal expansion will be discussed.

Comparative Structure Example 8

Figure 51:
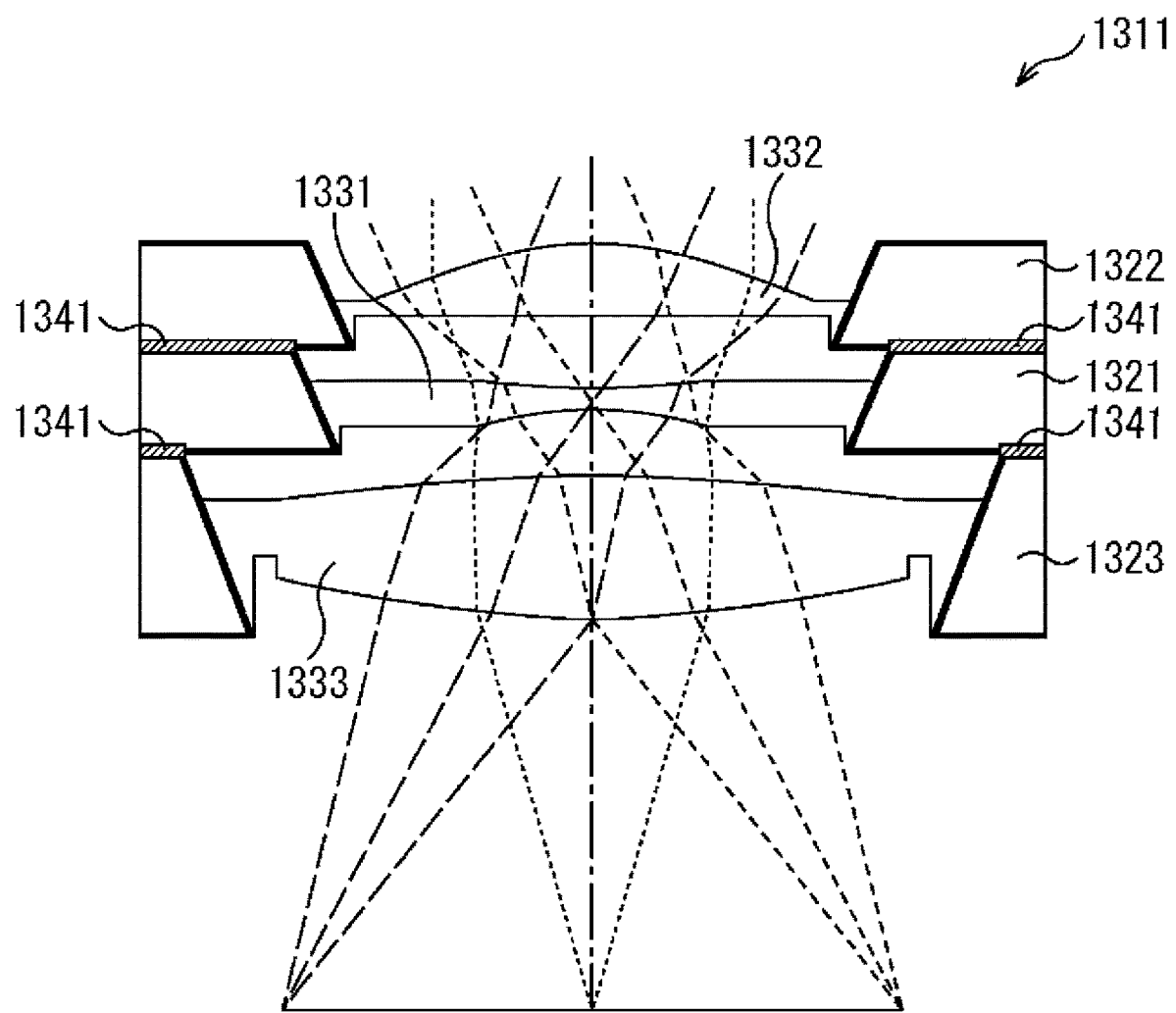
FIG. 51 is a sectional view of a laminated lens structure as Comparative Structure Example 8.

FIG. 51 is a sectional view of a laminated lens structure which is configured by laminating three substrates with lens, as an eighth substrate structure (hereinafter referred to as Comparative Structure Example 8). In this laminated lens structure, like in Comparative Structure Example 6 illustrated in FIG. 48, the layer and area of the photo-curing resin disposed on the upper surface and the lower surface of each of substrates with lens are the same.

Comparative Structure Example 8 of FIG. 51 differs from Comparative Structure Example 7 of FIG. 49 only in that the profile of through-holes in three substrates with lens 1321 to 1323 is a so-called downwardly narrowing shape of being narrower at the substrate lower surface than at the substrate upper surface.

Figure 52:
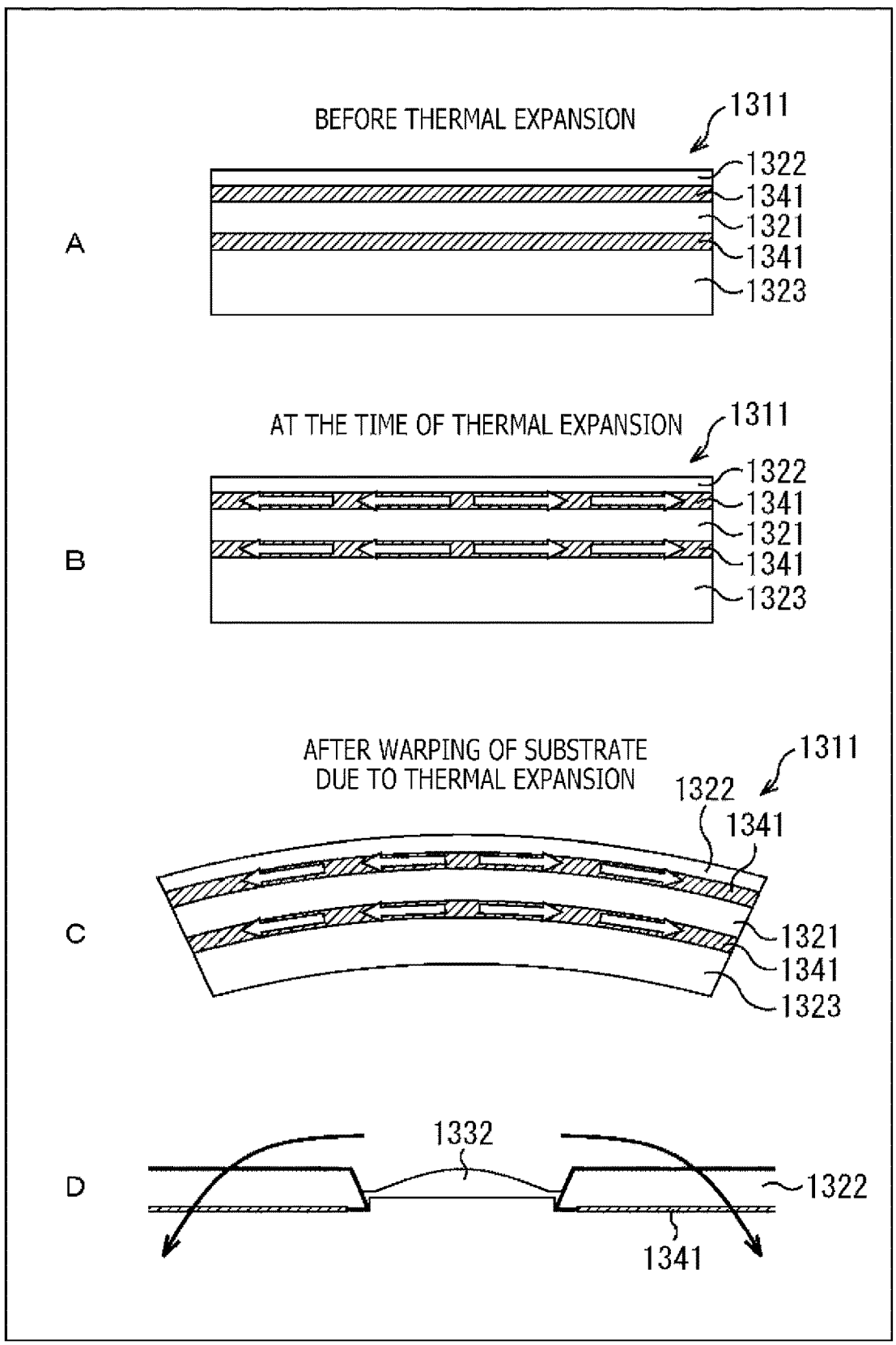
FIG. 52 illustrates figures for explaining an action offered by the laminated lens structure of FIG. 51.

A to C of FIG. 52 are figures schematically representing a laminated lens structure 1311 illustrated in FIG. 51.

When a user practically uses a camera module, an increase in power consumption attendant on an operation causes the temperature inside a housing of the camera to rise, whereby the temperature of the camera module is also raised. Due to the temperature rise, a resin 1341 disposed on the upper surface and the lower surface of the first substrate with lens 1321 in the laminated lens structure 1311 of FIG. 51 undergoes thermal expansion.

Even in the case where the area and thickness of the resin 1341 disposed on the upper surface and the lower surface of the first substrate with lens 1321 are set equal on both sides as in A of FIG. 48, if the layers of the resin 1341 present over the whole areas of the contact surfaces in the three substrates with lens 1321 to 1323 are not disposed symmetrically with respect to the center line of the laminated lens structure 1311, namely, a line extending in a substrate plane direction while passing through a midpoint in regard of the thickness direction of the laminated lens structure 1311, then actions of forces generated due to the thermal expansion of the resin 1341 disposed on the upper surface and the lower surface of the first substrate with lens 1321 could not be perfectly canceled out as illustrated in C of FIG. 48. As a result, the laminated lens structure 1311 would be warped in either direction.

For example, in the case where the two layers of resin 1341 on the upper surface and the lower surface of the first substrate with lens 1321 are deviated upward from the center line in regard of the thickness direction of the laminated lens structure 1311, the thermal expansion of the two layers of resin 1341 would warp the laminated lens structure 1311 into an upwardly convex shape, as illustrated in C of FIG. 52.

Further, in the example illustrated in FIG. 51, the profile of the through-holes in the thinner second substrate with lens 1322, of the second substrate 1322 and the third substrate with lens 1323, is a downwardly narrowing shape of decreasing in the direction toward the first substrate with lens 1321. In such a shape, when the two layers of resin 1341 on the upper surface and the lower surface of the first substrate with lens 1321 undergoes thermal expansion, forces for warping the laminated lens structure 1311 into an upwardly convex shape act on the laminated lens structure 1311. These forces act on the second substrate with lens 1322 as forces in the directions for separating the lens and the substrate from each other, as illustrated in D of FIG. 52. Due to this action, the fear of deficit or breakage of the lens 1332 of the second substrate with lens 1322 is increased.

<Present Structure>

Figure 53:
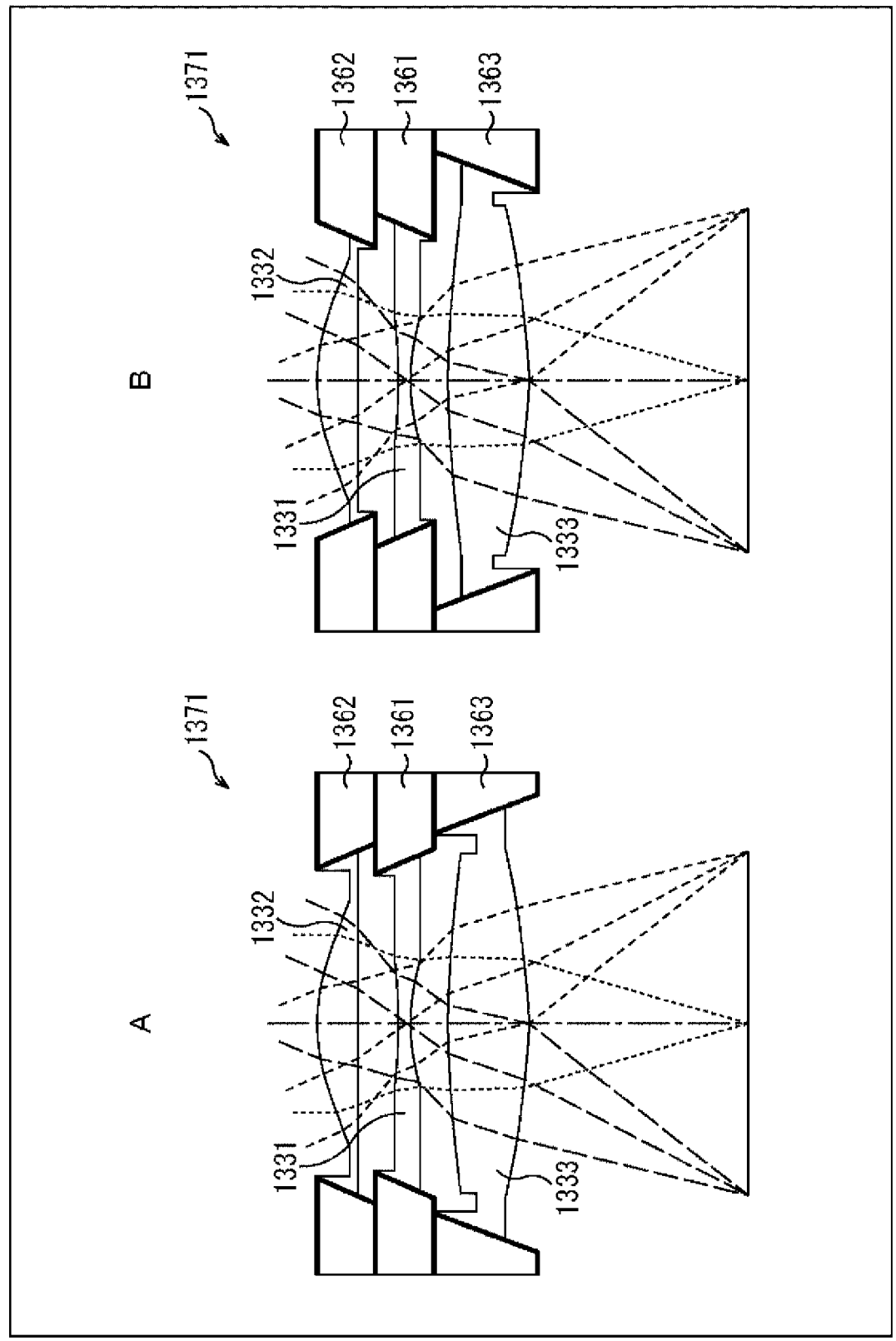
FIG. 53 illustrates sectional views of a laminated lens structure adopting the present structure.

FIG. 53 illustrates figures illustrating a laminated lens structure 1371 composed of three substrates with lens 1361 to 1363 which adopts the present structure.

A of FIG. 53 illustrates a structure which corresponds to the laminated lens structure 1311 of FIG. 49, and in which the profile of through-holes is a so-called forwardly broadening shape. On the other hand, B of FIG. 53 illustrates a structure which corresponds to the laminated lens structure 1311 of FIG. 51, and in which the profile of through-holes is a so-called downwardly narrowing shape.

Figure 54:
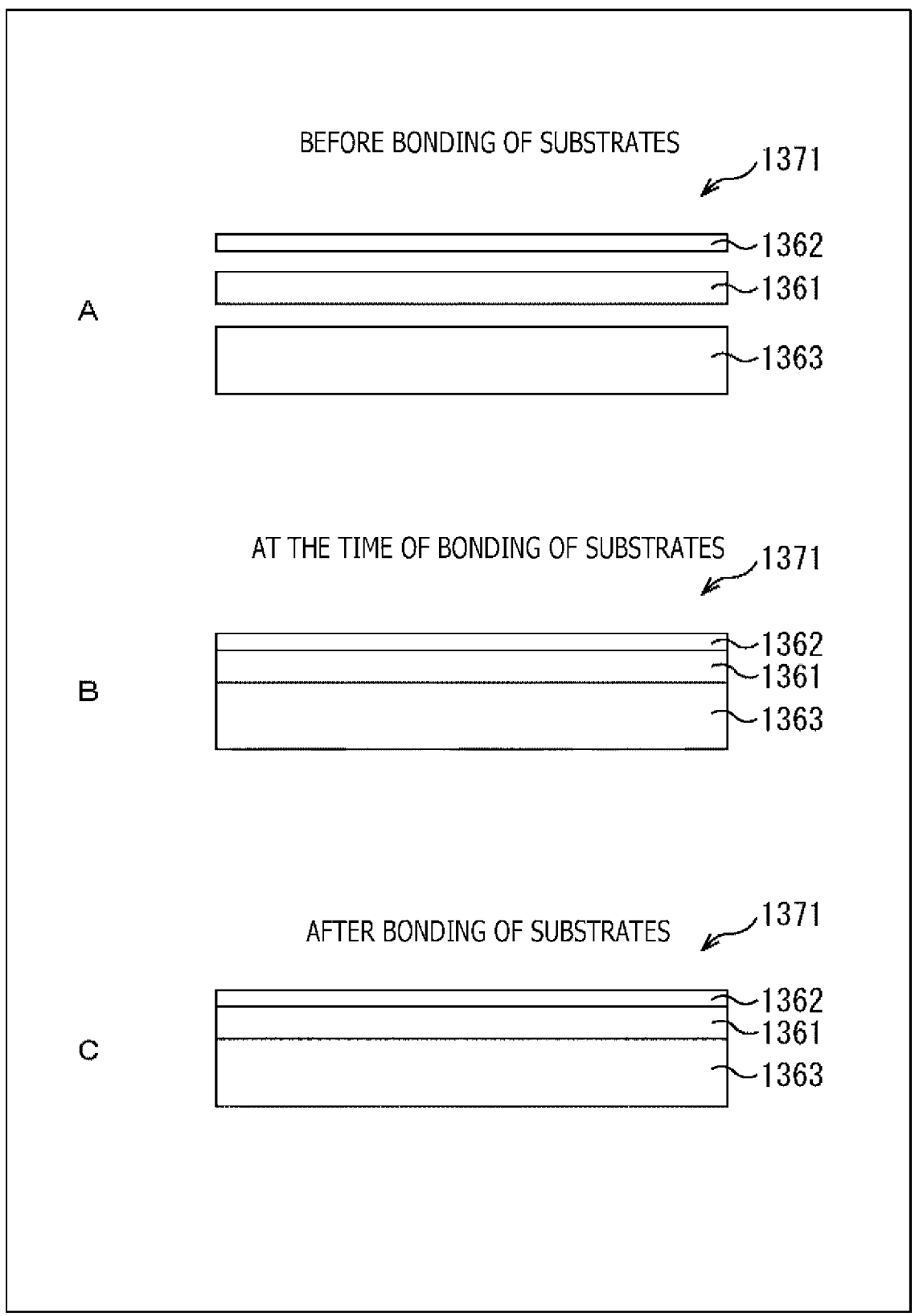
FIG. 54 illustrates figures schematically representing the laminated lens structure of FIG. 53.

FIG. 54 illustrates figures schematically representing the laminated lens structure 1371 of FIG. 53, for explaining an action offered by the present structure.

The laminated lens structure 1371 has a structure in which a second substrate with lens 1362 is disposed on the upper side of a first substrate with lens 1361 located in the middle, and a third substrate with lens 1363 is disposed on the lower side of the first substrate with lens 1361.

The second substrate with lens 1362 disposed in the uppermost layer and the third substrate with lens 1363 disposed in the lowermost layer differ in substrate thickness and lens thickness. Specifically, the third substrate with lens 1363 is formed to be greater in lens thickness than the second substrate with lens 1362, and, attendant on this, the third substrate with lens 1363 is formed to be greater than the second substrate with lens 1362 in substrate thickness, too.

In the laminated lens structure 1371 of the present structure, direct bonding between the substrate is used as means for firmly attaching the substrates with lens to one another. In other words, the substrates with lens to be firmly attached are subjected to a plasma activation treatment, and the two substrates with lens to be firmly attached are plasma bonded. In still other words, silicon oxide films are formed on respective surfaces of two substrates with lens to be laminated, hydroxyl groups are bonded thereto, after which the two substrates with lens are laminated, and the temperature thereof is raised, to effect dehydration condensation. In this way, the two substrates with lens are directly bonded by silicon-oxygen covalent bonds.

Therefore, in the laminated lens structure 1371 of the present structure, adhesion with a resin is not used as means for firmly attaching the substrates with lens to one another. For this reason, a resin for forming lenses or a resin for adhesion between substrates is not disposed between the substrate with lens and the substrate with lens. In addition, since no resin is disposed on the upper surface of the lower surface of the substrate with lens, thermal expansion of resin or shrinkage on curing of resin does not occur at the upper surface or lower surface of the substrate with lens.

Therefore, in the laminated lens structure 1371, even if the second substrate with lens 1362 and the third substrate with lens 1363 which differ in lens thickness and substrate thickness are disposed at an upper layer and a lower layer on the first substrate with lens 1351, substrate warping due to shrinkage on curing or substrate warping due to thermal expansion, as in Comparative Structure Examples 1 to 8 described above, is not generated.

In other words, the present structure in which substrates with lens are firmly attached to one another by direct bonding has an action and an effect such that even in the case where the substrates with lens differing in lens thickness and substrate thickness are laminated on the upper side and the lower side, substrate warping can be greatly restrained, as compared to Comparative Structure Examples 1 to 8 described above.

16. Various Modifications

Other modifications of the aforementioned embodiments will be described.

For example, in the case where a laminated lens structure in a substrate state is individualized by use of a blade or laser or the like, chipping may be generated in the support substrate of the substrate with lens in each layer. When, for example, the chipping proceeds to the through-hole, die strength of the substrate with lens may be lowered, and the laminated lens structure may be broken at the time of assembling a camera module or in a similar situation.

In addition, in the case where individualization is conducted using blade dicing or the like, load on dicing may increases, since the substrates with lens are laminated to have a considerable thickness; as a result, for example, process variations may be generated due to blade deterioration, and chipping-related yield may be lowered.

In view of this, an example of countermeasure against chipping will be described below.

<First Countermeasure Against Chipping>

First, referring to FIGS. 55 to 58, a first countermeasure against chipping will be described.

Figure 55:
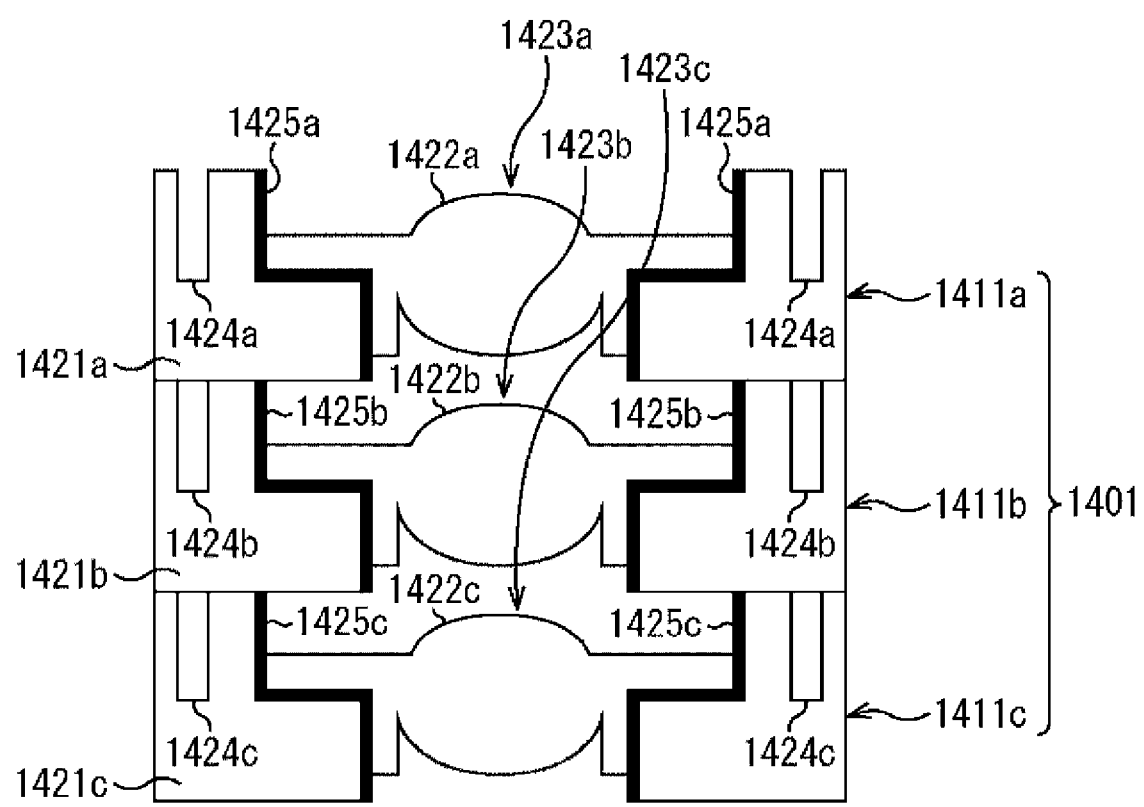
FIG. 55 is a schematic view of a section of a laminated lens structure to which the present technology is applied.

FIG. 55 is a schematic view of a section of a laminated lens structure 1401. Note that in FIG. 55, the parts necessary for explanation are mainly illustrated, and the parts unnecessary for explanation are appropriately omitted in the illustration.

In the laminated lens structure 1401, substrates with lens 1411a to 1411c are laminated in three layers. A lens resin portion 1422a is formed inside a through-hole 1423a in a support substrate 1421a of the substrate with lens 1411a. A light-shielding film 1425a is formed on a side wall of the through-hole 1423a. At end portions of an upper surface of the support substrate 1421a, grooves 1424a surrounding the periphery of the through-hole 1423a are formed.

The substrates with lens 1411b and 1411c also have the same or similar configuration to that of the substrate with lens 1411a, and description thereof is omitted. Note that while an example in which the lens resin portions 1422a to 1422c are the same in shape is illustrated in FIG. 55 for simplification of the drawing, the shapes of the lens resin portions 1422a to 1422c can be set arbitrarily.

Note that where the substrates with lens 1411a to 1411c need not be distinguished individually, they will hereinafter be referred to simply as substrates with lens 1411. Where the support substrates 1421a to 1421c need not be distinguished individually, they will hereinafter be referred to simply as support substrates 1421. Where the lens resin portions 1422a to 1422c need not be distinguished individually, they will hereinafter be referred to simply as lens resin portions 1422. Where the through-holes 1423a to 1423c need not be distinguished individually, they will hereinafter be referred to simply as through-holes 1423. Where the grooves 1424a to 1424c need not be distinguished individually, they will hereinafter be referred to simply as grooves 1424.

<Method of Manufacturing Laminated Lens Structure 1401>

Now, referring to FIGS. 56 to 58, a method of manufacturing the laminated lens structure 1401 will be described below. Note that hereinafter, steps related to the countermeasure against chipping will be mainly described. The steps descriptions of which are omitted are basically the same as the aforementioned steps.

Figure 56:
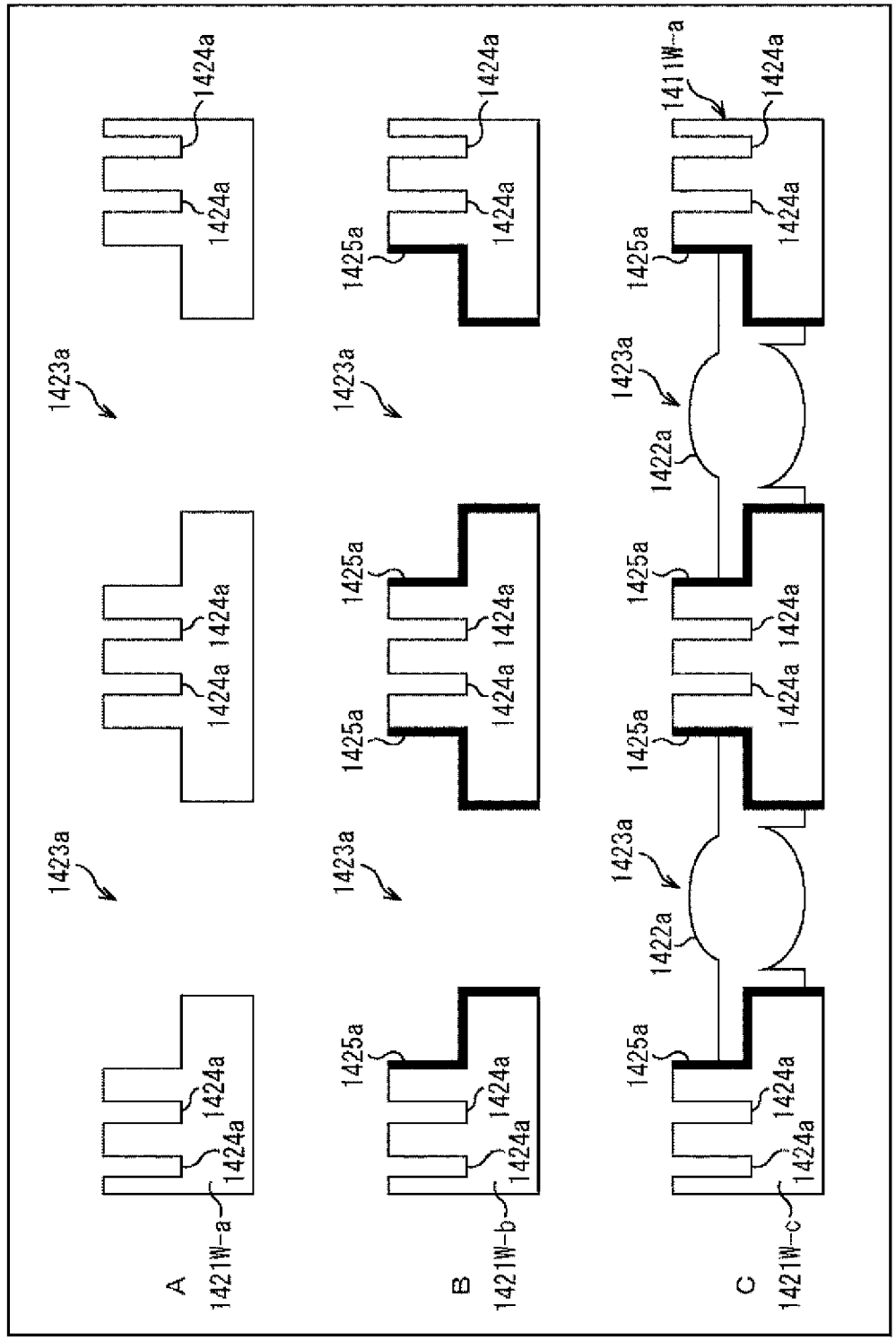
FIG. 56 illustrates figures for explaining a method of manufacturing the laminated lens structure of FIG. 55.

First, as illustrated in A of FIG. 56, a plurality of through-holes 1423a are formed in a support substrate 1421W-a in a substrate state. As a method of processing the through-holes 1423a, any of the aforementioned methods can be used. In addition, although only two through-holes 1423a are illustrated in FIG. 56 as space is limited, a multiplicity of through-holes 1423a are in practice formed in plane directions of the support substrate 1421W-a.

Besides, using dry etching, grooves 1424a are formed in the upper surface of the support substrate 1421W-a in such a manner as to surround the periphery of each of the through-holes 1423a.

It is sufficient that the grooves 1424a surround each through-hole 1423a at least on the inside of a region surrounded by dicing lines (not illustrated). For example, on the inside of a rectangular region surrounded by the dicing lines, grooves 1424a in a rectangular or circular shape or the like shape surrounding each through-hole 1423a may be formed. Alternatively, grooves 1424a parallel to the dicing line may be formed on both sides of each dicing line so that the dicing line is interposed between the grooves 1424a.

Next, as illustrated in B of FIG. 56, a light-shielding film 1425a is formed on the side wall of each through-hole 1423a.

Subsequently, as illustrated in C of FIG. 56, a lens resin portion 1422a is formed in each through-hole 1423a by the aforementioned method.

In this way, the substrate with lens 1411W-a in a substrate state is produced. In addition, by the same or similar steps, the substrates with lens 1411W-b and 1411W-c in a substrate state are produced.

Figure 57:
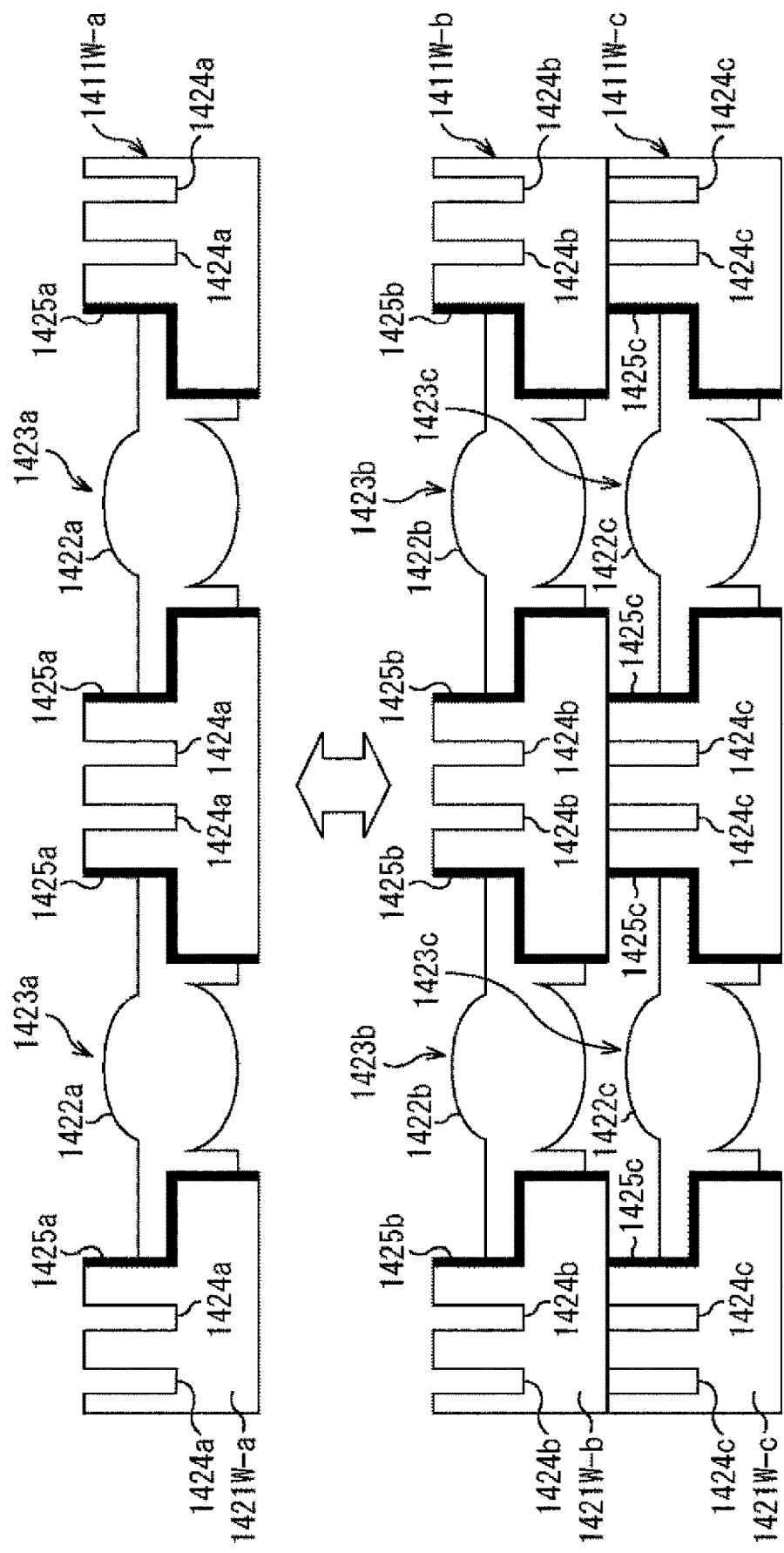
FIG. 57 is a figure for explaining the method of manufacturing the laminated lens structure of FIG. 55.

Next, as illustrated in FIG. 57, the substrates with lens 1411W-a to 1411W-C are laminated by direct bonding, by the aforementioned method, to produce a laminated lens structure 1401W in a substrate state. In the laminated lens structure 1401W, the grooves 1424a to 1424c of the substrates with lens 1411W-a to 1411W-c are substantially in register in the vertical direction.

Figure 58:
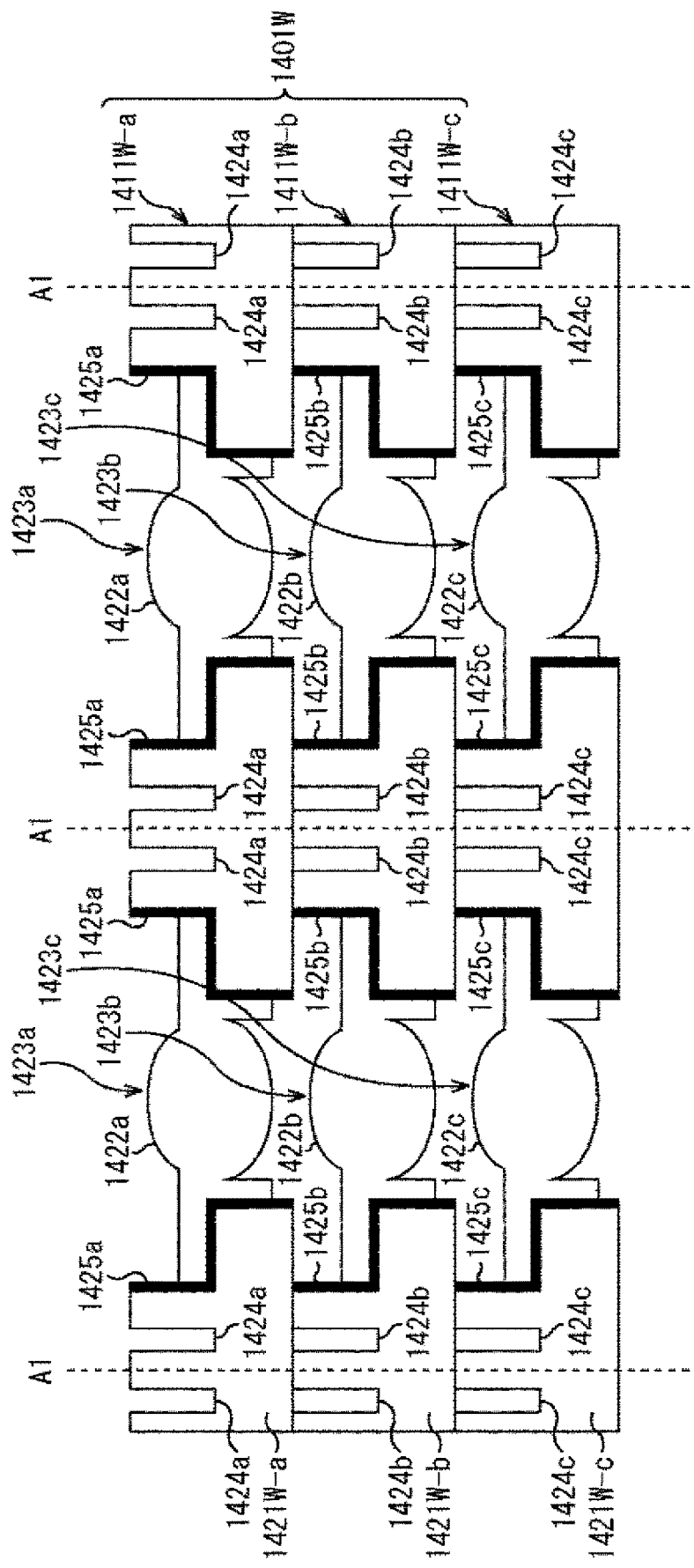
FIG. 58 is a figure for explaining the method of manufacturing the laminated lens structure of FIG. 55.

Subsequently, as illustrated in FIG. 58, the laminated lens structure 1401W in the substrate state is individualized on a chip basis by use of a blade or laser or the like, to obtain a plurality of laminated lens structures 1401. In this instance, as indicated by broken lines A1 in FIG. 58, regions between the adjacent ones of the grooves 1424a to 1424c are cut along the dicing lines. By this, chipping generated due to cutting in the substrate with lens 1411 in each layer is stopped by the grooves 1424a to 1424c, whereby the chipping is prevented from proceeding to the through-holes 1423a to 1423c. As a result, a situation in which die strength of the substrates with lens might be lowered and the laminated lens structure might be broken at the time of assembling a camera module or in a similar occasion is prevented from occurring.

<Second Countermeasure Against Chipping>

Referring to FIGS. 59 to 62, a second countermeasure against chipping will be described below.

Figure 59:
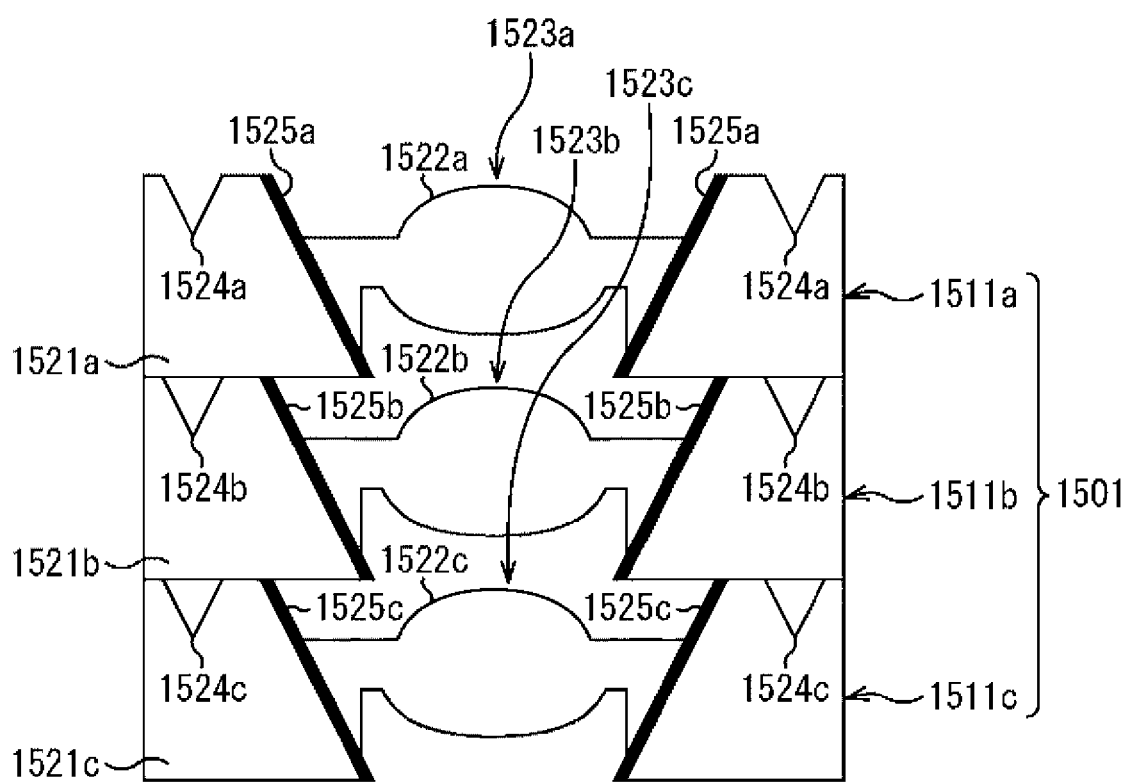
FIG. 59 is a schematic view of a section of a laminated lens structure to which the present technology is applied.

FIG. 59 is a schematic view of a section of a laminated lens structure 1501. Note that in FIG. 59, the parts necessary for explanation are mainly illustrated, and the parts unnecessary for explanation are appropriately omitted in the illustration.

In the laminated lens structure 1501, substrates with lens 1511a to 1511c are laminated in three layers. A lens resin portion 1522a is formed inside a through-hole 1523a in a support substrate 1521a of the substrate with lens 1511a. A light-shielding film 1525a is formed on the side wall of the through-hole 1523a. At end portions of the upper surface of the support substrate 1521a, grooves 1524a surrounding the periphery of the through-hole 1523a are formed.

The substrates with lens 1511b and 1511c have the same or similar configuration to that of the substrate with lens 1511a, and description thereof is omitted. Note that while an example in which the lens resin portions 1522a to 1522c are the same in shape is illustrated in FIG. 59 for simplification of the drawing, the shapes of the lens resin portions 1522a to 1522c can be set arbitrarily.

Note that where the substrates with lens 1511a to 1511c need not be distinguished individually, they will hereinafter be referred to simply as substrates with lens 1511. Where the support substrates 1521a to 1521c need not be distinguished individually, they will hereinafter be referred to simply as support substrates 1521. Where the lens resin portions 1522a to 1522c need not be distinguished individually, they will hereinafter be referred to simply as lens resin portions 1522. Where the through-holes 1523a to 1523c need not be distinguished individually, they will hereinafter be referred to simply as through-holes 1523. Where the grooves 1524a to 1524c need not be distinguished individually, they will hereinafter be referred to simply as grooves 1524.

<Method of Manufacturing Laminated Lens Structure 1501>

Figure 60:
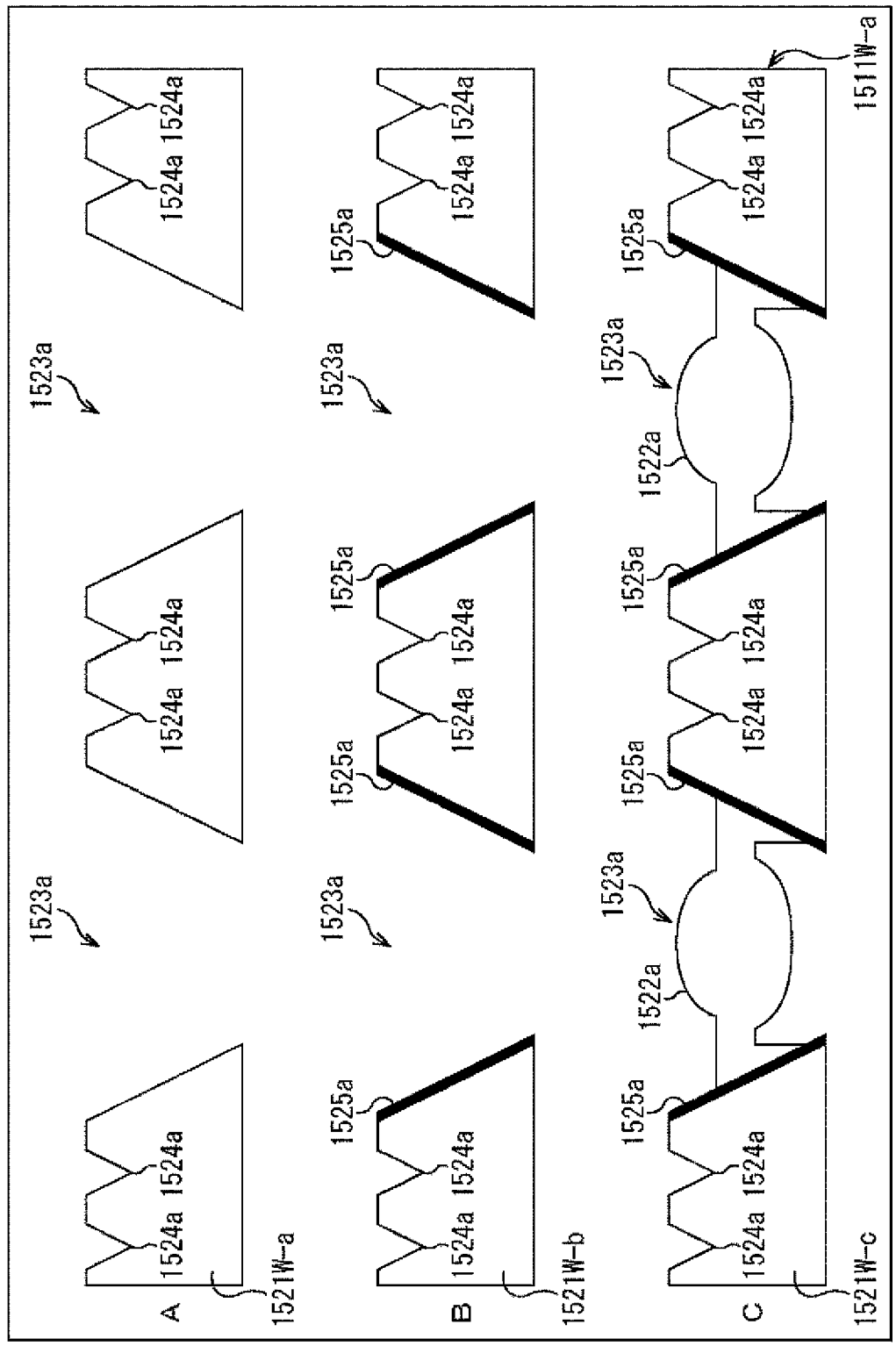
FIG. 60 illustrates figures for explaining a method of manufacturing the laminated lens structure of FIG. 59.
Figure 61:
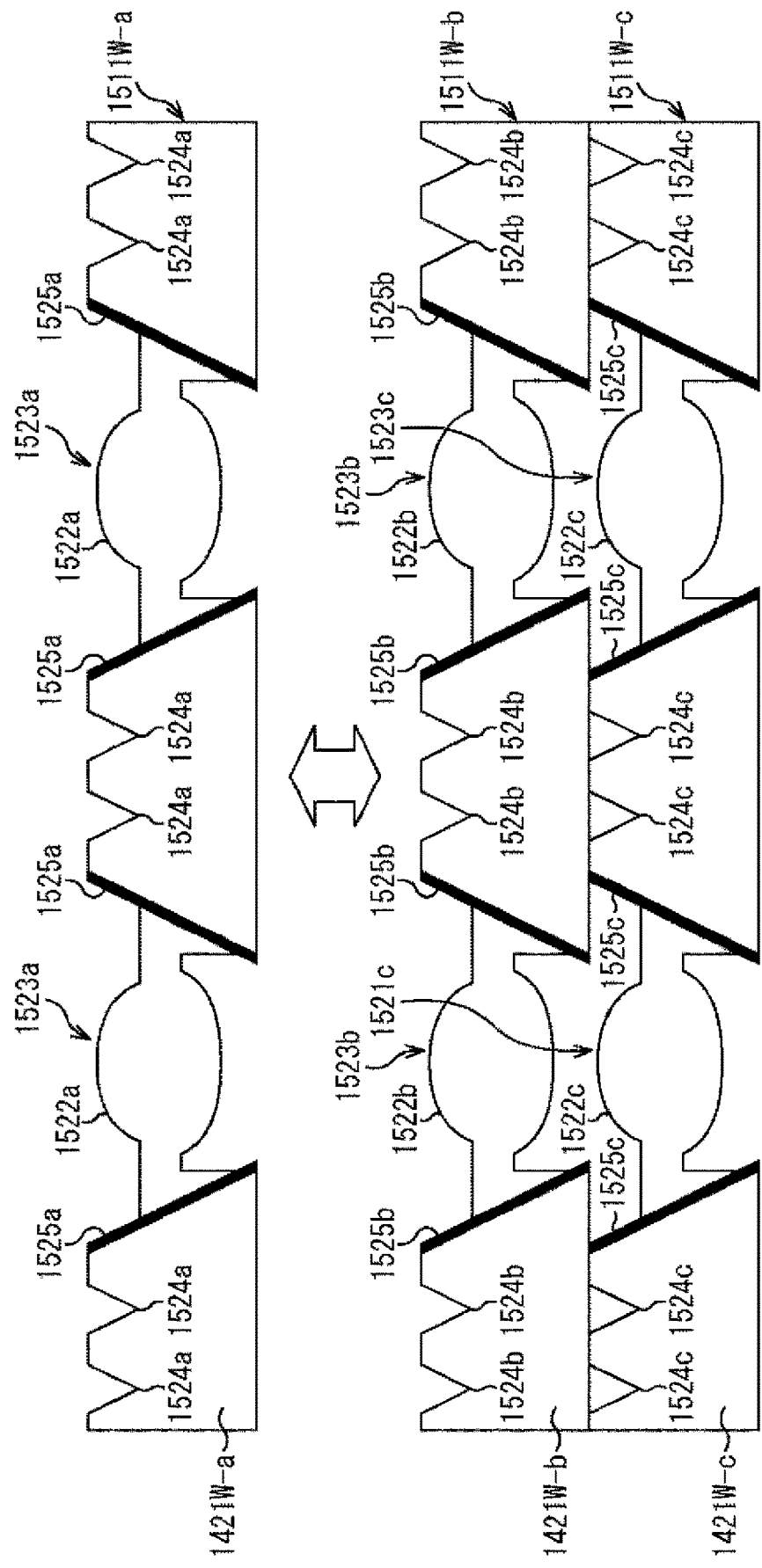
FIG. 61 is a figure for explaining the method of manufacturing the laminated lens structure of FIG. 59.
Figure 62:
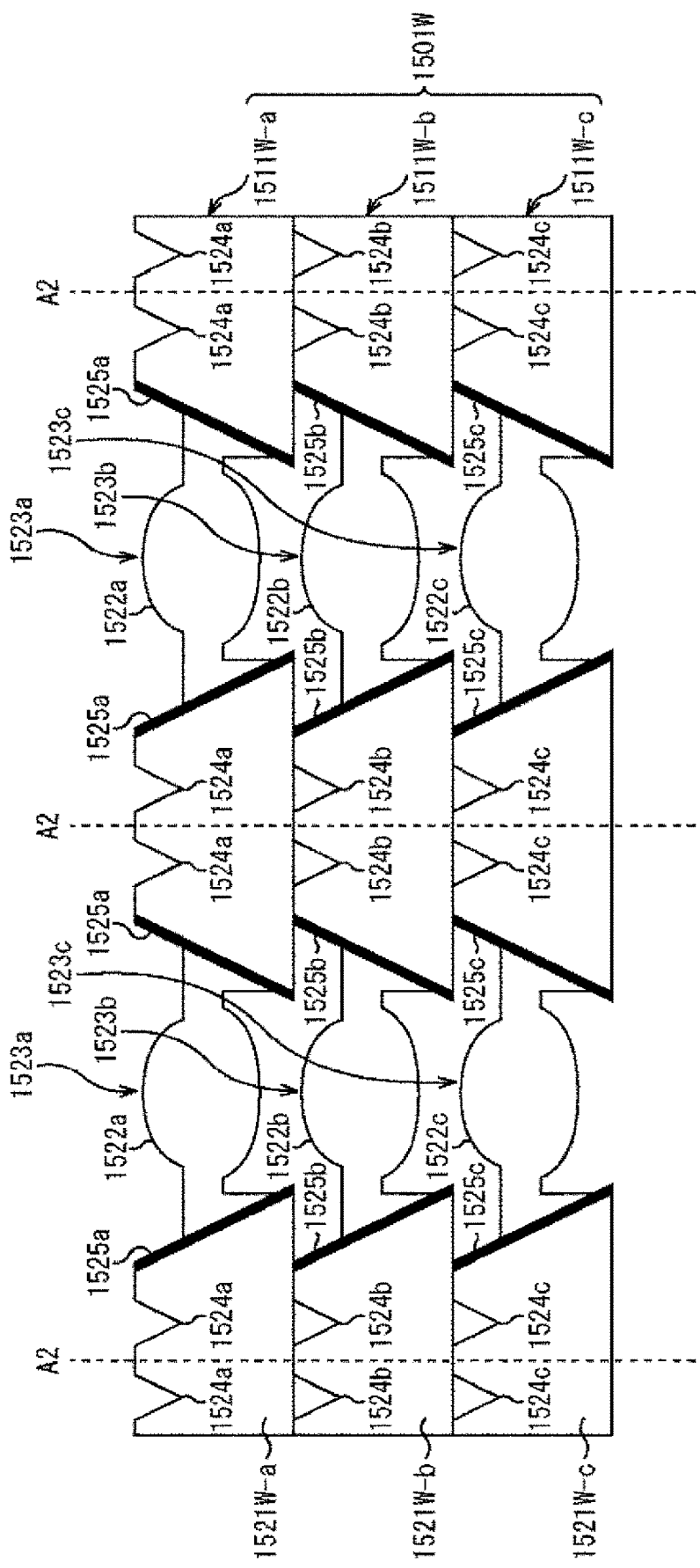
FIG. 62 is a figure for explaining the method of manufacturing the laminated lens structure of FIG. 59.

Referring to FIGS. 60 to 62, a method of manufacturing the laminated lens structure 1501 will be described below. Note that hereinafter, steps related to the countermeasure against chipping will be mainly described. The steps descriptions of which are omitted are basically the same as the aforementioned steps.

First, as illustrated in A of FIG. 60, a plurality of through-holes 1523a are formed in a support substrate 1521W-a in a substrate state. As a method for processing the through-holes 1523a, any of the aforementioned methods can be used. In addition, although only two through-holes 1523a are illustrated in FIG. 60 as space is limited, a multiplicity of through-holes 1523a are in practice formed in plane directions of the support substrate 1521W-a.

Besides, grooves 1524a are formed in the upper surface of the support substrate 1521W-a in such a manner as to surround the periphery of each through-hole 1523a, by wet etching.

It is sufficient that the grooves 1524a surround each through-hole 1523a at least on the inside of a region surrounded by dicing lines (not illustrated). For example, on the inside of a rectangular region surrounded by the dicing lines, grooves 1524a in a rectangular or circular shape or the like shape surrounding each through-hole 1523a may be formed. Alternatively, grooves 1524a parallel to the dicing line may be formed on both sides of each dicing line so that the dicing line is interposed between the grooves 1524a.

In this instance, by use of the aforementioned crystal-anisotropic wet etching, it is possible to control the depth of the grooves 1524a through controlling the width of the grooves 1524a. For example, in the case of an etching condition for etching at approximately 55 degrees relative to the crystal orientation of the support substrate 1521W-a, when the width of the grooves 1524a is set at approximately 140 μm, the depth will be approximately 100 μm.

In addition, with the through-holes 1523a also produced by crystal-anisotropic wet etching, it is possible to simultaneously produce the through-holes 1523a and the grooves 1524a, thereby reducing the number of steps. In this case, the through-holes 1523a and the grooves 1524a become equal in inclination angle.

Next, as illustrated in C of FIG. 60, a lens resin portion 1522a is formed in each through-hole 1523a, by the aforementioned method.

In this way, the substrate with lens 1511W-a in a substrate state is produced. In addition, by the same or similar steps, the substrates with lens 1511W-b and 1511W-c in a substrate state are produced.

Subsequently, as illustrated in FIG. 61, the substrates with lens 1511W-a to 1511W-c are laminated through direct bonding, by the aforementioned method, whereby the laminated lens structure 1501W in a substrate state is manufactured. In the laminated lens structure 1501W, the grooves 1524a to 1524c in the substrates with lens 1511W-a to 1511W-c are substantially in register in the vertical direction.

Next, as illustrated in FIG. 62, the laminated lens structure 1501W in the substrate state is individualized on a chip basis by use of a blade or laser or the like, to obtain a plurality of laminated lens structures 1501. In this instance, as indicated by broken lines A2 in FIG. 62, regions between the adjacent ones of the grooves 1524a to 1524c are cut along the dicing lines. By this, chipping generated due to cutting in each substrate with lens 1511 is stopped by the grooves 1524a to 1524c, whereby the chipping is prevented from proceeding to the through-holes 1523a to 1523c. As a result, a situation in which die strength of the substrates with lens might be lowered and the laminated lens structure might be broken at the time of assembling a camera module or in a similar occasion is prevented from occurring.

<Third Countermeasure Against Chipping>

Referring to FIGS. 63 to 66, a third countermeasure against chipping will be described below.

Figure 63:
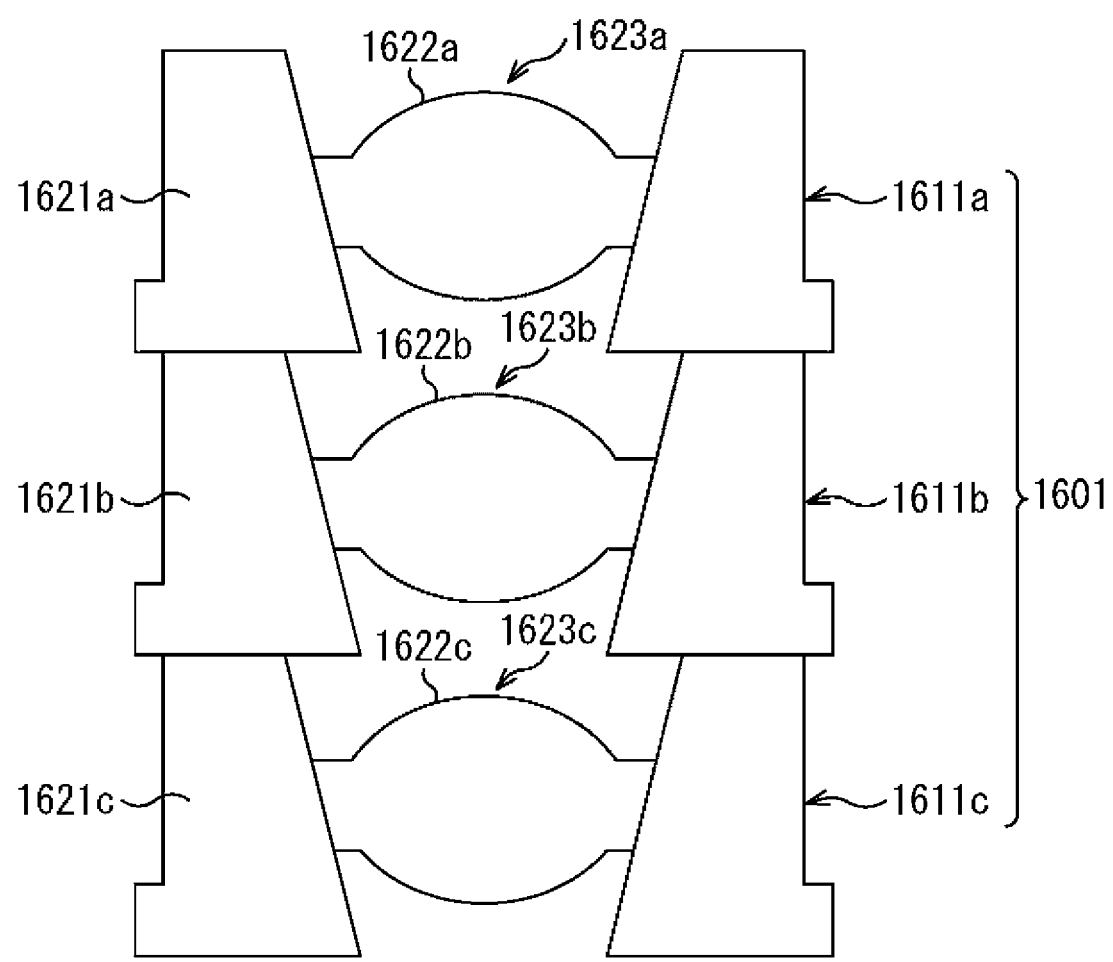
FIG. 63 is a schematic view of a section of a laminated lens structure to which the present technology is applied.

FIG. 63 is a schematic view of a section of a laminated lens structure 1601. Note that in FIG. 63, the parts necessary for explanation are mainly illustrated, and the parts unnecessary for explanation are appropriately omitted in the illustration.

In the laminated lens structure 1601, substrates with lens 1611a to 1611c are laminated in three layers. A lens resin portion 1622a is formed inside a through-hole 1623a in a support substrate 1621a of the substrate with lens 1611a.

The substrates with lens 1611b and 1611c also have the same or similar configuration to that of the substrate with lens 1611a, and description thereof is omitted. Note that while an example in which the lens resin portions 1622a to 1622c are the same in shape is illustrated in FIG. 63 for simplification of the drawing, the shapes of the lens resin portions 1622a to 1622c can be set arbitrarily.

Note that where the substrates with lens 1611a to 1611c need not be distinguished individually, they will hereinafter be referred to simply as substrates with lens 1611. Where the support substrates 1621a to 1621c need not be distinguished individually, they will hereinafter be referred to simply as support substrates 1621. Where the lens resin portions 1622a to 1622c need not be distinguished individually, they will hereinafter be referred to simply as lens resin portions 1622. Where the through-holes 1623a to 1623c need not be distinguished individually, they will hereinafter be referred to simply as through-holes 1623.

<Method of Manufacturing Laminated Lens Structure 1601>

Figure 64:
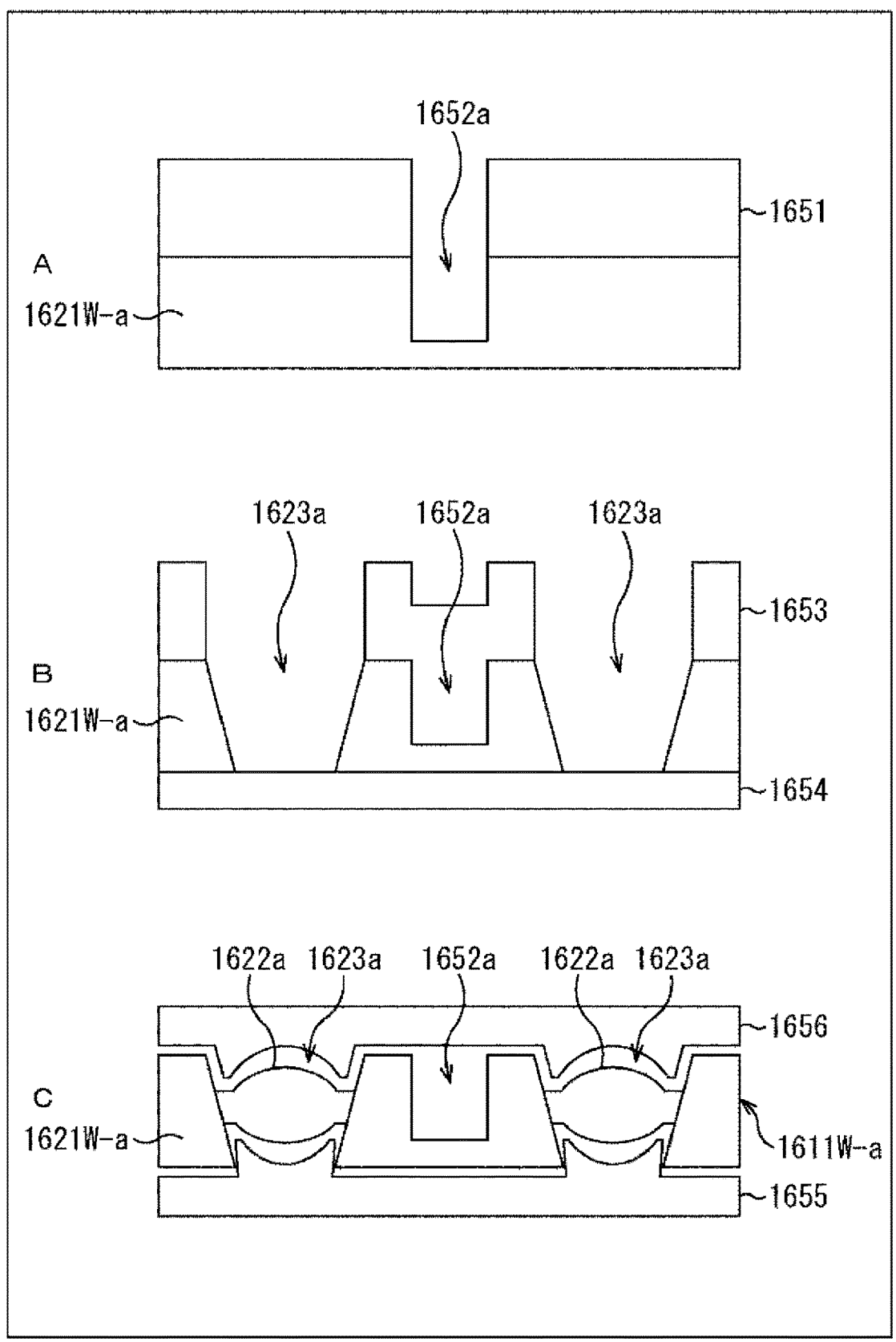
FIG. 64 illustrates figures for explaining a method of manufacturing the laminated lens structure of FIG. 63.
Figure 65:
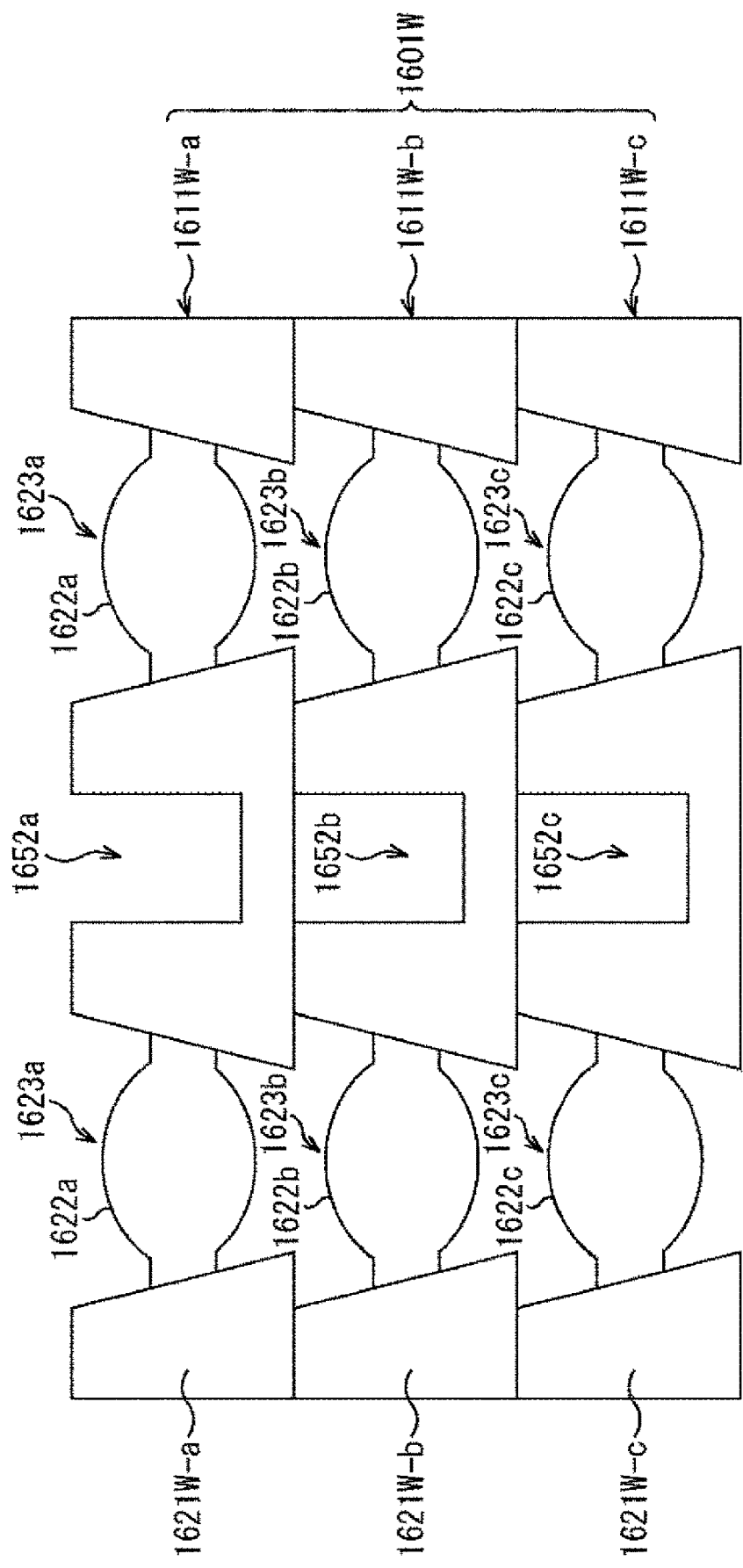
FIG. 65 is a figure for explaining the method of manufacturing the laminated lens structure of FIG. 63.
Figure 66:
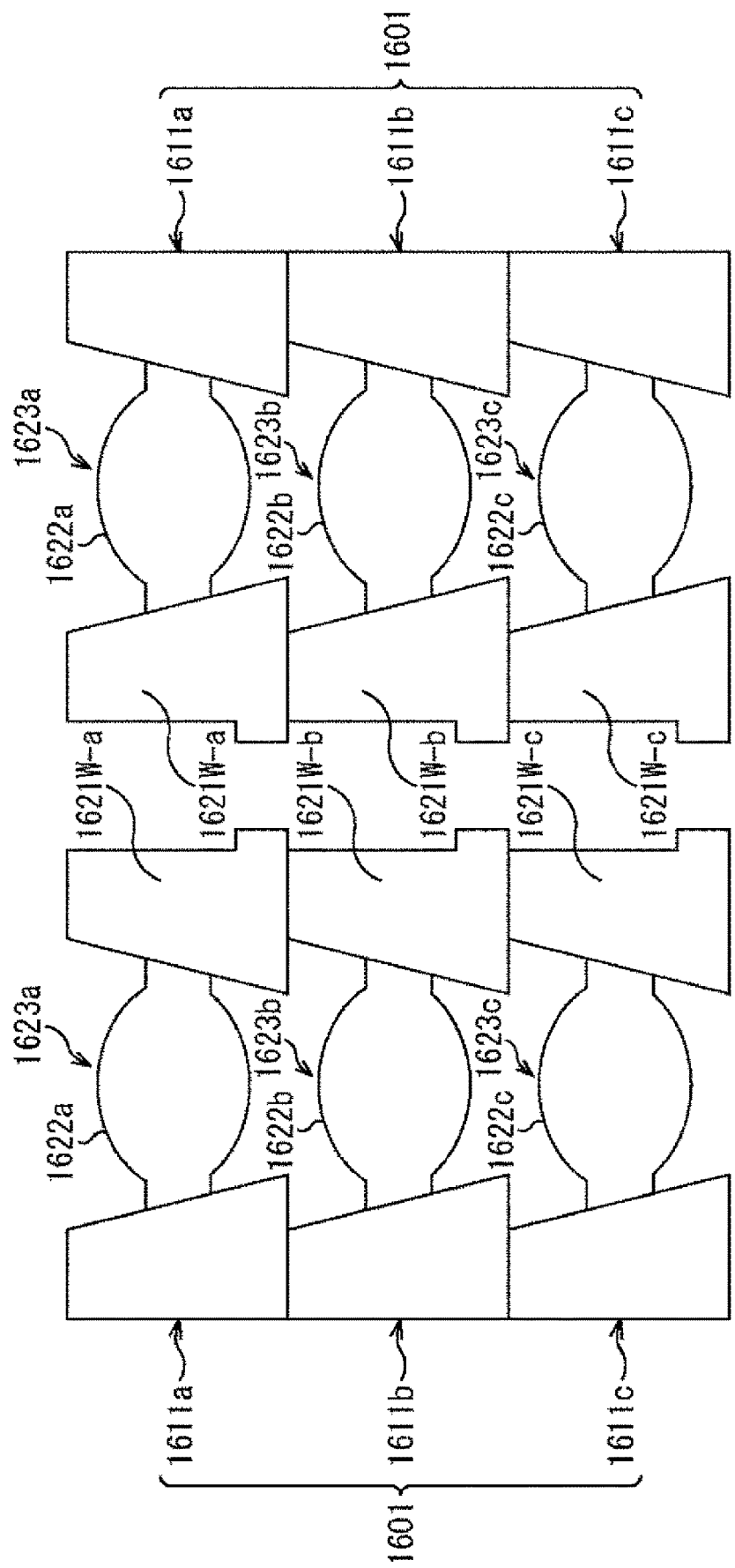
FIG. 66 is a figure for explaining the method of manufacturing the laminated lens structure of FIG. 63.

Referring to FIGS. 64 to 66, a method of manufacturing the laminated lens structure 1601 will be described below.

First, as illustrated in A of FIG. 64, an etching mask 1651 is formed on an upper surface of a support substrate 1621W-a in a substrate state. The etching mark 1651 has formed therein an opening for forming a groove 1652a. Then, the groove 1652a to be used for a dicing line is formed in the support substrate 1621W-a, by dry etching or wet etching.

Next, the etching mask 1651 is removed, after which a reinforcing resin sheet 1654 is adhered to the lower surface of the support substrate 1621W-a, as illustrated in B of FIG. 64. In addition, an etching mark 1653 is formed on the upper surface of the support substrate 1621W-a. The etching mask 1653 plugs up the groove 1652a, and has formed therein openings for forming through-holes 1623a. Then, the through-holes 1623a are formed by dry etching or wet etching. Note that while only two through-holes 1623a are illustrated in FIG. 64 as space is limited, a multiplicity of through-holes 1623a are in practice formed in plane directions of the support substrate 1621W-a.

Subsequently, as illustrated in C of FIG. 64, a lens resin portion 1622a is formed inside each through-holes 1623a using a lower mold 1655 and an upper mold 1656, by the aforementioned method.

In this way, a substrate with lens 1611W-a in a substrate state is produced. In addition, by the same or similar step, substrates with lens 1611W-b and 1611W-c in a substrate state are produced.

Next, as illustrated in FIG. 65, the substrates with lens 1611W-a and 1611W-b are directly bonded by the aforementioned method, whereby a laminated lens structure 1601W in a substrate state is produced. In the laminated lens structure 1601W, the grooves 1652a to 1652c in the substrates with lens 1611W-a to 1611W-c are substantially in register in the vertical direction.

Subsequently, as illustrated in FIG. 66, the laminated lens structure 1601W in the substrate state is cut along the grooves 1652a to 1652c by use of a blade or laser or the like, and are thereby individualized on a chip basis, whereby a plurality of laminated lens structures 1601 are manufactured. In this instance, with the laminated lens structure 1601W cut along the grooves 1652a to 1652c, it is possible to reduce the load at the time of dicing, to enhance chipping-related yield, and to reduce manufacturing cost.

Note that depending on the lamination structure of the substrates with lens, the individualization can be conducted by cleavage or the like, without performing the dicing.

<Modifications of Method of Manufacturing Laminated Lens Structure 1601>

Now, modifications of the method of manufacturing the laminated lens structure 1601 will be described below.

Figure 67:
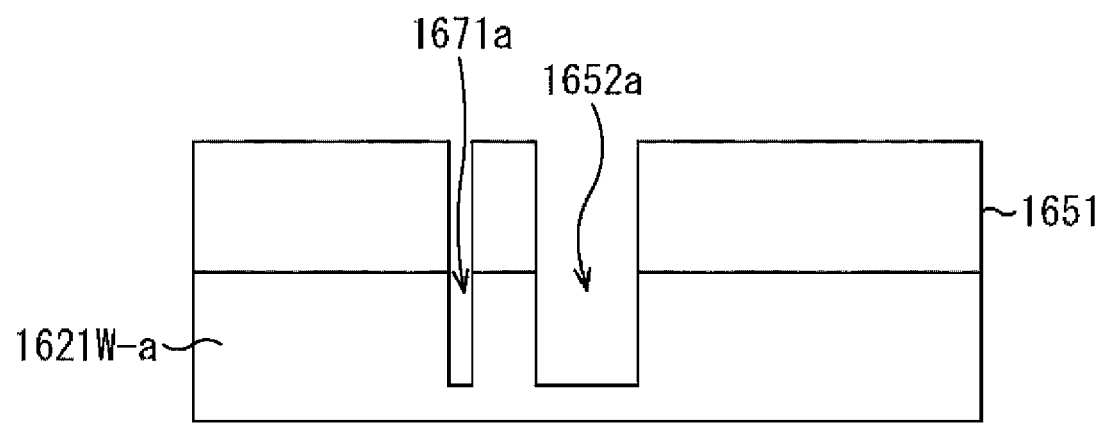
FIG. 67 is a figure for explaining a first modification of the method of manufacturing the laminated lens structure of FIG. 63.

For example, as illustrated in FIG. 67, at the time of forming the groove 1652a for dicing line, a groove 1671a for alignment mark may be formed simultaneously. By this, the number of steps can be reduced.

Figure 68:
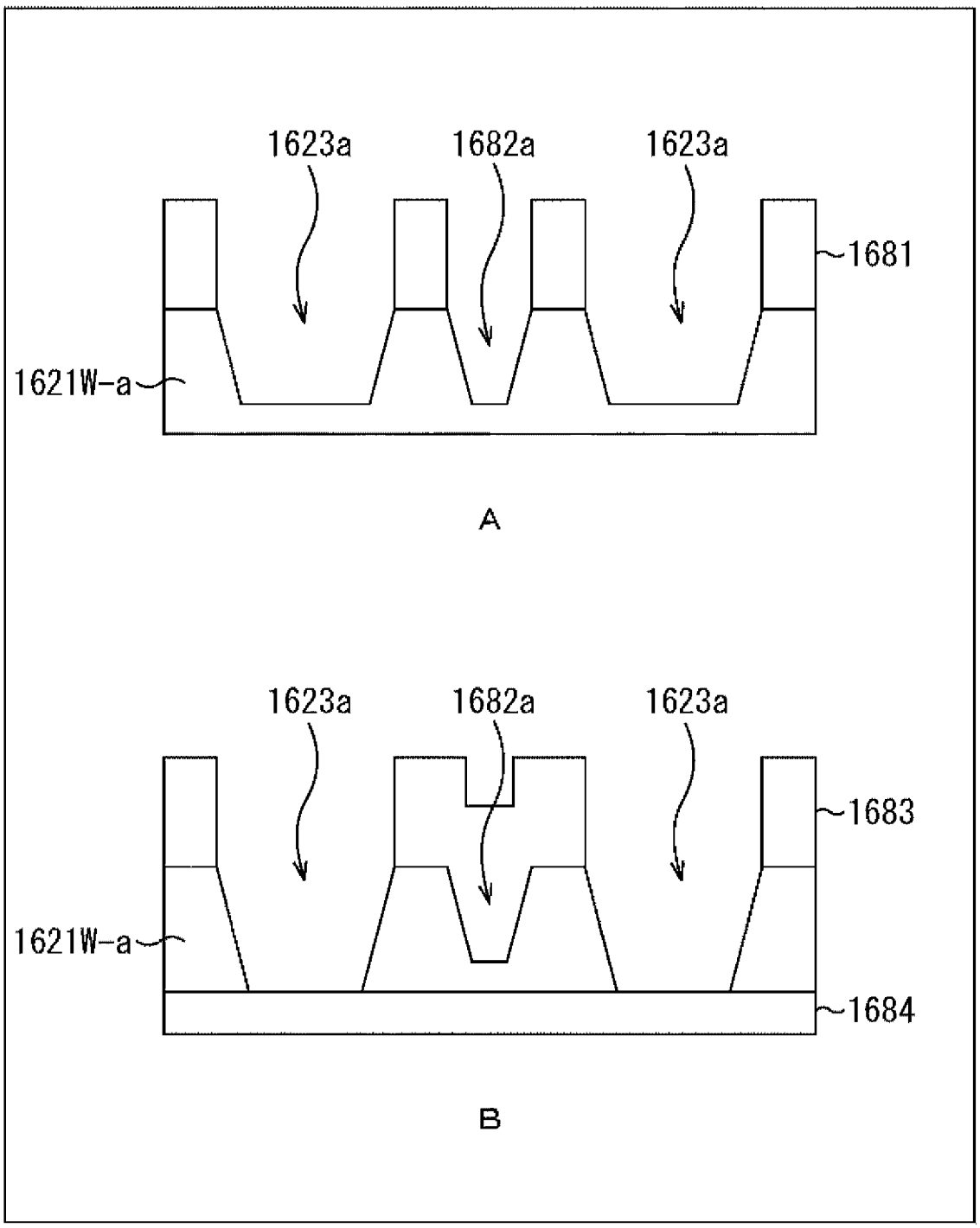
FIG. 68 illustrates figures for explaining a second modification of the method of manufacturing the laminated lens structure of FIG. 63.

In addition, for example, as illustrated in FIG. 68, processing of the through-holes 1623a and processing of a groove 1682a for dicing may be carried out simultaneously. Specifically, as illustrated in A of FIG. 68, an etching mask 1681 is formed on an upper surface of the support substrate 1621W-a in the substrate state. The etching mask 1681 has formed therein openings for forming the through-holes 1623a and the groove 1682a. Then, by dry etching or wet etching, the groove 1682a is formed, and the through-holes 1623a are formed to an intermediate point.

Next, the etching mask 1681 is removed, after which a reinforcing resin sheet 1684 is adhered to the lower surface of the support substrate 1621W-a, as illustrated in B of FIG. 68. In addition, an etching mask 1683 is formed on the upper surface of the support substrate 1621W-a. The etching mask 1683 plugs up the groove 1682a, and has formed therein openings for forming the through-holes 1623a. Then, by dry etching or wet etching, the through-holes 1623a are processed until they penetrate the support substrates 1621W-a.

With the processing of the through-holes 1623a and the processing of the groove 1682a thus conducted simultaneously, the processing time can be shortened.

Figure 69:
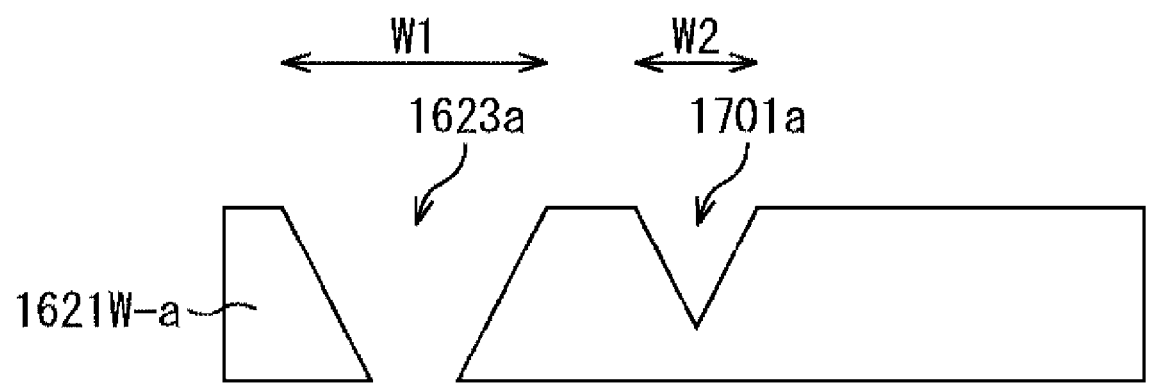
FIG. 69 is a figure for explaining a third modification of the method of manufacturing the laminated lens structure of FIG. 63.
Figure 70:
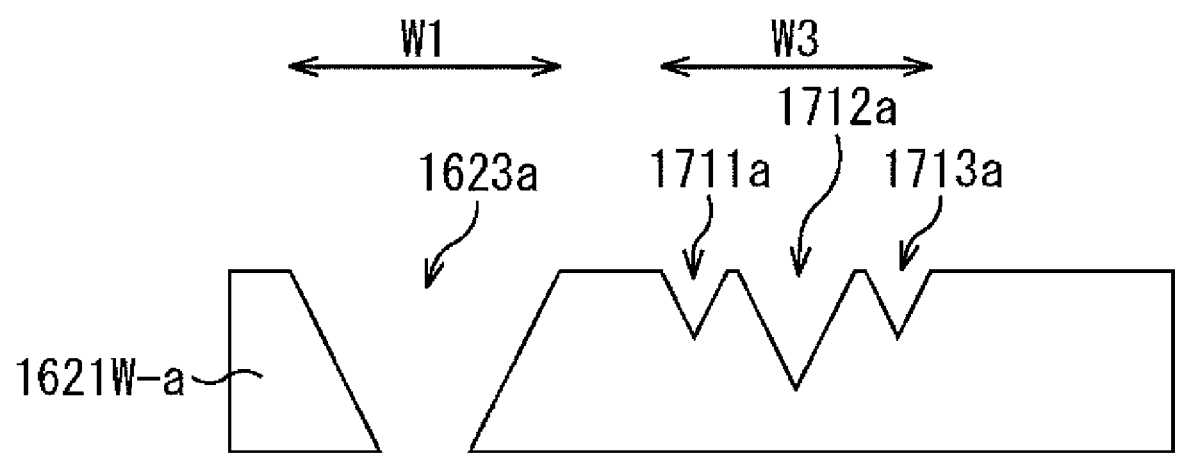
FIG. 70 is a figure for explaining the third modification of the method of manufacturing the laminated lens structure of FIG. 63.

In addition, for example, as illustrated in FIGS. 69 and 70, processing of the through-holes 1623a and processing of the dicing lines may be simultaneously performed by crystal-anisotropic wet etching. In this case, in consideration of the relation between the width of the through-holes 1623a and the width of the dicing lines, the width and number of the grooves for the dicing lines are controlled in such a manner that the grooves for the dicing lines do not penetrate the support substrate 1621W-a.

For example, in the case where the width W1 of the through-hole 1623a is greater than the width W2 of the dicing line, as illustrated in FIG. 69, a single groove 1701a is formed at the dicing line.

On the other hand, in the case where the width W1 of the through-hole 1623a is comparable to the width W3 of the dicing line or smaller than the width W3 of the dicing line, as illustrated in FIG. 70, a plurality of grooves are formed at the dicing line. In the case of this example, three grooves, namely, grooves 1711a to 1713a are formed. Note that the number of the grooves at the dicing line is determined according to the thickness of the support substrate 1621W, the width of the dicing line, the desired groove depth and the like.

Now, referring to FIGS. 71 and 72, in the third countermeasure against chipping, the relation between the width and depth of the groove (slit) formed on the dicing line and blade width will be described.

Figure 71:
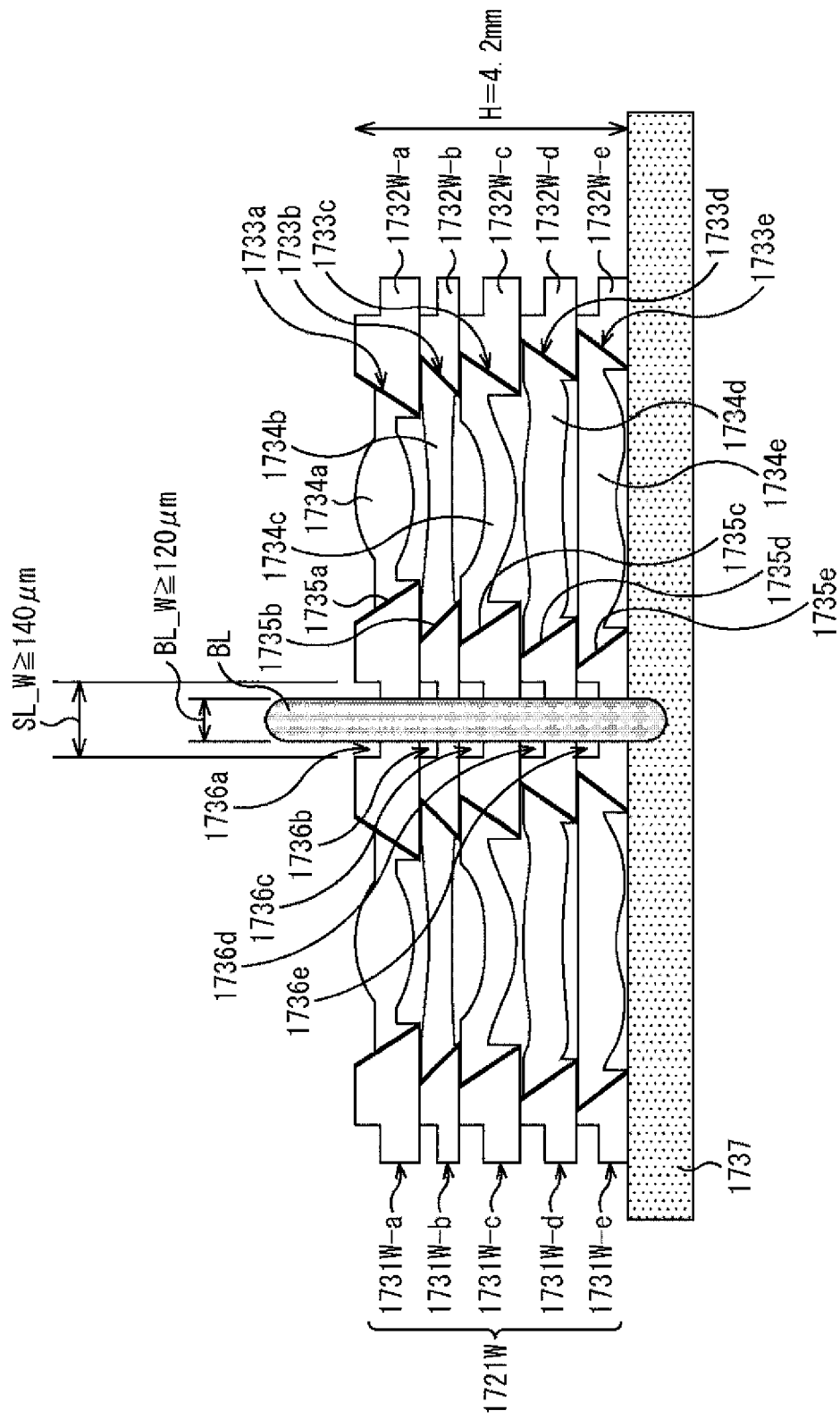
FIG. 71 is a figure for explaining the relationship between the width and depth of a groove and blade width.

FIG. 71 is a sectional view of a laminated lens structure 1721W in a substrate state.

The laminated lens structure 1721W in the substrate state illustrated in FIG. 71 is configured by laminating substrates with lens 1731W-a to 1731W-e in a substrate state through direct bonding.

The substrate with lens 1731W-a is provided with lens resin portions 1734a inside through-holes 1733a formed in a support substrate 1732W-a. A light-shielding film 1735a is formed on side surfaces of the through-holes 1733a. A groove 1736a for preventing chipping or the like is formed on the dicing line of the substrate with lens 1731W-a.

The substrate with lens 1731W-b is provided with lens resin portions 1734b inside through-holes 1733b formed in a support substrate 1732W-b. A light-shielding film 1735b is formed on side surfaces of the through-holes 1733b. A groove 1736b for preventing chipping or the like is formed on the dicing line of the substrate with lens 1731W-b. The same applies also to the substrates with lens 1731W-c to 1731W-e. A protective tape 1737 is adhered to a lower surface of the substrate with lens 1731W-e.

Note that where the substrates with lens 1731W-a to 1731W-e need not be distinguished individually, they will hereinafter be referred to simply as substrates with lens 1731W. In addition, where the support substrates 1732W-a to 1732W-e need not be distinguished individually, they will be referred to simply as support substrates 1732W. The same applies also to the lens resin portions 1734a to 1734e, the through-holes 1733a to 1733e, the light-shielding films 1735a to 1735e, and the grooves 1736a to 1736e.

The blade width BL_W of a blade BL is determined according to the height H of the laminated lens structure 1721W, by BL_W=H/K. Here, K is a coefficient (fixed value) determined from mechanical rigidity of the blade, and, for example, K=35 for a predetermined electroformed blade.

Therefore, for example, in the case where the height H of the laminated lens structure 1721W is 4.2 mm (4,200 µm), as illustrated in FIG. 71, the blade width BL_W is calculated as BL_W=H/K=4,200/35=120 µm, and, accordingly, a blade width of not less than 120 µm is required.

The width SL_W of the groove (slit) 1736 is a value obtained by adding a margin of approximately 20 to 60 µm to the determined blade width BL_W, taking into account a blade position alignment error and chipping margin and the like. For example, in the case where a margin of 20 µm is added to a blade width BL_W of 120 µm, the width SL_W of the groove 1736 is 140 µm. When the minimum value of the margin to be added is 20 µm, the width SL_W of the groove 1736 is not less than 140 µm.

Figure 72:
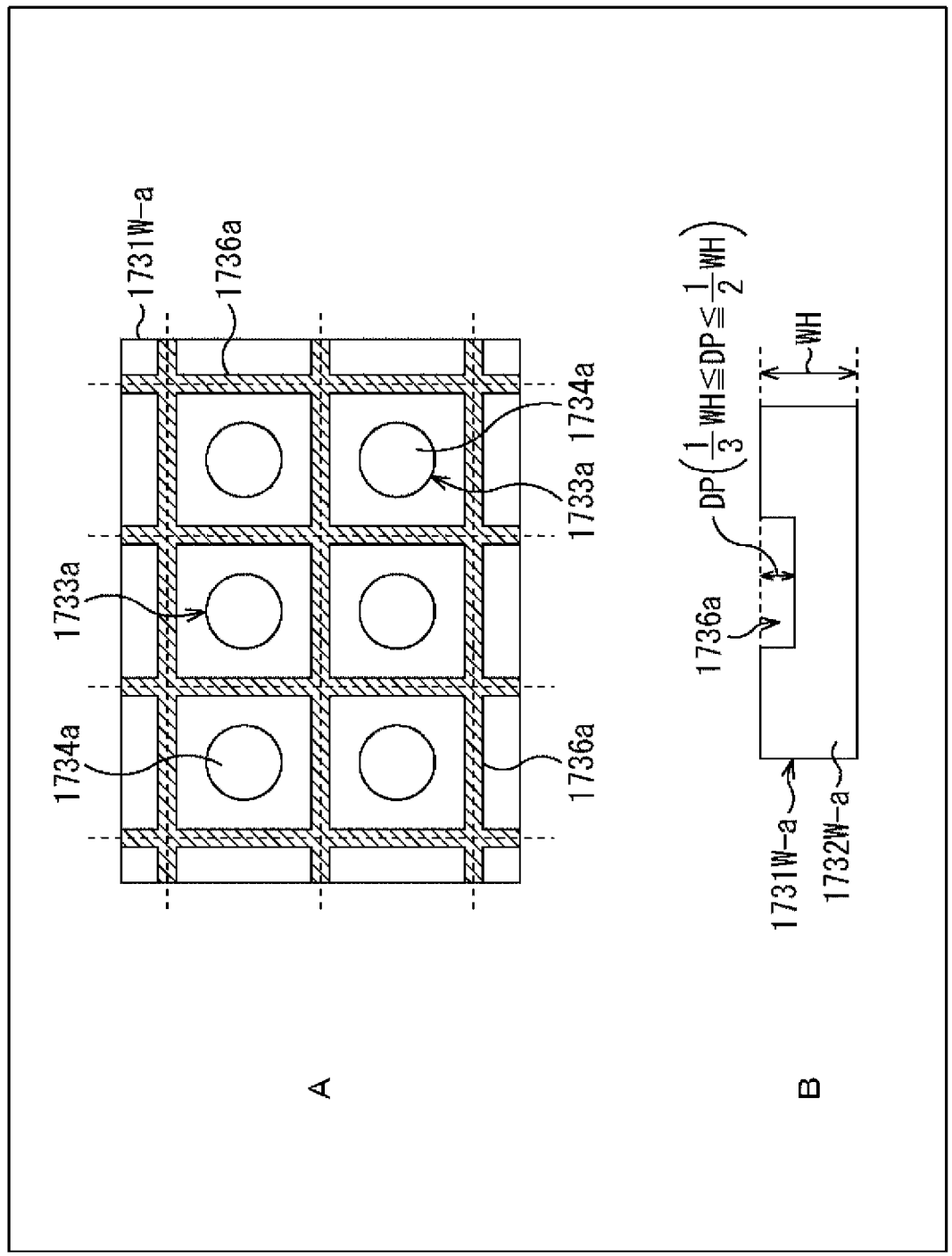
FIG. 72 illustrates figures for explaining the relationship between the width and depth of a groove and blade width.

A of FIG. 72 is a plan view illustrating positions where the grooves 1736a of the substrate with lens 1731W-a are formed. Note that A of FIG. 72 is a plan view of a part of the substrate with lens 1731W-a, and includes six lens resin portions 1734a.

As illustrated in A of FIG. 72, the grooves 1736a are formed in a grid pattern such that the dicing lines indicated by broken lines are located in the centers thereof.

In addition, as illustrated in B of FIG. 72, the depth DP of the grooves 1736a is set to be, for example, ⅓ to ½ times the thickness WH of the substrate with lens 1731W-a (the support substrate 1732W-a) (WH/3≤DP≤WH/2).

<Fourth Countermeasure Against Chipping>

Referring to FIGS. 73 to 76, a fourth countermeasure against chipping will be described below.

Figure 73:
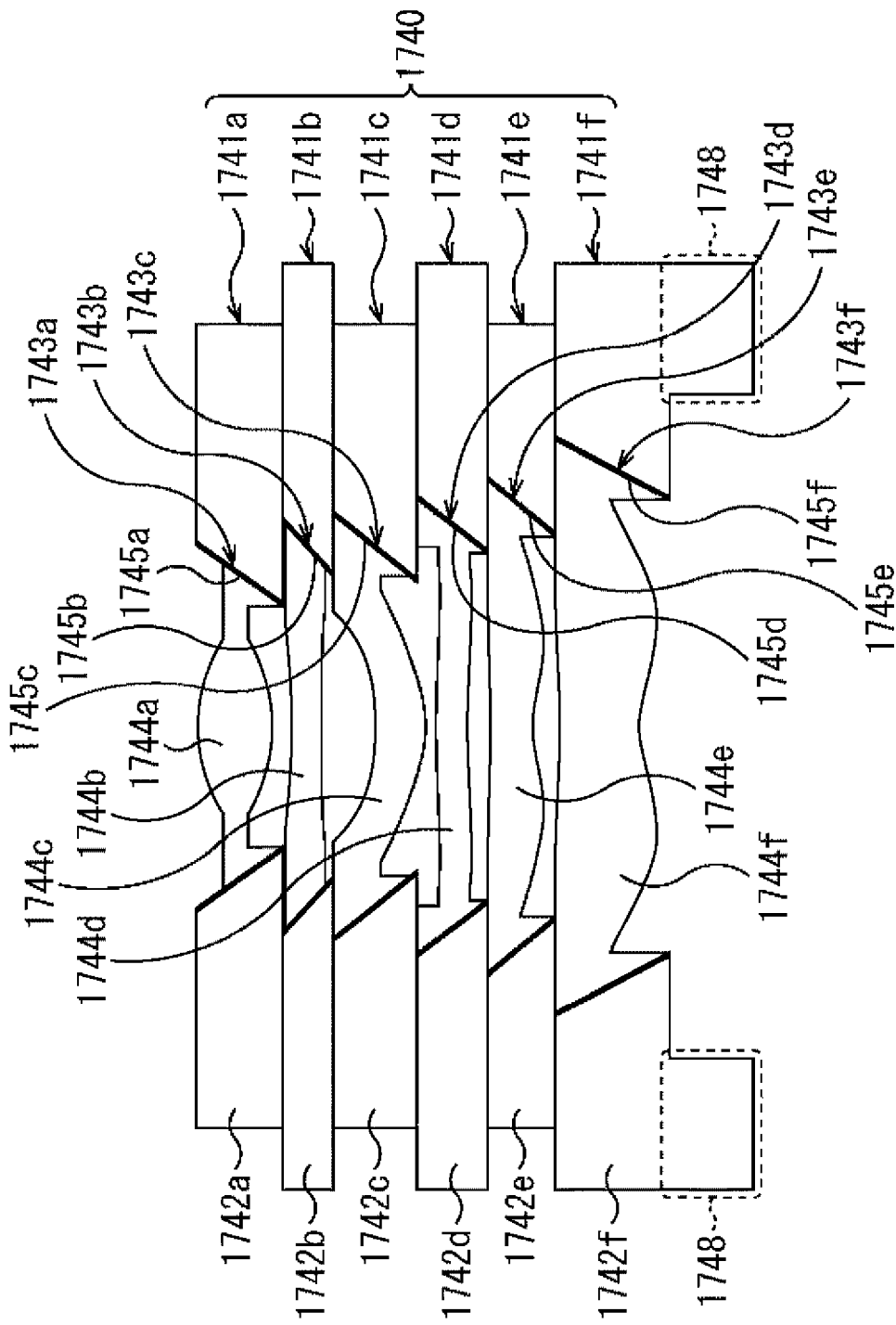
FIG. 73 is a sectional view of a laminated lens structure to which the present technology is applied.

FIG. 73 is a sectional view of a laminated lens structure 1740. Note that in FIG. 73, the parts necessary for explanation are mainly illustrated, and the parts unnecessary for explanation are appropriately omitted in the illustration.

The laminated lens structure 1740 illustrated in FIG. 73 is configured by laminating substrates with lens 1741-a to 1741-f through direct bonding.

The substrate with lens 1741a is provided with a lens resin portion 1744a inside a through-hole 1743a formed in a support substrate 1742a. A light-shielding film 1745a is formed on the side wall of the through-hole 1743a.

The substrate with lens 1741b is provided with a lens resin portion 1744b inside a through-hole 1743b formed in a support substrate 1742b. A light-shielding film 1745b is formed on the side surface of the through-hole 1743b. The same applies also to the substrates with lens 1741c to 1741f. Note that the substrate with lens 1741f is provided with leg portions 1748 for adjusting the distance (back focus) from a light-receiving element 12 (see, for example, FIG. 1) which is not illustrated.

Where the substrates with lens 1741a to 1741f need not be distinguished individually, they will hereinafter be referred to simply as substrates with lens 1741. In addition, where the support substrates 1742a to 1742f need not be distinguished individually, they will be referred to simply as support substrates with lens 1742. The same applies also to the lens resin portions 1744a to 1744f, the through-holes 1743a to 1743f, and the light-shielding films 1745a to 1745f.

In the laminated lens structure 1740, the size in a plane direction (in the figure, the left-right direction) of the substrates with lens 1741a to 1741f (the support substrates 1742a to 17420 in odd-numbered layers is different from that in even-numbered layers, so that side surfaces of the laminated lens structure 1740 have a projected and recessed structure.

More specifically, as counted from the light incidence side, the substrate with lens 1741a in the first layer, the substrate with lens 1741c in the third layer, and the substrate with lens 1741e in the fifth layer have a common horizontal width. The substrate with lens 1741b in the second layer, the substrate with lens 1741d in the fourth layer, and the substrate with lens 1741f in the sixth layer have a common horizontal width. In addition, the horizontal width of the substrate with lens 1741a in the first layer, the substrate with lens 1741c in the third layer and the substrate with lens 1741e in the fifth layer is smaller than the horizontal width of the substrate with lens 1741*b* in the second layer, the substrate with lens 1741*d* in the fourth layer and the substrate with lens 1741*f* in the sixth layer.

Figure 74:
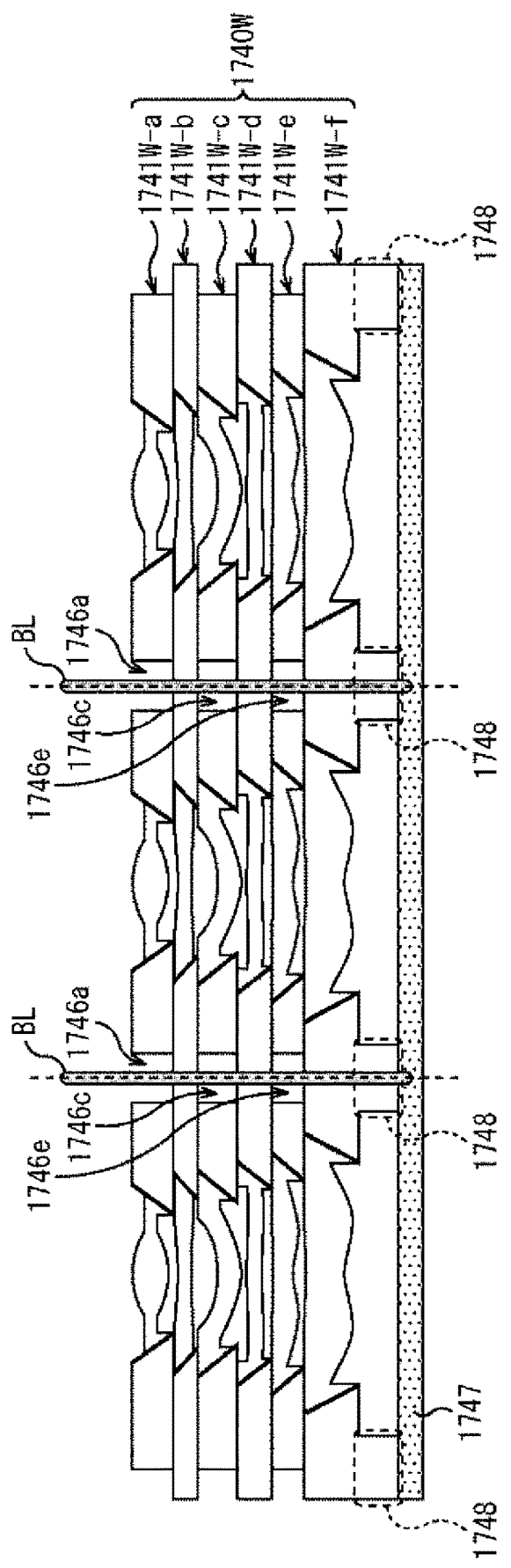
FIG. 74 is a sectional view of a substrate state before individualization of the laminated lens structure of FIG. 73.

FIG. 74 is a sectional view of a laminated lens structure 1740W in a substrate state, before the individualization of the laminated lens structure 1740 of FIG. 73.

In the laminated lens structure 1740W in the substrate state, substrates with lens in odd-numbered layers, namely, a substrate with lens 1741W-a in the first layer, a substrate with lens 1741W-c in the third layer and a substrate with lens 1741W-e in the fifth layer, have through grooves 1746*a*, 1746*c*, and 1746*e* respectively at positions of dicing lines indicated by broken lines. The through grooves 1746*a*, 1746*c* and 1746*e* are grooves which penetrate support substrates 1742W-a, 1742W-c and 1742W-f, respectively.

A protective tape 1747 is adhered to a lower surface of the substrate with lens 1741W-f in the sixth layer, which is the lowermost layer of the laminated lens structure 1740W in the substrate state.

The laminated lens structure 1740W in the substrate state formed in this way is individualized along the dicing lines by a blade BL, resulting in that the side surfaces of the laminated lens structure 1740 after individualization have the projected and recessed structure, as illustrated in FIG. 73.

The substrates with lens in even-numbered layers, namely, the substrate with lens 1741W-b in the second layer, the substrate with lens 1741W-d in the fourth layer and the substrate with lens 1741W-f in the sixth layer are not formed with through grooves at the section portions illustrated in FIG. 74, but they are formed with through grooves in regions different from those in the substrates with lens 1741W in the odd-numbered layer.

Figure 75:
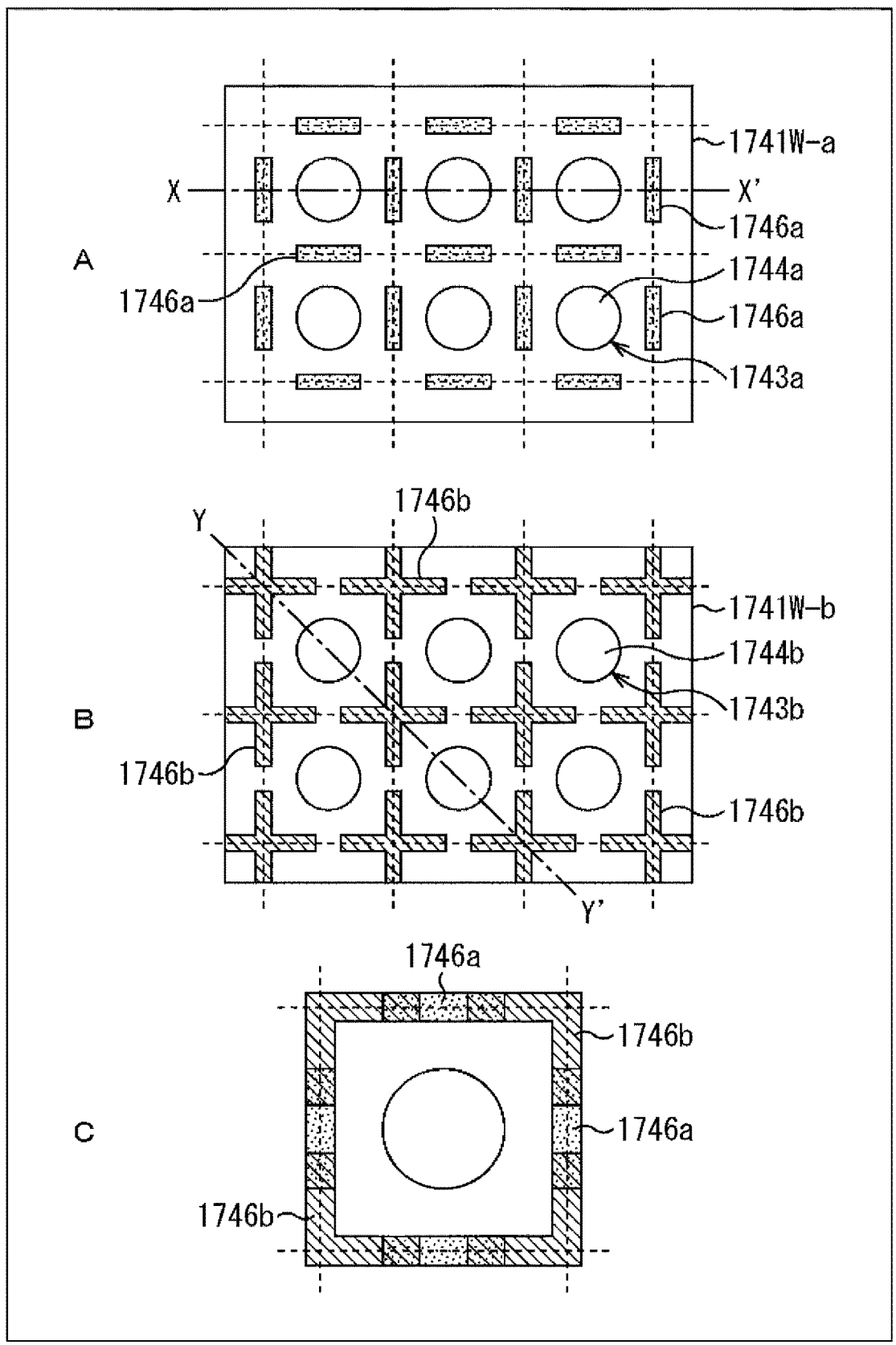
FIG. 75 illustrates plan views of substrates with lens in an odd-numbered layer and an even-numbered layer.

In view of this, a plan view of the substrate with lens 1741W-a in the first layer, which is an odd-numbered layer, and a plan view of the substrate with lens 1741W-b in the second layer, which is an even-numbered layer, are illustrated in FIG. 75.

A of FIG. 75 is a plan view of the substrate with lens 1741W-a in the first layer, which is an odd-numbered layer, and B of FIG. 75 is a plan view of the substrate with lens 1741W-b in the second layer, which is an even-numbered layer. Note that in either of A and B of FIG. 75, only a partial region of the substrate with lens 1741W is illustrated.

In the substrate with lens 1741W-a in the first layer, as illustrated in A of FIG. 75, the through grooves 1746*a* are formed in other parts than the vicinities of intersection parts of rectangles partitioned by the dicing lines, of the dicing lines in a grid pattern indicated by broken line (the other parts will hereinafter be referred to as straight-line regions in the middle between intersection parts). The same applies also to through grooves in substrates with lens 1741W in the other odd-numbered layers, namely, the through grooves 1746*c* in the substrate with lens 1741W-c in the third layer, and the through grooves 1746*e* in the substrate with lens 1741W-e in the fifth layer.

Note that the sectional view of the laminated lens structure 1740W illustrated in FIG. 74 corresponds to a sectional view taken along line X-X' of A of FIG. 75.

On the other hand, in the through grooves 1746*b* in the substrate with lens 1741W-b in the second layer, which is an even-numbered layer, as illustrated in B of FIG. 75, the through grooves 1746*b* are formed in parts (hereinafter referred to as intersection vicinity regions inclusive of intersection parts) in the vicinities of intersection parts of rectangles partitioned by the dicing lines, of the dicing lines in a grid pattern indicated by broken line. The same applies also to the substrate with lens 1741W in the other even-numbered layers.

Figure 76:
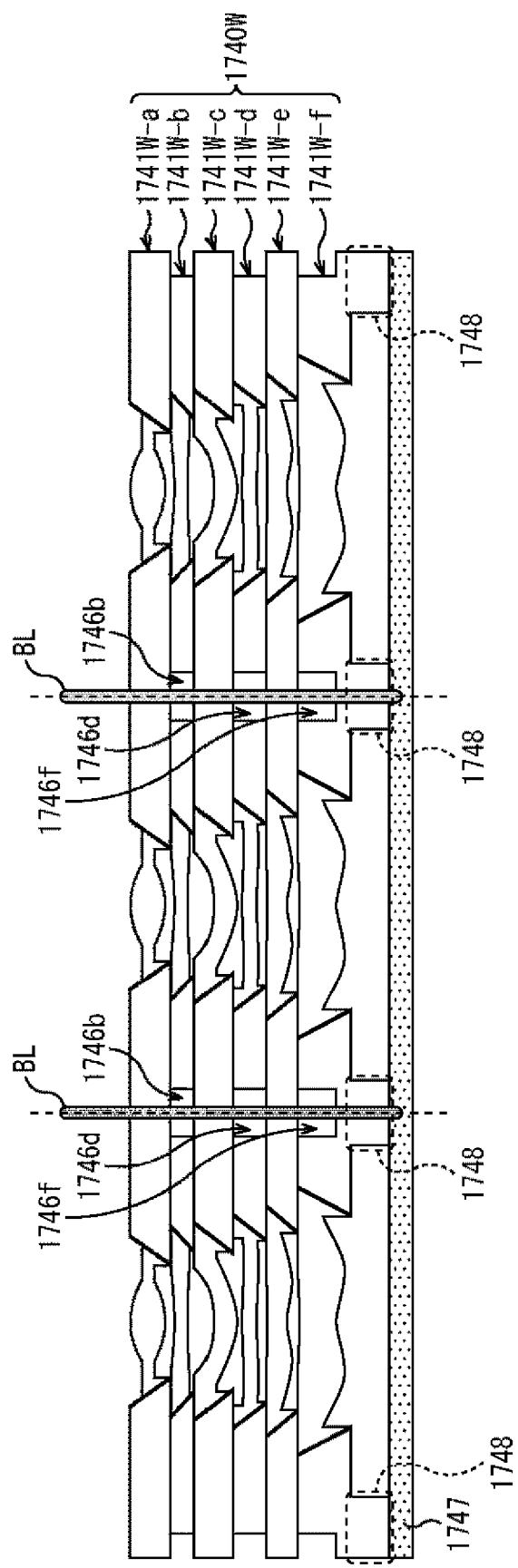
FIG. 76 is a sectional view of a substrate state before individualization of the laminated lens structure of FIG. 73.

A sectional view taken along line Y-Y' of B of FIG. 75 is as illustrated in FIG. 76. The substrate with lens 1741W-b in the second layer is formed with the through grooves 1746*b*, and the substrate with lens 1741W-d in the fourth layer is formed with the through grooves 1746*d*. In the substrate with lens 1741W-f in the sixth layer, a recessed structure provided with leg portions 1748 is adopted, and, therefore, grooves 1746*f* are formed in place of through grooves; however, in the case where the leg portions 1748 are not provided, through grooves may be adopted.

C of FIG. 75 is a figure illustrating one of the rectangles partitioned by the dicing lines, in a state in which the through grooves 1746*a* in the first layer and the through grooves 1746*b* in the second layer are superimposed on each other.

The laminated lens structure 1740W illustrated in FIG. 74 can be produced in the same manner as the method of manufacturing the laminated lens structure 1601 described referring to FIGS. 64 to 66. In addition, as has been described referring to A of FIG. 68, the through-holes 1743 and the through grooves 1744 can also be formed simultaneously. The relation between the width of the through grooves 1744 and the width of the blade BL is the same as the relation between the width SL_W of the groove (slit) 1736 and the blade width BL_W which has been described referring to FIG. 71.

According to the laminated lens structure 1740W in the substrate state configured in this way, the through grooves 1746 are alternately formed on the dicing lines of the plurality of substrates with lens 1741W laminated; therefore, the number of the substrates needing dicing is smaller than the number of the substrates laminated, so that the load on the blade BL at the time of individualization by blade dicing can be reduced. As a result, chipping can be prevented.

Note that in the aforementioned example, in the substrates with lens 1741W in the odd-numbered layers, the through grooves 1746 are formed in the straight-line regions in the middle between the intersection parts of the rectangles partitioned by the dicing lines, whereas in the substrates with lens 1741W in the even-numbered layers, the through grooves 1746 are formed in the intersection vicinity regions inclusive of the intersection parts of the rectangles partitioned by the dicing lines; however, the layout of the through grooves 1746 in the odd-numbered layers and that in the even-numbered layers may be reversed. Specifically, in the substrates with lens 1741W in the odd-numbered layers, the through grooves 1746 may be formed in the regions inclusive of the intersection parts of the rectangles partitioned by the dicing lines, whereas in the substrates with lens 1741W in the even-numbered layers, the through grooves 1746 may be formed in the straight-line regions in the middle between the intersection parts of the rectangles partitioned by the dicing lines.

Note that the application of the aforementioned first to fourth countermeasures against chipping is not limited to the application to the laminated lens structure, and the countermeasures are applicable also to a case of manufacturing a semiconductor device by laminating support substrates and cutting the laminated body. For example, the countermeasures can be applied to a case where a substrate on which a plurality of pixel array parts are disposed and a substrate on which a plurality of control circuits for controlling the pixel array parts and the like purposes are disposed are laminated, and the laminated body is cut to manufacture a solid-state imaging device in which the pixel substrate and the control substrate are laminated.

In addition, for example, in the first or second countermeasure against chipping, in the case where a plurality of patterns of predetermined circuit or component part are disposed on a support substrate, it is sufficient that grooves surrounding the periphery of each pattern are formed on the inside of regions surrounded by dicing lines.

<Countermeasure Against Cracks>

A structure in the case where great importance is attached to a countermeasure against cracks will be described below.

According to the aforementioned first to fourth countermeasures against chipping, it is possible to prevent chipping but the countermeasures are insufficient as a countermeasure against cracks. For example, when the camera module is put to a module dropping test, cracks may be generated in the silicon substrate, lowering the quality of the module.

In view of this, a laminated lens structure that has a countermeasure against cracks together with a countermeasure against chipping will be described below.

Figure 77:
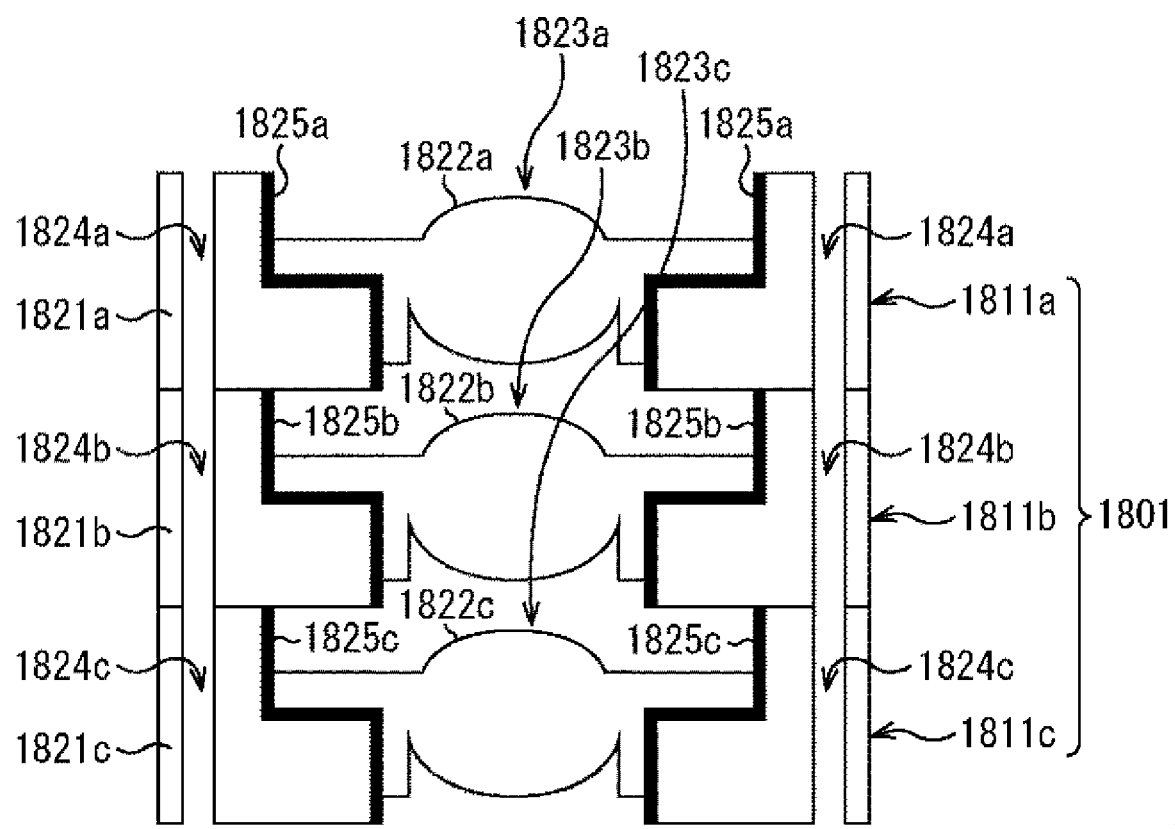
FIG. 77 is a schematic view of a section of a laminated lens structure to which the present technology is applied.

FIG. 77 is a schematic view of a section of a laminated lens structure 1801 to which the present technology is applied. In FIG. 77, the parts necessary for explanation are mainly illustrated, and the parts unnecessary for explanation are appropriately omitted in the illustration.

In the laminated lens structure 1801, substrates with lens 1811a to 1811c are laminated in three layers. A lens resin portion 1822a is formed inside a through-hole 1823a in a support substrate 1821a of the substrate with lens 1811a. A light-shielding film 1825a is formed on the side wall of the through-hole 1823a. Through grooves 1824a that penetrate the support substrate 1821a are formed in the vicinity of an outer circumference of the support substrate 1821a.

The substrates with lens 1811b and 1811c have the same or similar structure to that of the substrate with lens 1811a, and description thereof is omitted. Note that while an example in which the lens resin portions 1822a to 1822c are the same in shape is illustrated in FIG. 77 for simplification of the drawing, the shapes of the lens resin portions 1822a to 1822c can be set arbitrarily.

Where the substrates with lens 1811a to 1811c need not be distinguished individually, they will hereinafter be referred to simply as substrates with lens 1811. Where the support substrates 1821a to 1821c need not be distinguished individually, they will hereinafter be referred to simply as support substrates 1821. Where the lens resin portions 1822a to 1822c need not be distinguished individually, they will hereinafter be referred to simply as lens resin portions 1822. Where the through-holes 1823a to 1823c need not be distinguished individually, they will hereinafter be referred to simply as through-holes 1823. Where the through grooves 1824a to 1824c need not be distinguished individually, they will hereinafter be referred to simply as through grooves 1824.

In this way, in the laminated lens structure 1801, the substrates with lens 1811 each having the lens resin portion 1822 (lens 21) disposed inside the through-hole 1823 formed in the support substrate 1821 are laminated in the state of being bonded by direct bonding. In addition, each of the substrates with lens 1811 of the laminated lens structure 1801 is provide with the through grooves 1824 penetrating the support substrate 1821, in the vicinity of the outer circumference thereof.

<Method of Manufacturing Laminated Lens Structure 1801>

Referring to FIGS. 78 to 81, a method of manufacturing the laminated lens structure 1801 will be described below. Note that in the following, the steps related to the countermeasure against cracks will be mainly described. The steps descriptions of which are omitted are basically the same as aforementioned steps.

Figure 78:
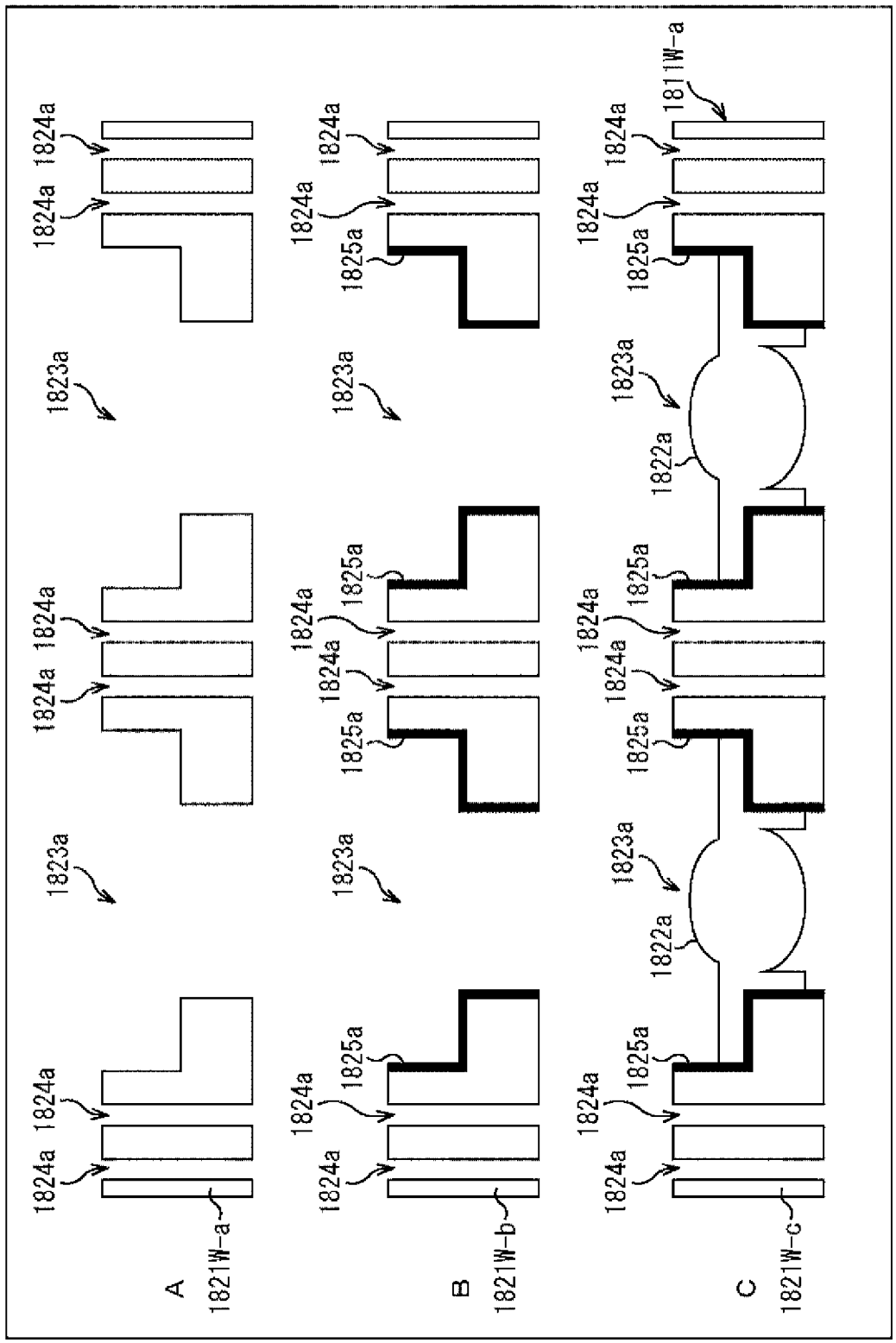
FIG. 78 illustrates figures for explaining a method of manufacturing the laminated lens structure of FIG. 77.

First, as illustrated in A of FIG. 78, a support substrate 1821W-a in a substrate state is formed with a plurality of through-holes 1823a. In addition, through grooves 1824a are formed on the outside of each through-hole 1823a. As a method for processing the through-holes 1823a and the through grooves 1824a, there can be used, for example, the aforementioned methods such as dry etching and wet etching. The processing of the through-holes 1823a and the processing of the through grooves 1824a may be conducted simultaneously or may be performed in an arbitrary order.

Besides, while only two through-holes 1823a are illustrated in FIG. 78 as space is limited, a multiplicity of through-holes 1823a are in practice formed in plane directions of the support substrate 1821W-a.

Figure 79:
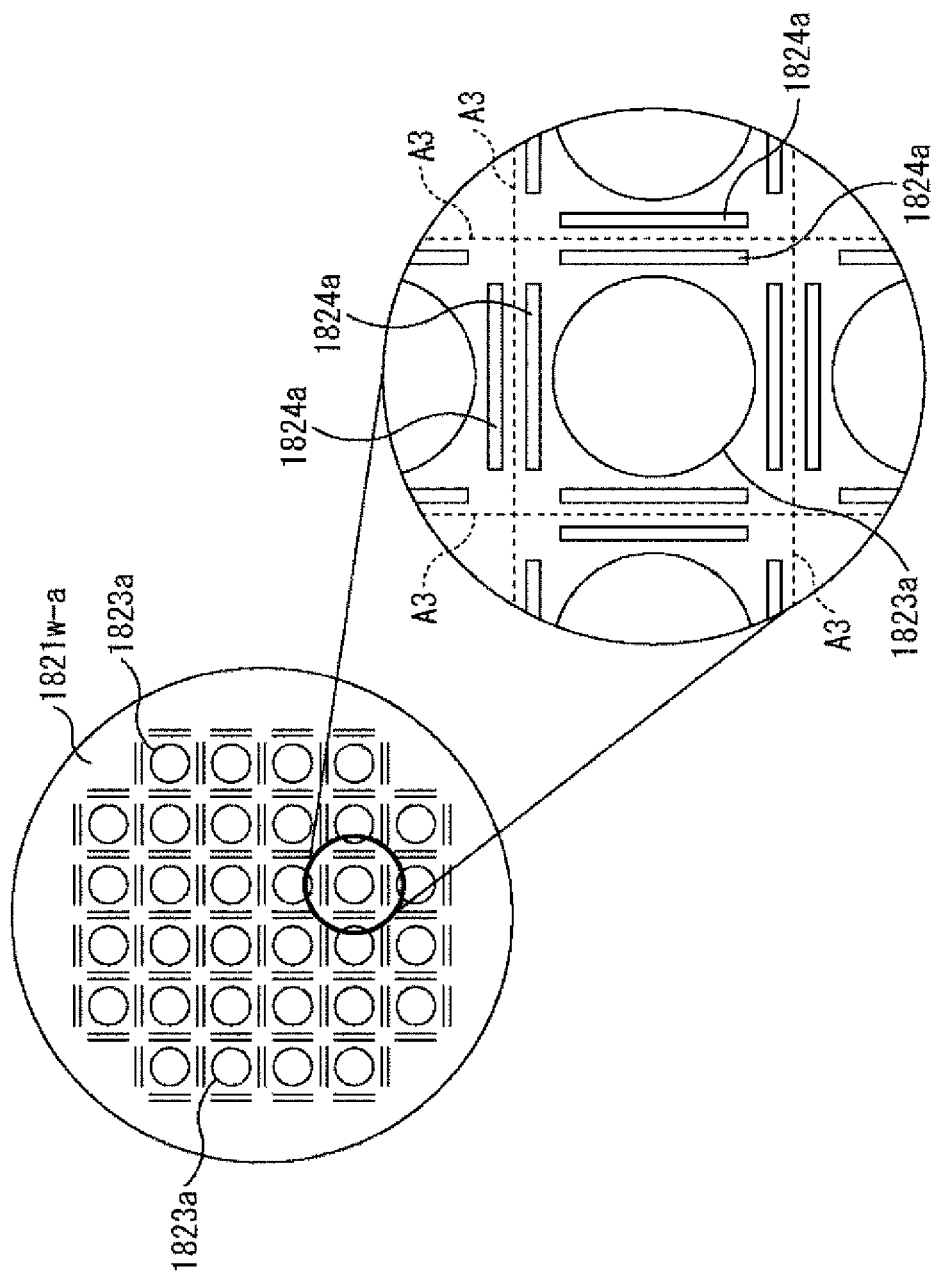
FIG. 79 is a figure for explaining the method of manufacturing the laminated lens structure of FIG. 77.

FIG. 79 is a plan view of the support substrate 1821W-a in a substrate step in the step illustrated in A of FIG. 78.

The through grooves 1824a are formed on both sides of the dicing line A3 in parallel to the dicing line A3 so that the dicing line A3 is interposed between the through grooves 1824a. In an individualized state, the through grooves 1824a are each disposed on the inside of the dicing line A3. The through grooves 1824a are not formed in the parts where the dicing lines A3 intersect. As a result, in the laminated lens structure 1801 after individualized, the through grooves 1824a are independently disposed rectilinearly at four parts along the four sides of the outer circumference of the rectangle, and are not disposed in the corners of the rectangle.

Note that while the plan-view shape of the through groove 1824a is a rectilinear shape parallel to the dicing line A3, the shape may be, for example, a circular shape along the circular through-hole 1823a.

Returning to FIG. 78, as illustrated in B of FIG. 78, a light-shielding film 1825a is formed on the side wall of each through-hole 1823a.

Next, as illustrated in C of FIG. 78, a lens resin portion 1822a is formed in each through-hole 1823a, by aforementioned method in which the resin for forming a lens is clamped between the upper mold and the lower mold.

In this way, a substrate with lens 1811W-a in a substrate state is produced. In addition, by the same or similar step, substrates with lens 1811W-b and 1811W-c in a substrate state are formed.

Figure 80:
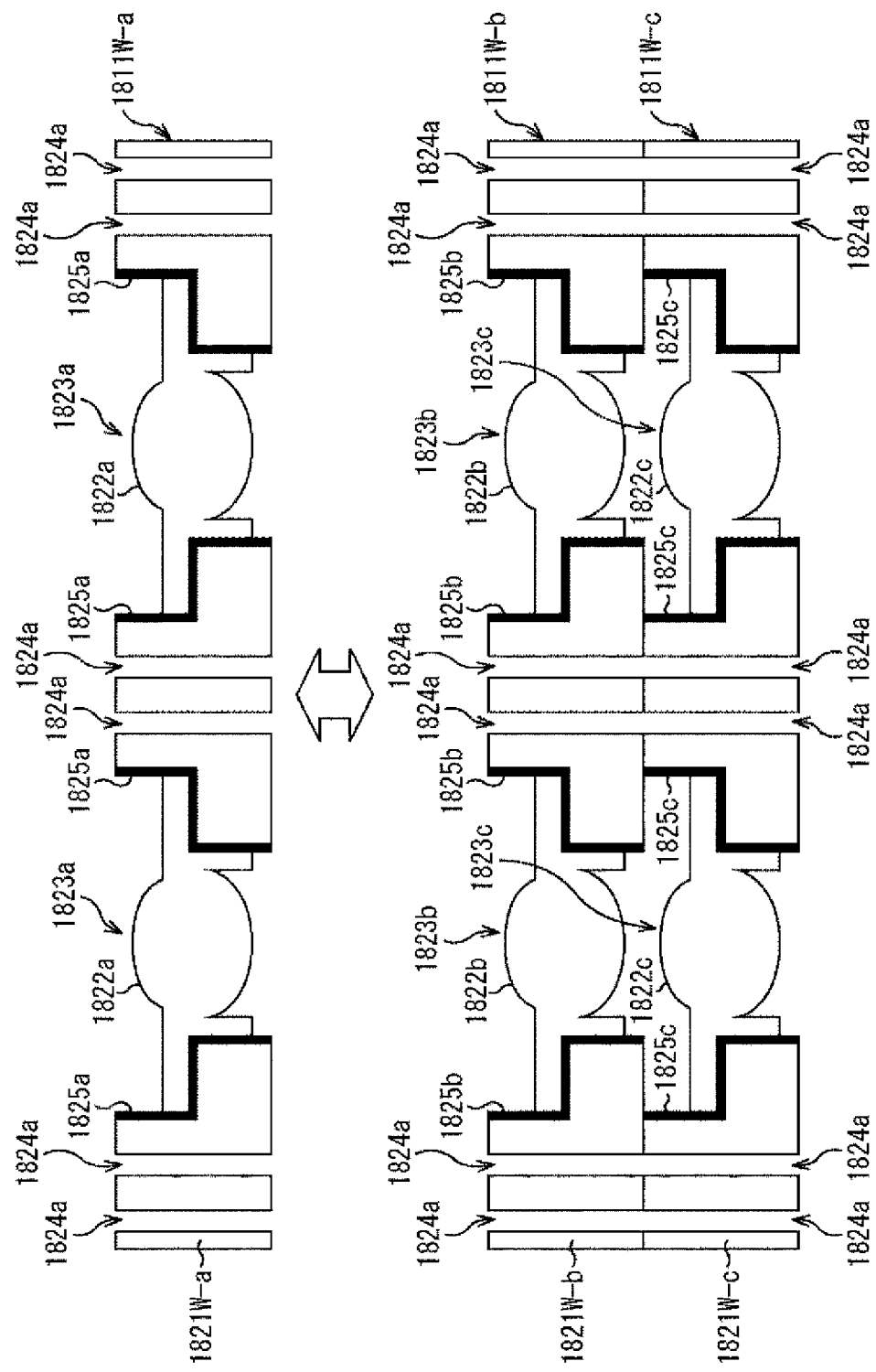
FIG. 80 is a figure for explaining the method of manufacturing the laminated lens structure of FIG. 77.

Subsequently, as illustrated in FIG. 80, the substrates with lens 1811W-a to 1811W-c are laminated by the aforementioned direct bonding, to produce a laminated lens structure 1801W in a substrate state. In the laminated lens structure 1801W, the through grooves 1824a to 1824c in the substrates with lens 1811W-a to 1811W-c are substantially in register in the vertical direction. The through grooves 1824a to 1824c may be in a tapered shape or a reversely tapered shape in which the opening width at the substrate upper surface and the opening width at the substrate lower surface are different, like the through grooves 151 illustrated in B of FIG. 22.

Figure 81:
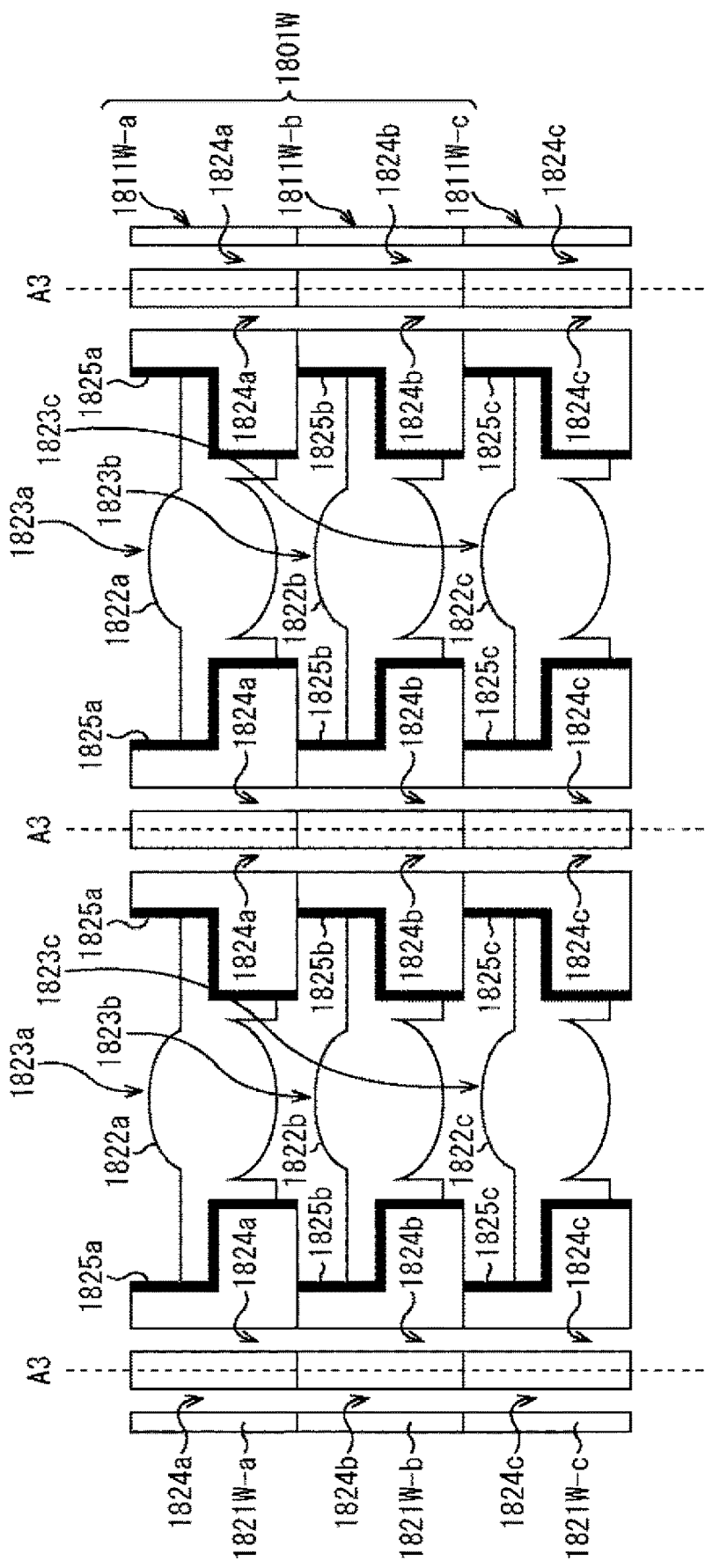
FIG. 81 is a figure for explaining the method of manufacturing the laminated lens structure of FIG. 77.

Next, as illustrated in FIG. 81, the laminated lens structure 1801W in the substrate state is individualized on a chip basis by use of a blade or laser or the like, to obtain a plurality of laminated lens structures 1801. In this instance, as illustrated in FIG. 81, the regions between the adjacent through grooves 1824a, between the adjacent through grooves 1824b, and between the adjacent through grooves 1824c are cut along the dicing lines A3. As a result, the laminated lens structure 1801 after individualized illustrated in FIG. 77 is completed.

Note that in the example of the producing method aforementioned, the through grooves 1824 are formed on the basis of each substrate with lens 1811 and thereafter the substrates with lens 1811W-a to 1811W-c are laminated by direct bonding; however, a process may be adopted in which the substrates with lens 1811W-a to 1811W-c are laminated without forming them with the through grooves 1824, and thereafter the plurality of substrates with lens 1811W-a to 1811W-c are simultaneously formed with the through grooves 1824.

Not only the aforementioned dry etching and wet etching but also laser, mechanical processing and the like may be used to form the through grooves 1824.

According to the structure of the laminated lens structure 1801 illustrated in FIG. 77, the rectilinear through grooves 1824 extending along the dicing lines are provided in the vicinities of the dicing lines, whereby it is ensured that even if a crack is generated upon a shock such as dropping, the through grooves 1824 can prevent the cracking from proceeding.

Note that the through grooves 1824 are not formed in the intersection parts of the dicing lines, in other words, in the corners of the laminated lens structures 1801 after individualized; since the crystal orientation of silicon proceeds only in a transverse direction, there is no possibility of cracking of the four corner parts corresponding to diagonal directions.

Therefore, according to the structure of the laminated lens structure 1801, cracking can be prevented. In addition, since the through grooves 1824a to 1824c have such shapes as to serve also as the aforementioned grooves 1424a to 1424c, chipping can also be prevented.

In a camera module 1 adopting the structure of the laminated lens structure 1801, also, generation of cracking or chipping is restrained, so that enhanced quality can be expected.

<First Modification>

FIG. 82 is a schematic view of a section illustrating a first modification of the laminated lens structure 1801 of FIG. 77 provided with the countermeasure against cracking.

In regard of the first modification illustrated in FIG. 82, only the parts differing from the structure illustrated in FIG. 77 will be described.

In the structure of the laminated lens structure 1801 illustrated in FIG. 77, the inside of the through groove 1824 has not been filled with anything but has been left as an air gap (cavity).

On the other hand, in the first modification illustrated in FIG. 82, a resin 1841 is placed to fill the inside of the through groove 1824. More specifically, resins 1841a to 1841c are placed to fill up the through grooves 1824a to 1824c, respectively.

The material of the resin 1841 place to fill the inside of the through grooves 1824 is not particularly limited. The material of the resin 1841 may be the same as the material of the lens resin portions 1822, but is preferably a material lower in modulus of elasticity than the material of the lens resin portions 1822.

The through grooves 1824 left as air gap or filled with the resin 1841 produce an action or effect of reducing the stress on the substrates with lens 1811a to 1811c and restraining substrate warping.

A method of manufacturing the first modification of the laminated lens structure 1801 may be a method in which a step of filling the inside of the through grooves 1824 with a predetermined resin 1841 is added to an arbitrary step in the method of manufacturing the laminated lens structure 1801 which has been described referring to FIGS. 78 to 81. In the case of forming the resin 1841 simultaneously with the step of forming the lens resin portion 1822, the laminated lens structure 1801 of the first modification can be produced without increasing the number of steps.

<Second Modification>

Figure 83:
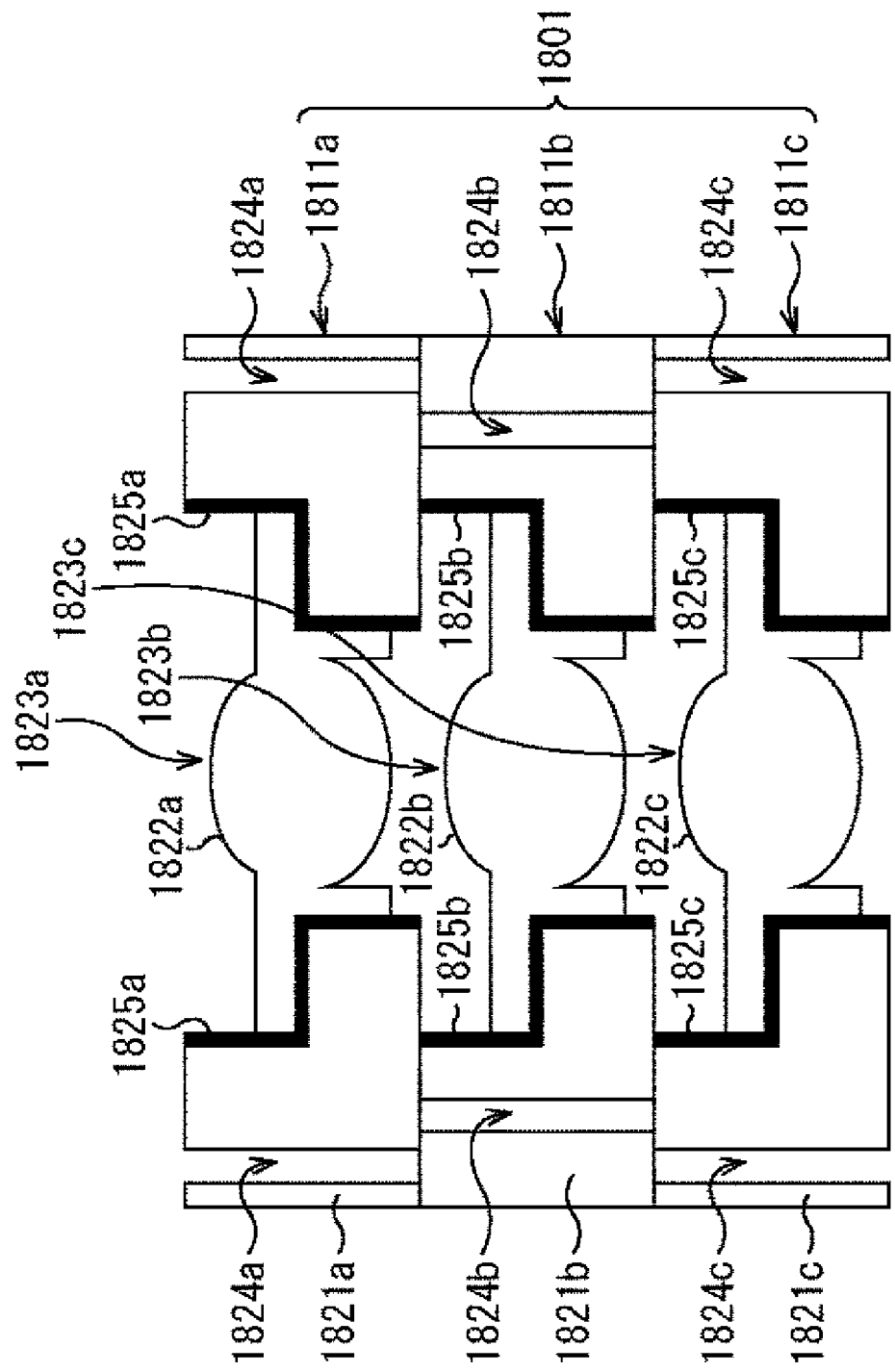
FIG. 83 is a schematic view of a section illustrating a second modification of the laminated lens structure of FIG. 77.

FIG. 83 is a schematic view of a section illustrating a second modification of the laminated lens structure 1801 of FIG. 77 provided with the countermeasure against cracking.

In regard of the second modification of FIG. 83, only the parts differing from the structure illustrated in FIG. 77 will be described.

In the structure of the laminated lens structure 1801 illustrated in FIG. 77, the through grooves 1824a to 1824c in the substrates with lens 1811a to 1811c have been formed at the same positions in terms of positions in plane directions.

On the other hand, in the second modification illustrated in FIG. 83, the through grooves 1824 in the substrates with lens 1811 are formed at such positions in plane directions that they in the vertically adjacent substrate with lens 1811 are not in register but are deviated from each other.

Thus, in the plurality of substrates with lens 1811 laminated, the through grooves 1824 are disposed at positions differing between the vertically adjacent substrates with lens 1811, whereby generation of a gap (space) penetrating the plurality (in the example of FIG. 83, three sheets) of substrates with lens 1811 laminated is avoided, and, therefore, sealing property can be enhanced. A resin 1841 may be placed to fill up the inside of the through grooves 1824, like in the first modification.

Figure 84:
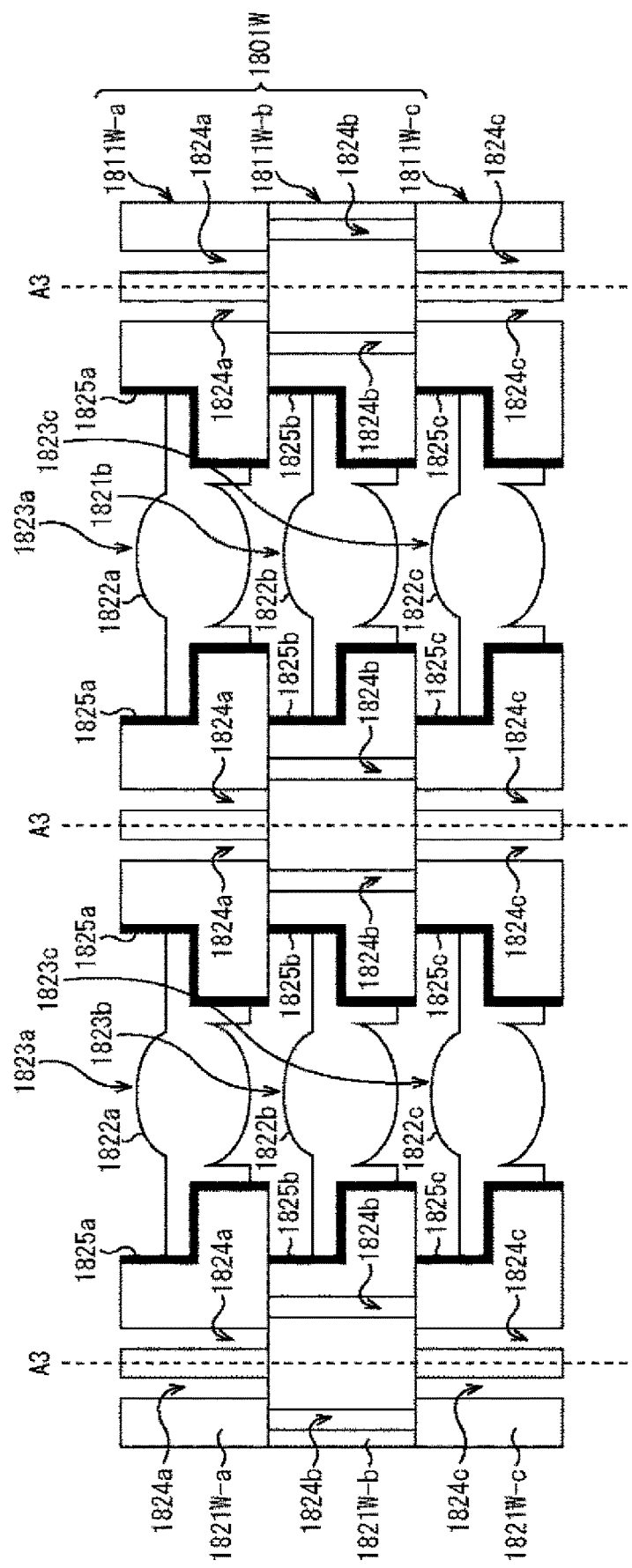
FIG. 84 is a sectional view illustrating a substrate state before individualization of the laminated lens structure of FIG. 83.

A method of manufacturing the second modification of the laminated lens structure 1801 is the same as the method of manufacturing the laminated lens structure 1801 described referring to FIGS. 78 to 81, except that the positions where the through grooves 1824a are formed differ between the substrates with lens 1811. It is to be noted, however, that since the positions of the through grooves 1824a are different between the substrates with lens 1811, it is necessary to form the through grooves 1824 on the basis of each substrate with lens 1811, and the plurality of substrates with lens 1811W cannot be simultaneously formed with the through grooves 1824. The laminated lens structure 1801W in a substrate state before individualization is as illustrated in FIG. 84.

In the first and second modifications of the laminated lens structure 1801 as above, cracking and chipping can be prevented by providing rectilinear through grooves 1824 extending along the dicing lines, in the vicinities of the dicing lines.

In addition, the through grooves 1824 reduce stress on the substrates with lens 1811a to 1811c, and, therefore, substrate warping can be restrained.

The laminated lens structures 1801 provided with the countermeasure against chipping and the countermeasure against cracking as above can be adopted as the laminated lens structures 11 in the camera modules 1 according to the first to eleventh embodiment.

Note that the application of the aforementioned countermeasure against cracking is not limited to the application to the laminated lens structure, and the countermeasure is applicable also to a case of manufacturing a semiconductor device by laminating support substrates and cutting the laminated body. For example, the countermeasure can be applied to a case where a substrate on which a plurality of pixel array parts are disposed and a substrate on which a plurality of control circuits for controlling the pixel array parts and the like purposes are laminated, and the laminated boy is cut to manufacture a solid-state imaging device in which the pixel substrate and the control substrate are laminated.

17. Example of Application to Electronic Apparatus

The aforementioned camera module 1 can be used in the state of being incorporated in an electronic apparatus using a solid-state imaging device in an image take-in section (photoelectric conversion section), such as imaging apparatuses such as digital still cameras, video cameras, etc., potable terminal apparatuses having an imaging function, and copiers using a solid-state imaging device in an image reading section.

Figure 85:
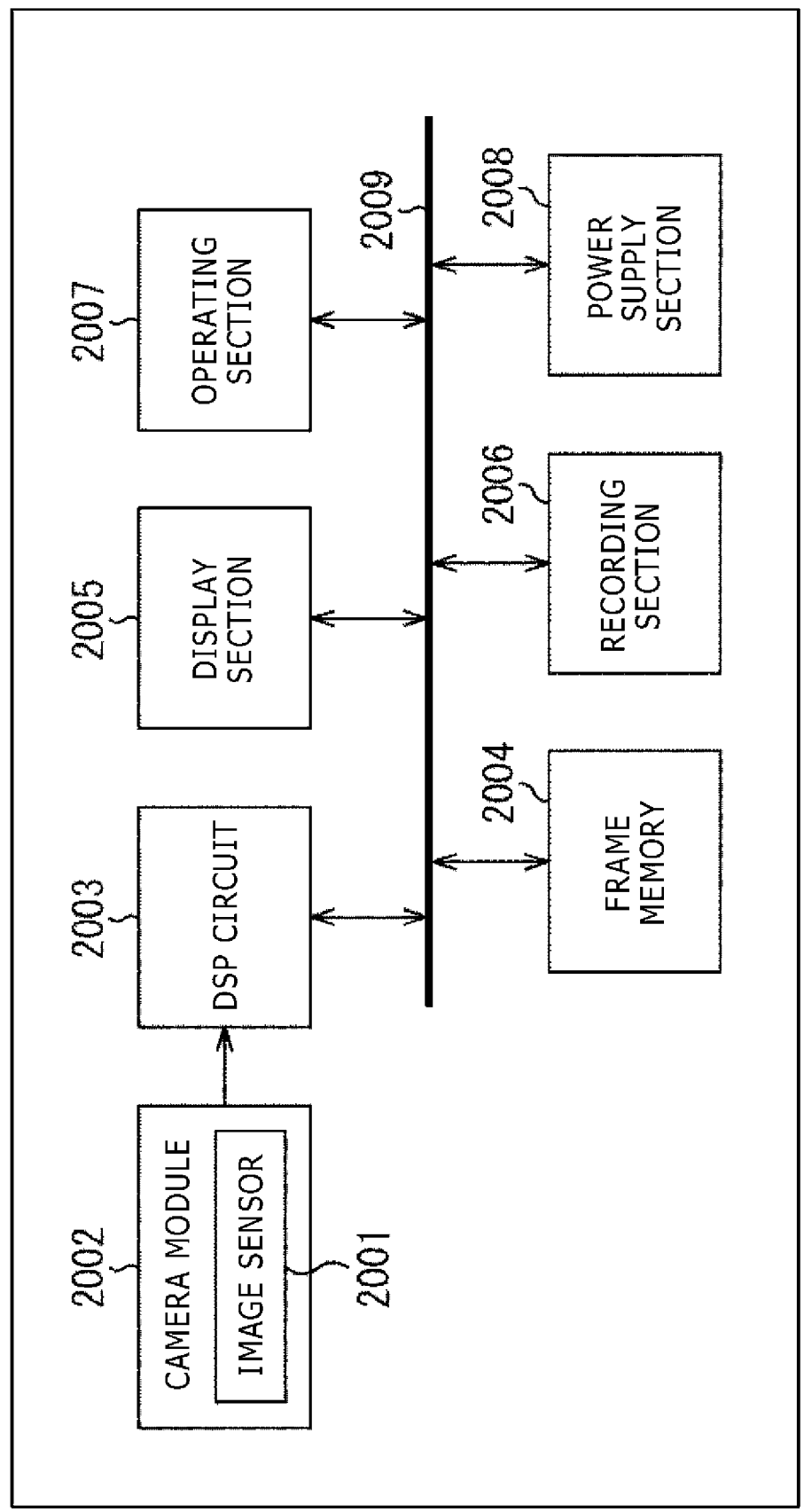
FIG. 85 is a block diagram illustrating a configuration example of an imaging apparatus as an electronic apparatus to which the present technology is applied.

FIG. 85 is a block diagram illustrating a configuration example of an imaging apparatus as an electronic apparatus to which the present technology is applied.

An imaging apparatus 2000 of FIG. 85 includes a camera module 2002, and a DSP (Digital Signal Processor) circuit 2003 which is a camera signal processing circuit. In addition, the imaging apparatus 2000 also includes a frame memory 2004, a display section 2005, a recording section 2006, an operating section 2007, and a power supply section 2008. The DSP circuit 2003, the frame memory 2004, the display section 2005, the recording section 2006, the operating section 2007 and the power supply section 2008 are interconnected through a bus line 2009.

An image sensor 2001 in the camera module 2002 takes in incident light (image light) from a subject to form an image on an imaging surface, converts the quantity of light of the incident light of the image into an electrical signal on a pixel basis, and outputs the signal as an image signal. The aforementioned camera module 1 is adopted as the camera module 2002, and the image sensor 2001 corresponds to the aforementioned light-receiving element 12. The image sensor 2001 receives light having passed through each lens 21 of the optical unit 13 of the laminated lens structure 11 of the camera module 2002, and outputs an image signal.

The display section 2005 is composed, for example, of a panel type display such as a liquid crystal panel or an organic EL (Electro Luminescence) panel, and displays a video image or still image picked up by the image sensor 2001. The recording section 2006 records the video image or still image picked up by the image sensor 2001 on or in a recording medium such as a hard disk or a semiconductor memory.

The operating section 2007 issues operational commands in regard of various functions possessed by the imaging apparatus 2000, under an operation by a user. The power supply section 2008 appropriately supply the DSP circuit 2003, the frame memory 2004, the display section 2005, the recording section 2006 and the operating section 2007 with various power supplies serving as operation power supplies for these components to be supplied with power.

By use of the camera module 1 in which the laminated lens structure 11 highly accurately positioned and bonded (laminated) is mounted as a camera module 2002 as aforementioned, it is possible to realize a high image quality and downsizing. Therefore, it is possible realize both downsizing of semiconductor packages and enhancement of image quality of picked-up images, also in the imaging apparatus 2000 such as camera module for video cameras, digital still cameras, and, further such mobile apparatuses as mobile phones.

18. Example of Application to Body Internal Information Acquisition System

The technology according to the present disclosure (the present technology) is applicable to a variety of products. For example, the technology according to the present disclosure may be applied to a body internal information acquisition system for a patient in which a capsule type endoscope is used.

Figure 86:
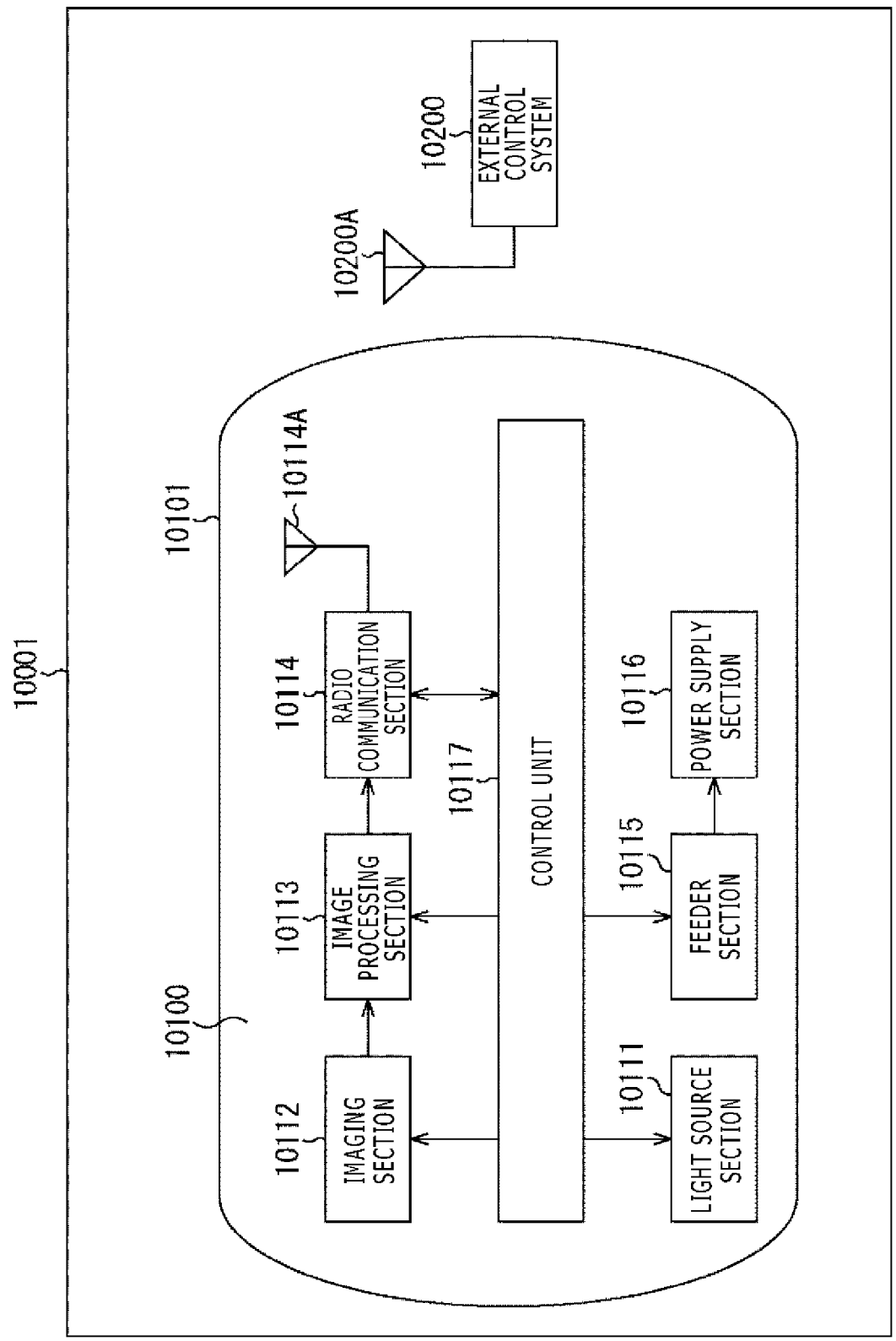
FIG. 86 is a block diagram illustrating an example of a general configuration of a body internal information acquisition system.

FIG. 86 is a block diagram illustrating an example of general configuration of a body internal information acquisition system for a patient in which a capsule type endoscope is used and to which the technology according to the present disclosure (the present technology) can be applied.

The body internal information acquisition system 10001 is composed of a capsule type endoscope 10100 and an external control system 10200.

The capsule type endoscope 10100 is swallowed by the patient at the time of examination. The capsule type endoscope 10100 has an imaging function and a radio communication function. Until spontaneous passage from the patient, while being moved inside organs such as stomach and intestines by peristalsis or the like, the capsule type endoscope 10100 sequentially picks up images of the inside of the organs (hereinafter referred to also as internal image) at predetermined intervals, and sequentially radio-transmits information on the internal image to the external control system 10200 in the exterior of the body.

The external control system 10200 controls the operations of the body internal information acquisition system 10001 in an integrated manner. In addition, the external control system 10200 receives information on the internal image transmitted from the capsule type endoscope 10100, and, based on the information on the internal image thus received, produces image data for displaying the internal image on a display device (not illustrated).

In the body internal information acquisition system 10001, in this way, the internal image obtained by imaging the state inside the patient's body can be obtained at any desired timing, during the period after the capsule type endoscope 10100 is swallowed until it is discharged.

The configurations and functions of the capsule type endoscope 10100 and the external control system 10200 will be described more in detail.

The capsule type endoscope 10100 has a capsule-shaped housing 10101, in which are accommodated a light source section 10111, an imaging section 10112, an image processing section 10113, a radio communication section 10114, a feeder section 10115, a power supply section 10116, and a control unit 10117.

The light source section 10111 is composed of a light source such as, for example, an LED (Light Emitting Diode), and emits light to an imaging visual field of the imaging section 10112.

The imaging section 10112 is composed of an imaging element, and an optical system composed of a plurality of lenses provided in front of the imaging element. Reflected light (hereinafter referred to as observation light) of light radiated onto a body tissue which is an object to be observed is condensed by the optical system, before being incident on the imaging element. In the imaging section 10112, the imaging element performs photoelectric conversion of the observation light incident thereon, to produce an image signal corresponding to the observation light. The image signal produced by the imaging section 10112 is supplied to the image processing section 10113.

The image processing section 10113 is composed of a processor such as a CPU (Central Processing Unit) and a GPU (Graphic Processing Unit), and performs various kinds of signal processing on the image signal produced by the imaging section 10112. The image processing section 10113 supplies the image signal thus processed as RAW data to the radio communication section 10114.

The radio communication section 10114 performs a predetermined processing such as modulation on the image signal processed by the image processing section 10113, and transmits the resulting image signal to the external control system 10200 through an antenna 10114A. In addition, the radio communication section 10114 receives control signals related to control of driving of the capsule type endoscope 10100 from the external control system 10200 through the antenna 10114A. The radio communication section 10114 supplies the control unit 10117 with the control signals received from the external control system 10200.

The feeder section 10115 is composed of a power-receiving antenna coil, a power regenerating circuit for regenerating electric power from an electric current generated in the antenna coil, a booster circuit, and the like. In the feeder section 10115, electric power is produced by the principle of so-called wireless charging.

The power supply section 10116 is composed of a secondary battery, and accumulates electric power produced by the feeder section 10115. While arrows and the like indicative of destinations to which electric power is supplied from the power supply section 10116 are omitted in FIG. 86 for avoiding complication of the drawing, the electric power stored in the power supply section 10116 is supplied to the light source section 10111, the imaging section 10112, the image processing section 10113, the radio communication section 10114, and the control unit 10117, to be used for driving these components.

The control unit 10117 is composed of a processor such as a CPU, and appropriately controls the driving of the light source section 10111, the imaging section 10112, the image processing section 10113, the radio communication section 10114, and the feeder section 10115, according to the control signals transmitted from the external control system 10200.

The external control system 10200 is composed of a processor such as CPU, GPU, etc. or a microcomputer or control substrate or the like on which a processor and a storage element such as memory are mounted mixedly. The external control system 10200 transmits control signals to the control unit 10117 of the capsule type endoscope 10100 through an antenna 10200A, thereby controlling the operation of the capsule type endoscope 10100. In the capsule type endoscope 10100, for example, illumination conditions for the object to be observed in the light source section 10111 can be changed according to the control signal from the external control system 10200. In addition, imaging conditions (for example, frame rate, exposure value, etc. at the imaging section 10112) can be changed according to the control signal from the external control system 10200. Besides, the contents of processing in the image processing section 10113 and/or the conditions of transmission of an image signal by the radio communication section 10114 (for example, transmission interval, number of images transmitted, etc.) may be changed according to the control signal from the external control system 10200.

In addition, the external control system 10200 applies various kinds of image processing to the image signal transmitted from the capsule type endoscope 10100, to produce image data for displaying the picked-up internal image on the display device. As the image processing, various kinds of signal processing can be performed such as, for example, development processing (demosaic processing), image quality enhancing processing (band emphasis processing, super-resolution processing, NR (Noise Reduction) processing, and/or image stabilization processing, etc.), and/or enlargement processing (electronic zooming processing), etc. The external control system 10200 controls the driving of the display device, to display the picked-up internal image on the basis of the produced image data. Alternatively, the external control system 10200 may record the produced image data on a recorder (not illustrated) or cause a printer (not illustrated) to print out the produced image data.

An example of the body internal information acquisition system to which the technology according to the present disclosure is applicable has been described above. The technology according to the present disclosure is applicable to the imaging section 10112, in the configuration described above. Specifically, the camera modules 1 according to the first to eleventh embodiments can be applied as the imaging section 10112. With the technology according to the present disclosure applied to the imaging section 10112, it is possible, while downsizing the capsule type endoscope 10100, to obtain a sharper image of the site of operation and, therefore, to enhance accuracy of examination.

19. Example of Application to Endoscopic Surgery System

The technology according to the present disclosure (the present technology) is applicable to a variety of products. For example, the technology according to the present disclosure may be applied to an endoscopic surgery system.

Figure 87:
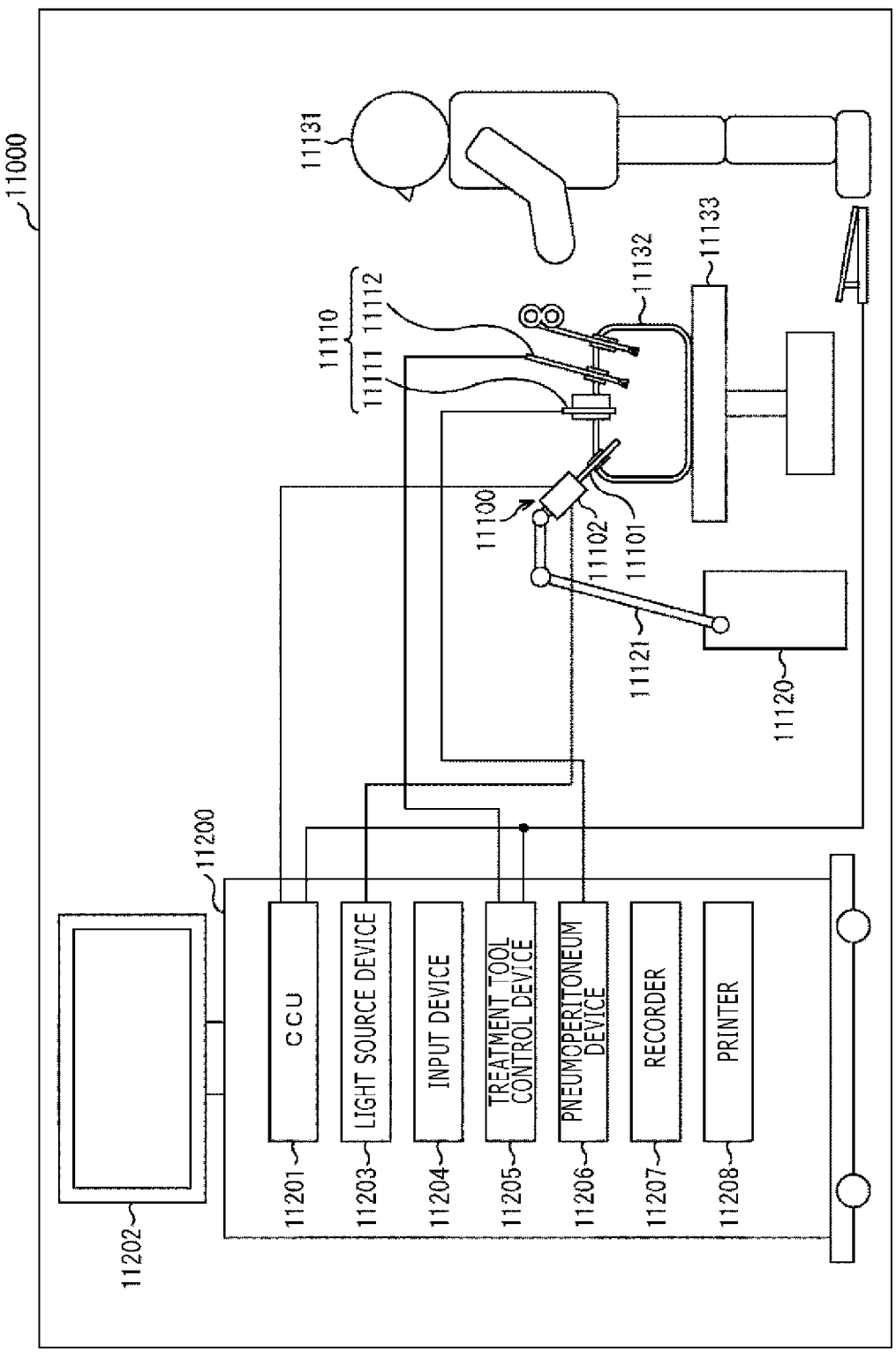
FIG. 87 is a figure illustrating an example of general configuration of an endoscopic surgery system.

FIG. 87 is a figure illustrating an example of general configuration of an endoscopic surgery system to which the technology according to the present disclosure (the present technology) is applied.

In FIG. 87, there is illustrated how a surgical operation of a patient 11132 on a patient bed 11133 is performed by an operator (surgeon) 11131 using an endoscopic surgery system 11000. As illustrated, the endoscopic surgery system 11000 is composed of an endoscope 11100, other treatment tools 11110 such as a pneumoperitoneum tube 11111, an energy treatment tool 11112, etc., a support arm device 11120 supporting the endoscope 11100, and a cart 11200 on which various devices for endoscopic surgery are mounted.

The endoscope 11100 is composed of a lens-barrel 11101 of which a region of a predetermined length from the tip is to be inserted into the body cavity of the patient 11132, and a camera head 11102 connected to the tip of the lens-barrel 11101. While the endoscope 11100 configured as a so-called rigid endoscope having a rigid lens-barrel 11101 is illustrated in the example illustrated in the figure, the endoscope 11100 may be configured as a flexible endoscope having a flexible lens-barrel.

The lens-barrel 11101 is provided at its tip with an opening in which an objective lens is fitted. A light source device 11203 is connected to the endoscope 11100. Light produced by the light source device 11203 is led by a light guide extended inside the lens-barrel 11101 to the tip of the lens-barrel, and is radiated toward the object to be observed in the body cavity of the patient 11132 through the objective lens. Note that the endoscope 11100 may be an endoscope of the direct view type or of the oblique view type or side view type.

An optical system and an imaging element are provided inside the camera head 11102, and reflected light (observation light) from the object to be observed is focused by the optical system onto the imaging element. The observation light is put to photoelectric conversion by the imaging element, and an electrical signal corresponding to the observation light, namely, an image signal corresponding to an observed image is produced. The image signal is transmitted as RAW data to a camera control unit (CCU) 11201.

The CCU 11201 is composed of a CPU (Central Processing Unit), a GPU (Graphics Processing Unit) or the like, and controls the operations of the endoscope 11100 and the display device 11202 in an integrated manner. Further, the CCU 11201 receives the image signal from the camera head 11102, and applies to the image signal a variety of image processing for displaying an image based on the image signal, such as, for example, development processing (demosaic processing).

The display device 11202 displays an image based on the image signal having undergone the image processing by the CCU 11201, under control by the CCU 11201.

The light source device 11203 is composed of a light source such as, for example, an LED (Light Emitting Diode), and supplies the endoscope 11100 with illumination light at the time of imaging the site of operation or the like.

The input device 11204 is an input interface for the endoscopic surgery system 11000. The user can input various kinds of information and commands to the endoscopic surgery system 11000 through the input device 11204. For example, the user can input commands to change the imaging conditions (the kind of illumination light, magnification, focal distance, etc.) for imaging by the endoscope 11100.

The treatment tool control device 11205 controls the driving of the energy treatment tool 11112 for cauterization or incision of a tissue, sealing of a blood vessel, etc. The pneumoperitoneum device 11206 feeds a gas into the body cavity of the patient 11132 through the pneumoperitoneum tube 11111, for swelling the body cavity, for the purpose of securing a visual field for the endoscope 11100 or securing a working space for the operator. The recorder 11207 is a device capable of recording various kinds of information on a surgery. The printer 11208 is a device capable of printing the various information on the surgery in various forms such as text, image, graph, etc.

Note that the light source device 11203 for supplying the endoscope 11100 with illumination light at the time of imaging the site of operation can be composed a white light source which is composed, for example, of an LED, a laser light source or a combination thereof. In the case where the white light source is composed of a combination of RGB light sources, it is possible to highly accurately control an output intensity and an output timing of each color (each wavelength), and therefore to adjust a white balance of an image to be picked up, at the light source device 11203. Besides, in this case, when the object to be observed is illuminated with laser lights from the RGB laser light sources on a time sharing basis and the driving of the imaging element of the camera head 11102 is controlled synchronously with the illumination timings, it is thereby possible to pick up images corresponding respectively to RGB on a time sharing basis. By this method, a color image can be obtained, without providing the imaging element with color filters.

In addition, the driving of the light source device 11203 may be controlled in such a manner that the intensity of the light outputted is varied at a predetermined time interval. When the driving of the imaging element of the camera head 11102 is controlled synchronously with the timings of light intensity variation to pick up images on a time sharing basis and the images thus picked up are synthesized, it is thereby possible to produce an image having a high dynamic range with neither so-called underexposed shadows nor so-called overexposed highlights.

Besides, the light source device 11203 may be so configured as to be able to supply light in a predetermined wavelength band corresponding to a special light observation. In the special light observation, for example, so-called narrow band imaging is conducted in which a predetermined tissue such as a blood vessel in a mucous membrane surface layer is imaged with a high contrast, by illumination with light in a narrower band as compared to illumination light at the time of ordinary observation (namely, white light), while utilizing wavelength dependency of absorption of light in a body tissue. Alternatively, in the special light observation, fluorescence imaging may be performed in which an image is obtained based on fluorescence generated by irradiation with excitation light. In the fluorescence imaging, for example, a method of irradiating a body tissue with excitation light and observing fluorescent light coming from the body tissue (autofluorescence imaging) is used, or a method of locally injecting a reagent such as indocyanine green into a body tissue and irradiating the body tissue with excitation light corresponding to the fluorescence wavelength of the reagent to obtain a fluorescent image is used. The light source device 11203 can be configured so as to be able to supply narrow band light and/or excitation light corresponding to such special light observation.

Figure 88:
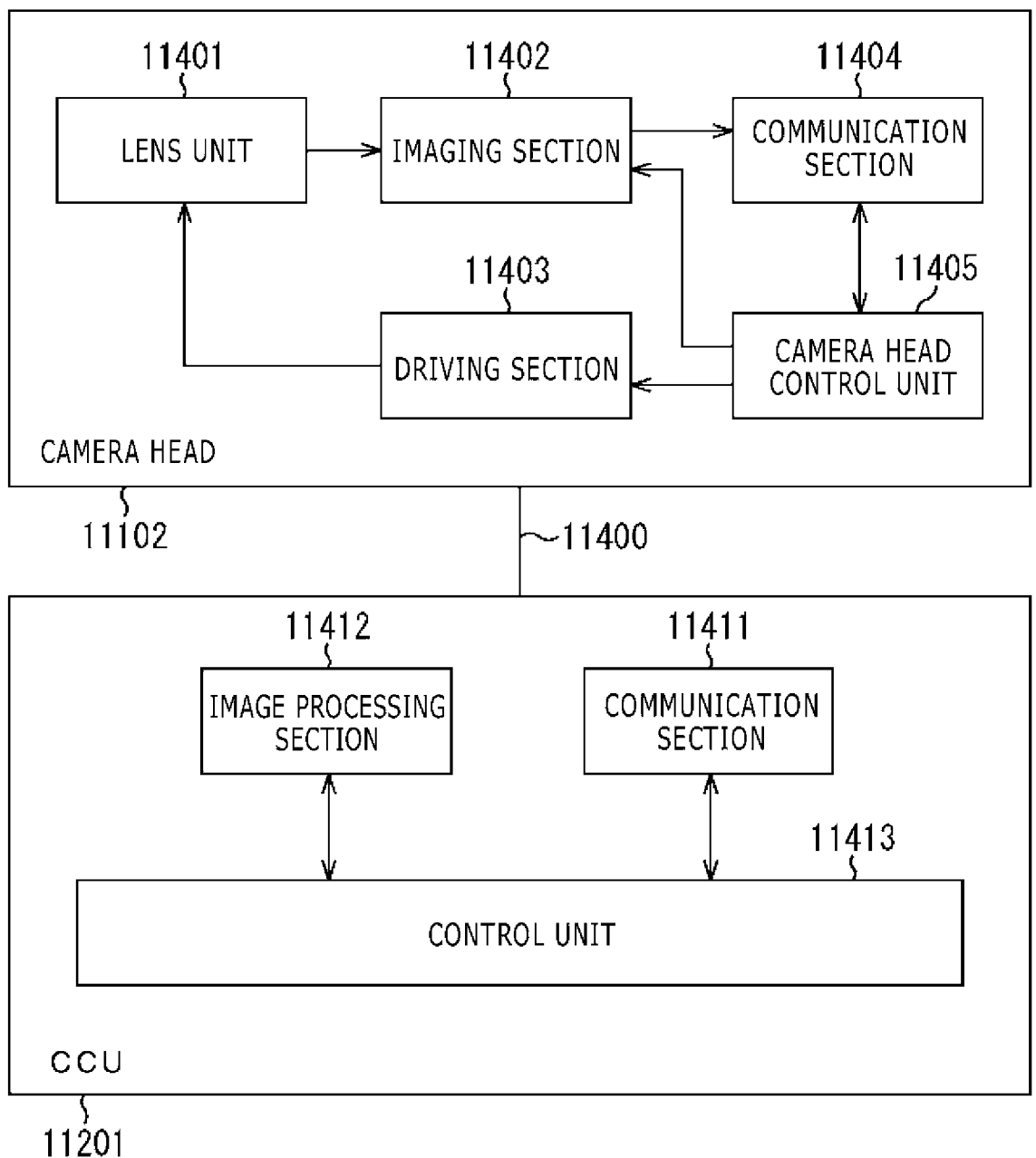
FIG. 88 is a block diagram illustrating an example of functional configuration of a camera head and a CCU.

FIG. 88 is a block diagram illustrating an example of functional configurations of the camera head 11102 and the CU 11201 illustrated in FIG. 87.

The camera head 11102 includes a lens unit 11401, an imaging section 11402, a driving section 11403, a communication section 11404, and a camera head control unit 11405. The CCU 11201 includes a communication section 11411, an image processing section 11412, and a control unit 11413. The camera head 11102 and the CCU 11201 are connected by a transmission cable 11400 so that communication is possible therebetween.

The lens unit 11401 is an optical system provided at a connection section for connection with the lens-barrel 11101. The observation light taken in via the tip of the lens-barrel 11101 is led to the camera head 11102, to be incident on the lens unit 11401. The lens unit 11401 is configured by combining a plurality of lenses including a zoom lens and a focus lens.

The imaging section 11402 is composed of an imaging element. The imaging element constituting the imaging section 11402 may be one element (so-called single-plate type) or may be a plurality of elements (so-called multi-plate type). In the case where the imaging section 11402 is configured in a multi-plate type structure, for example, image signals corresponding respectively to RGB are produced by the imaging element, and the images are synthesized to obtain a color image. Alternatively, the imaging section 11402 may be configured to have a pair of imaging elements for acquiring image signals for the right eye and the left eye corresponding to 3D (Dimensional) display. With the 3D display, the operator 11131 can accurately grasp the depth of the body tissue in the site of operation. Note that in the case where the imaging section 11402 is configured in a multi-plate type structure, a plurality of systems of the lens units 11401 can be provided correspondingly to the imaging elements.

In addition, the imaging section 11402 may not necessarily be provided in the camera head 11102. For example, the imaging section 11402 may be provide inside the lens-barrel 11101, directly behind the objective lens.

The driving section 11403 is composed of an actuator, and, under control by the camera head control unit 11405, moves the zoom lens and the focus lens of the lens unit 11401 by predetermined distances along an optical axis. As a result, the magnification and focus for the image to be picked up by the imaging section 11402 are appropriately adjusted.

The communication section 11404 is composed of a communication device for transfer of various kinds of information between itself and the CCU 11201. The communication section 11404 transmits an image signal obtained from the imaging section 11402 as RAW data to the CCU 11201 through the transmission cable 11400.

Besides, the communication section 11404 receives a control signal for controlling the driving of the camera head 11102 from the CCU 11201, and supplies the signal to the camera head control unit 11405. The control signal includes information on imaging conditions such as, for example, information for designating a frame rate of the images to be picked up, information for designating an exposure value at the time of imaging, and/or information for designating the magnification and focus of the image to be picked up.

Note that the imaging conditions such as the frame rate, exposure value, magnification, focus, etc. may be appropriately designated by the user, or may be automatically set by the control unit 11413 of the CCU 11201 on the basis of the image signal acquired. In the latter case, a so-called AE (Auto Exposure) function, a so-called AF (Auto Focus) function and a so-called AWE (Auto White Balance) function are incorporated in the endoscope 11100.

The camera head control unit 11405 controls the driving of the camera head 11102, based on the control signal received from the CCU 11201 through the communication section 11404.

The communication section 11411 is composed of a communication device for transfer of various kinds of information between itself and the camera head 11102. The communication section 11411 receives an image signal transmitted from the camera head 11102 through the transmission cable 11400.

In addition, the communication section 11411 transmits a control signal for controlling the driving of the camera head 11102, to the camera head 11102. The image signal and the control signal can be transmitted by electrical communication, optical communication or the like.

The image processing section 11412 applies various kinds of image processing to the image signal which is the RAW data transmitted from the camera head 11102.

The control unit 11413 performs various kinds of control concerning imaging of the site of operation or the like by the endoscope 11100, and display of the picked-up image obtained by imaging of the site of operation or the like. For example, the control unit 11413 produces a control signal for controlling the driving of the camera head 11102.

In addition, the control unit 11413 causes the picked-up image of the site of operation or the like to be displayed on the display device 11202, based on the image signal having undergone the image processing by the image processing section 11412. In this instance, the control unit 11413 may recognize various kinds of objects in the picked-up image by use of various kinds of image recognition technology. For example, by detecting edge shapes and/or colors of the objects in the picked-up image and the like, the control unit 11413 can recognize surgical tools such as forceps, a specific part of living body, bleeding, mist at the time of using the energy treatment tool 11112, etc. At the time when the picked-up image is displayed on the display device 11202, the control unit 11413 may superimposingly display various kinds of surgery assisting information on the image of the site of operation, by use of the results of recognition. With the surgery assisting information superimposingly displayed and presented to the operator 11131, the burden on the operator 11131 can be alleviated and the operator 11131 can proceed the operation in a reliable manner.

The transmission cable 11400 connecting the camera head 11102 and the CCU 11201 is an electrical signal cable corresponding to communication of electrical signals, an optical fiber corresponding to optical communication, or a composite cable thereof.

While communication is conducted on a wired basis by using the transmission cable 11400 in the example illustrated here, the communication between the camera head 11102 and the CCU 11201 may be carried out wirelessly.

An example of an endoscopic surgery system to which the technology according to the present disclosure is applicable has been described above. The technology according to the present disclosure is applicable to the lens unit 11401 and the imaging section 11402 of the camera head 11102, in the configuration described above. Specifically, the camera modules 1 according to the first to eleventh embodiments can be applied as the lens unit 11401 and the imaging section 11402. With the technology according to the present disclosure applied to the lens unit 11401 and the imaging section 11402, it is possible to obtain a sharper image of the site of operation, while downsizing the camera head 11102.

Note that while an endoscopic surgery system has been described as an example here, the technology according to the present disclosure may be applied to other systems such as, for example, a microsurgery system.

20. Example of Application to Mobile Body

The technology according to the present disclosure (the present technology) is applicable to a variety of products. For example, the technology according to the present disclosure may be realized as a device to be mounted on a mobile body of any of such kinds as automobiles, electric vehicles, hybrid electric vehicles, motorcycles, bicycles, personal mobilities, airplanes, drones, ships, and robots.

Figure 89:
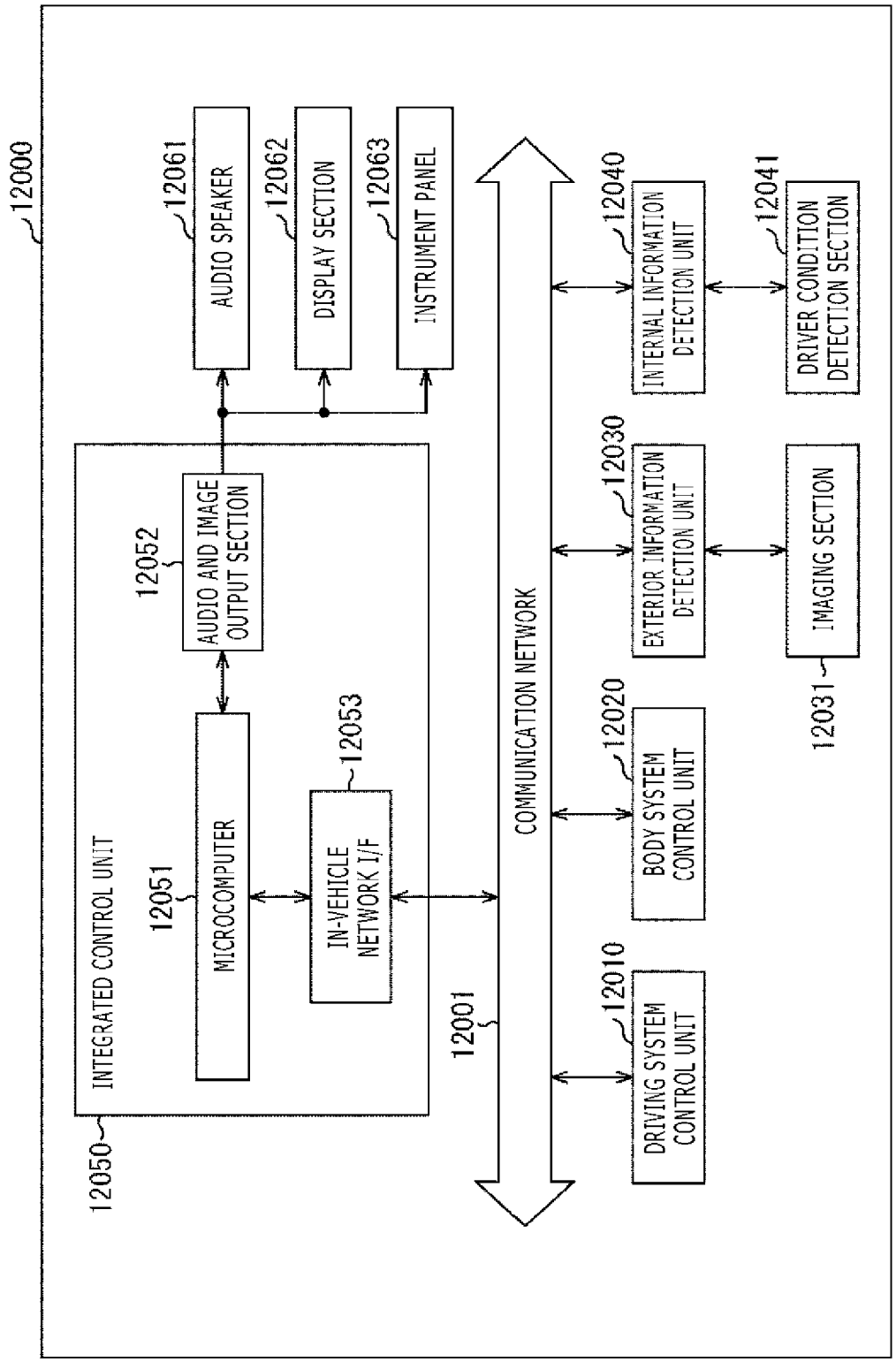
FIG. 89 is a block diagram illustrating an example of general configuration of a vehicle control system.

FIG. 89 is a block diagram illustrating an example of general configuration of a vehicle control system, which is an example of mobile body control system to which the technology according to the present disclosure can be applied.

A vehicle control system 12000 includes a plurality of electronic control units interconnected through a communication network 12001. In the example illustrated in FIG. 89, the vehicle control system 12000 includes a driving system control unit 12010, a body system control unit 12020, an exterior information detection unit 12030, an interior information detection unit 12040, and an integrated control unit 12050. In addition, as functional components of the integrated control unit 12050, there are illustrated a microcomputer 12051, an audio and image output section 12052, and an in-vehicle network I/F (interface) 12053.

The driving system control unit 12010 controls operations of devices concerned to a driving system of the vehicle, according to various programs. For instance, the driving system control unit 12010 functions as a controller for a driving force generating device that generates a driving force of the vehicle, such as an internal combustion engine or a driving motor, a driving force transmission mechanism for transmitting the driving force to a wheel or wheels, a steering mechanism for regulating a steering angle of the vehicle, and a brake device for generating a braking force of the vehicle.

The body system control unit 12020 controls operations of each of devices provided on the vehicle body, according to various programs. For example, the body system control unit 12020 functions as a controller for a keyless entry system, a smart key system, a power window device, or various lamps such as headlamp, tail lamp, brake lamp, turn signal lamps or fog lamp. In this case, electromagnetic waves emitted from a mobile device representing a key or signals from various switches may be inputted to the body system control unit 12020. The body system control unit 12020 accepts these inputs of electromagnetic waves or signals, and controls a door lock device, the power window device, the lamps and the like of the vehicle.

The exterior information detection unit 12030 detects information in the exterior of the vehicle on which the vehicle control system 12000 is mounted. For instance, an imaging section 12031 is connected to the exterior information detection unit 12030. The exterior information detection unit 12030 causes the imaging section 12031 to pick up an image of the vehicle exterior, and receives the picked-up image. The exterior information detection unit 12030 may perform object detection processing or distance measuring processing in regard of humans, vehicles, obstacles, signs, characters on the road surface, etc.

The imaging section 12031 is an optical sensor that receives light and outputs an electrical signal according to the amount of light received. The imaging section 12031 can output the electrical signal as an image, or can output the electrical signal as information on distance measurement. In addition, the light received by the imaging section 12031 may be visible light, or invisible light such as infrared rays.

The interior information detection unit 12040 detects information in the vehicle interior. The interior information detection unit 12040 is connected, for example, with a driver condition detection section 12041 for detecting the condition of the driver. The driver condition detection section 12041 includes, for example, a camera for imaging the driver, and the interior information detection unit 12040 may calculate the degree of fatigue or the degree of concentration of the driver, and may determine whether or not the driver is dozing in a sitting position based on detection information input from the driver condition detection section 12041.

The microcomputer 12051 can calculate control setpoints for the driving force generating device, the steering mechanism or the brake device, based on exterior or interior information acquired by the exterior information detection unit 12030 or the interior information detection unit 12040, and can output control commands to the driving system control unit 12010. For instance, the microcomputer 12051 can perform cooperative control for the purpose of realizing the function of ADAS (Advanced Driver Assistance System) that includes vehicle collision avoidance or shock mitigation, following traveling based on inter-vehicle distance, vehicle speed maintaining running, vehicle collision alarm, lane departure alarm, etc.

In addition, the microcomputer 12051 controls the driving force generating device, the steering mechanism, the brake device or the like, based on the information on the surroundings of the vehicle acquired by the exterior information detection unit 12030 or the interior information detection unit 12040, whereby cooperative control aimed at automatic driving for autonomously traveling without depending on the driver's operation, or the like can be performed.

Besides, the microcomputer 12051 can output control commands to the body system control unit 12020, based on the exterior information acquired by the exterior information detection unit 12030. For instance, the microcomputer 12051 can perform cooperative control aimed at anti-glare such as switching from a high beam mode to a low beam mode, by controlling the headlamp according to the position of the leading vehicle or the oncoming vehicle that is detected by the exterior information detection unit 12030.

The audio and image output section 12052 emits at least one output signal of audio and image signals to an output device capable of giving audio or visual information to the rider on the vehicle or to the exterior of the vehicle. In the example illustrated in FIG. 89, an audio speaker 12061, a display section 12062 and an instrument panel 12063 are illustrated as examples of the output device. The display section 12062 may include at least one of an on-board display and a head-up display, for example.

Figure 90:
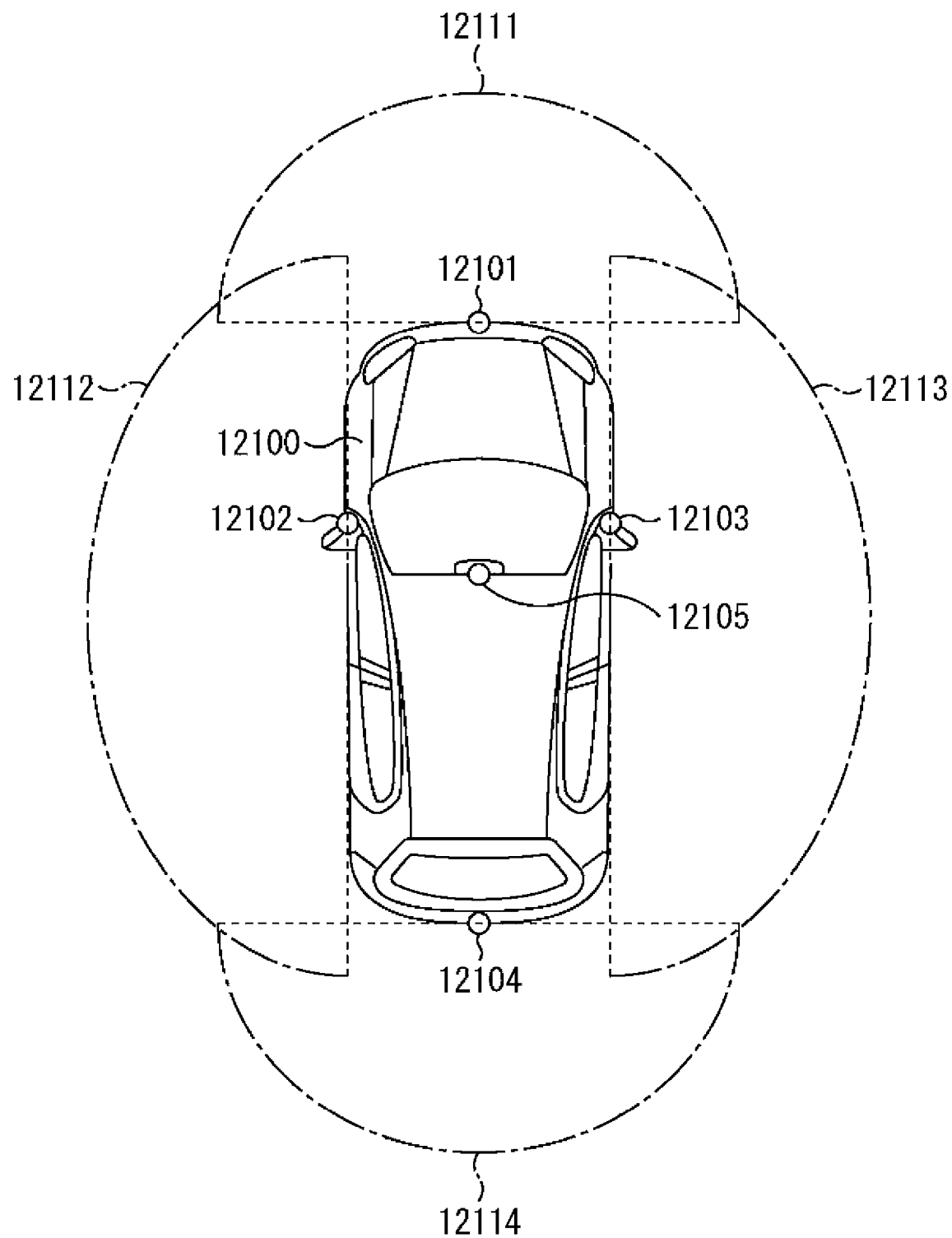
FIG. 90 illustrates an example of installation positions of an exterior information detection section and an imaging section.

FIG. 90 is a figure illustrating an example of layout position of the imaging section 12031.

In FIG. 90, the vehicle 12100 is provided with imaging sections 12101, 12102, 12103, 12104, and 12105 as the imaging section 12031.

The imaging sections 12101, 12102, 12103, 12104, and 12105 are provided, for example, at such positions as a front nose, sideview mirrors, a rear bumper, or a back door of the vehicle 12100, and an upper portion of a front glass in the vehicle compartment. The imaging section 12101 provided at the front nose and the imaging section 12105 provided at the upper portion of the front glass in the vehicle compartment acquire mainly an image of the front side of the vehicle 12100. The imaging sections 12102 and 12103 provided on the sideview mirrors acquire mainly images on the lateral sides of the vehicle 12100. The imaging section 12104 provided on the rear bumper or the back door acquires mainly an image of the rear side of the vehicle 12100. The front-side images acquired by the imaging sections 12101 and 12105 are used mainly for detection of a leading vehicle, pedestrians, obstacles, signals, traffic signs, traffic lanes, etc.

Note that FIG. 90 illustrates an example of imaging ranges of the imaging sections 12101 to 12104. An imaging range 12111 represents an imaging range of the imaging section 12101 provided at the front nose; imaging ranges 12112 and 12113 represent imaging ranges of the imaging sections 12102 and 12103 provided respectively on the sideview mirrors; and an imaging range 12114 represents an imaging range of the imaging section 12104 provided on the rear bumper or the back door. For instance, where the image data picked up by the imaging sections 12101 to 12104 are superimposed, a bird's-eye view image obtained by viewing the vehicle 12100 from above is thereby obtained.

At least one of the imaging sections 12101 to 12104 may have a function to acquire distance information. For instance, at least one of the imaging sections 12101 to 12104 may be a servo camera composed of a plurality of imaging elements, or may be an imaging element having pixels for phase difference detection.

For example, the microcomputer 12051 may obtain the distance to each solid object within the imaging ranges 12111 to 12114 and time variation of this distance (relative velocity with reference to the vehicle 12100), based on the distance information acquired from the imaging sections

12101 to 12104. By this, particularly, a solid object which is on the traveling path of the vehicle 12100, is the nearest to the vehicle 12100 and is running at a predetermined speed (for example, not less than 0 km/hour) in substantially the same direction as the vehicle 12100 can be extracted as the leading vehicle. Further, the microcomputer 12051 can set an inter-vehicle distance to be preliminarily secured between the vehicle 12100 and the leading vehicle, and can perform an automatic brake control (inclusive of a following stop control) or an automatic acceleration control (inclusive of a following start control). In this way, it is possible to perform cooperative control aimed at automatic driving for autonomously traveling without depending on the driver's operation.

For instance, the microcomputer 12051 can extract solid object data concerning solid objects while classifying them into two-wheel vehicles, ordinary-sized vehicles, heavy duty vehicles, pedestrians, electric poles, and other solid objects, based on the distance information obtained from the imaging sections 12101 to 12104, and can use the extracted solid object data for automatic avoidance of obstacles. For example, the microcomputer 12051 discriminates the obstacles in the surrounding of the vehicle 12100 into obstacles that can be visually recognized by the driver of the vehicle 12100 and obstacles that are difficult to visually recognize. Then, the microcomputer 12051 determines collision risk representing the degree of danger of collision on each obstacle. In a situation in which the collision risk is not less than a preset value and there is a possibility of collision, the microcomputer 12051 causes an alarm to be outputted to the driver through the audio speaker 12061 and/or the display section 12062, or causes forced deceleration or avoiding steering to be performed through the driving system control unit 12010, whereby driving assistance for avoiding collision can be performed.

At least one of the imaging sections 12101 to 12104 may be an infrared camera for detection of infrared rays. For example, the microcomputer 12051 can recognize a pedestrian by determining whether or not a pedestrian is present in the images picked up by the imaging sections 12101 to 12104. Such recognition of a pedestrian is conducted, for example, by a procedure of extracting characteristic points in the images picked up by the imaging sections 12101 to 12104 as infrared cameras, and a procedure of determining whether or not an object is a pedestrian by performing pattern matching processing on a series of characteristic points representing the profile of the object. When the microcomputer 12051 determines that a pedestrian is present in the images picked up by the imaging sections 12101 to 12104 and recognizes the pedestrian, the audio and image output section 12052 controls the display section 12062 such that a rectangular profile line for emphasis is superimposed on the recognized pedestrian. In addition, the audio and image output section 12052 may control the display section 12062 such that an icon or the like representing a pedestrian is displayed at a desired position.

An example of a vehicle control system to which the technology according to the present disclosure is applicable has been described above. The technology according to the present disclosure can be applied to the imaging section 12031, in the configuration described above. The camera modules 1 according to the first to eleventh embodiments can be applied as the imaging section 12031. With the technology according to the present disclosure applied as the imaging section 12031, it is possible to obtain a picked-up image easier to look at or to obtain distance information, while realizing downsizing. In addition, by use of the picked-up images and distance information thus obtained, it is possible to reduce the fatigue of the driver and to enhance safety of the driver and the vehicle.

In addition, the application of the present technology is not limited to the application to camera modules for picking up an image by detection of distribution of the amount of incident visible light. The present technology is applicable also to camera modules for detecting as an image a distribution of incident amounts of infrared rays, X-rays or particles or the like, and further generally to camera modules in a wider meaning, namely, camera modules (physical quantity distribution detection devices), such as fingerprint detection sensor, for picking up an image by detection of distribution of other physical quantities such as pressure and capacitance.

Embodiments of the present technology are not restricted to the above-described embodiments, and various modifications are possible without departing from the scope of the gist of the present technology.

For instance, it is possible to adopt a form obtained by combining all or part of the plurality of embodiments described above.

Note that the effects described herein are merely exemplary and are not restrictive, and other effects than those described herein may exist.

Note that the present technology can also take the following configurations.

(1)

A laminated lens structure including substrates with lens which each have a lens disposed inside a through-hole formed in the substrate and which are laminated on one another by direct bonding, in which the substrates are each provided in a vicinity of an outer circumference thereof with through grooves penetrating the substrate.

(2)

The laminated lens structure as described in (1) above, in which the through grooves are disposed rectilinearly along four sides of an outer circumference of a rectangle.

(3)

The laminated lens as described in (1) or (2) above, in which the through grooves are disposed at four parts correspondingly to four sides of an outer circumference of a rectangle, and the through grooves at the four parts are independent from one another.

(4)

The laminated lens structure as described in any one of (1) to (3) above, in which the through grooves are not disposed at corners of four sides of an outer circumference of a rectangle.

(5)

The laminated lens structure as described in any one of (1) to (4) above, in which an inside of the through groove is an air gap.

(6)

The laminated lens structure as described in any one of (1) to (4) above, in which a resin is placed fill the inside of the through grooves.

(7)

The laminated lens structure as described in any one of (1) to (6) above, in which the through grooves are disposed at same positions in the substrates vertically adjacent to each other.

(8)
The laminated lens structure as described in any one of (1) to (6) above,
in which the through grooves are disposed at different positions in the substrates vertically adjacent to each other.

(9)
A method of manufacturing a laminated lens structure, the method including:
forming each of a plurality of substrates with a through-hole in which to dispose a lens, and with through grooves formed on or along dicing lines;
laminating the plurality of substrates by direct bonding; and
individualizing the plurality of laminated substrates along the dicing lines.

(10)
The method of manufacturing a laminated lens structure as described in (9) above,
in which the through grooves are formed inside the dicing lines and are not formed at intersection parts of the dicing lines.

(11)
The method of manufacturing a laminated lens as described in (9) above,
in which the through grooves are formed on the dicing lines in such regions that the regions of the dicing lines in an odd-numbered substrate when the plurality of substrates are laminated are different from the regions of the dicing lines in an even-numbered substrate.

(12)
The method of manufacturing the laminated lens structure as described in (11) above,
in which the through grooves in one of the odd-numbered substrate and the even-numbered substrate are formed in intersection vicinity regions inclusive of intersection parts of rectangles partitioned by the dicing lines, and the through grooves in the other of the odd-numbered substrate and the even-numbered substrate are formed in straight-line regions in the middle between intersection parts of the rectangles partitioned by the dicing lines.

(13)
The method of manufacturing the laminated lens structure as described in (9) above,
in which processing of the through-hole and processing of the through grooves are conducted simultaneously.

(14)
The method of manufacturing the laminated lens structure as described in (9) above,
in which the resin is placed to fill the inside of the through grooves simultaneously with a resin forming the lens.

(15)
A method of manufacturing a laminated lens structure, the method including:
bonding a plurality of substrates with lens to one another by direct bonding, the substrates with lens each having a lens disposed inside a through-hole formed in the substrate;
forming the plurality of substrates with lens thus bonded with through grooves along dicing lines; and
individualizing the plurality of substrates with lens thus formed with the through grooves along the dicing lines.

(16)
An electronic apparatus including:
a laminated lens structure including substrates with lens which each have a lens disposed inside a through-hole formed in the substrate and which are laminated on one another by direct bonding, in which the substrates are each provided in a vicinity of an outer circumference thereof with through grooves penetrating the substrate.

(17)
A stacked lens substrate including:
a first lens substrate including a first lens in a first through-hole;
a second lens substrate including a second lens in a second through-hole, the second lens substrate being stacked on the first lens substrate; and
groove portions penetrating the first lens substrate and the second lens substrate in a cross-section view, wherein the first through-hole is disposed between at least two groove portions in a plan view.

(18)
The stacked lens substrate according to (17) above, where the first lens substrate is directly bonded to the second lens substrate.

(19)
The stacked lens substrate according to (18) above, where a first layer is formed on the first lens substrate and a second layer is formed on the second lens substrate, and where each of the first and second layers include one or more of an oxide, nitride material, or carbon.

(20)
The stacked lens substrate according to (19) above, where the first lens substrate is directly bonded to the second lens substrate via the first layer and the second layer.

(21)
The stacked lens substrate according to (20) above, where the first layer and the second layer include a plasma bonded portion.

(22)
The stacked lens substrate according to any one of (17) to (21) above, where an anti-reflection film is located in the first through-hole and the second through-hole.

(23)
The stacked lens substrate according to any one of (17) to (22) above, where the groove portions are disposed rectilinearly along four sides of a rectangle.

(24)
The stacked lens substrate according to any one of (17) to (22) above, where the groove portions are disposed at four parts corresponding to four sides of a rectangle, and the groove portions at the four parts are independent from one another.

(25)
The stacked lens substrate according to any one of (17) to (22) above, where the groove portions are not disposed at corners of four sides of a rectangle.

(26)
The stacked lens substrate according to any one of (17) to (25) above, where an inner void inside a groove portion is an air gap.

(27)
The stacked lens substrate according to any one of (17) to (25) above, where an inner void of a groove portion includes resin.

(28)
The stacked lens substrate according to any one of (17) to (27) above, where the groove portions are disposed at same positions in the substrates adjacent to each other in the plan view.

(29)
The stacked lens substrate according to any one of (17) to (27) above, where the groove portions are disposed at different positions in the substrates adjacent to each other in the plan view.

(30)
A method of manufacturing a stacked lens structure, the method including:
disposing a first lens in a first through-hole of a first lens substrate;
disposing a second lens in a second through-hole of a second lens substrate;
stacking the first lens substrate on the second lens substrate;
forming groove portions penetrating the first lens substrate and the second lens substrate in a cross-section view, wherein the first through-hole is disposed between at least two groove portions in a plan view; and
dicing the stacked substrates along dicing lines.

(31)
The method of manufacturing the stacked lens structure according to (30) above, where the groove portions are formed between adjacent dicing lines.

(32)
The method of manufacturing the stacked lens structure according to (30) above, where the groove portions are formed along the dicing lines in regions where the dicing lines in adjacent lens substrates are different from each other.

(33)
The method of manufacturing the stacked lens structure according to (32) above, where the groove portions in one of an odd-numbered lens substrate and an even-numbered lens substrate are formed at intersection regions of the dicing lines, and the groove portions in the other of an odd-numbered lens substrate and an even-numbered lens substrate are formed at regions between the intersection regions of the of the dicing lines.

(34)
The method of manufacturing the stacked lens structure according to any one of (30) to (33) above, where the through-holes and the groove portions are formed simultaneously.

(35)
The method of manufacturing the stacked lens structure according to any one of (30) to (34) above, further including filling an inside of the groove portions with resin simultaneously when forming the first lens.

(36)
A method of manufacturing a stacked lens structure, the method including:
bonding a plurality of lens substrates to one another by direct bonding, each lens substrate of the plurality of lens substrates including a lens disposed inside a through-hole formed in the respective lens substrate;
forming grooves portions along dicing lines; and
dicing the plurality of lens substrates along the dicing lines.

(37)
An electronic apparatus including:
a stacked lens substrate including:
a first lens substrate including a first lens in a first through-hole,
a second lens substrate including a second lens in a second through-hole, the second lens substrate being stacked on the first lens substrate, and
groove portions penetrating the first lens substrate and the second lens substrate in a cross-section view, where the first through-hole is disposed between at least two groove portions in a plan view; and
an image sensor corresponding to the first through-hole.

REFERENCE SIGNS LIST

1 Camera module
11 Laminated lens structure
12 Light-receiving element
13 Optical unit
21 Lens
41 (41a to 41e) Substrate with lens
43 Sensor substrate
51 Diaphragm plate
52 Opening
81 Support substrate
82 Lens resin portion
83 Through-hole
121 Light-shielding film
122 Upper-side surface layer
123 Lower-side surface layer
1740 Laminated lens structure
1741a to 1741f Substrate with lens
1742a to 1742f Support substrate
1743a to 1743f Through-hole
1744a to 1744f Lens resin portion
1746a to 1746e Through groove
1746f Groove
1801 Laminated lens structure
1811a to 1811c Substrate with lens
1821a to 1821c Support substrate
1822a to 1822c Lens resin portion
1823a to 1823c Through-hole
1824a to 1824c Through groove
1841 Resin
2000 Imaging device
2001 Image sensor
2002 Camera module

What is claimed is:

1. A stacked lens substrate comprising:
a first lens substrate including a first lens in a first through-hole;
a second lens substrate including a second lens in a second through-hole, wherein the second lens substrate is stacked on the first lens substrate; and
groove portions penetrating the first lens substrate and the second lens substrate in a cross-section view, wherein the first through-hole is disposed between at least two groove portions in a plan view, wherein the first lens substrate is directly bonded to the second lens substrate, wherein a first layer is formed on the first lens substrate and a second layer is formed on the second lens substrate, and wherein each of the first and second layers include one or more of an oxide, nitride material, or carbon.

2. The stacked lens substrate according to claim 1, wherein the first lens substrate is directly bonded to the second lens substrate via the first layer and the second layer.

3. The stacked lens substrate according to claim 2, wherein the first layer and the second layer include a plasma bonded portion.

4. A stacked lens substrate, comprising:
a first lens substrate including a first lens in a first through-hole;
a second lens substrate including a second lens in a second through-hole, wherein the second lens substrate is stacked on the first lens substrate, and
groove portions penetrating the first lens substrate and the second lens substrate in a cross-section view, wherein the first through-hole is disposed between at least two groove portions in a plan view, and wherein an anti-reflection film is located in the first through-hole and the second through-hole.

5. The stacked lens substrate according to claim 4, wherein the first lens substrate is directly bonded to the second lens substrate.

6. The stacked lens substrate according to claim 1, wherein the groove portions are disposed rectilinearly along four sides of a rectangle.

7. The stacked lens substrate according to claim 1, wherein the groove portions are disposed at four parts corresponding to four sides of a rectangle, and wherein the groove portions at the four parts are independent from one another.

8. The stacked lens substrate according to claim 1, wherein the groove portions are not disposed at corners of four sides of a rectangle.

9. The stacked lens substrate according to claim 1, wherein an inner void inside a groove portion is an air gap.

10. A stacked lens substrate, comprising:
a first lens substrate including a first lens in a first through-hole;
a second lens substrate including a second lens in a second through-hole, wherein the second lens substrate is stacked on the first lens substrate; and
groove portions penetrating the first lens substrate and the second lens substrate in a cross-section view, wherein the first through-hole is disposed between at least two groove portions in a plan view, and wherein an inner void of a groove portion includes resin.

11. The stacked lens substrate according to claim 1, wherein the groove portions are disposed at same positions in the substrates adjacent to each other in the plan view.

12. The stacked lens substrate according to claim 1, wherein the groove portions are disposed at different positions in the substrates adjacent to each other in the plan view.

13. A method of manufacturing a stacked lens structure, the method comprising:
disposing a first lens in a first through-hole of a first lens substrate;
disposing a second lens in a second through-hole of a second lens substrate;
stacking the first lens substrate on the second lens substrate;
forming groove portions penetrating the first lens substrate and the second lens substrate in a cross-section view, wherein the first through-hole is disposed between at least two groove portions in a plan view; and
dicing the stacked substrates along dicing lines,
wherein the through-holes and the groove portions are formed simultaneously.

14. The method of manufacturing the stacked lens structure according to claim 13,
wherein the groove portions are formed along the dicing lines in regions where the dicing lines in adjacent lens substrates are different from each other.

15. A method of manufacturing a stacked lens structure, the method comprising:
disposing a first lens in a first through-hole of a first lens substrate;
disposing a second lens in a second through-hole of a second lens substrate;
stacking the first lens substrate on the second lens substrate;
forming groove portions penetrating the first lens substrate and the second lens substrate in a cross-section view, wherein the first through-hole is disposed between at least two groove portions in a plan view; and
dicing the stacked substrates along dicing lines,
wherein the groove portions are formed along the dicing lines in regions where the dicing lines in adjacent lens substrates are different from each other,
wherein the groove portions in one of an odd-numbered lens substrate and an even-numbered lens substrate are formed at intersection regions of the dicing lines, and
wherein the groove portions in the other of an odd-numbered lens substrate and an even-numbered lens substrate are formed at regions between the intersection regions of the of the dicing lines.

16. The method of manufacturing the stacked lens structure according to claim 13, wherein the groove portions are formed between adjacent dicing lines.

17. A method of manufacturing a stacked lens structure, the method comprising:
disposing a first lens in a first through-hole of a first lens substrate;
disposing a second lens in a second through-hole of a second lens substrate;
stacking the first lens substrate on the second lens substrate;
forming groove portions penetrating the first lens substrate and the second lens substrate in a cross-section view, wherein the first through-hole is disposed between at least two groove portions in a plan view;
dicing the stacked substrates along dicing lines; and
filling an inside of the groove portions with resin simultaneously when forming the first lens.

18. A method of manufacturing a stacked lens structure, the method comprising:
bonding a plurality of lens substrates to one another by direct bonding, each lens substrate of the plurality of lens substrates including a lens disposed inside a through-hole formed in the respective lens substrate;
forming groove portions along dicing lines; and
dicing the plurality of lens substrates along the dicing lines.

19. An electronic apparatus, comprising:
a stacked lens substrate, including:
a first lens substrate including a first lens in a first through-hole,
a second lens substrate including a second lens in a second through-hole, wherein the second lens substrate is stacked on the first lens substrate, and
groove portions penetrating the first lens substrate and the second lens substrate in a cross-section view, wherein the first through-hole is disposed between at least two groove portions in a plan view; and
an image sensor corresponding to the first through-hole.

20. The stacked lens substrate according to claim 5, wherein the first lens substrate is directly bonded to the second lens substrate via a first layer and a second layer.

21. The stacked lens substrate according to claim 20, wherein the first layer and the second layer include a plasma bonded portion.

\* \* \* \* \*